United States Patent [19]

Kajiya et al.

[11] Patent Number: 5,977,977
[45] Date of Patent: *Nov. 2, 1999

[54] METHOD AND SYSTEM FOR MULTI-PASS RENDERING

[75] Inventors: James T. Kajiya, Duvall; John M. Snyder, Redmond, both of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/670,491

[22] Filed: Jun. 27, 1996

Related U.S. Application Data

[63] Continuation-in-part of application No. 08/560,114, Nov. 17, 1995, abandoned, which is a continuation of application No. 08/511,553, Aug. 4, 1995, abandoned.

[51] Int. Cl.⁶ ........................................ G06F 15/00
[52] U.S. Cl. .............................................. 345/418
[58] Field of Search ....................... 345/418–20, 435–7, 345/501–3

[56] References Cited

U.S. PATENT DOCUMENTS

| | | | |
|---|---|---|---|
| 4,631,690 | 12/1986 | Corthout et al. | 364/518 |
| 4,645,459 | 2/1987 | Graf et al. | 434/43 |
| 5,287,438 | 2/1994 | Kellher | 345/432 |
| 5,295,235 | 3/1994 | Newman | 345/433 |
| 5,363,475 | 11/1994 | Baker et al. | 345/422 |
| 5,392,385 | 2/1995 | Evangelist et al. | 345/431 |
| 5,488,684 | 1/1996 | Gharahorlii et al. | 345/423 |
| 5,522,018 | 5/1996 | Takeda et al. | 345/422 |
| 5,561,752 | 10/1996 | Jevans | 345/433 |
| 5,563,989 | 10/1996 | Billyard | 345/426 |
| 5,586,234 | 12/1996 | Sakuraba et al. | 345/430 |
| 5,596,686 | 1/1997 | Duluk, Jr. | 345/122 |
| 5,598,517 | 1/1997 | Watkins | 345/441 |
| 5,630,043 | 5/1997 | Uhlin | 345/425 |
| 5,634,850 | 6/1997 | Kitahara et al. | 463/33 |
| 5,651,104 | 7/1997 | Cosman | 345/428 |
| 5,673,401 | 9/1997 | Volk et al. | 345/327 |
| 5,684,935 | 11/1997 | Demesa, III et al. | 345/419 |
| 5,684,939 | 11/1997 | Foran et al. | 345/431 |
| 5,710,876 | 1/1998 | Peercy et al. | 345/426 |
| 5,729,669 | 3/1998 | Appleton | 345/422 |
| 5,729,672 | 3/1998 | Ashton | 345/426 |
| 5,742,749 | 4/1998 | Foran et al. | 345/426 |

*Primary Examiner*—Phu K. Nguyen
*Attorney, Agent, or Firm*—Klarquist Sparkman Campbell Leigh & Whinston LLP

[57] ABSTRACT

A method for improved multi-pass rendering in a graphics system includes rendering geometry in a scene to generate rendered image data and then feeding back this rendered image data for a subsequent rendering pass for the same or other geometry in a scene. Geometric primitives are rasterized to generate pixel data, which is stored in a rasterization buffer. The pixel data, including lists of fragment records, is resolved and stored in a shared memory. Resolved pixel data can be combined to generate a display image at real-time, interactive rates. The resolved pixel data can also be used as a texture for subsequent rendering operations. Geometry in a scene can be rasterized in more than one pass to generate pixel data including fragments for partially covered pixels. Fragments from subsequent passes can be blended with corresponding fragments stored in the rasterization buffer from a previous pass.

19 Claims, 48 Drawing Sheets

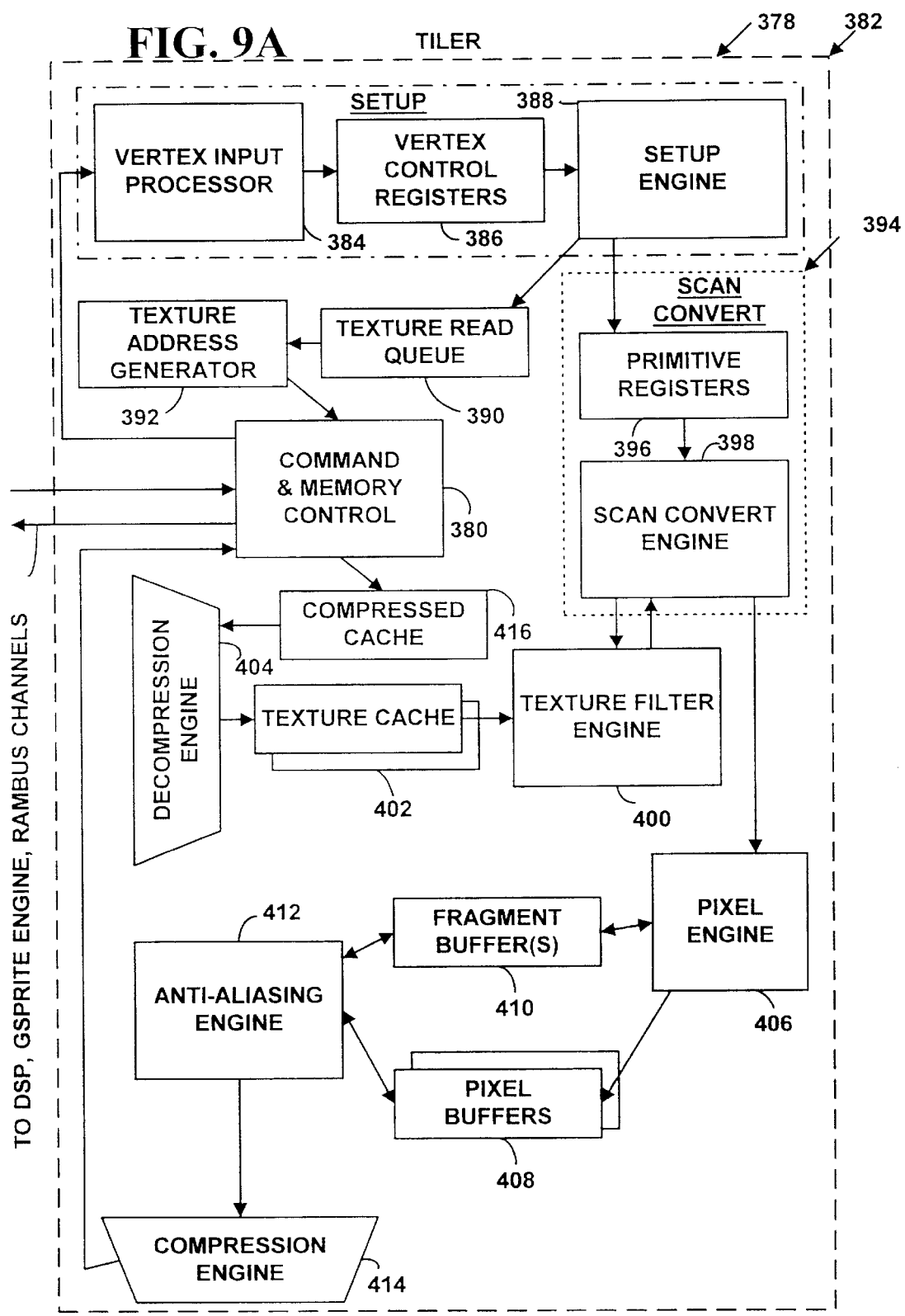

548 BOUNDING BOX
546 OBJECT

552 GSPRITE
550 OBJECT
556 32x32 PIXEL CHUNK
554 32 PIXEL CHUNK BOUNDARY

32x32 PIXEL CHUNK 568
558
560 OBJECT
570
32 PIXEL CHUNK BOUNDARY
564 GSPRITE
562 OBJECT
566 GSPRITE
572 32x32 PIXEL SCREEN BOUNDARY

METHOD AND SYSTEM FOR MULTI-PASS RENDERING

REFERENCE TO PRIOR APPLICATIONS

This is a continuation-in-part of application Ser. No. 08/560,114, filed Nov. 17, 1995, now abandoned. Application Ser. No. 08/560,114 is a continuation of application Ser. No. 08/511,553, filed Aug. 4, 1995, which is now abandoned.

TECHNICAL FIELD

The invention relates to graphics rendering, and more specifically relates to a method and system for performing multi-pass rendering in a graphics system.

BACKGROUND

Graphics rendering refers generally to the process of generating a two-dimensional image from graphical models. A graphical model defines attributes of a real or imaginary object which are to be represented in a rendered image. These attributes include, for example, color, shape, and position of an object in a graphics scene. In the process of rendering these models, a graphics system generates a display image, which typically includes an array of pixel data. A pixel is a point or picture element in a display device, and in the context of graphics processing, also corresponds to a point in the two-dimensional space to which the graphical models are rendered. The pixel data of a rendered image includes one or more data values describing attributes of a pixel used to display it. For instance, this pixel data can include intensity values for color components. These intensity values are then used to display the array of pixels comprising an image on physical output device such as a raster display device.

Graphics processing is often classified by the dimension of the models to be rendered 25 to an image. For instance, two-dimensional graphics processing ("2-D graphics") refers to the generation of an image from graphical models having two dimensions (x and y coordinates). and three-dimensional graphics processing ("3-D" graphics) refers the processing of three-dimensional models.

Graphics processing can also be classified as "real time" which means that 1) the display image is updated so that the user perceives continuous motion of the objects in the scene; and 2) there is minimal and predictable "transport delay" between user input, which change the position of objects or the viewpoint of the scene, and the display of an image in response to this input. To achieve this affect, a scene, or objects in the scene, must be rendered within a predefined period of time.

In 3-D graphics applications, an objects in a scene are represented by 3-D graphical models, which include geometric data used to model the surface and position of the objects, and visual attributes used to model the appearance of the objects. There are a number of ways that a geometric model can represent a 3-D object, including polygon meshes, parametric surfaces, or quadratic surfaces. Using a polygon mesh, for example, the surface of an object is modeled with several interconnected polygons. The surface elements, in this case polygons, are referred to as geometric primitives. Visual attributes such as red, green, and blue color data, and possibly other model data is stored at the vertices of the polygon.

In the rendering process, the geometric primitives corresponding to objects in a scene are processed to generate a display image. In the context of 3-D graphics, the rendering process includes transforming the graphical models in a scene, and rasterizing the geometric primitives in the models to generate pixel data.

The rendering process typically begins by transforming the vertices of the geometric primitives to prepare the model data for the rasterizing step. While the specific details of the transformation phase varies, a few examples will illustrate the process. The modeling transform, in some systems, is used to convert the vertices of a model from the model's local coordinate to world coordinates, the coordinates in which a complete scene is represented. The next step is to determine potentially visible objects in a 3-D space referred to as the view volume. This step is commonly performed in view reference coordinates, which describes object locations relative to a viewpoint or eyepoint. Objects that are not potentially visible at this stage can be disregarded while objects that are least partially in the view volume are "clipped" to the view volume.

After transforming the objects, the geometric primitives for the objects are "rasterized." Rasterizing generally refers to the process of computing a pixel value for a pixel in the view space based on data from the geometric primitives that project onto or "cover" the pixel. Rasterizing is sometimes referred to as "tiling" because of the analogy to tiling a floor. Imagine that the pixels are square elements or tiles, and that a polygon is the floor plan. The rasterizing step includes tiling this floor plan by computing pixel values for the pixels or "tiles" within the polygon.

While there are a number of ways to scan convert a geometric primitive, this process generally involves computing a pixel intensity value or values based on the data from polygons covering that pixel. For example, color values stored at the vertices of a polygon can be interpolated to find a color value at a given pixel in the interior of the polygon. During this process, lighting and shading models can also be used to compute pixel values for pixels across the surface of the polygon.

The color and opacity of a pixel can also be determined using a process called texture mapping. Texture mapping is the process of mapping a two-dimensional image to the surface of an object. Where the surface of the object is modeled with polygons, texture mapping involves mapping the image to the surface of a polygon.

In one application of texture mapping, colors accessed from a two-dimensional table (2-D table) are applied to the surface of a polygon. The table lookup is computed by interpolating 2-D texture indices specified at each vertex, and using the interpolated index to look up the color at each pixel.

In some cases, a polygon may have translucency. The translucency of a polygon is typically represented by an opacity value, specifying the degree to which the polygon is translucent. Translucency, while more complicated, can be handled in a similar fashion to color. For example, each pixel rasterized within a polygon can have a color and opacity formed by some function of a color and opacity value interpolated over the polygon from values at its vertices, and a color and opacity retrieved from the texture map. The function that combines the interpolated and looked-up color/opacity values is sometimes referred to as the texture application function. The result of the texture application function is called the composed color and composed opacity.

An example of a texture application function called the "modulate mode" is described by J. Neider, T. Davis, and M. Woo in "OpenGL Programming Guide", Addison-Wesley Publishing Co. Reading, Mass., 1992, pp. 275.

In the OpenGL modulate mode, the composed color and opacity, $C_c$ and $A_c$, are given by:

$C_c = C_i C_t$ $A_c = A_i A_t$ where $C_i$ and $A_i$ are the color and opacity interpolated over the polygon, and $C_t$ and $A_t$ are the color and opacity retrieved from the texture map.

A major problem in the design of a graphics system is designing the system to support complex lighting add shading operations. There is a conflict between simplifying the hardware design on the one hand, and supporting more sophisticated lighting operations on the other. One way to simplify the hardware design is to support only a single texture map access for each pixel rasterized. Unfortunately, more complex lighting models often require that more than one texture map be accessed.

One way to address this problem is to decompose the lighting model into a series of passes, each of which uses a single texture map. The results of subsequent passes can then be combined with the results of a previous pass using a function called the blending function. The result of the blending function is called the buffer color and buffer opacity because it is stored in the rasterization buffer.

Blending functions from OpenGL involve linear combinations of the interpolated and texture-mapped color/opacity. For example, consider a polygon that has a texture-mapped diffuse color as well as a separately texture-mapped emission color:

D N·L+E where D is the texture-mapped diffuse color, N·L is the dot product of the normal with the light direction, and E is the texture-mapped emission color. The following two passes decompose this lighting model into steps the hardware can compute:

1. [buffer color=D N·L] Render polygon interpolating N·L, and using D as the texture map. The texture application function multiplies the interpolated and looked-up quantities. The blending function simply stores the composed color as the buffer color.
2. [buffer color=D N·L+E] Render polygon interpolating the unit color and using E as the texture map. This effectively ignores the interpolated color and yields E as the composed result. The blending function is set to add this result to the result of the previous pass.

When a general lighting expression is decomposed into a series of passes, the same geometric primitives are rasterized multiple times. Each time the geometry is rasterized, the different terms of the lighting expression are accumulated.

As noted above, it is particularly difficult to implement multi-pass rendering in a graphics system. One way to support a limited form of multi-pass rendering is to use a single accumulation buffer. The single accumulation buffer is discussed in P. Haeberli and K. Akeley, "The Accumulation Buffer: Hardware Support for High-Quality Rendering," in Computer Graphics, SIGGRAPH '90 Proceedings, August, 1990, 24(4), pp. 309–318. While the Accumulation Buffer can be used for multi-pass rendering, it only addresses a limited subset of possible lighting expressions.

One major limitation to using a single accumulator is that it cannot support multi-pass rendering operations where the result of one pass must be stored temporarily and then added or multiplied with results of another pass. The problem is analogous to compiling arithmetic expressions using an ALU with a single accumulator. To compute an expression like a*b+c*d requires at least one temporary variable (e.g., to store a*b). In the same way, a single accumulation buffer is not sufficient for all lighting expressions because there is only a single destination for intermediate expressions. The accumulation buffer provides no support for temporarily storing an intermediate result, which can then be combined with results of other passes.

In designing a graphics system to support multi-pass rendering, it is important that the problem of aliasing also be addressed. From the tiling analogy above, it is clear that discrete pixels cannot precisely represent continues surfaces. For example, a polygon may only partially cover a pixel region. In this case, the edge or edges of a polygon cross over the pixel region. If the pixel were approximated as being fully covered by this polygon, anomalies such as jaggy edges in the rendered image would likely result. A technique known generally as antialiasing attempts to address this problem. In general, antialiasing is used to compute pixel intensities for partially covered pixels to reduce the discontinuities introduced by representing a continues object with a discrete array of pixels.

One way to perform antialiasing is to generate pixel fragments for partially covered pixels during the rasterization process and then resolve the pixel fragments stored for each pixel to compute final color values for each pixel. A software implementation of this approach is discussed in: L. Carpenter in "The A-Buffer, An Antialiased Hidden Surface Method," in Computer Graphics, SIGGRAPH '84 proceedings, July 1984, 18(3), pp. 103–108.

It is very difficult to support this approach to antialiasing and multi-pass rendering at he same time because of the problem of blending pixel fragments. This problem can arise when attempting to make more than one rendering pass before resolving the pixel fragments. For example, when rendering the same geometry in two passes, the pixel fragments from the second pass need to be combined with the pixel fragments stored from the first pass. This problem has not been addressed.

As outlined above, there are a number of difficulties in supporting advanced lighting and shading operations in a graphics rendering system. It is even more difficult to support these features in a real time, interactive graphics system. Sophisticated rendering features such as multiple light source shadows, environment mapped reflective objects, spot lights, and ground fog have been limited to off-line software rendering systems. Because of the complexity of the computations involved, such features are usually attempted in software only and do not achieve real time performance.

Present real-time graphics rendering systems do not adequately support advanced lighting and shading functions. The rigid rendering pipelines and fixed rendering modes of high end 3-D graphics workstations make it impossible to implement these advanced effects without drastic reductions in real-time performance. As a result, users who require real-time display must put up with limited rendering flexibility.

SUMMARY OF THE INVENTION

Addressing these and other drawbacks of present graphics rendering systems, the invention provides improved methods and systems for multi-pass rendering. In one embodiment of the invention, geometric primitives can be rendered to an image, and this rendered image can then be used as a texture for the same or other geometric primitives in a scene. Geometric primitives in a graphics scene are rasterized to generate pixel data, which is stored in a rasterization buffer. The pixel data in the rasterization buffer is resolved and stored in a memory such that the resolved pixel data can be retrieved for subsequent rendering passes.

In one application of this embodiment, the resolved pixel data can be used as a texture for a subsequent rendering pass on the same geometry. This feature enables a graphics system to support more complex lighting and shading functions because intermediate results of a lighting or shading expression can be stored temporarily in memory. The intermediate results stored in memory can be added or multiplied with intermediate results of another rendering pass to generate the desired effect.

In another application of this embodiment, resolved pixel data can be texture mapped to other geometry in the same scene. With this feature, an embodiment of the invention can render an object in a scene, for example, and then map the rendered image representing the object to the surface of other geometry in a scene. In one embodiment, texture maps and rendered image data is stored in a compatible format in a shared memory. Geometry is rendered and stored in shared memory in this format. Rendered image data in memory can be composited to generate a display image or can be retrieved for use in subsequent rendering passes. This capability enables a graphics system to support reflection mapping. It also enables a graphics system to support shadows from one or more different light sources.

An embodiment of the invention can render a 3-D graphics scene in real-time, even with multiple rendering passes. The support for multi-pass rendering enables this embodiment to handle more sophisticated and a wider range of lighting and shading expressions. In addition, these advanced rendering operations can be performed in real-time due to novel aspects of the invention.

According to another aspect of the invention, pixel data generated from more than one rendering pass can be composited in a rasterization buffer. In one embodiment, a set of geometric primitives is rasterized to create a corresponding set of pixel data, and the pixel data is stored in the rasterization buffer. In a subsequent pass, the set of geometric primitives is rasterized again and the pixel data generated in this pass is composited with pixel data stored in the rasterization buffer from a previous pass. The pixel data, in this embodiment includes fragment records for partially covered or translucent pixels which includes color, coverage, depth and alpha data. Fragments generated during a first pass and stored in the rasterization buffer are blended with fragments generated during a subsequent pass.

In one embodiment, fragment records are maintained in list structures corresponding to pixel locations in an image being rendered. To blend a fragment generated in a subsequent pass, a fragment list at a given pixel location is searched to find a fragment with the same depth value. If more than one fragment has the same depth value, these fragments are checked to find one with matching coverage data. After completing compositing operations in the rasterization buffer, the pixel data is resolved and stored. This approach enables a graphics system to support sophisticated antialiasing and multi-pass rendering at the same time.

In another embodiment, a color clear operation can be performed on pixel data in the rasterization buffer to decrease rendering overhead. As noted above, intermediate rendering results can be stored, and then retrieved for subsequent rendering passes. In one embodiment of this approach, rendered image data is stored without depth or coverage data for each pixel. In some cases, this may require that background geometry, not part of a multi-pass lighting or shading operation, be re-rendered in black in a subsequent rendering pass only to perform hidden surface removal and proper antialiasing. A color clear operation performed on pixel data in the rasterization buffer can be used to eliminate this re-rendering step. A related feature to the color clear operation is the opacity clear operation, which also reduces extraneous rendering in subsequent passes.

Additional features and advantages of the invention will become apparent with reference to the following detailed description and accompanying drawings.

BRIEF DESCRIPTION OF THE DRAWINGS

FIGS. 9A–C are block diagrams illustrating alternative embodiments of a Tiler.

DETAILED DESCRIPTION

System Overview

In the following detailed description, we describe several embodiments with reference to an image processing system.

The image processing system supports real time image rendering and generation for both graphics and video processing. Due to the novel architecture and image processing techniques employed in the system, it can produce sophisticated real time 3-D animation at a significant cost savings over present graphics systems. In addition to graphics processing, the system supports video processing such as video editing applications, and can also combine video and graphics. For instance, the system can be used to apply video to graphical objects, or conversely, can be used to add graphical objects to video data.

The system supports a wide range of interactive applications. Its ability to support advanced real time animation makes it well-suited for games, educational applications, and a host of interactive applications. The system supports sophisticated user interfaces including 3-D graphics or combined graphics and video. Improving upon the limited graphics capabilities of today's windowing environments for personal computers, the system can support improved 3-D graphical user interfaces for applications ranging from office information processing on desktop computers to interactive television applications in a set-top box. The system makes very efficient use of memory and processor time and therefore can provide impressive image processing and display without unduly hindering performance of the application or responsiveness of the user interface to user actions.

Figure 1:
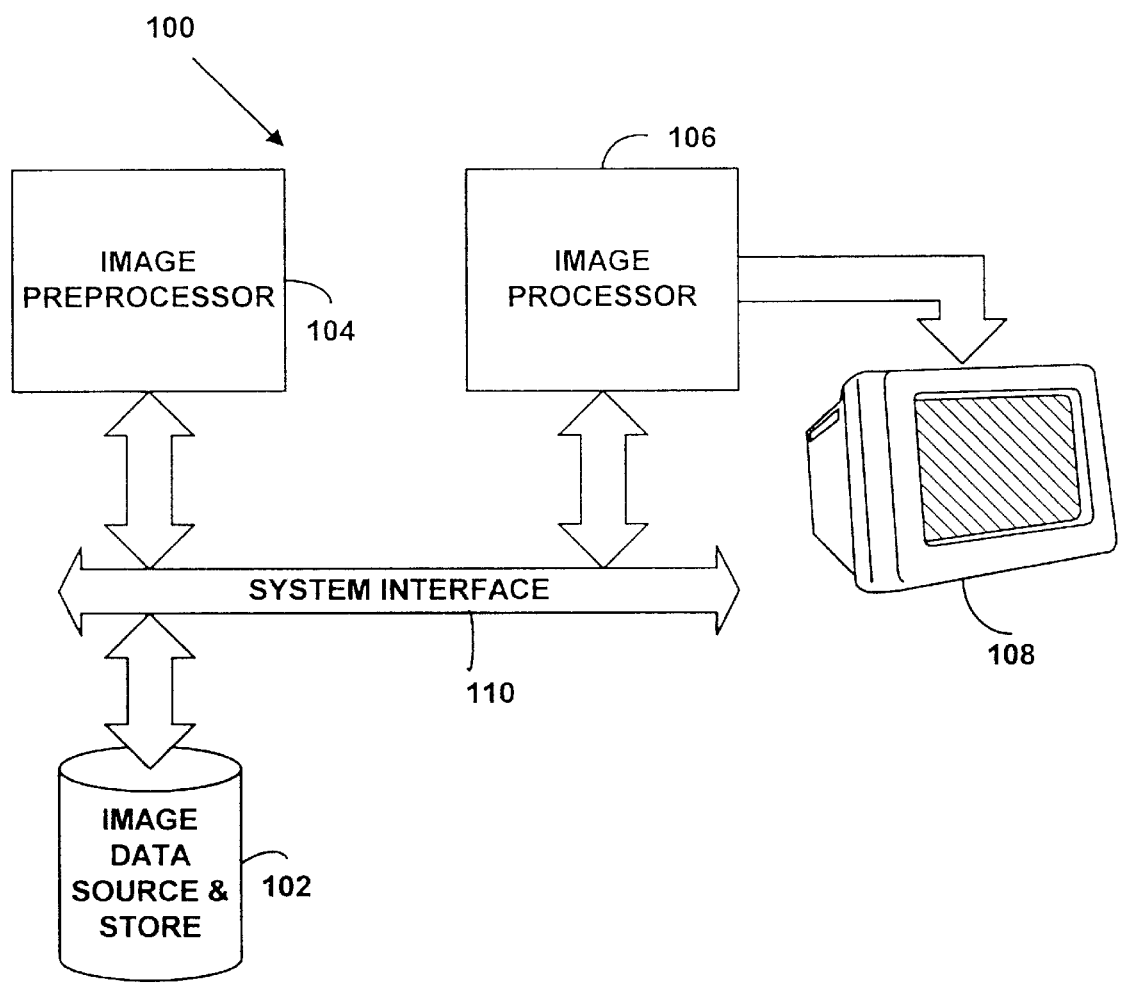
FIG. 1 is a block diagram of an image processing system.

FIG. 1 is a block diagram of the image processing system 100. The image processing system comprises an image data source and store 102, an image preprocessor 104, an image processor 106, and a display device 108, if immediate display of rendered images is desired. The elements in the system communicate through a system interface 110. The image data source and store 102 supplies image data to the system, and stores image data and commands. The image preprocessor 104 is responsible for manipulating the image data to prepare it for rendering. Examples of preprocessing functions include: defining objects in terms of geometric models, defining lighting and shadowing models, determining object locations, determining the location of a viewpoint and light sources, and geometry processing.

The image processor 106 renders the images, and generates a display image to be displayed on the display device 108. Rendering refers to the process of creating images from models and includes such functions as geometry processing (note that geometry processing can also be a preprocessing function), visible-surface determination, scan conversion, and lighting, to name a few. After rendering an image or parts of an image, the image processor 106 transfers rendered image data to the display device for display.

Below, we describe several features of the image processing system 100 in detail with reference to specific hardware and software architectures. However, it is important to note that the image processing described below can be implemented in a variety of alternative architectures.

The image processing system 100 achieves a vast price-performance improvement over existing high quality 3-D graphics systems known to the inventors. A number of advances in computer graphics contribute to this improvement. These advances include: composited image layers, image compression, chunking, and multi-pass rendering. We introduce these advances here, and describe these and other advances in more detail below.

Composited Image Layers (Gsprites)

In our system, multiple independent image layers may be composited together at video rates to create the output video signal. These image layers, which we refer to as generalized gsprites, or gsprites, can be rendered into and manipulated independently. The system will generally use an independent gsprite for each non-interpenetrating object in the scene. This allows each object to be updated independently, so that object update rate can be optimized based on scene priorities. For example, an object that is moving in the distant background may not need to be updated as often, or with as much accuracy, as a foreground object.

Gsprites can be of arbitrary size and shape. In one implementation, we use rectangular gsprites. Pixels in the gsprite have color and alpha (opacity) information associated with them, so that multiple gsprites can be composited together to create the overall scene.

Several different operations may be performed on gsprites at video rates, including scaling, rotation, subpixel positioning, and transformations to mimic motion, such as affine warps. So, while gsprite update rates are variable, gsprite transformations (motion, etc.) may occur at full video rates, resulting in much more fluid dynamics than could be achieved by a conventional 3-D graphics system that has no update rate guarantees.

Many 3-D transformations can be simulated by 2-D imaging operations. For example, a receding object can be simulated by scaling the size of the gsprite. By utilizing 2-D transformations on previously rendered images for intermediate frames, overall processing requirements are significantly reduced, and 3-D rendering power can be applied where it is needed to yield the highest quality results. This is a form of temporal level of detail management.

By using gsprite scaling, the level of spatial detail can also be adjusted to match scene priorities. For example, background objects, cloudy sky, etc., can be rendered into a small gsprite (low resolution) which is then scaled to the appropriate size for display. By utilizing high quality filtering, the typical low resolution artifacts are not as noticeable.

A typical 3-D graphics application (particularly an interactive game) trades off geometric level of detail to achieve higher animation rates. Gsprites allow the system to utilize two additional scene parameters—temporal level of detail and spatial level of detail—to optimize the effective performance as seen by the user. The spatial resolution at which the image of an object is rendered does not have to match the screen resolution at which it will be rendered. Further, the system can manage these trade-offs automatically without requiring application support.

Image Compression

Perhaps the most significant factor in determining system cost and performance is memory. A traditional high-end 3-D graphics system, for example, has over 30 Mbytes of memory, including frame buffers (double buffered), a depth buffer, a texture buffer, and an anti-aliasing buffer. And most of this is specialized memory which is significantly more expensive than DRAM. Memory bandwidth is always a critical bottleneck. The cost of high performance systems are often driven by the need to provide numerous banks of interleaved memory to provide adequate bandwidth for pixel and texture data accesses.

The system broadly applies image compression technology to solve these problems. Image compression has traditionally not been used in graphics systems because of the computational complexity required for high quality, and because it does not easily fit into a conventional graphics architecture. By using a concept we call chunking (described below), we are able to effectively apply compression to images and textures, achieving a significant improvement in price-performance.

In one respect, graphics systems have employed compression to frame buffer memory. High end systems utilize eight bits for each of three color components, and often also include an eight bit alpha value. Low end systems compress these 32 bits per pixel to as few as four bits by discarding information and/or using a color palette to reduce the number of simultaneously displayable colors. This compression results in very noticeable artifacts, does not achieve a significant reduction in data requirements, and forces applications and/or drivers to deal with a broad range of pixel formats.

The compression used in our system can achieve very high image quality yet still provide compression ratios of 10:1 or better. Another benefit of our approach is that a single high quality image format can be used for all applications, as distinguished from the standard PC graphics architecture which requires a trade-off between spatial resolution and color depth.

Chunking

Another significant advance in our system is referred to as chunking. A traditional 3-D graphics system (or any frame buffer for that matter), can be (and is) accessed randomly. Arbitrary pixels on the screen can be accessed in random order. Since compression algorithms rely on having access to a fairly large number of neighboring pixels (in order to take advantage of spatial coherence), compression can only be applied after all pixel updates have been made, due to the random access patterns utilized by graphics algorithms. This makes the application of compression technology to display buffers impractical.

This random access pattern also means that per-pixel hidden surface removal and anti-aliasing algorithms must maintain additional information for every pixel on the screen. This dramatically increases the memory size requirements, and adds another performance bottleneck.

Our system takes a different approach. A scene, or portions of a scene, can be divided into pixel regions (32×32 pixels in one specific implementation), called chunks. In one implementation, the system divides the geometry assigned to gsprites into chunks, but an alternative implementation could perform chunking without gsprites. The geometry is presorted into bins based on which chunk the geometry will be rendered into. This process is referred to as chunking. Geometry that overlaps a chunk boundary is preferably referenced in each chunk it is visible in. As the scene is animated, the data structure is modified to adjust for geometry that moves from one chunk to another.

Chunking provides several significant advantages. The use of chunking provides an effective form of compression. Since all the geometry in one chunk is rendered before proceeding to the next, the depth buffer need only be as large as a single chunk. By using a relatively small chunk size such as 32×32 pixels, the depth buffer can be implemented directly on the graphics rendering chip. This eliminates a considerable amount of memory, and also allows the depth buffer to be implemented using a specialized memory architecture which can be accessed with very high bandwidth and cleared during double buffer operations, eliminating the traditional frame buffer memory clearing overhead between frames.

Anti-aliasing is also considerably easier since each chunk can be dealt with independently. Most high-end Z-buffered graphics systems which implement anti-aliasing utilize a great deal of additional memory, and still perform relatively simplistic filtering. With chunking however, the amount of data required is considerably reduced (by a factor of 1000), allowing practical implementation of a much more sophisticated anti-aliasing algorithm.

In addition to Z-buffering and anti-aliasing, the system can also simultaneously support translucency in a correct and seamless manner. While a chunk is being built, the system can perform both anti-aliasing and translucency computations on another chunk. In other words, in the time required to build a chunk, the system can perform anti-aliasing and translucency processing on another chunk. The system can "ping-pong" between chunks, and thus perform sophisticated processing without adding delay in processing an image for real time applications.

Yet another advantage is that chunking enables block oriented image compression. Once a chunk has been rendered (and anti-aliased), it can then be compressed with a block transform based compression algorithm. Therefore, in addition to the compression achieved from rendering chunks separately, chunking supports more sophisticated and adaptable compression schemes.

Multi-Pass Rendering

Another advantage of the architecture of our system is the opportunity for 3-D interactive applications to break out of the late 1970's look of CAD graphics systems: boring lambertian Gouraud-shaded polygons with Phong highlights. Texture mapping of color improves this look but imposes another characteristic appearance on applications. In the 1980's, the idea of programmable shaders and procedural texture maps opened a new versatility to the rendering process. These ideas swept the off-line rendering world to create the high-quality images that we see today in film special effects.

The rigid rendering pipelines and fixed rendering modes of today's typical high-end 3-D graphics workstations make it impossible to implement such effects without drastic reductions in real-time performance. As a result, users who require real-time display must put up with the limited rendering flexibility.

By reducing the bandwidth requirements using the techniques outlined above, the system of the present invention can use a single shared memory system for all memory requirements including compressed texture storage and compressed gsprite storage. This architecture allows data created by the rendering process to be fed back through the texture processor to use as data in the rendering of a new gsprite. Because of this support for feedback, the system can perform efficient multi-pass rendering.

By coupling efficient multi-pass rendering with a variety of compositing modes and a flexible shading language, the system can provide a variety of rendering effects in real-time that have previously been the domain of off-line software renderers. This includes support of functions such as shadows (including shadows from multiple light sources), environment mapped reflective objects, spot lights, ground fog, realistic underwater simulation, etc.

In one embodiment, the image processing system (100) includes a combination of software and hardware. In the following section, we describe the system environment below with reference to a hardware and software architecture. Where possible, we describe alternative architectures. However, the software and hardware architectures can vary, and therefore are not limited to the specific examples provided below.

The image processing system, or portions of it, can be implemented in a number of different platforms including desktop computers, set-top boxes, and game systems.

Figure 2:
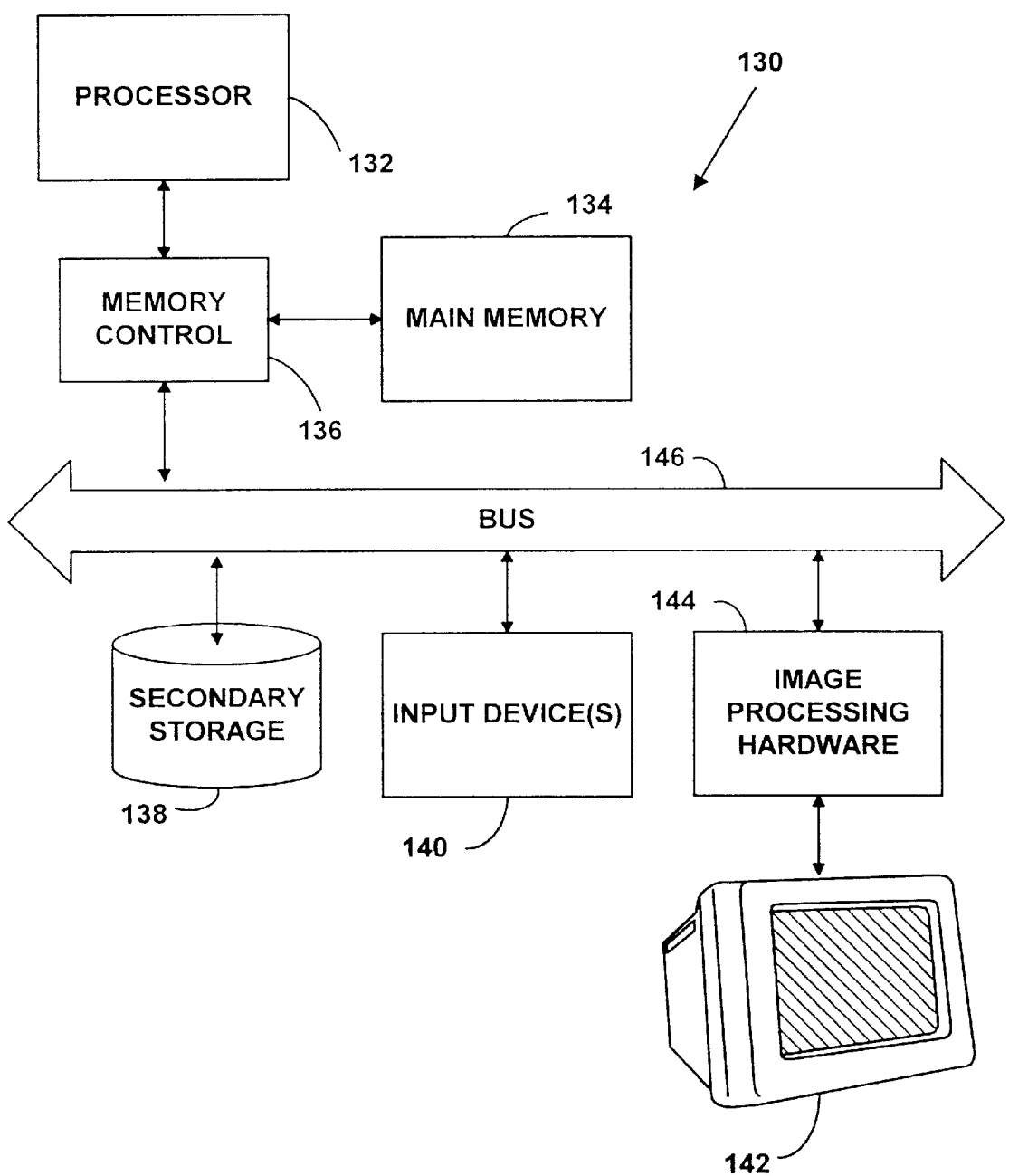
FIG. 2 is a block diagram of the system environment for an embodiment of the invention.

FIG. 2 is a block diagram of a computer system 130 in which the image processing system can be implemented. The computer system 130 includes a processor 132, main memory 134, memory control 136, secondary storage 138, input device(s) 140, display device 142, and image processing hardware 144. Memory control 136 serves as an interface between the processor 132 and main memory 134; it also acts as an interface for the processor 132 and main memory 134 to the bus 146.

A variety of computer systems have the same or similar architecture as illustrated in FIG. 2. The processor within such systems can vary. In addition, some computer systems include more than one processing unit. To name a few, the processor can be a Pentium or Pentium Pro processor from Intel Corporation, a microprocessor from the MIPS family from Silicon Graphics, Inc., or the PowerPC from Motorola.

Main memory 134 is high speed memory, and in most conventional computer systems is implemented with random access memory (RAM). Main memory can interface with the processor and bus in any of variety of known techniques. Main memory stores 134 programs such as a computer's operating system and currently running application programs. Below we describe aspects of an embodiment with reference to symbolic representations of instructions that are performed by the computer system. These instructions are sometimes referred to as being computer-executed. These aspects of the embodiment can be implemented in a program or programs, comprising a series of instructions stored on a computer-readable medium. The computer-readable medium can be any of the devices, or a combination of the devices described herein, in connection with main memory or secondary storage.

The bus 146 interconnects the memory control 136, secondary storage 138, and the image processing hardware 144. In one implementation for example, the bus is a PCI bus. The PCI standard is well-known, and several computer system boards are designed to support this standard. Computer systems having other bus architectures can also support the image processing system. Examples include an ISA bus, EISA bus, VESA local bus, and the NuBus.

The display device 142 is a color display, with continuous refresh to display an image. The display device in one embodiment is a cathode ray tube (CRT) device, but it can also be a liquid crystal display (LCD) device, or some other form of display device.

The secondary storage device 138 can include a variety of storage media. For example, the secondary storage device can include floppy disks, hard disks, tape, CD-ROM, etc. and other devices that use electrical, magnetic, optical or other recording material.

The input device(s) 140 can include a keyboard, cursor positioning device such as a mouse, joysticks, as well as a variety of other commercially available input devices.

In one implementation detailed below, the image processing hardware 144 is implemented on board that couples with the computer system through a PCI bus. In an alternative implementation, the image processing hardware can be located on a system board along with a processor or other image processing hardware and memory. For example, in a game system, image processing hardware is typically located on the mother board. Similarly, image processing hardware in a set-top box can also be located on the mother board.

While we have outlined the architecture of a computer system, we do not intend to limit our invention to the system architecture illustrated in FIG. 2. Our image processing system can be implemented in game systems, set-top boxes, video editing devices, etc. Below we describe an embodiment of an image processing system in the environment of the system architecture shown in FIG. 2. We describe alternative implementations throughout the following description, but we do not intend our description of alternatives to be a complete listing of other possible implementations. Based on our detailed description below, those having ordinary skill in the art can implement our the image processing system, or aspects of it, on alternative platforms.

Figure 3:
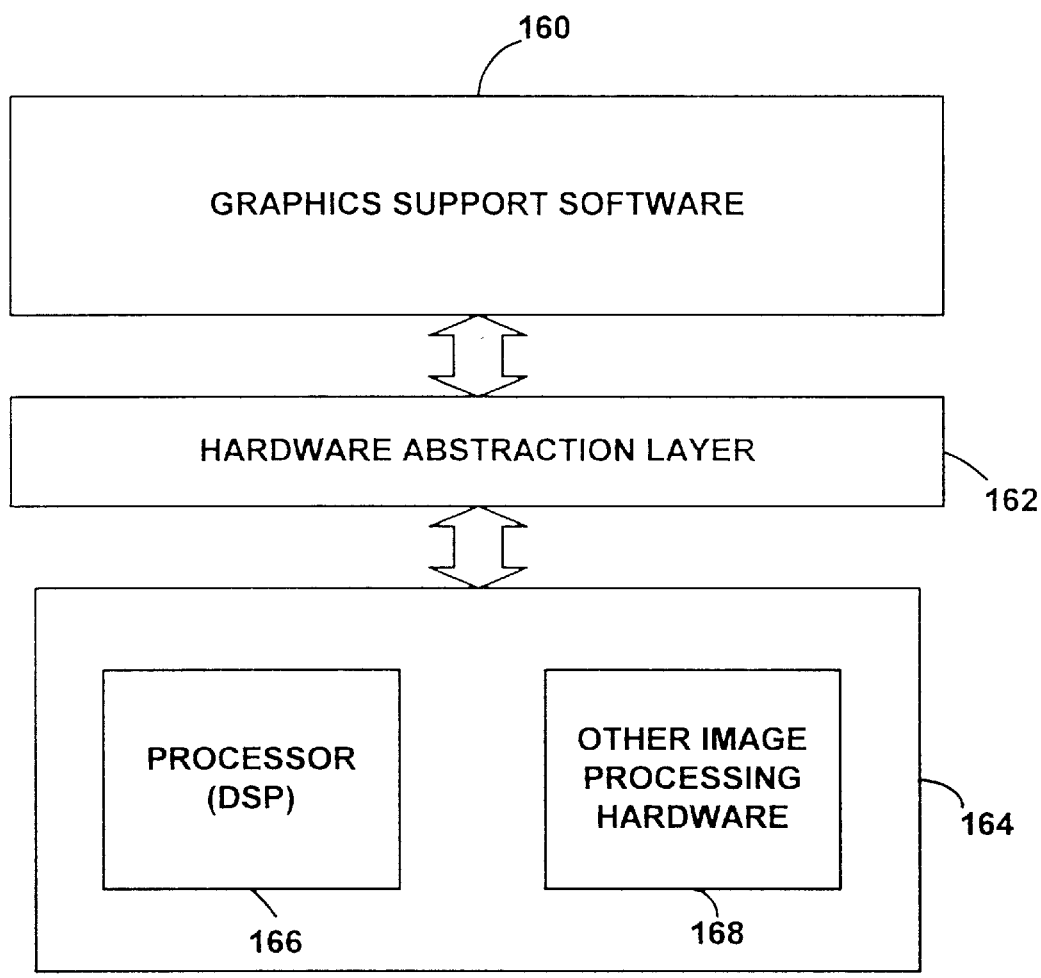
FIG. 3 is a block diagram of system architecture for an embodiment.

FIG. 3 is a block diagram illustrating the relationship between the software and hardware in one embodiment. In this embodiment, the image processing system is implemented using processing resources of the processor of the host computer and the image processing hardware 144. The image processing hardware 144 is implemented on an expansion board 164 which includes a processor (e.g. a Digital Signal Processor) 166 and image processing circuitry 168. The processors of the host computer 130 and the image processing board 164 share image processing tasks. Below we outline generally the functions performed by the host computer 130 and the image processing board 174.

Graphics support software 160 executes on the host computer system 130 and communicates with the image processing board 164 through the hardware abstraction layer (HAL) 162. The image processing board 164 includes a programmable digital signal processor called the DSP 166 and additional image processing hardware 168 detailed below.

The graphics support software 160 can include functions to support memory management, view volume culling, depth sorting, chunking, as well as gsprite allocation, transformation, and level of detail. The graphics support software can include a library of graphics functions, accessible by graphics applications, to perform the functions enumerated here.

The graphics support software 160 includes functions that support the gsprite paradigm introduced above. As indicated above, gsprites are rendered independently, and do not need to be rendered on every frame. Instead, changes in position of a gsprite can be approximated with affine or other transformations. The graphics support software 160 provides functions to help assign an object or objects to a gsprite and to track motion data describing the position and motion of the gsprite. The graphics support software also provides functions to determine when a rendered gsprite needs to be updated. The need to update a gsprite can vary depending on object movement, viewpoint movement, lighting changes, and object collisions.

We provide further detail with respect to the functions of the graphic support software below. The image processing board 164 performs low level geometry processing, including transforms, lighting and shading, texturing, anti-aliasing, translucency, etc. In one embodiment, the DSP 166 is responsible for front end geometry processing and lighting computations, but a number of these functions can be performed by the processor 132 of the host.

Overview of the Image Processing Board

Figure 4A:
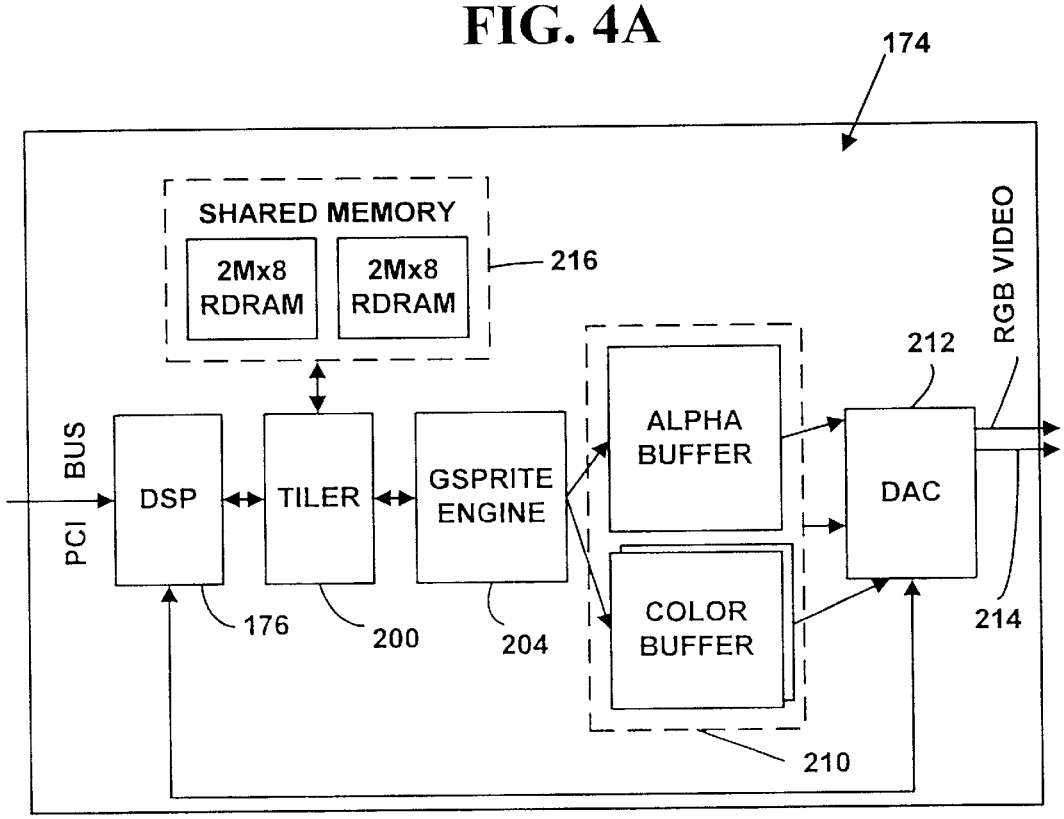
FIG. 4A is a block diagram of image processing hardware for an embodiment.

FIG. 4A is a block diagram illustrating the image processing board 174. The image processing board 174 communicates with the host computer through the bus 146. It includes a DSP 176, tiler 200, shared memory 216, the gsprite engine 204, compositing buffer 210, and a digital-to-analog converter (DAC) 212. The bus 146 (FIG. 2) transfers commands and data between the host and the DSP 176. In response to commands from the host, the image processing board 174 renders images and transfers display images to a display device 142 (FIG. 2) through the DAC 212.

In the embodiment illustrated in FIGS. 2–4A, the host processor and the DSP share the functions of the image preprocessor of FIG. 1. The image processor comprises the tiler 200, gsprite engine 204, compositing buffer 210, and DAC 212. Below, we provide more detail regarding these elements. It should be kept in mind, however, that the implementation of the image processing system can vary.

The shared memory 202 stores image data and image processing commands on the image processing board 174. In one embodiment, the shared memory is used to store gsprite and texture data in compressed form, DSP code and data, and various buffers used to transfer data between processing subsystems.

The DSP 176 is responsible for video compression/decompression and front-end graphics processing (transformations, lighting, etc.). Preferably, the DSP should support floating point and integer computations greater than 1000 MFLOPS/MOPS.

The tiler 200 is a VLSI chip which performs scan-conversion, shading, texturing, hidden-surface removal, anti-aliasing, translucency, shadowing, and blending for multi-pass rendering. The resulting rendered gsprite chunks are then compressed and stored in compressed form in the shared memory. The tiler additionally performs decompression and recompression of gsprite data in support of video and windowing operations.

The gsprite engine 204 operates at video rates to address and decompress the gsprite chunk data and perform the necessary image processing for general affine transformations (which include scaling, translation with subpixel accuracy, rotation, reflection and shearing). After filtering, the resulting pixels (with alpha) are sent to the compositing buffers where display pixel data is calculated.

Gsprite chunk data is processed a number of scan lines at a time for display. In one implementation, chunk data is processed 32 scan lines at a time. The compositing buffer (210) includes two 32 scan line color buffers which are toggled between display and compositing activities. The compositing buffer also includes a 32 scan line alpha buffer which is used to accumulate alpha for each pixel.

The DAC 212 includes a R G B video DAC and corresponding video port 214, to video editing devices. Individual components can be used to implement the functionality of the DAC.

System Operation

Figure 5A:
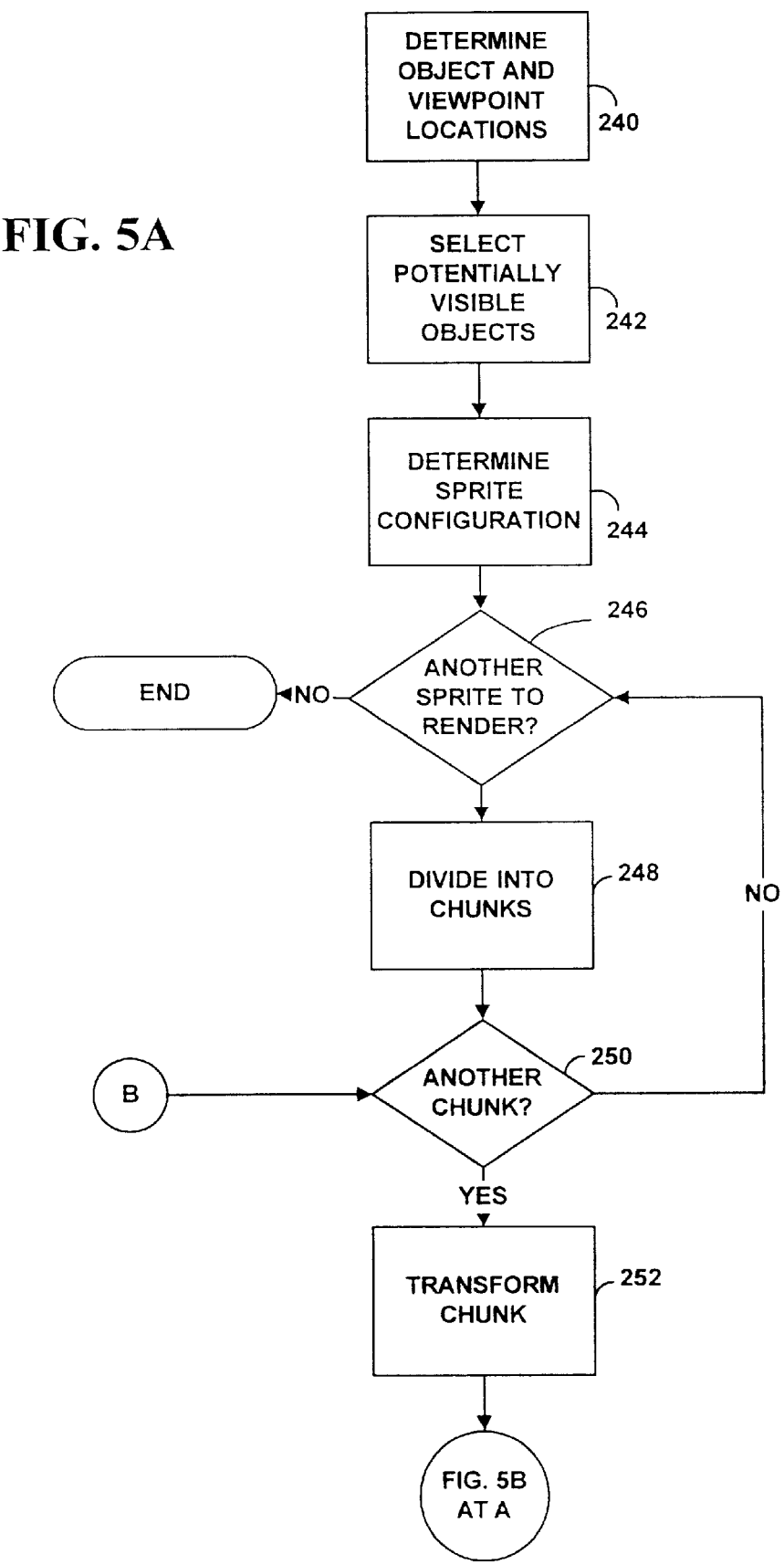
FIGS. 5A and 5B are flow diagrams illustrating an overview of the rendering process in an embodiment.
Figure 5B:
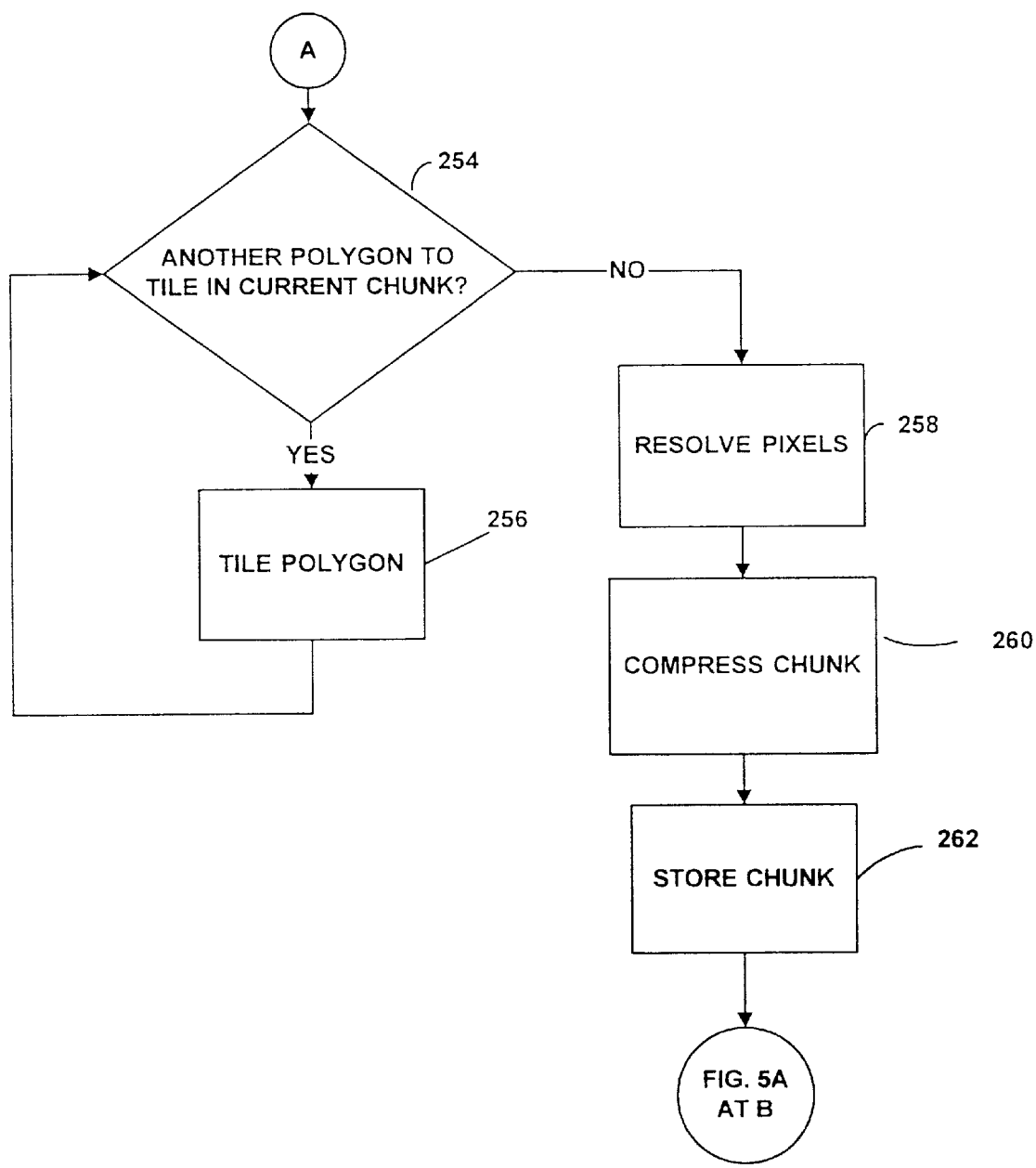

FIGS. 5A and 5B are flow diagrams illustrating steps in rendering an image in the image processing system. Before the image processor 106 begins rendering an image for the view space, the image preprocessor 104 determines object and viewpoint locations (240). In the embodiment illustrated in FIGS. 2 and 3, the graphics support software 160, running in the host computer system 132, determines the object and viewpoint locations from data provided by a graphics application. The graphics application, running on the host processor, defines models representing the relevant objects, and supplies a modeling transform, which is used to place the object with other objects in "world" coordinates.

Next, the image preprocessor 104 selects potentially visible objects (242). It determines potentially visible objects based on the view volume. The view volume is a three-dimensional space in world coordinates that provides the boundaries for a scene. The preprocessor selects potentially visible objects by traversing objects and determining whether their boundaries intersect the view volume. Objects that intersect the view volume are potentially visible in the geometric or spatial sense.

In some cases, it is useful to determine "temporally" potentially visible objects outside the current view volume, to account for future changes in the scene. This enables the system to adjust for rapid changes in the view volume. In typical 3-D graphics systems, the only way to respond to this rapid change is to completely generate a new scene based on the changed input, interposing significant transport delay. Such a long delay has negative effects on the user, creating problems such as over-control and nausea. To reduce this delay, the image preprocessor of the present invention can calculate the location of objects positioned in an extended range outside the visible range, and the image processor can render and store images within this extended range. Using the affine transform capability of the system, viewpoint input for a subsequent frame can be used to reposition the gsprites from this extended range reducing system transport delay to less than 2 computational frames. Such a short transport delay is unachievable with current 3-D graphics hardware systems known to the inventors, and will enable much higher quality simulations with much better user immersion.

The image preprocessor determines the configuration of gsprites for the image (244). This step involves finding how to map potentially visible objects to gsprites. As part of this process, the image preprocessor 104 allocates gsprites, which includes creating a gsprite data structure to store image data corresponding to one or more potentially visible objects. If processing resources allow, each non-interpenetrating object in the scene is assigned to an independent gsprite. Interpenetrating or self-occluding objects may be processed as a single gsprite.

The image preprocessor 104 can aggregate gsprites when the image processor does not have the capacity to composite the gsprites at the desired computational frame rate or there is insufficient system memory to store the gsprites. Rendering to separate gsprites will always be more computationally efficient, so if the system has the memory and compositing capacity, non-intersecting objects should be rendered into separate gsprites. If the system is incapable of storing or generating a display image based on a current assignment of gsprites, some gsprites can be aggregated to alleviate this problem. After an object or objects are assigned to gsprites, the image processor divides the gsprites into image regions called "chunks" (248). The image preprocessor loops on gsprites and divides the gsprites into chunks (246, 248). In one embodiment, this process includes transforming bounding volumes of objects to the view space and finding rectangular image regions that enclose the transformed bounding volumes. These image regions define the dimensions of the gsprite in terms of the two-dimensional space to which the gsprite's object or objects are rendered. The gsprite is divided into chunks by dividing the rectangular image region into chunks and associating these chunks with the gsprite data structure.

As an optimization, the transformed bounding volume can be scaled and/or rotated so that the number of chunks required to render the gsprite is minimized. Because of this added transformation (scaling or rotating), the space to which the objects assigned to the gsprite are rendered is not necessarily screen space. This space is referred to as gsprite space. In the process of generating a display image, the gsprite should be transformed back to screen space.

The next step is determine how to divide the object geometry among the chunks (250). The image preprocessor determines how the geometric primitives (e.g. polygons) should be divided among the chunks by transforming the polygons to 2-D space (252) and determining which chunk or chunks the polygons project into. Due to the expense of clipping polygons, the preferred approach is to not clip the polygons lying at the edge of a chunk. Instead, a chunk includes polygons that overlap its edge. If a polygon extends over the border of two chunks, for example, in this approach the vertices of the polygon are included in each chunk.

The image preprocessor then queues the chunk data for tiling. Tiling refers to the process of determining pixel values such as color and alpha for pixel locations covered or partially covered by one or more polygons.

Decision step (254) (FIG. 5B) and the step (256) following it represent the process of tiling the polygons within the chunk. While the image processor has included polygons that overlap the boundaries of the current chunk, it only produces pixels that lie within the chunk. The produced pixels include information for antialiasing (fragment records), which are stored until all pixels have been generated.

After completing the tiling of polygons in a chunk, the image processor resolves the anti-aliasing data (such as fragment records) for the pixels (258). In one embodiment, the tiler 200 uses double buffering to resolve a previous chunk while the next is tiled. Alternatively, the tiler can use a common buffer with a free list. The free list represents free memory in the common buffer that is allocated as new fragment records are generated and added to when fragment records are resolved. A combination of double buffering and common memory can be used as well.

The image processor compresses the resolved chunk using a compression scheme described further below (260). As the image processor resolves a block of pixels, it can compress another block. The image processor stores the compressed chunk in shared memory (262).

Figure 6:
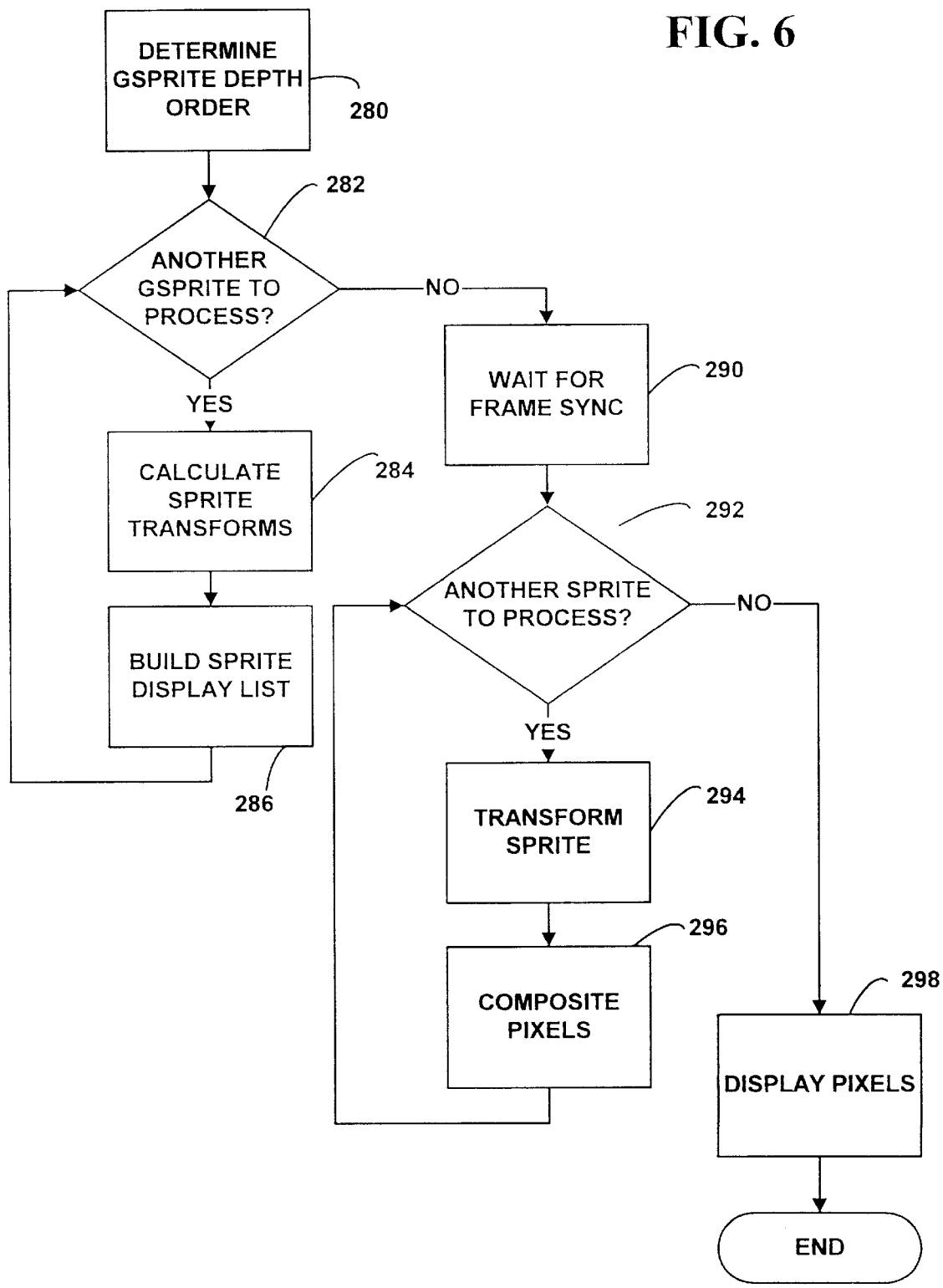
FIG. 6 is a flow diagram illustrating an overview of the display generation process of an embodiment.

FIG. 6 is a flow diagram illustrating the steps executed to display an image. On the image processing board 174 described above, images are read from shared memory 216, transformed to physical output device coordinates by the gsprite engine 204, composited in the compositing buffer 210, transferred to the DAC 212, and then transferred to an output device.

During the display process, the image processor accesses a list of gsprites to be displayed for the current frame. In the process of determining the gsprite configuration, the image preprocessor determines the depth order of gsprites (280). As noted above, one object is preferably assigned to a gsprite. However, the image preprocessor can assign more than one object to a gsprite, for example, to accommodate processing constraints of a particular image processor being used in the system. The image preprocessor sorts objects in Z-order, i.e. in distance from the viewpoint. In addition to sorting objects, it sorts gsprites in depth order as well and stores this depth data in the gsprite data structures.

The decision step (282) in FIG. 6 represents a loop on gsprites in the display process. The steps within this loop can include 1) calculating a transform for a rendered gsprite; and 2) building a gsprite display list to control how gsprites are displayed. These steps are described below.

For gsprites in the potentially visible range, the image processor calculates gsprite transforms. A gsprite transform refers to a transformation on a rendered 2-D gsprite. In one embodiment, the image processor can perform a transformation on a gsprite to reduce rendering overhead. Rather than rendering each object for every frame, the image processor reduces rendering overhead by re-using a rendered gsprite.

It is not necessary to compute a gsprite transform for every frame of image data. For instance, if a gsprite is rendered for the current frame of image data, it may not need to be transformed, unless e.g. the gsprite has been transformed to better match the bounding box for the object. In addition, some gsprites may not need to be re-rendered or transformed because the object or objects assigned to them have not changed and are not moving. As such, the step of transforming a gsprite is optional.

The gsprite may be multiplied by the unity matrix in cases where the position of the gsprite has not changed. This may apply, for example, in cases where the image processor has rendered the gsprite for the current frame, or where the gsprite position has not changed since it was originally rendered.

To specify how gsprites are to be displayed, the image processor creates a gsprite display list. The display list refers to a list or lists that define which gsprites are to be displayed on the display screen. This concept of display list can also apply to other output devices for presenting a frame of image data. The image processor uses the display list in mapping and compositing rendered gsprites to the physical device coordinates. While the step of building the display list is illustrated as part of a loop on gsprites, it is not necessary that the list or lists be generated specifically within this loop.

The display list can refer to a list of gsprites or a list of gsprites per band. A "band" is a horizontal scanline region of a display screen. For instance, in one embodiment a band is 32 scanlines high by 1344 pixels wide. The display list can include a separate list of gsprites for each band, in which case the band lists describe the gsprites impinging on the respective bands. Alternatively, the display list can be comprised of a single list implemented by tagging gsprites to identify which bands the gsprites impinge upon.

The display list in the illustrated embodiment is double-buffered. Double buffering enables the system to generate one display list while it reads another. As the system calculates the gsprite transforms and build the display list for one frame, it reads the display list for another frame and displays the image data in this list.

Because of the double buffering, the steps shown in FIG. 6 are over-lapped: the image preprocessor performs steps (280–286) for one frame while the image processor performs steps (290–298) for another frame.

Figure 7:
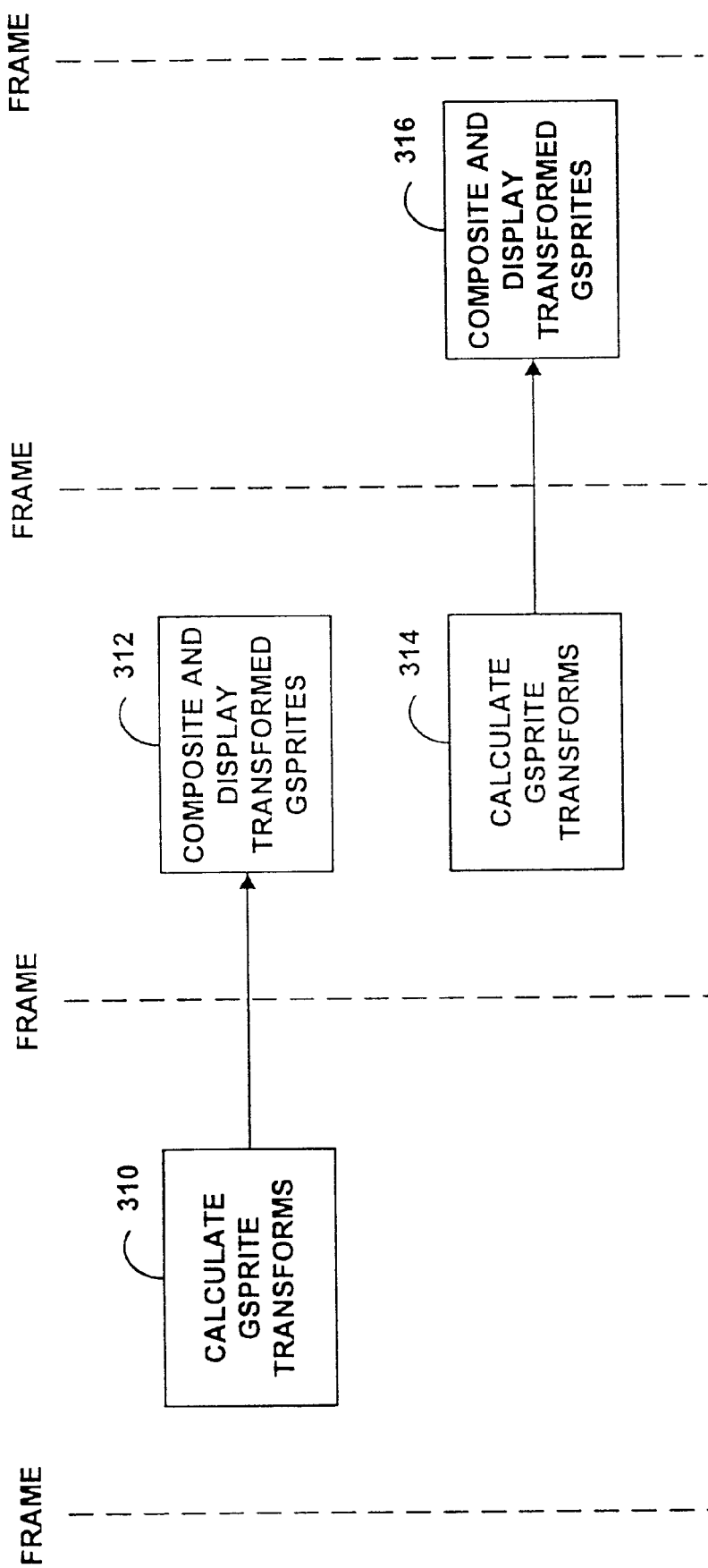
FIG. 7 is a diagram illustrating one aspect of display generation in terms of frame periods in an embodiment.

FIG. 7 is a block diagram illustrating the timing of these steps. After the system completes steps (280–286) (FIG. 6) for a frame 310, it waits for a frame sync signal (vertical retrace) and then performs the buffer swap. The display list it has just created is then used to determine the gsprites to be displayed in the current frame 312. While that display list is processed 312, gsprite transforms are computed and a display list is constructed for a next frame 314. In the next frame, the gsprite transforms and display list that were generated in the previous frame 314 are then used to generate the display image 316.

The image processor converts gsprites to output device coordinates based on the list of gsprites in the display list. The image processor reads gsprite data from shared memory, including color, alpha, and data identifying the gsprite's position. Based on this data, the image processor determines the color and alpha for pixels covered by the gsprite.

In one embodiment, the image processor loops on each band, transforming gsprites that impinge upon that band according to the gsprite display list. We will describe this display process in more detail below.

After transforming gsprite data, the image processor composites the resulting pixel data. This includes computing the color and alpha for pixels in output device coordinates based on the gsprite transforms. The image processor transforms the pixel data for gsprites in the display list and then composites the transformed pixel data. The process involves determining the color and alpha at a pixel location based on the contribution of one or more pixel values from gsprites that cover that pixel location.

In one embodiment, the image processor loops on bands and composites pixel data for each band. The image processor double buffers pixel data: it transforms and composites gsprite data for a band in one buffer while it displays composited pixel data for another band.

After compositing pixel data, the image processor then transfers composited pixel data to an output device. The most typical output device used in connection with this system is, of course, a display. To display the pixel data, it is converted to a format compatible with the display.

Having described system operation of an embodiment, we now provide more detail regarding the image processing board.

The Image Processing Board

In the one embodiment, the shared memory 216 comprises 4 Mbytes of RAM. It is implemented using two 8-bit Ram bus channels. The amount and type of memory can vary, however.

Figure 8:
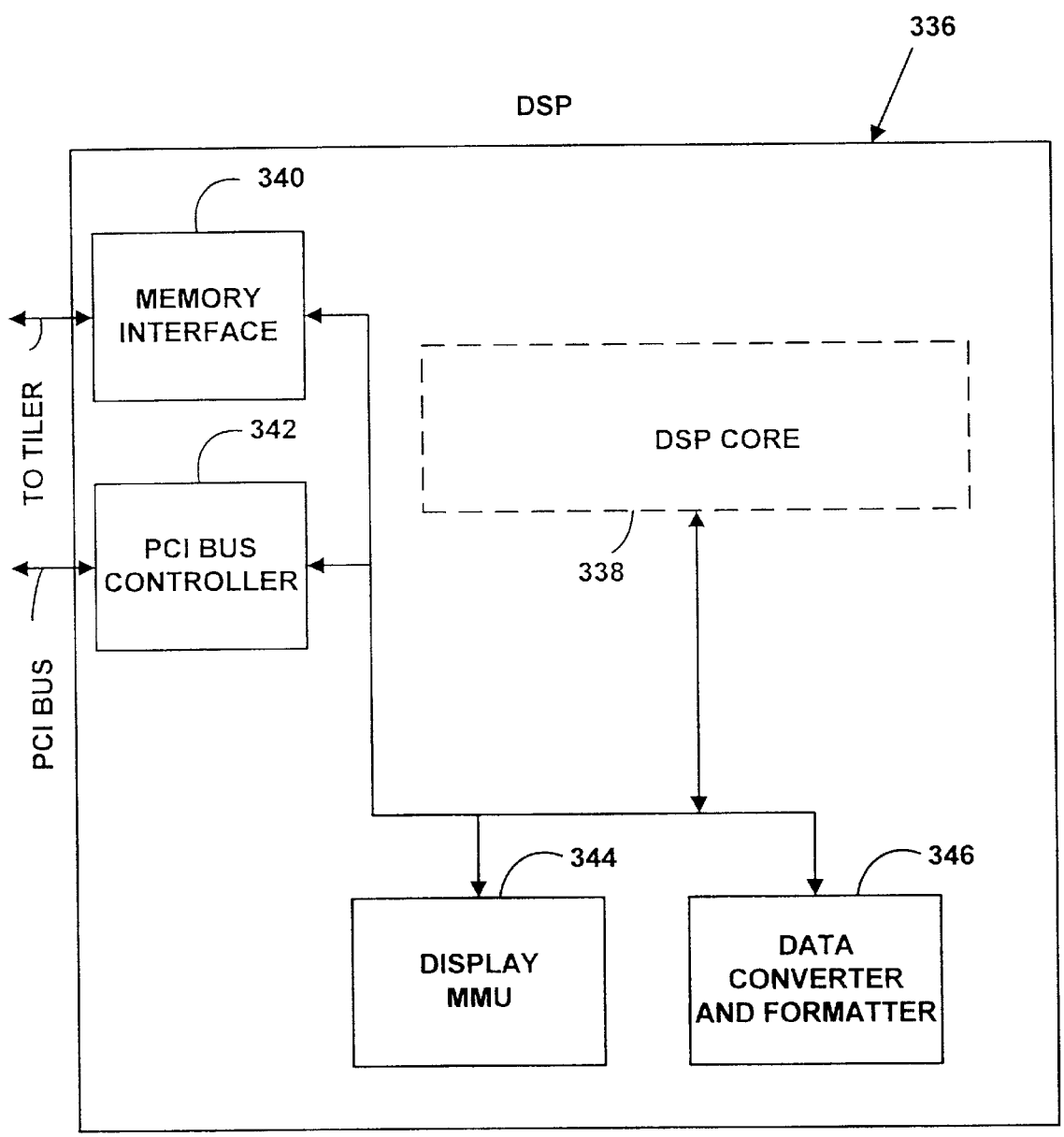
FIG. 8 is a block diagram of a Digital Signal Processor (DSP) in an embodiment.

FIG. 8 is a block diagram illustrating the DSP 336 on the image processing board 174. The DSP 336 is responsible for parsing the command stream from the host processor and performing some video processing, and front end geometry processing. The DSP performs front end geometry and lighting calculations used for 3-D graphics. This includes model and viewing transformations, clipping, and lighting. Portions of the gsprite animation management are also handled in the DSP such as gsprite motion extrapolation.

Rendering commands are stored in main memory buffers and DMAed to the image processing board 174 over the PCI bus and through the PCI bus controller 342. These commands are then buffered in the shared memory 216 on the board until needed by the DSP 336 (FIG. 8).

The DSP core 338 includes a processor for performing the image processing computations described above. In addition the DSP core performs scheduling, and resource management.

The Memory interface 340 supports high speed data transfers, e.g. 64 bits at 80 MHz. It is designed to interface with conventional DRAM and SDRAM devices. The tiler 200 is designed to directly connect to this bus, simulating the memory timing required by the DSP.

The data formatter and converter 346 in the DSP formats rendering instructions for the tiler. This block converts floating point color components into integer and packs them into the tiler specific data structures. It also buffers up a complete command and DMAs it directly to a memory buffer in shared memory. These rendering instructions are later read by the tiler when it is ready to perform the operations.

Among its formatting tasks, the data formatter and converter 346 formats triangle command data for the tiler. R G B α (alpha) data which is calculated by the DSP (336) in floating point is converted to 8 bit integer. Coordinate information is converted from floating point to 12.4 fixed point. The data is packed into 64 bit words and transferred in a contiguous block to the shared memory to optimize bandwidth.

The display memory management unit (MU) 344 is used for desktop display memory. It traps PCI accesses within a linear address range that is allocated as the desktop display memory. It then maps these accesses to image blocks stored in shared memory.

The architecture of the image processing board (FIG. 4A, 174) is relatively independent of the specific DSP. However, the DSP should preferably have significant floating point performance. Suitable DSPs include the MSP-1 from Samsung Semiconductor and TriMedia from Phillips Semiconductor. These specific DSPs are two examples of DSPs that provide sufficient floating point performance.

FIG. 9A is a block diagram of the tiler 200 on the image processing board 174. The tiler is responsible for 2-D and 3-D graphics acceleration, and for shared memory control. As shown in the block diagram of the image procession board, the tiler connects directly to the DSP (176, FIG. 4), the gsprite engine 204, and the shared memory system 216.

The functional blocks shown in the block diagram above are described in this section.

The tiler 378 includes a number of components for primitive rendering. The command and memory control 380 includes an interface to shared memory 216, the gsprite engine 204, and the DSP 176. Accesses to memory from the tiler, DSP, and gsprite engine are arbitrated by this block. A queue is provided to buffer read accesses.

The setup block 382 calculates the linear equations which determine the edge, color, and texture coordinate interpolation across the surface of the triangle. These equations are also used to determine which texture blocks will be required to render the triangle. The edge equations are also passed to the scan conversion block 394 and are stored in the primitive registers 396 until required by the scan convert engine 398.

The setup block 382 includes three components: the vertex input processor 384, vertex and control registers 386, and the setup engine 388. The vertex input processor 384 parses the command stream from the DSP. The vertex and control registers 386 store the information necessary for processing polygons or other geometric primitives. Triangle processing is used in this specific embodiment, and the tiler 200 includes registers for six vertices (three for each triangle) to allow double buffering of triangle processing. The setup engine 388 calculates the differentials for color, depth, edges, and texture coordinate interpolation across the surface of the triangle. These equations are also used to determine which texture blocks are used to render the triangle. The setup engine also pre-fetches texture chunks so that they are available when needed by the scan convert engine 398.

The setup engine 388 also communicates with the texture read queue 390, and a texture address generator 392. The texture read queue 390 buffers read requests for texture blocks from shared memory. While we use the term "texture" in referring to the portions of the tiler used to retrieve image data blocks from memory, it should be understood that this term can refer to texture maps, shadow maps, and other image data used in multi-pass rendering operations. The texture address generator 392 determines the address in memory of the requested chunks and sends texture read requests to the command and memory control 380. The texture address generator 392 includes a memory management unit that controls the writing of image data to the texture cache.

The scan convert block 394 receives differentials and other vertex data from the setup block and generates pixel data. The scan convert block 394 includes primitive registers 396, and the scan convert engine 398. The primitive registers 396 store the equation parameters for each triangle parameter. The primitive registers include registers to store multiple sets of equations so that the scan convert engine does not stall waiting for texture data.

The scan convert engine 398 scan converts polygons, which in this case are triangles. The scan convert block 394 includes the interpolators for walking edges and evaluating colors, depths, etc. The pixel address along with color and depth, and anti-aliasing coverage information is passed to the pixel engine for processing.

The scan convert engine 398 passes texture addresses to the texture filter engine 400, which calculates the texture data. The texture filter engine 400 calculates pixel color and alpha data for polygons that are being rendered. The illustrated texture filter engine computes a filter kernel based on the Z-slope and orientation of the triangle being rendered, and on the center of the texture request (the S and T coordinates of a point mapped into the texture). Filtering is performed in two passes in a pipelined fashion so that a new pixel is generated every cycle. The filter kernel can be an anisotropic filter or an isotropic filter. Where anisotropy is not required, the filter kernel can use negative lobes allowing much sharper textures than is possible with tri-linear interpolation. The texture filter engine 400 also handles Z-comparison operations for computing effects on shadows.

The texture cache 402 stores blocks of decompressed image data. In one implementation, the texture cache 402 stores texture data for sixteen 8×8 pixel blocks. The data is organized so that 16 texture elements can be accessed every clock cycle.

The decompression engine 404 decompresses texture data and transfers it to the texture cache 402. In this embodiment, the decompression engine includes two decompressors, one which implements a discrete cosine transformation (DCT) based algorithm for continuous tone images such as textures, and the other which implements a lossless algorithm for desktop pixel data. The DCT based algorithm is implemented by two parallel decompression blocks, each of which can generate eight pixel elements (i.e. two pixels) per clock cycle.

The compressed cache 416 can be used to buffer compressed data before the decompression engine 404 decompresses and transfers it to the texture cache 402.

The scan convert engine 398 transfers pixel data to the pixel engine 406. The pixel engine 406 performs pixel level calculations including blending, and depth buffering. The pixel engine also handles Z-comparison operations required for shadows. To achieve optimal performance, the pixel engine should preferably operate at one pixel per clock cycle.

The pixel engine 406 controls transfers of pixel data to a rasterization buffer. The rasterization buffer includes pixel buffers 408, and fragment buffers 410 in the illustrated embodiment. The pixel buffers 408 include two buffers to support double buffering. In this implementation of the pixel buffers, each pixel entry stores eight bits per color component (R G B), eight bits for the alpha component, 24 bits for the Z-buffer, 8 bits for the stencil buffer, and a nine bit pointer into the fragment buffer. This is a total of 73 bits per pixel. One pixel buffer is used by the pixel engine 406 while the other is used by the anti-aliasing engine 412. The buffers are then swapped.

The fragment buffers 410 store fragments for partially covered pixels called pixel fragments, which result from pixels of polygons whose edges cross a given pixel, or are translucent. The fragment buffer is single buffered in the implementation shown in FIG. 9A. A free list of fragments is maintained, such that as fragments are resolved, they are added to the free list, and as fragments are generated, they use entries from the free list. Alternatively, the fragment buffer could be double buffered, so that one fragment buffer could be resolved by the anti-aliasing engine while the other was filled by the pixel engine in parallel.

In one embodiment, a fragment record includes the same data as in the pixel buffer entries plus a 4×4 mask. The nine bit pointer is used to form a linked list of entries, with a reserved value indicating the end of the list. In this embodiment, the fragment buffers 410 includes a total of 512 entries, but the size can vary.

The anti-aliasing engine 412 calculates the color and alpha component for pixels which are affected by more than one polygon, which occurs when polygons only partially cover the pixel area (i.e. the polygon edges cross the pixel) or when polygons have translucency. The anti-aliasing engine 412 transfers resolved pixel data to the compression engine 414. In this embodiment, the compression engine 414 includes two compressors, one DCT based for continuous tone images, and one lossless for desktop pixel data. The DCT based algorithm is implemented using a compressor capable of compressing eight pixel elements per clock cycle. The compression engine 414 compresses the resulting rendered gsprites and sends the compressed data to the command memory and control 380 for storage in shared memory 216 (FIG. 4). The tiler also has a compressed cache 416 for caching compressed data.

Figure 10:
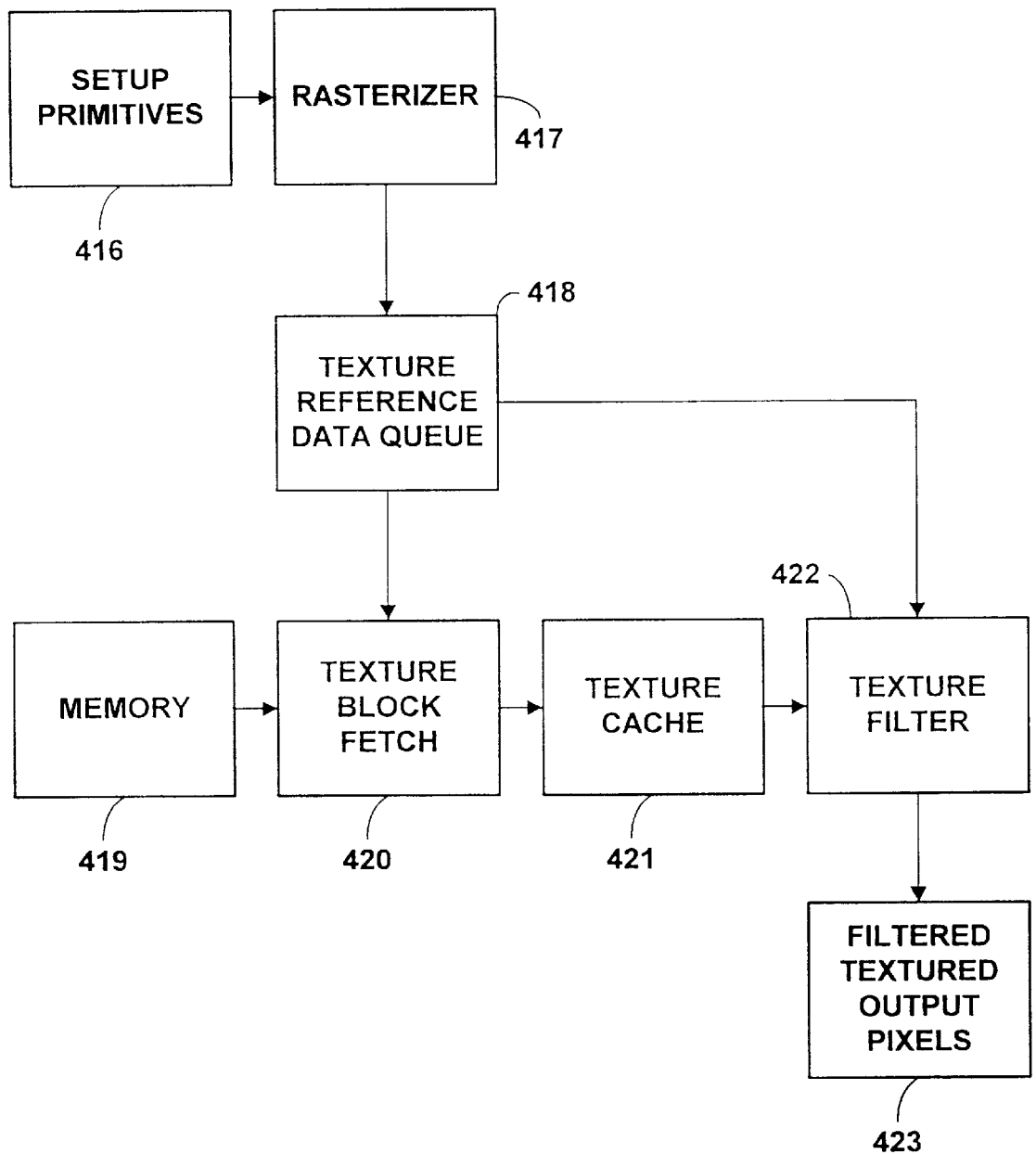
FIG. 10 is a block diagram illustrating a system for accessing texture data from memory.
Figure 11:
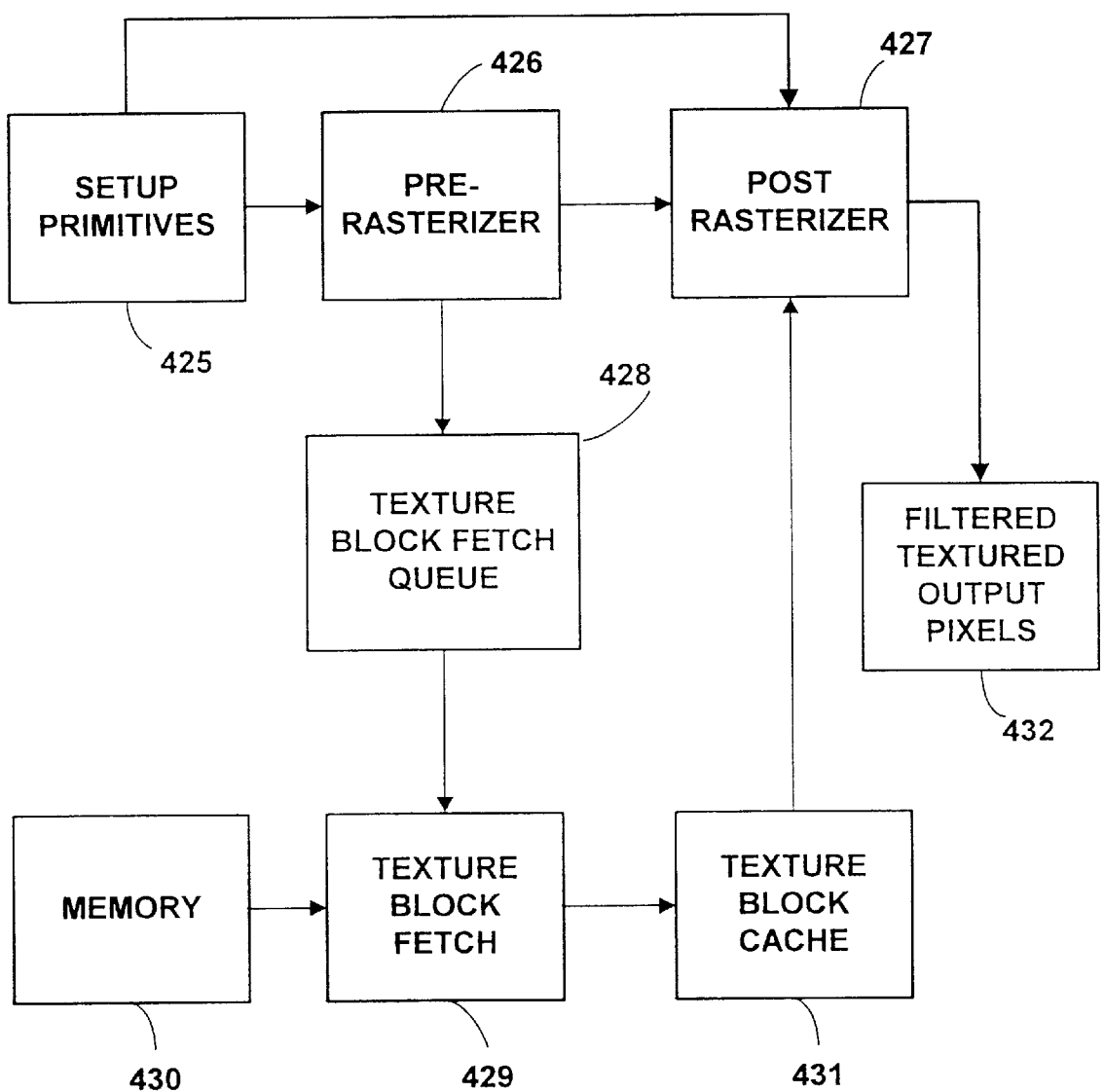
FIG. 11 is a block diagram illustrating a system for accessing texture data from memory.

FIGS. 10 and 11 illustrate two alternative implementations for accessing image data from memory during the pixel generation process. There are a number of instances when image data has to be accessed from memory during pixel generation. These include for example, accessing a texture map during a texture mapping operation, accessing a shadow map during a shadowing operation, and accessing color and/or alpha data during multi-pass blending operations. For simplicity, we refer to the image data in memory as "textures" or "texture data". However, it should be understood that the methods and systems described here can also be applied to other types of image data accessed from memory during pixel generation.

The implementations illustrated in FIGS. 10 and 11 provide alternative approaches to efficiently load and utilize a texture cache on the tiler. A significant advantage of these approaches is that texture data can be stored in memories with high latency and even in a compressed format without unduly hampering performance. As a result, less specialized and lower cost memory can be used to implement high performance rendering hardware.

Texture data from the memory is accessed and cached in units called "blocks" which are typically a small rectangular region appropriate for efficient fetching and catching. A typical block size is about 8×8 samples in size. For instance, for texture maps, a typical block is 8×8 texels.

FIG. 10 is a functional block diagram illustrating one embodiment for accessing these blocks of texture data. This embodiment solves the latency problem by buffering pixel data from the rasterizer 417, including texture data requests, in a texture reference data queue 418. The queue includes enough entries to absorb the latency which would otherwise be incurred in accessing (and possibly decompressing) a texture block so that the rendering process can run at full speed. For example, if it takes 100 cycles to fetch a texture block, and the tiler is capable of producing one pixel per clock cycle, then the texture reference data queue includes at least 100 entries.

Data flow in the system illustrated in FIG. 10 proceeds as follows. First, geometric primitives are set-up for rasterization as shown in block 416. Set-up processing includes, for example, reading vertices for a geometric primitive such as a triangle, and calculating the differentials for color, depth, and edges across the surface of the triangle. The parameters resulting from these computations are then fed to the rasterizer 417.

The rasterizer 417 reads the equation parameter data for each primitive and generates pixel data. The rasterizer generates pixel data, including texture coordinates and filter data, and buffers this data in the texture reference data queue 418. The texture fetch block 420 reads texture reference data stored in the queue 418 and fetches the appropriate texture blocks from memory 419.

The pixel data stored in the texture reference data queue 418 in this implementation includes: an address of destination for the pixel (X, Y) being computed; depth data (Z); a coverage mask; color and translucency data; the coordinates of the center for the texture request (S, T); and texture filter data. The depth and coverage data is only needed in the texture reference data queue if high-quality anti-aliasing of pixels is desired. Alternatively, hidden surface removal and antialiasing can be performed in the rasterizer 417. If hidden surface removal and anti-aliasing are performed in the rasterizer, depth data and coverage data does not need to be stored in the data queue 418. The texture filter data may include a level of detail parameter for MIP-mapping, for example, or may include anisotropic filter data for higher quality texture filtering.

The texture block fetch 420 reads the texture reference data buffered in the data queue and retrieves the corresponding texture data from memory 419. In the case of texture map accesses, the texture block fetch unit converts the (S, T) center of the texture request and the texture filter data into the addresses of the blocks required to satisfy the texture filtering operation. The blocks identified in this process are then fetched into the cache, replacing other blocks as needed. Image data blocks can be fetched using a least recently used (LRU) or other suitable cache replacement algorithm. To reduce memory accesses, the texture block fetch unit keeps track of the texture blocks already stored in the texture cache 421 and avoids requesting the same block more than once. This capability significantly reduces the memory bandwidth required to perform high quality texture filtering because the latency in retrieving a texture block is incurred only once in computing an image.

The texture block fetch unit includes a hold-off mechanism to prevent from overwriting texture blocks still needed in the texture filter unit in the tiler. One way to implement such a hold-off mechanism is to associate a reference count with each texture block to keep track of whether the texture filter has used a particular texture block. This reference count is incremented on receipt of a texture request to a block by the texture fetch unit, and decremented in response to its use by the texture filter unit. The texture block fetch unit then only replaces blocks that have a corresponding reference count of zero.

An alternative way to implement the hold-off mechanism is to allocate a buffer for temporary storage of texture blocks output by the texture fetch unit. In this approach, the image block is first written to temporary storage buffer. After the texture fetch unit has completed writing the image block to the temporary storage buffer, it can then be transferred to the texture cache. Image blocks are swapped to the texture cache when first needed by the texture filter unit 422.

In the case of texture mapping operations, the texture filter block 422 reads texture samples from the texture cache 421 and the pixel data stored in the texture reference data queue 418, and computes pixel color and possibly alpha values from the texture sample data.

In addition to texture mapping operations, this approach can also be applied to shadowing and multi-pass blending operations as well. For instance, texture reference data queue can be used to retrieve a shadow depth map residing in memory. Alternatively, the texture reference data queue can be used to retrieve color and/or alpha data used in multi-pass lighting and shading operations. More detail regarding texture mapping, shadowing, and multi-pass operations is provided below.

There are a number of advantages to buffering pixel data in the manner described above. One significant advantage is that the image data can be stored in less specialized memory (with higher access time), which reduces the cost of the overall system. In addition, image data including textures can be stored in compressed format and can still be accessed at fast enough rates to perform sophisticated pixel operation such as texture filtering. As a result, the system is able to achieve improved performance at a lower cost relative to known methods for accessing texture data.

Another advantage to this approach is that the texture reference data queue is able to predict accurately which image blocks need to be accessed from memory. As a result, the system incurs latency for memory accesses no more than necessary. Once the image data blocks are in the texture cache, the texture filter unit can run at the full speed of the rasterizer, as long as there is sufficient memory bandwidth and texture fetch throughput to write the requested image blocks to the texture cache.

Queuing texture references with the texture request center and filtering the data allows the queue to be much smaller than if texels with their corresponding texture filter weights were queued.

FIG. 11 is a functional block diagram illustrating an alternative embodiment for accessing image data from memory. In this approach, geometric primitives are queued and then processed in a pre-rasterizer to hide the latency of the texture block fetch during the pixel generation process. An example will help illustrate the concept. If an average primitive takes 25 cycles to rasterize, and it requires 100 clock cycles to fetch a texture block from memory, the primitive queue should be at least four primitives long. A simplified version of the post-rasterizer, the pre-rasterizer includes circuitry to determine the image data blocks that need to be accessed from memory. Once the texture data is fetched, the post-rasterizer can generate pixel data using texture data without being exposed to the delay involved in fetching blocks from memory.

The data flow through this implementation occurs as follows. As in the implementation described above, geometric primitives are processed in a set-up block 425 for rasterization. In this particular implementation, however, the set-up block 425 includes a larger primitive queue to buffer more primitives. The pre-rasterizer 426 quickly converts the primitives into a list of texture blocks needed to satisfy the texture filtering needs for all of the pixels covered by the primitive in the order that the blocks will be needed by the post-rasterizer 427. The pre-rasterizer is a simplified version of the post-rasterizer 427, or the rasterizer 417 in the alternative implementation. In this approach, the pre-rasterizer only needs to compute texture data addresses and determine texture requests.

The pre-rasterizer also keeps a model of the texture block cache and performs the cache replacement algorithm, such as least recently used (LRU) to keep from exceeding the size of the texture block cache. As part of the cache replacement algorithm, the pre-rasterizer compresses repetitive requests to a single texture block to only one request to the texture block fetch unit 429.

The texture block fetch queue 428 includes entries for storing texture block requests. The texture block fetch unit 429 reads texture requests from the texture block fetch queue and retrieves the appropriate blocks from memory 430.

The post-rasterizer rasterizes primitives queued in the set-up block 425 to generate pixel data for a pixel location. If image data needs to be accessed from memory during the pixel generation process, the post-rasterizer rasterizes the primitives as quickly as the necessary texture blocks can be transferred to the texture block cache 431. When the post-rasterizer completes rasterizing a primitive queued in the set-up block, the primitive is removed and replaced with another primitive from the input data stream. The set-up block is responsible for keeping the queue filled with primitives so that the pre-rasterizer and post-rasterizer are not stalled in the pixel generation process.

Like the alternative embodiment described above, the texture block fetch should preferably include a hold-off mechanism to prevent it from overriding the texture blocks that are still needed by the post-rasterizer. The two hold-off mechanisms described above can also be used in this implementation. Specifically, a reference count can be used to keep track of when an image block has been requested and then used. In this case, the reference account would be incremented on receipt of a texture request for a block by the pre-rasterizer, and decremented upon use by the post-rasterizer. The texture block fetch unit then only replaces blocks in the texture cache when their corresponding reference count is zero.

Alternatively, a buffer can be allocated for temporary storage of texture blocks output by the texture fetch block. When the texture fetch block has completed writing a block to this temporary buffer, it can then be transferred to the texture block cache 431 when requested by the post-rasterizer 427. When the post-rasterizer 427 first request data in a texture block in the temporary buffer, the block is then transferred to the texture block cache 431.

There are a number of advantages to this approach. First, texture data can be stored in less specialized memory and can still be accessed at rates required to support sophisticated texture filtering. An important related advantage is that texture data can be stored in a compressed format and then decompressed for use in the pixel generation process.

Another advantage of this approach is that requests to memory can be predicted so that the latency for memory access is incurred only once for each texture block to render a scene. Once the initial texture blocks are in the texture cache, the post-rasterizer can run at full speed, as long as there is memory bandwidth and texture fetch throughput to keep the cache current.

Figure 9B:
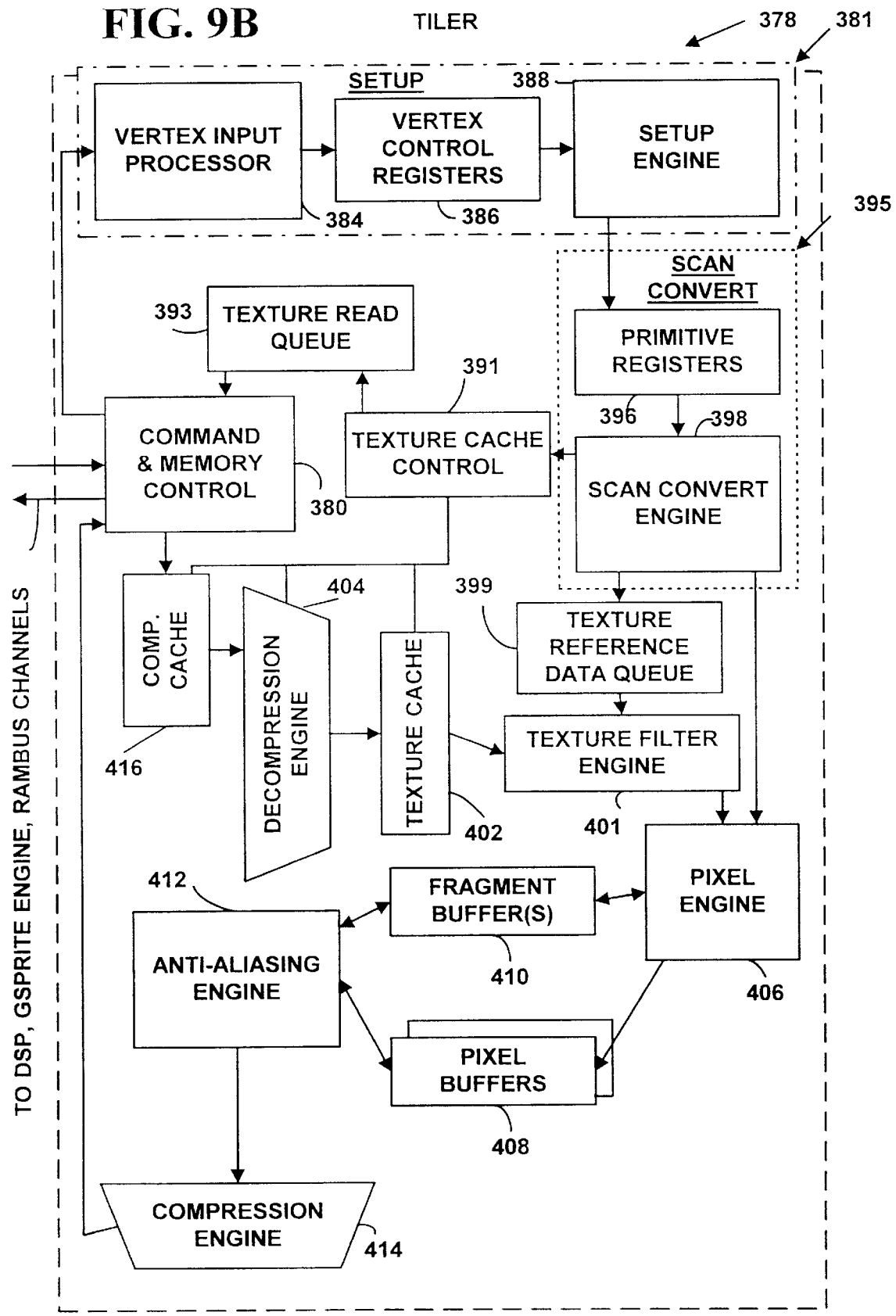

FIG. 9B illustrates a more detailed implementation of the system illustrated in FIG. 10. The set-up block 381 in FIG. 9B corresponds to the set-up block 416 in FIG. 10. Unlike the set-up block 382 of FIG. 9A, the set-up block 381 in this alternative implementation does not generate texture read requests. Instead, the scan convert block 395 generates pixel data, including texture reference data, which is buffered in the texture reference data queue 399.

The scan convert block 395 of FIG. 9B is a specific implementation of the rasterizer 417 in FIG. 10. It computes a Z-value, a coverage mask, color and translucency data, and the center of the texture request in texture coordinates. For some texture mapping operations, it also computes level detail data or anisotropic filter data. The texture filter engine 401 reads the texture request and possibly texture filter data buffered in the texture reference data queue 399 and accesses the appropriate texture samples in the texture cache. From this texture data, the texture filter engine computes the contribution of the texture to the pixel color and alpha values. The texture filter engine combines the color and alpha in the texture reference data queue 399 with the contribution from the texture to generate pixel values sent to the pixel engine 406.

The texture cache control 391, texture read queue 393, command and memory control 380 are specific implementations of the texture block fetch 420 in FIG. 10. In addition, for compressed texture blocks, the compressed cache 416 and the decompression engine 404 are also part of the texture block fetch 420.

Figure 9C:
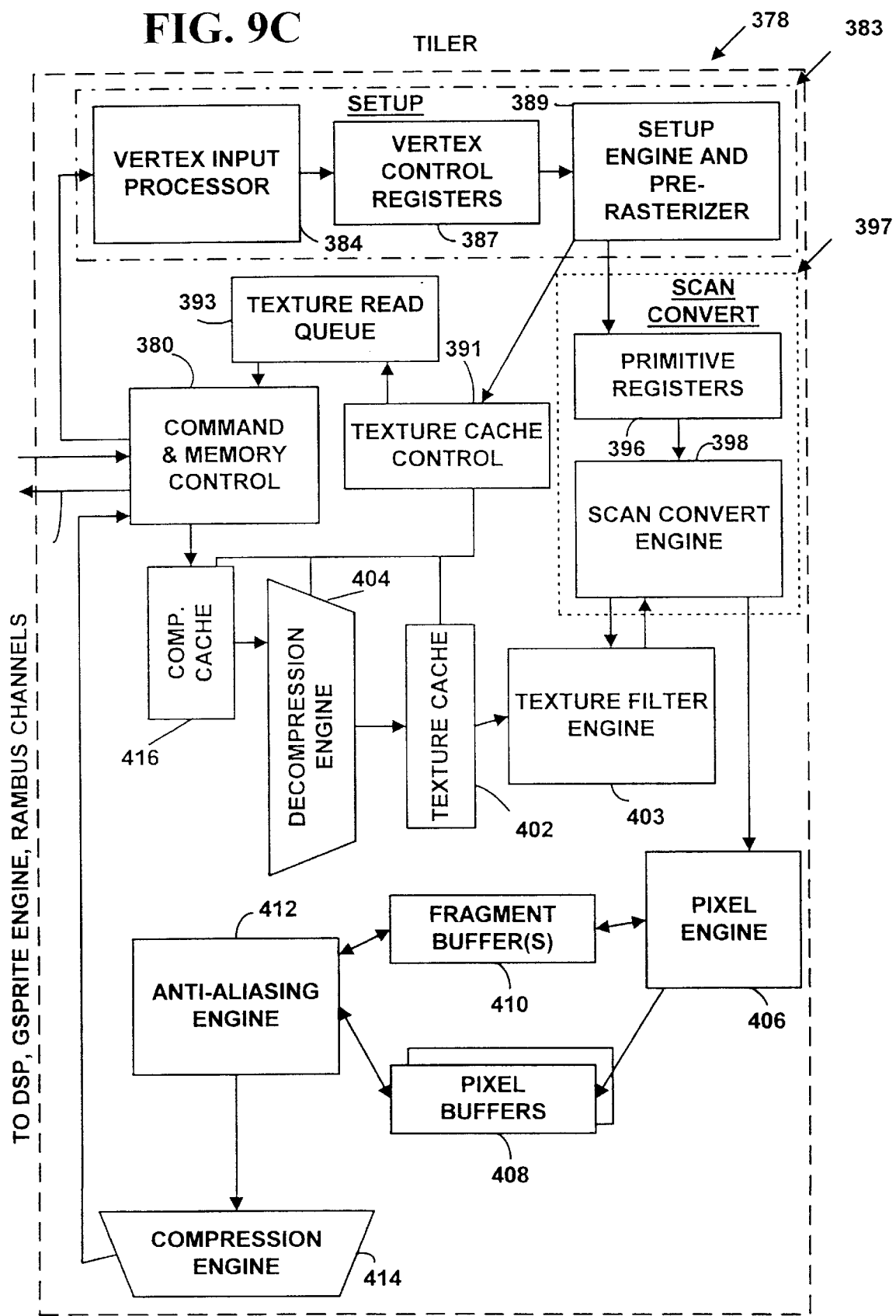

FIG. 9C illustrates a more detailed implementation of the system illustrated in FIG. 11. In this implementation, the functionality described in connection with blocks 425 and 426 of FIG. 11 is implemented within the set-up block 383. Specifically, the set-up block 383 includes the pre-rasterizer 426. The set-up block 383 also includes additional vertex control registers 387 to buffer additional primitives so that the pre-rasterizer can quickly convert the primitives to initiate texture data requests. The set-up engine and pre-rasterizer 383 sends requests for texture blocks to the texture cache control 391 shown in FIG. 9C.

The texture cache control 391 ensures that the required texture blocks will be in the texture cache 402 when needed. The texture read queue buffers read requests for texture data blocks to the shared memory system. The command and memory control 380 arbitrates access to the shared memory system, and it includes a buffer for buffering data from memory. The texture cache control 391, texture read queue 393, and the command and memory control 380 are specific implementations of the texture block fetch 429 in FIG. 11. For compressed texture blocks, the compressed cache 416 and the decompression engine 404 are also part of the texture block fetch 429. The texture cache control 391 manages the flow of texture blocks from the compressed cache 416, through the decompression engine 404, into the texture cache 402.

The scan convert block 397 and the texture filter engine 403 are a specific implementation of the post-rasterizer 427 in FIG. 11. The scan-convert block 397 and the texture filter engine 403 operate similarly to their counterparts illustrated in FIG. 9A and described above.

Texture Cache Control

Above, we described two approaches for rasterizing in environments with high latency for texture fetch operations. We now describe aspects of the texture cache control in more detail.

The texture cache control scheme allows a rasterizer to function at full speed during texture mapping in spite of a high latency for texture map fetch operations. In the tiler, this latency is the result of the time required to read uncompressed texture data from shared memory (e.g., RAMBUS) plus the time required to decompress blocks of the texture map. The scheme also applies to the gsprite engine, which fetches gsprite blocks from shared memory, possibly decompresses them, and converts pixel data in gsprite space to view space (or more specifically, to screen coordinates).

The basic premise of the texture cache control scheme is to produce two identical streams of texel (or gsprite pixel) requests which are offset in time. The first (earlier) stream is a pre-fetch request for which no texture data is returned, while the second (later) stream is an actual request which does return texel data. The time difference between these two streams is used to hide the latency of reading and decompressing texture data.

Two approaches for generating these time-separated requests described above are: (1) duplicate rasterizers which both read from a single primitive FIFO (FIG. 11 and 9C); and (2) a single rasterizer followed by a pixel FIFO (FIG. 10 and 9B).

In approach (1), the first rasterizer peeks at primitives from positions at or near the input side of the primitive FIFO and rasterizes the primitives, making texture requests but not receiving any texels back and not producing any pixels. The second rasterizer removes primitives from the FIFO output and makes the identical requests at a later time, receives the texels from the texture cache controller, and produces the pixels. The depth of the primitive queue combined with the number of pixels per primitive determines the potential time difference between the two request streams.

In approach (2), the single rasterizer processes primitives and makes texture requests and outputs partially complete pixel data into a pixel FIFO. This partial pixel data includes all data that is necessary to finish computing the pixel once the texture requests are honored. At the output side of the pixel FIFO, the partial pixel is completed, which produces the identical stream of texture requests, receives the texels, and produces completed pixels. The depth of the pixel queue determines the potential time difference between the two request streams.

The Texture Cache Control

The texture cache control has two conceptual caches: the virtual cache, and the physical cache. The virtual cache is associated with the first (pre-fetch) request stream, and has no data directly accompanying the cache entries (requests to this cache do not return any data). The physical cache is associated with the second (actual) request stream, and has real texture data accompanying each cache entry (and thus returns data to the requester). These caches have the same number of entries.

The virtual cache controls and tracks the future contents of the physical cache, thus at any position in its request stream it has a set of cache key and entry associations which the physical cache will have at the same relative position in its request stream (at a future time).

Upon receiving a request (a new 'key'), the virtual cache performs the comparison against its current set of keys. If the requested key is not in the virtual cache, then a cache replacement operation is performed. The virtual cache replacement includes 1) selecting an entry for replacement (via LRU or some other algorithm), 2) replacing the key for that entry, and 3) invoking the (memory and) decompression subsystem to begin the process of fetching and decompressing the data associated with that key. The particular implementations shown in FIGS. 9B and 9C, the decompression subsystem includes the command and memory control 380, compressed cache 416, and decompression engine 404.

The output of the decompression subsystem is a block of texture data which is then placed into an entry in the physical cache (the texture cache 402, for example). In the tiler shown in FIGS. 9B and C, processing performed by the decompression subsystem is performed in a multi-entry pipeline in which serial order is maintained.

Note that if the requested key was already in the virtual cache, then no action is required because the associated data will be in the physical cache at the time it is requested from the second request stream.

Requests to the physical cache result in a similar key comparison to see if the requested data is already in the cache. If a matching key is found, then the associated data is returned. If a match is not found, then the next data output by the decompression subsystem is guaranteed to be the desired data. Note that the physical cache does not perform any replacement entry selection processing—the entry in the physical cache replaced by this new data is dictated by the virtual cache via a cache entry 'target' index computed by the virtual cache controller and passed through the decompression subsystem with the requested data.

Correct functioning of the scheme requires that flow control be applied to the interface between the decompression subsystem and the physical cache. If decompressed data is allowed to overwrite its targeted entry in the physical cache immediately upon being available, it is possible that all of the references to the previous contents of that cache entry may not have been completed. (Note that the physical cache controller also may have to wait for data to be output by the decompression subsystem.)

This flow control is accomplished by waiting until the new entry is requested before overwriting the previous entry's contents. Placing new data into the texture cache is thus always deferred until the last moment until it is needed.

Since this replacement is deferred until it is needed, any time required to place the data into the physical cache can introduce latency into the process driving the second request stream. Two schemes for alleviating this latency are as follows.

The first scheme is to double buffer data in the physical cache. This allows the decompression subsystem to immediately write each entry's data into its side of the double buffer, and the physical cache controller can do a (presumably fast) buffer swap to map the data into its side of the cache. The decompression subsystem only has to wait if the entry to be filled is already fill and has not been swapped yet. Note that the cache replacement algorithm used by the virtual cache controller will tend to not repeatedly overwrite the same entry, thus 'spreading out' the writes to the cache entries.

The second scheme is for the physical cache to have one or more 'extra' entries in addition to the number of 'keyed' entries. The number of keyed entries is the number for which cache keys exist, and matches the number of entries in the virtual cache. The number of extra entries represents the number of entries which are unmapped (i.e. not currently keyed). The sum of these is the total number of data entries in the physical cache.

In the second scheme, all cache entries can transition between unmapped to mapped (associated with a key). The set of unmapped entries forms a FIFO of entries into which the decompression subsystem writes completed blocks of data. A separate FIFO structure is maintained for the target indices associated with these unmapped entries. When a request to the physical cache is made for which a matching key is not present, the first entry in the queue of unmapped of entries is mapped in to the targeted index and associated with that key. The replaced entry is unmapped and placed (empty) at the end of the unmapped queue.

Cache Key Generation

The basic premise of the scheme is that two identical streams of requests are generated. It is not a requirement, however, that the specific keys which are associated with these requests be identical.

The cache keys which form the first (early) stream of requests are used to control the reading and subsequent decompression of texture data. These keys must have some direct relevance to the requested data (such as a memory address).

The cache keys which form the second (later) stream of requests do not need to precisely match the content of the first stream—it is only a requirement that there be a unique one-to-one mapping between the two. This is due to the fact that the keys for the second stream are used only for matching existing cache entries, not for any data fetching operation. The critical fact here is that the association between the physical cache's key and a cache entry is made when the new data is mapped in to the physical cache, and the index of the associated entry is computed by the virtual cache and passed through the decompression subsystem.

This fact can be exploited to simplify the controls for the process which is generating the keys for the second request stream, since the keys for the stream need only be unique and not precisely 'correct'.

Figure 12A:
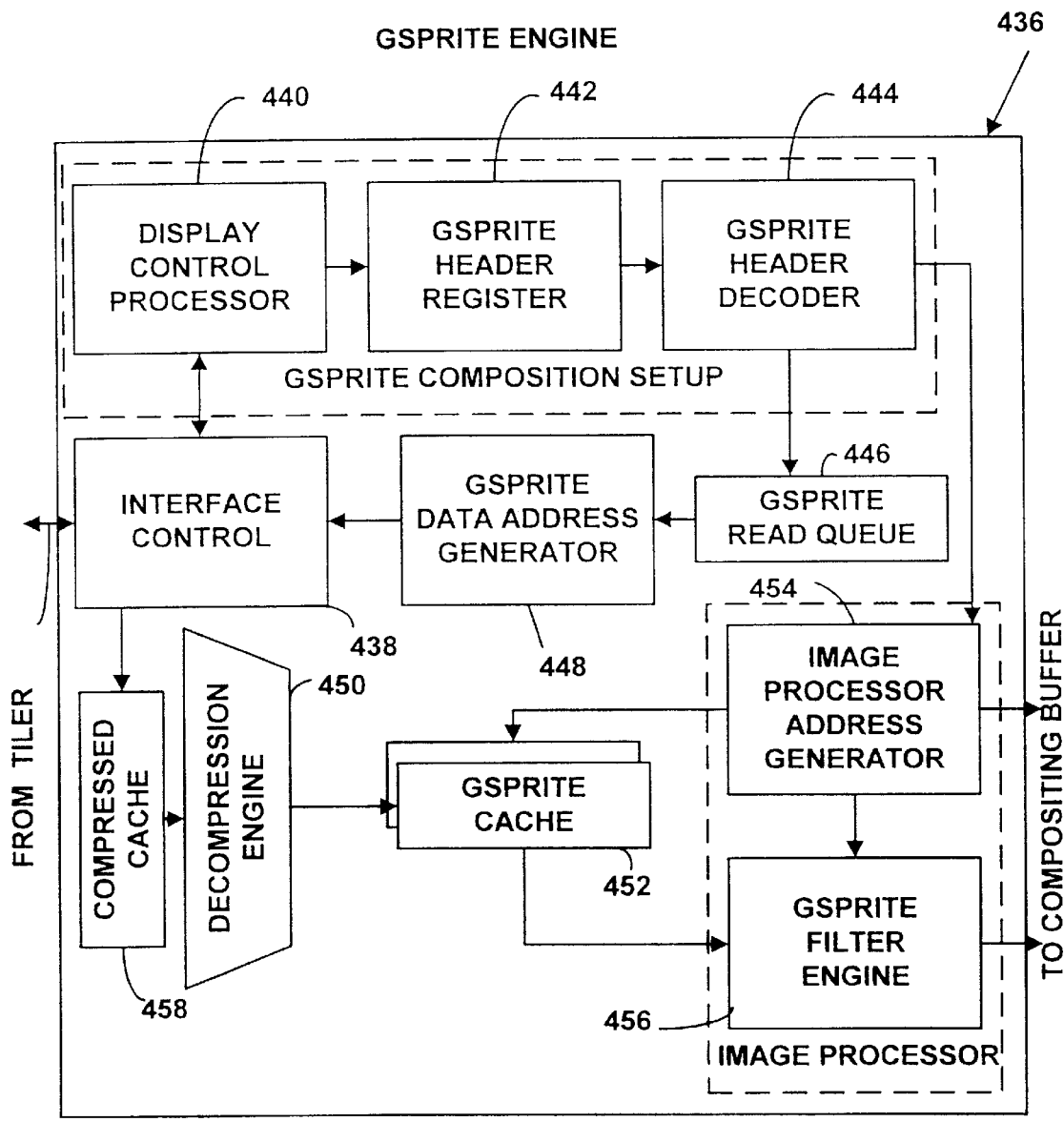
FIGS. 12A and 12B are block diagrams illustrating alternative implementations of a gsprite engine.

FIG. 12A is a block diagram illustrating the gsprite engine 436 on the image processing board 174. The gsprite engine 436 is responsible for generating the graphics output from a collection of gsprites. It interfaces with the tiler memory interface unit to access the gsprite data structures in shared memory. Gsprites are transformed (rotated, scaled, etc.) by the gsprite engine and passed to the compositing buffer where they are composited with pixels covered by other gsprites.

Interface control 438 is used to interface the gsprite engine with the shared memory system via the tiler. This block includes a FIFO to buffer accesses from the memory before they are distributed through the gsprite engine.

The display control 440 processor is used to control the video display updates. It includes a video timing generator which controls video display refresh, and generates the timing signals necessary to control gsprite accesses. This block also traverses the gsprite display data structures to determine which gsprites need to be read for any given 32-scanline band.

The gsprite header 442 registers store gsprite header data which is used by the image processor address generator 454 and gsprite filter engine 456 to determine the transformations on each gsprite. It is also used by the gsprite header decoder 444 to determine the blocks (in this case, the 8×8 compression blocks) required to render the gsprite in each band.

The gsprite header decoder 444 determines which blocks from each gsprite are visible in the 32-scanline band and generates block read requests which are transferred to the gsprite read queue 446. This block also clips the gsprite to the current band using the gsprite edge equation parameters. This process is described in more detail below.

The gsprite read queue 446 buffers read requests for gsprite blocks. This queue stores requests for sixteen blocks, in this embodiment.

The gsprite data address generator determines the address in memory of the requested gsprite blocks and sends gsprite read requests to the interface control block. The gsprite data address generator 448 includes a memory management unit.

Compressed data retrieved from shared memory 216 (FIG. 4A) can be temporarily stored in the compressed cache 458.

The decompression engine 450 includes two decompressors, one which implements a DCT based algorithm for continuous tone images such as 3-D gsprites and images, and the other which implements a lossless algorithm for desktop pixel data. The DCT based algorithm is implemented by two parallel decompression blocks, each of which can generate eight pixel elements (i.e. 2 pixels) per clock cycle.

The gsprite cache 452 stores decompressed, gsprite data (R G Bα) for sixteen 8×8 blocks. The data is organized so that 16 gsprite pixels can be accessed every clock cycle.

The image processor address generator 454 is used to scan across each gsprite based on the specified affine transformation and calculate the filter parameters for each pixel. Gsprite cache addresses are generated to access gsprite data in the gsprite cache 452 and feed it to the gsprite filter engine 456. The image processor address generator 454 also controls the compositing buffer.

The gsprite filter engine 456 calculates the pixel color and alpha for pixel locations based on the filter parameters. This data is transferred to the compositing buffers for compositing. This block 456 computes a 4 or 16 pixel filter kernel based on the gsprite s and t coordinates at a pixel location. The filter may, for example, either be bilinear or a more sophisticated sum-of-cosines function. The 16 pixel filter kernel can have negative lobes allowing much sharper filtering than is possible with bi-linear interpolation. The gsprite filter engine 456 generates four new pixels to be composited every clock cycle. These pixels are aligned in a two by two pattern.

The gsprite engine 436 interfaces to the tiler 200 and the compositing buffer 210. Control signals control video timing and data transfer to the DAC 212.

Figure 12B:
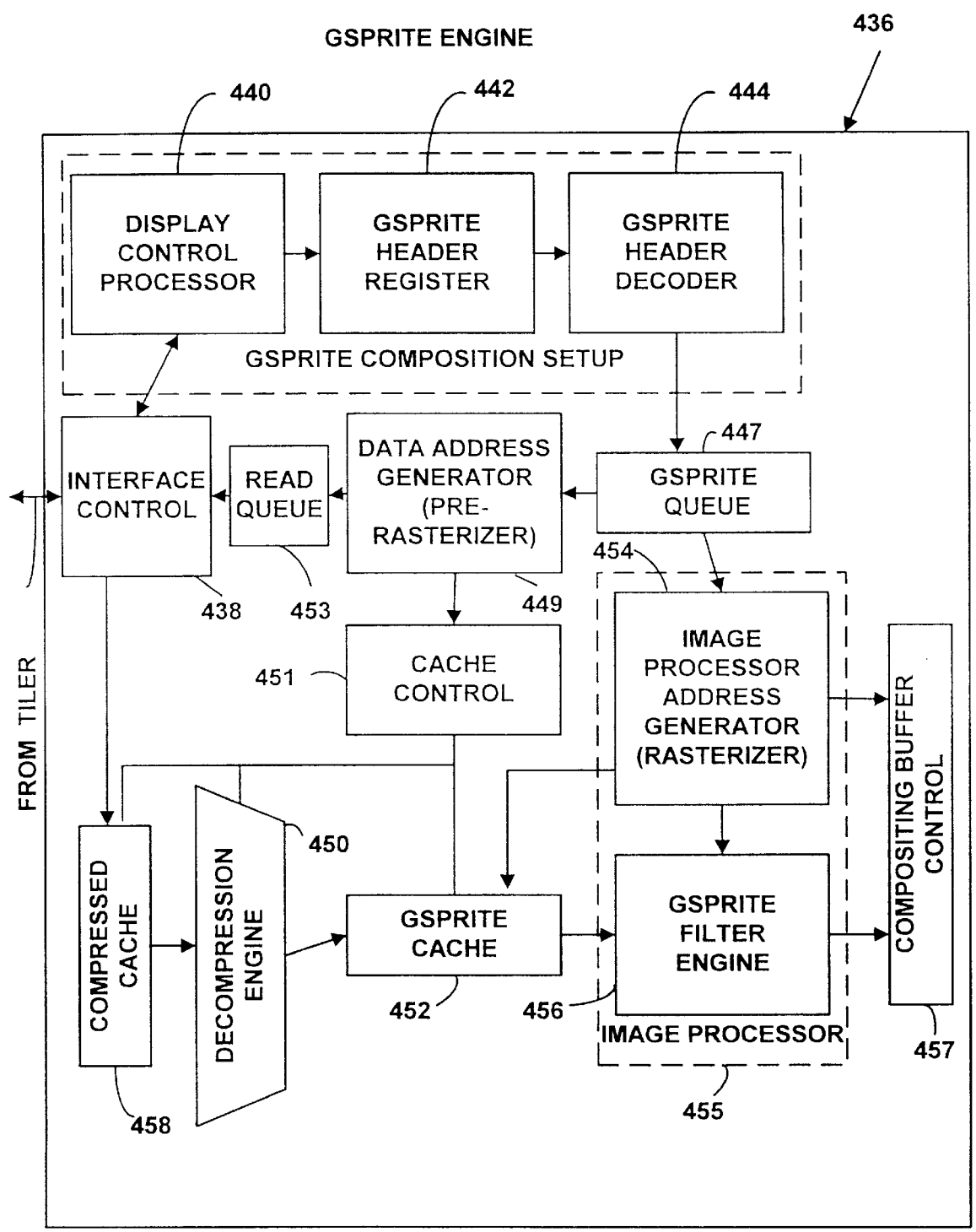

FIG. 12B is a block diagram of an alternative implementation of the gsprite engine 437. This particular implementation includes both a pre-rasterizer 449 and rasterizer 454 so that the gsprite engine can convert gsprite pixel data from gsprite space to screen space without incurring the latency in retrieving and decompressing blocks of gsprite pixel data. The dual rasterizer approach used in this implementation is described above in connection with FIG. 11 and 9C.

The operation of the blocks in the gsprite engine 437 is generally the same as described above for FIG. 12A except that this implementation uses the dual rasterizer method for fetching blocks of texture data. In this implementation (FIG. 12B), the gsprite header decoder 444 reads the gsprite header register 442, clips the gsprite to the current display band, and places the gsprite in the gsprite queue 447 for rasterization. The data address generator or "pre-rasterizer" 449 scans each gsprite based on the specified affine transform in the gsprite header and generates read requests to the gsprite cache control 451. Using a method described above in connection with the texture cache control, the sprite cache control 451 ensures that the required gsprite data blocks are in the gsprite engine 437 and specifically in the gsprite cache 452 when the image processor block 455 needs them. It manages the flow of gsprite data blocks from the compressed cache 458, through the decompression engine 450, and into the gsprite cache 452. The read queue 453 buffers requests for gsprite data blocks to the shared memory system, and the interface control 438 reads the requests in the read queue 453, controls accesses to shared memory, and places blocks of gsprite data in the compressed cache 458.

The decompression subsystem in the gsprite engine includes the compressed cache 458 and decompression engine 450. The cache control 451 controls the flow of gsprite blocks through this decompression subsystem as described above in connection with the texture cache control.

The image processor address generator (rasterizer) 454 scans each gsprite based on the specified affine transform in the gsprite header and calculates the filter parameters for each pixel. It also generates gsprite cache addresses of gsprite data, which it sends to a cache address map in the gsprite cache for use by the gsprite filter engine 456. In one specific implementation of the cache, the cache address map selects which 14 pixel blocks are active and which two blocks are filled from the decompression engine.

The gsprite filter engine 456 maps color and alpha data at pixel locations in gsprite space to screen space. In this implementation, it applies either a 2×2 or 4 by 4 filter kernel to compute pixel values (color or both color and alpha) at pixel locations in screen space. The compositing buffer control 457 passes pixel values, in this case four pixels per clock cycle, to the compositing buffer. The compositing buffer control 457 monitors the ready line from the compositing buffer to ensure that the gsprite engine 437 does not overrun the compositing buffer. The rasterizer 454 controls the compositing buffer control 457.

Figure 13:
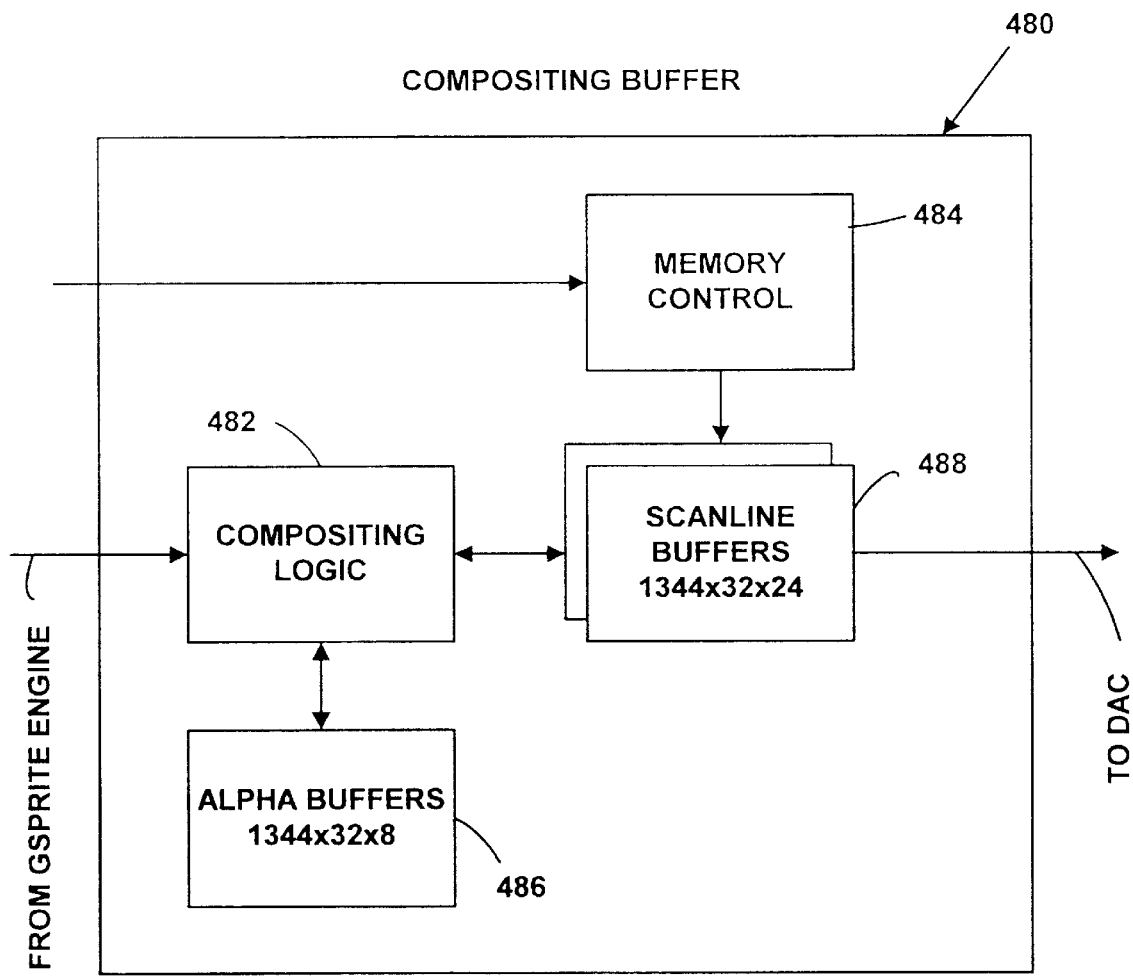
FIG. 13 is a block diagram of a compositing buffer in an embodiment.

FIG. 13 is a block diagram illustrating the compositing buffer 480 on the image processing board 174. The compositing buffer 480 is a specialized memory device that is used to composite gsprite data from the gsprite engine and generate digital video data to transfer to the DAC 212. The compositing buffer operates on 32 scanlines at a time—compositing gsprites for one 32 scanline band while the previous 32 scanlines are displayed.

The compositing logic 482 is responsible for calculating the pixel values as they are written into the scanline buffer. This is accomplished by performing a blending operation between the pixel value that is currently stored in the scanline buffer and the one that is being written to the compositing buffer. This operation is described in more detail below. In one implementation, the compositing logic performs four parallel pixel operations per clock cycle.

The memory control 484 is used to control the address and cycling of the memory banks. Address information is passed in a row column format as with normal DRAMs.

The alpha buffers 486 include an eight bit value for each of 1344×32 pixels. The memory is organized such that four contiguous pixels can be read and written each clock cycle. The alpha buffer also has a fast clear mechanism to quickly clear the buffer between 32-scanline band switching.

Two independent scanline buffers 488 are provided. The scanline buffers include three eight bit color values for each of 1344×32 pixels. The memory is organized such that four contiguous pixels can be read and written each clock cycle. One buffer is used to transfer the pixel data for a band to the DAC while the other is used to composite the pixels for the next band. Once the band has been completed, their functions swap.

A multiplexer is used to select data from one of the two scanline buffers 488 and sends the pixel display data to the DAC. The multiplexer switches between buffers every 32 scanlines.

The compositing buffer 480 interfaces to the gsprite engine 204, and transfers image data to the DAC 212.

Figure 14:
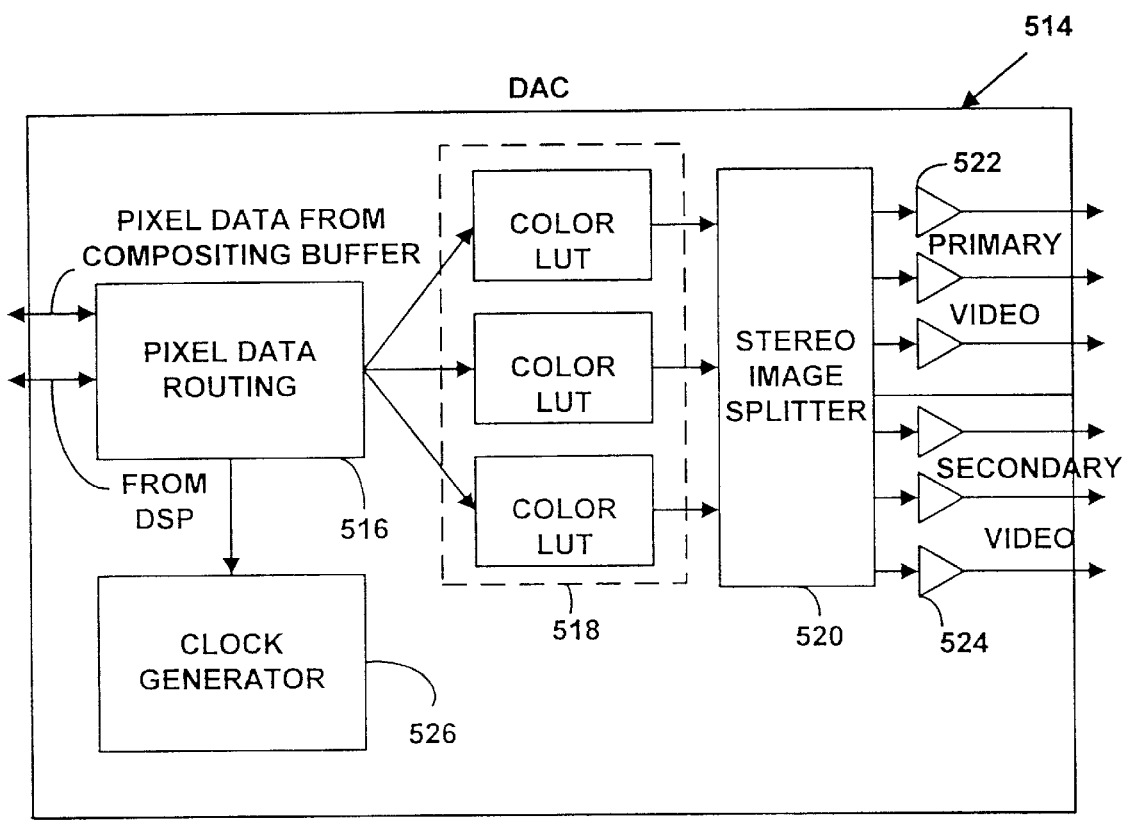
FIG. 14 is a block diagram of a Digital to Analog Converter (DAC) in an embodiment.

FIG. 14 is a block diagram illustrating the DAC 514 on the image processing board 174. The DAC 514 implements the basic functions that are common to most RAMDACs on the market today. The DAC includes logic for reading and writing internal control registers, and for pipelining the video control signals. Additional functional blocks are described below.

The pixel data routing block 516 is used to control the routing of pixel data from the compositing buffers. In the normal operating mode, this data is passed at pixel rates to the Color LUTs 518 for each of the three channels. This block also allows the data to be read back to the DSP for diagnostic purposes.

The stereo image splitter 520 supports two separate video signals for stereoscopic display using a head mounted display system. In this mode, the two video channels (522, 524) are interleaved from the compositing buffer, and must be split out by the DAC 514. The stereo image splitter 520 performs this function on the DAC 514. In the normal single channel mode, the LUT data is passed directly to the Primary DACs.

Alternatively, the DAC 514 can be designed to generate a single video output. With a single video output, the DAC can generate a stereoscopic display using a line interleaved format, where one scanline for one eye is followed by the scanline for the other eye. The resulting video stream has a format such as 640×960, for example, which represents two 640×480 images.

The clock generator 526 is used to generate the video and audio clocks. These clocks are generated by two phase locked clock generators to eliminate synchronization drift. The clock generator can also be slaved to a control signal from the Media Channel, allowing the image processing board to sync to an external sync source.

Having described the structure and operation of the image processing system above, we now describe various components and features of the system in more detail. We begin with an introduction to the data structures that can be used in the system to implement concepts introduced above.

Geometry Processing

In one embodiment of the image processing system, there is a fundamental primitive type to describe all geometry, including triangle strips, triangle fans, polylines and points. Within each primitive there may be several sub-primitives of the same primitive type (e.g. a collection of triangle strips). A primitive has a header and a series of vertices. The header describes the following:

Primitive Type: triangle, line or point

Per-vertex information: Indicates what data is specified at each vertex, and may include color values, normal vectors, texture coordinates, and Z-values.

Control information: Flags to control front/back culling and automatic computation of normal vectors.

A vertex includes position information, and the following optional information. The presence of this optional information is indicated in the header word of the primitive.

Color information: R, G ,B colors specified as either floating point or integer.

Normal vectors: Surface normals used for lighting calculations.

Texture coordinates: u and v indices into the current texture map.

Zvalues: These will normally exist, except for 2-D primitives, or for applications that choose to pre-sort geometry by depth.

Edge normals: These are used in some anti-aliasing calculations.

In addition, a vertex has two control bits that specify:

Strip/Fan: Indicates whether this vertex is to be considered a strip vertex or a fan vertex.

Start/Continuation: Specifies whether this vertex is the start of a new sub-primitive.

The appearance of the primitive can be influenced by the graphics attributes such as transformation matrix, lighting models, and texture. These state variables are described in the following section.

The image processing board 174 maintains a limited number of state tables 16 including attributes that affect rendering. Functions are provided for loading and selecting graphics state as described below:

Load State: Defines the complete state for a given state table.

Select State: Selects one of the state tables as the currently active one.

Set State Variable: Overwrites a specific state variable in the currently selected state table.

The following graphics attributes can be included in the state table:

Matrix: 4×4 Modeling/Viewing/Projection transformation matrix, along with flags to assist in performance optimization.

Material properties: This includes emissive color, diffuse color, ambient color and specular color.

Lighting models: Ambient, directional, positional and spot lights are supported. Lighting parameters include ambient intensity, diffuse intensity, specular intensity, position, direction, attenuation factor (constant, linear and quadratic), spotlight exponent and spotlight cutoff angle.

Shading mode: Gouraud and flat shading are supported. In addition, there may be a shading language that facilitates user-definable shaders.

Texture control: This includes an on/off flag, texture gsprite (textures maps are stored as gsprites), texture mapping mode (clamp/wrap), texture application mode (blend, decal, modulate), and texture filtering mode.

Fog mode: This includes an enable flag, fog type (linear, exponential, exponential squared), and parameters for computing fog blending factor (fog density, near distance and far distance).

Chunking

Unlike conventional graphics systems which use a large frame buffer and Z-buffer in RAM to store color, depth, and other information for every pixel, our system divides objects in a scene among image regions called "chunks" and separately renders object geometries to these chunks. In one embodiment, objects are rendered to gsprites. The gsprites are subdivided into chunks, and the chunks are rendered separately. While our description refers to several specific embodiments, it should be understood that chunking can be applied in a variety of ways without departing from the scope of the invention.

Figure 15A:
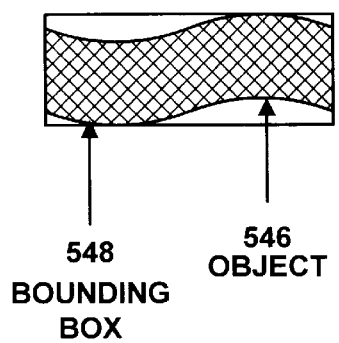
FIGS. 15A–C are diagrams of an example illustrating one aspect of chunking.
Figure 15B:
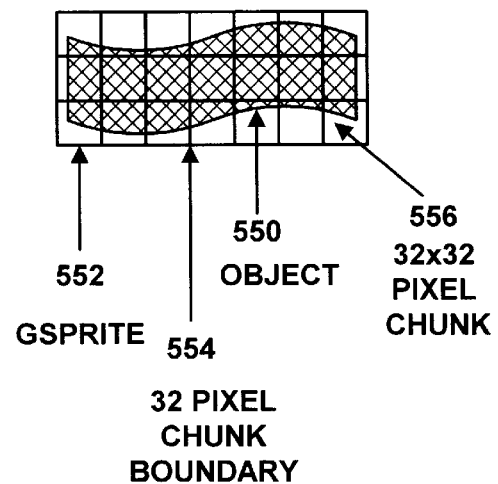

A few examples will help illustrate the concept of chunking. As shown in FIG. 1SA an object 546 in a graphics scene is enclosed by a box called a bounding box 548. Turning to FIG. 15B, an object 550 in the graphics scene enclosed by a bounding box can be rendered to an image region called a gsprite 552. The bounding box may be rotated, scaled, expanded or otherwise transformed (e.g. affine transformed) to create a gsprite in screen space. Once the bounding box has been generated, if the bounding box does not fall on a 32 pixel boundary (i.e. the chunk boundary) 554, the bounding box is expanded in both the X and Y directions around the object to become an integer multiple of the 32 pixel chunk size. As can be seen from the object 550 in FIG. 15B, a bounding box drawn around the object 546 that was shown in FIG. 15A, is expanded to 32×32 pixel boundaries in FIG. 15B. The gsprite is then subdivided into 32×32 pixel "chunks" 556 before rendering. However, other smaller or larger chunk sizes and alternatively shaped chunks could also be used. However, rectangular and most preferably square shaped chunks are illustrated.

Figure 15C:
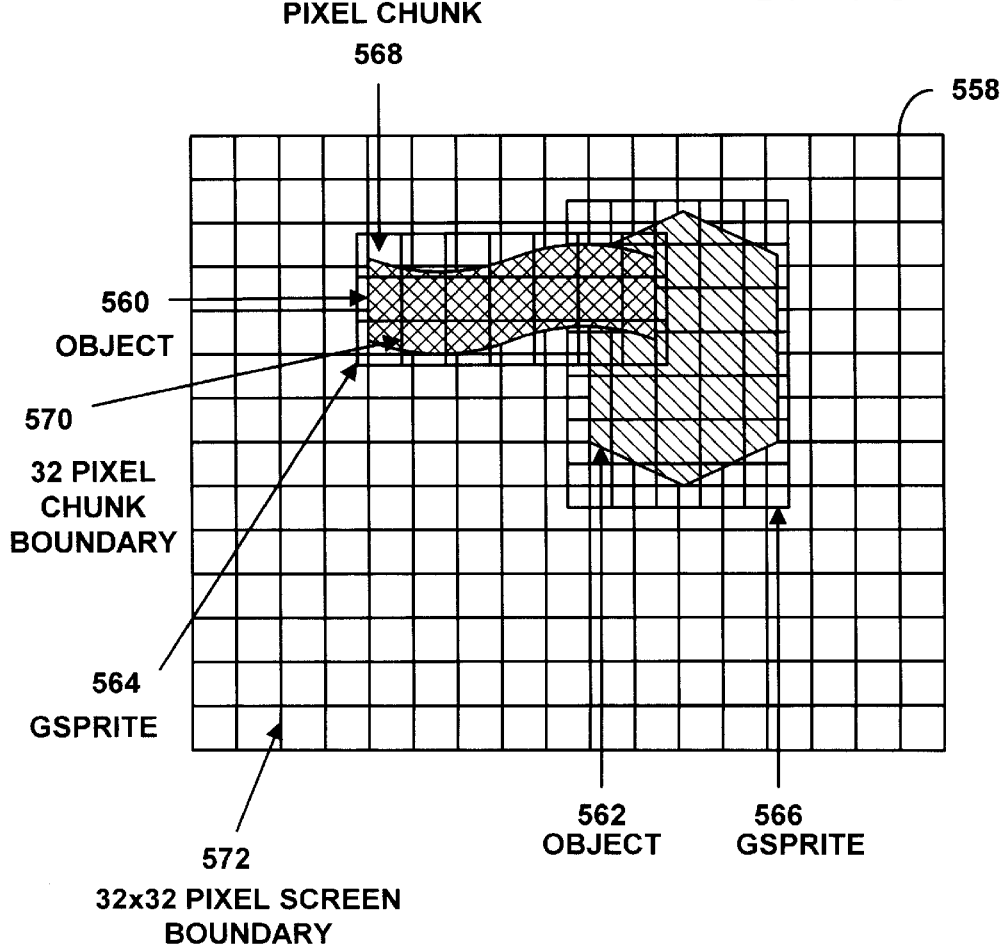

As is shown in FIG. 15C, a graphics scene 558 will contain a number of overlapping objects (560, 562). These objects are enclosed in bounding boxes and are assigned to gsprites (564, 566). The bounding boxes shown in FIG. 15C have already been expanded (and rotated, scaled, and otherwise transformed) to 32 pixel multiples to allow 32×32 chunks 568 to be generated. However, as can also be seen from FIG. 1 5C, the gsprites and their corresponding 32×32 pixel chunks boundaries 570 typically will not line up exactly on 32 pixel screen boundaries 572 so additional gsprite manipulation is required during chunking so the gsprite can be translated into screen space.

One approach to creating gsprites which will be rendered using chunking is to combine a number of objects to create a larger composite gsprite instead of creating and rendering a number of smaller individual gsprites that contain the geometries of the individual objects. This combination of gsprites saves processing time during rendering and is often desirable if the objects combined do not change very often within a graphics scene. Another approach to create gsprites is to target components of an object with complex geometries, and then sub-divide these complex geometry components into a number of gsprites. This sub-division may require extra processing time, but is used to improve the output resolution of a particular complex object that changes frequently. A combination of both of these techniques may also be used on some objects.

Consider for example a character in a video game whose arms are covered by a number of spikes of different sizes, and the arms move frequently. The body and head and other parts of the character may be combined to form a larger composite gsprite since these parts of the object don't change frequently. However, the characters arms, which are covered with spikes and represent complex geometries and change frequently, are sub-divided into a number of gsprites to improve the output resolution. Both the combination and the sub-division are used in this case. Since it is not easy or practical to draw such a character, for the purposes of illustration, a much simpler object, a "coffee cup" is used instead to illustrate the combination and sub-division.

Figure 16A:
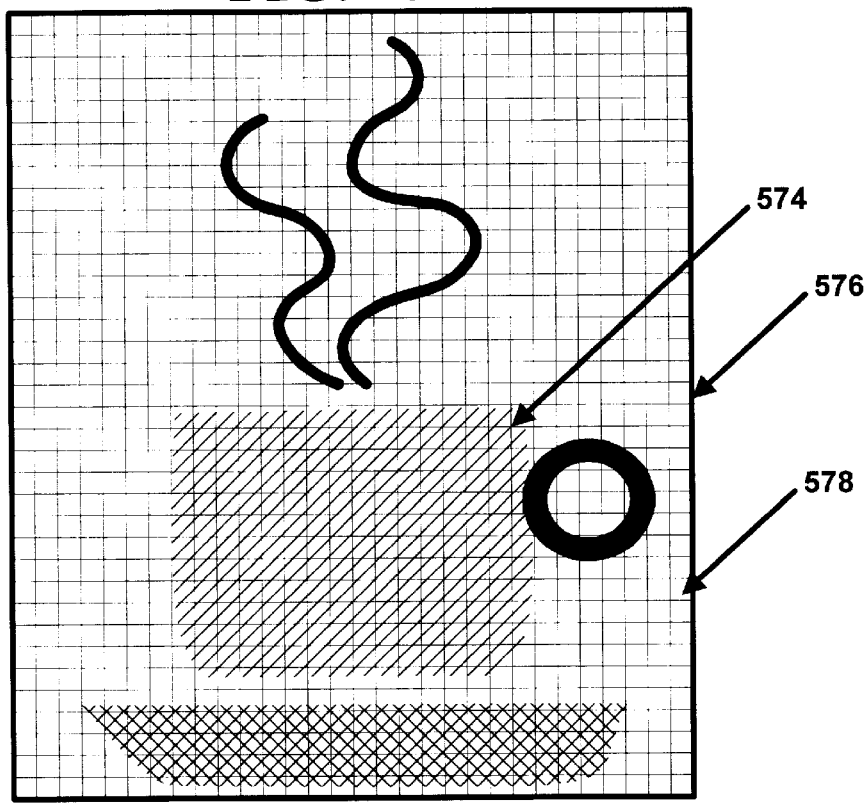
FIGS. 16A–B are diagrams illustrating aspects of chunking in an embodiment.
Figure 16B:
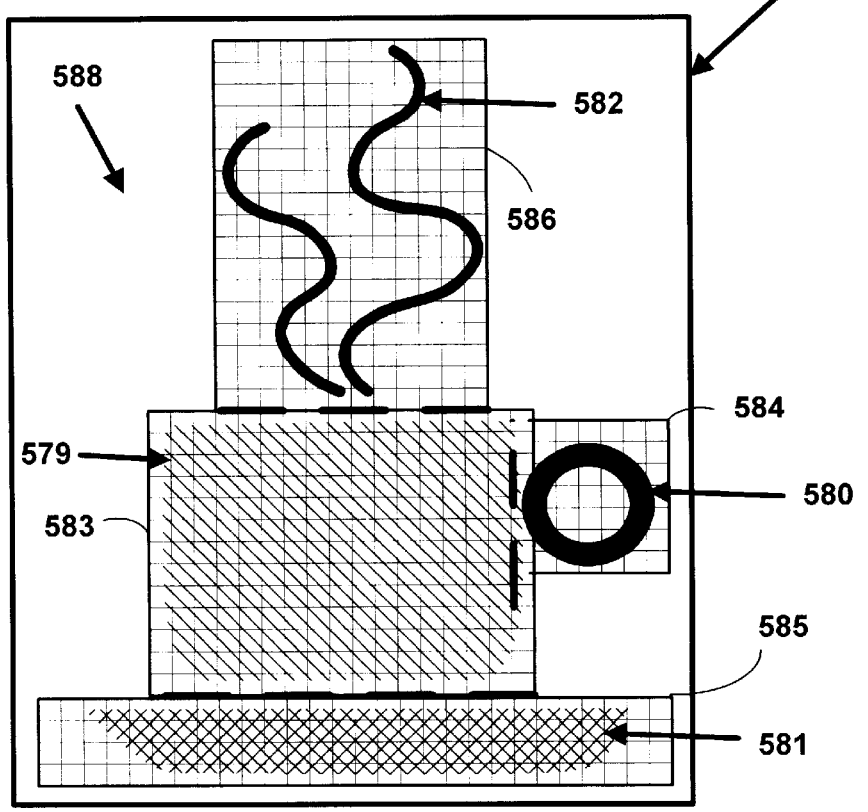

FIG. 16A shows a "coffee cup." This "coffee cup" is actually is composed of a number of separate objects. For example "coffee cup" can be look at to actually consist of a cup container, a cup handle, a saucer, and fumes coming out of the cup. One approach would be to combine this individual objects into a large gsprite (i.e. a "coffee cup") as is shown in FIG. 16A. Another approach would be to sub-divide the "coffee-cup" into a number of smaller objects (e.g. cup container, cup handle, saucer, and fumes) and create smaller individual gsprites as is shown in FIG. 16B. FIG. 16B also illustrates how an object with complex geometries might be sub-divided.

Treating the "coffee cup" 574 as one simple object as is shown in FIG. 16A, the individual components (e.g. cup container, cup handle, saucer, fumes) of the object can be combined to create one large gsprite. In this case, a bounding box 576 would be drawn around the object to transform the object to screen space and create one large gsprite. The bounding box may be rotated, scaled, expanded or otherwise manipulated to create a gsprite which falls on 32×32 pixel boundaries in screen space. The gsprite is then divided into a number of 32×32 pixels chunks 578.

One way to divide a gsprite into chunks is to loop through all the geometry contained in the objects, and place the geometries into chunks. Another approach loops through the chunks recording all geometries which touch the chunk being considered. The illustrated embodiment uses the second approach, however the first and other approaches can also be used. As can be seen from FIG. 16A, a number of chunks will be empty (i.e. not be touched by any object geometries). These chunks can be ignored during rendering as will be explained below.

Now, treating the "coffee cup" as a complex object, the object is sub-divided into smaller object components which are processed to create a number of smaller gsprites as is shown in FIG. 16B. For example, the "coffee cup" object includes the cup container without the handle 579, the cup handle 580, the saucer 581 and the fumes 582 sub-objects. Each of these sub-objects would be enclosed by bounding boxes shown by 583–586 respectively to create four individual gsprites. The "coffee cup" including the four individual gsprites would also be enclosed by a enclosing bounding box as is shown by 587. Each of these bounding boxes may be rotated, scaled, expanded or otherwise transformed (e.g. affine transformed) to create a gsprite which falls on 32×32 pixel boundaries in screen space. Each individual gsprite is then divided into a number of 32×32 pixels chunks. The enclosing bounding box 587 is also divided into chunks and contains areas of empty chunks 588 which are ignored during rendering. However, chunks of the enclosing bounding box are not illustrated in FIG. 16B.

As a result of chunking, the graphics image is not rendered as a single frame, but is rendered as a sequence of chunks that are later aggregated to a frame or view space. Only objects within a single gsprite that intersect the 32×32 pixel chunk of the image currently being drawn are rendered. Chunking permits the frame and Z-buffer to of be a small physical size in memory (i.e. occupy significantly less memory than in the traditional graphics systems described above), and achieve a high degree of utilization of the memory that is occupied, as well as increasing memory bandwidth. The small chunk size also allows more sophisticated rendering techniques to be used, techniques that could not be applied efficiently on large frame and Z-buffers.

Rendering of chunks is performed on the tiler. However, rendering could also be performed on other hardware components or using software. VLSI memory on the tiler chip is used to store the small chunks (32×32 pixel) of the frame currently being rendered. The on-chip VLSI memory is much faster and has a much larger memory bandwidth than external RAM. However, because of the chunking process, a large amount of memory to store the whole frame buffer and Z-buffer for the rendering process is no longer required. The internal memory within the tiler is used only to process the current chunk, and then it is re-used over and over for each subsequent chunk that is processed. As a result, the available internal memory is well utilized during the graphics rendering.

Using internal VLSI memory also eliminates pin driver delays that normally occur due to off chip communications as well as overhead associated with performing READ and WRITE operations to the large external memory required for conventional frame and Z-buffers. In addition, the small chunk size allows more sophisticated anti-aliasing (e.g.

fragment buffers) and texturing schemes to be performed on the chunk than could be performed on a full frame and Z-buffer stored in a large amount of external memory because an entire 32×32 pixel chunk can be completely rendered in the illustrated embodiment before the next chunk is computed. The small chunk size also lends itself well to image compression techniques that will be described in more detail below.

After all intersecting polygons have been drawn into the chunk and the fragments resolved, the pixel data including color and opacity are compressed in the tiler chip and then moved to external memory.

Figure 17A:
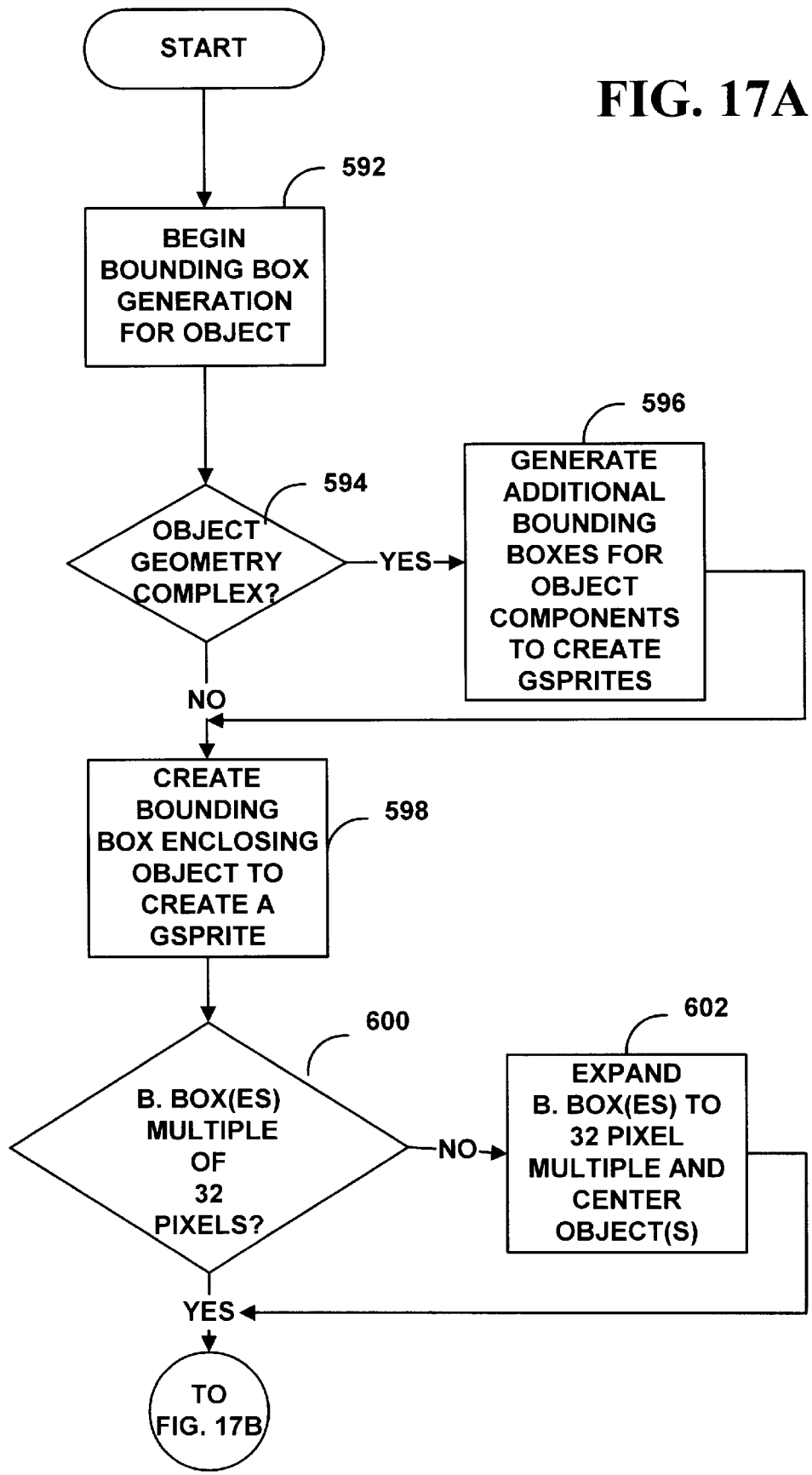
FIGS. 17A–B are flow diagrams illustrating aspects of chunking in an embodiment.
Figure 17B:
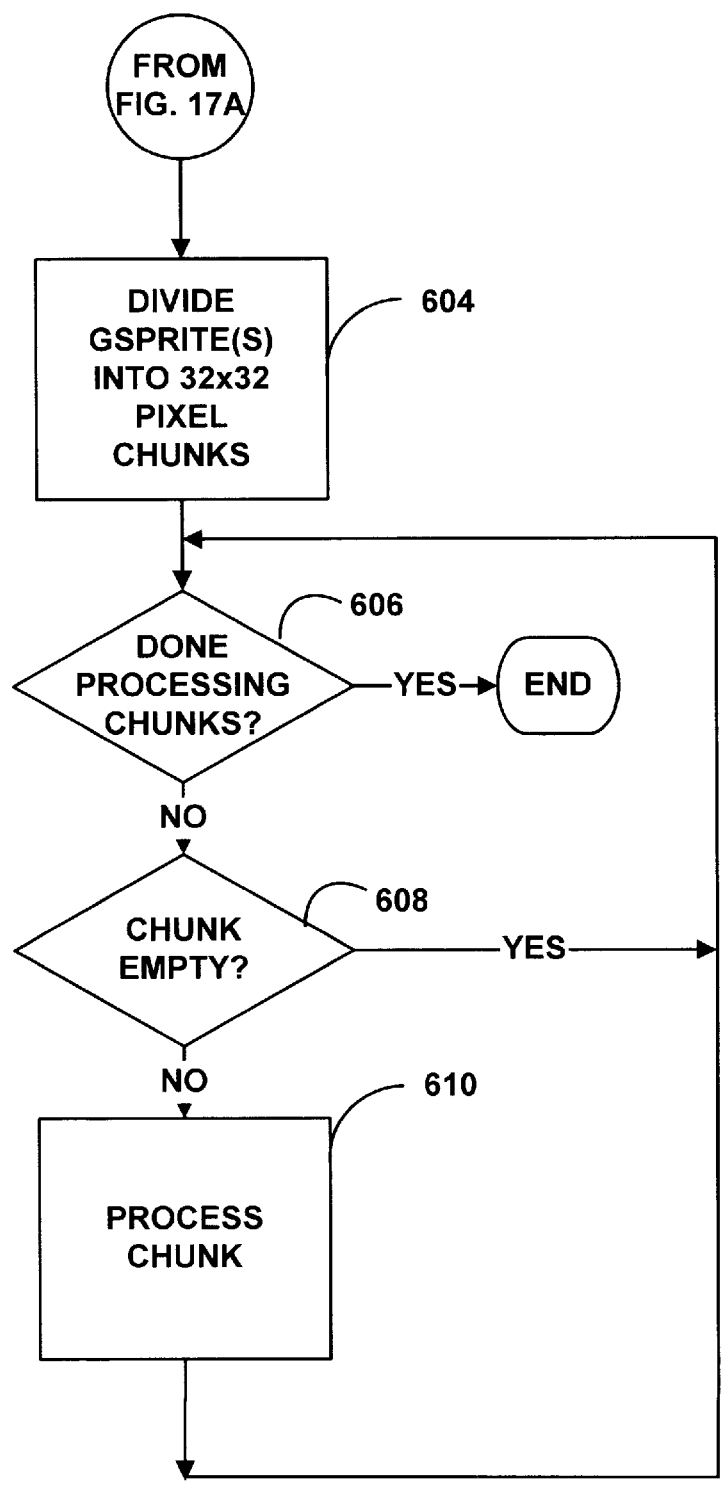

The flowchart in FIGS. 17A and 17B show a high level overview of how a graphics scene is partitioned into chunks. First, one or more bounding boxes are generated for each object. (592) (FIG. 17A). If the object has complex geometry (e.g. finely tessellated, etc.) (594), then a number of bounding boxes are generated to enclose each of the object's complex components (to create a plurality of gsprites) (596). If the object geometry is not complex, then a single bounding box can be used to enclose the object and create a gsprite (598). However, if the object is complex, then the single bounding box will also enclose the plurality of bounding boxes that were created to enclose the object's complex components. If the bounding box or boxes are not an integer multiple of 32 pixels (600), then the bounding box(es) is/are expanded symmetrically in the X or Y directions (or both directions) to become an integer multiple of 32 pixels. The object (and object components if the geometry is complex) is/are then centered in the bounding box (602). This is illustrated by the gsprites shown in FIGS. 15B and 15C. The symmetric expansion is preferable, though not required, as it provides the best balance of processing between chunks in a single gsprite.

Returning again to FIG. 17, the gsprites are then divided into 32×32 pixel chunks (604) (FIG. 17B). As is apparent, these chunks are not at fixed locations in the view space, but are at addressable and variable locations depending upon the location of the chunked object. After dividing the gsprites into chunks, the chunks are processed. If the rendering of chunks is complete (606), the process ends. If the rendering of chunks is not complete, processing of the next chunk is started, after first examining to see if it is empty (608). If the chunk is empty, then it is not processed, and the next chunk is examined. If the chunk is not empty, then rendering (610) of the chunk continues in the tiler until all objects impinging on the chunk have been processed. This process continues until all chunks in each gsprite and all gsprites have been processed.

Gsprite sizes may be expressed as a percentage of the total screen area. Background gsprites will be quite large, but other components of the scene are usually quite a bit smaller than the total screen area. The performance of any chunking scheme used is sensitive to the screen space size of the primitives in the gsprites. As a result, it is necessary to properly regulate (e.g. queue) the object data input stream that is used to create the gsprites. Proper regulation of the object data input stream allows object processing to be completed at a higher bandwidth, and increases system throughput.

Our system uses a command stream cache to cache the object data input stream. The command stream cache can be used to cache the entire contents of a gsprite, and then iterate over every chunk and its associated geometries in the gsprite stored in the cache.

The cache can be also used for selective caching. For example, defining a threshold so that geometric primitives are automatically cached if they touch a certain number of chunks. If a cache is available, then virtual chunking can be done. In virtual chunking, a chunk bucket is created which corresponds to regions of N×M chunks with each region being a virtual chunk. Virtual chunking allows for adaptive sizing of the virtual chunks appropriate to the contents and the size of the geometry being processed.

Another use for the cache is modified scene graph caching. Instead of caching and referring to static portions of the scene, caching is done and dynamic portions of the scene are referred to through indirection. For example, suppose a gsprite contained a cuckoo clock with fairly complex geometries. The clock itself is quite complex, but the only moving parts are a bird, two doors, and two clock hands. Further, each of these geometries is rigid and unchanging. Thus, the rendering of the clock involves six static trees and six transformations (i.e. one for the clock, bird, 2 doors, and 2 clock hands). If the cache is large enough, the entire scene graph is transformed into a command stream. On rendering, the current transformations are patched over the cached command stream, and the resulting command stream is launched against all of the chunks in the gsprite. The patched portions of the command stream are the same size across all renderings. A more flexible approach is to insert a call command in the cached static scene graph. On rendering, the dynamic portions are written and cached to memory of varying sizes. Addresses of these dynamic portions are then patched into the associated call command in the static command stream. This approach is more flexible since the size of the dynamic command can vary from rendering to rendering. Thus, the effect of this approach is a memory-cached callback approach. In the case of the cuckoo clock, it would mean writing six transformations, and possibly a callback for the bird geometry so that it could be empty if the doors are closed. This approach is extremely compact with respect to bus bandwidth and lends itself to quick, directed traversal of the scene graph.

Even though the cache memory is limited, some geometries or attributes may remain cached across many renderings. For example, in a car racing game, caching a car body geometry would result in a significant overall savings across renderings. Likewise, common attribute states (or sub-states) could be reused across many gsprites or rendering of a single gsprite. As was just described, using a cache within a chunking scheme can result in some significant time savings. However, adequate chunking performance might also achieved without the command stream cache by generating a command stream on the fly for each touched chunk in the gsprite.

In the implementation of the tiler shown in FIGS. 9A–9C, chunks are used sequentially to render an entire frame on one processor, rather than using multiple simultaneous chunks on parallel processors to share the computational load. Although less preferred, a combination of serial and parallel processing of chunks could also be used. Using a completely parallel processing implementation of chunks, an object moving across the screen would necessarily require constant chunking operations as it moved across the screen. However, in the illustrated embodiment of the invention, because of the serial processing of chunks, an object can be fixed at the chunk boundaries in a gsprite and thus NOT require chunking as the object moved across the screen. The parallel processing rendering of chunks also does not allow sophisticated anti-aliasing and texturing schemes to be applied to individual chunks as is the case for serial rendering of chunks. The chunk size and sequential rendering is very valuable for image compression techniques since an entire 32×32 pixel chunk is rendered before the next chunk is computed, and thus can be compressed immediately.

The purpose of image compression is to represent images with less data in order to save storage costs and/or transmission time and costs. The less data required to represent an image the better, provided the image can be reconstructed in an adequate manner. The most effective compression is achieved by approximating the original image rather than reproducing it exactly. The greater the compression, the more of an approximation ("lossy compression") the final image is going to be.

The process of chunking is itself a compression technique. Objects are approximated with one or more gsprites which in turn are created from number of 32×32 pixel chunks. The actual object is approximated with gsprites and reconstructed from rendered gsprites. The reconstruction of the original object depends on how effectively the object was approximated by dividing it into gsprites and then chunking it (e.g. using the complex object geometry division techniques described above).

The individual 32×32 chunks are also compressed using image compression techniques. A compressed 32×32 pixel chunk takes up less space in the small amount of internal memory available. The 32×32 pixel chunks can be broken down into sixteen 8×8 pixel chunks which is the size commonly used in image compression techniques that employ discrete cosine transformations (DCT).

In one implementation, the compression and decompression engines on the tiler and the decompression engine on the gsprite engine support both lossy and lossless forms of compression/decompression. The lossy form includes a lossless color transform from RGB to YUV, a DCT, uniform or perceptual quantization, and entropy coding (Run length and Huffman coding). The lossless form includes a color transform from RGB to YUV, a prediction stage, and entropy coding as performed in the lossy form.

In order to dramatically reduce memory requirements to process graphics images using chunking, a small Z-buffer (e.g. about 4 kilobytes (kb) is used in the illustrated embodiment. Specifically, the z-buffer in this implementation is slightly less than 4 kb (1024×26), but the number of bits of precision can vary. However, a Z-buffer of other larger or smaller sizes could also be used. Using a small 4 kb Z-buffer allows only 1024 pixels to be Z-buffer rendered at any one time. In order to render scenes (e.g. scenes composed of gsprites) of arbitrary size using a 4 kb Z-buffer, the scene is broken up into chunks of 32×32 pixels in size (there are usually several gsprites in a scene, but each gsprite is broken into chunks). In this scheme, the image pre-processor sends the appropriate geometry to each chunk in a gsprite to be Z-buffer rendered.

Figure 18A:
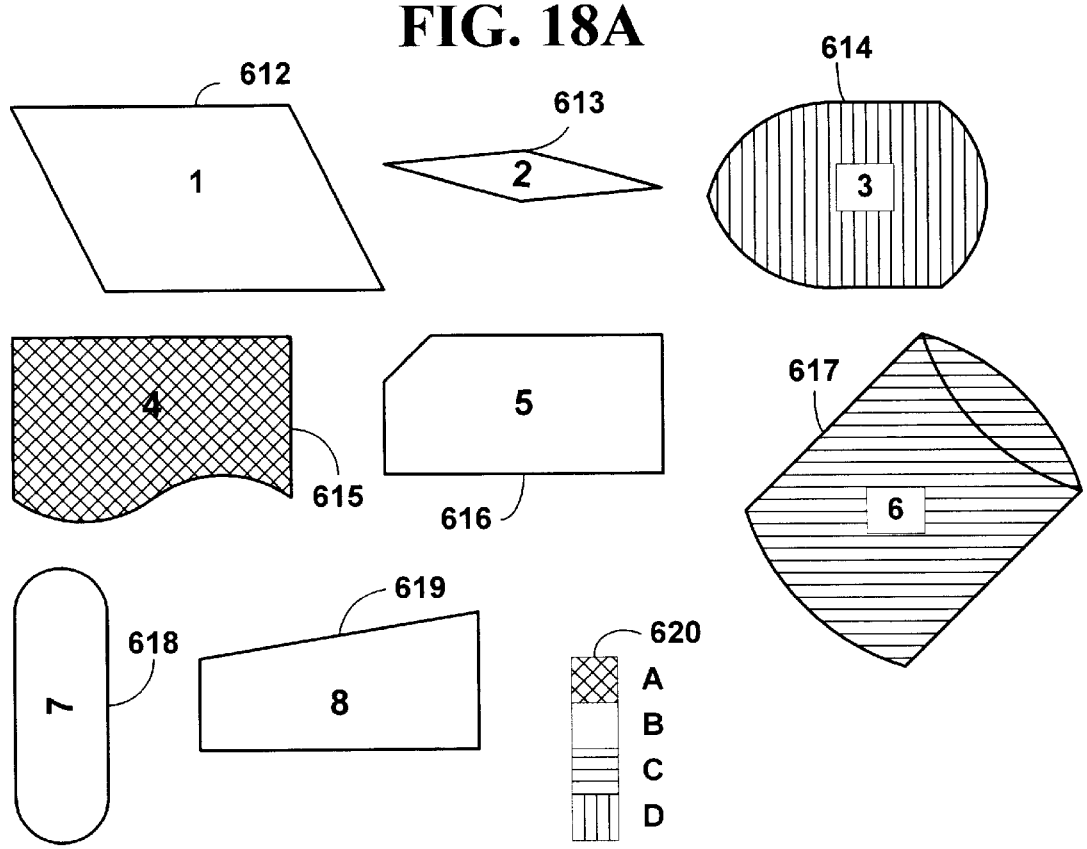
FIGS. 18A–B are diagrams illustrating aspects of chunking in an embodiment.
Figure 18B:
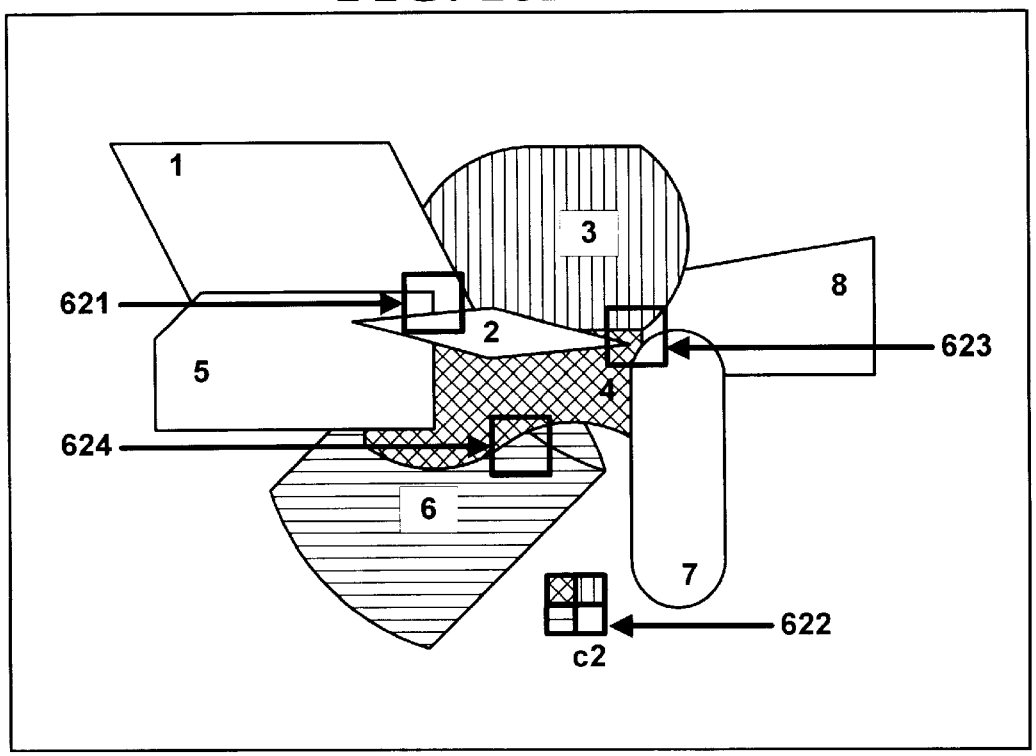
Figure 19A:
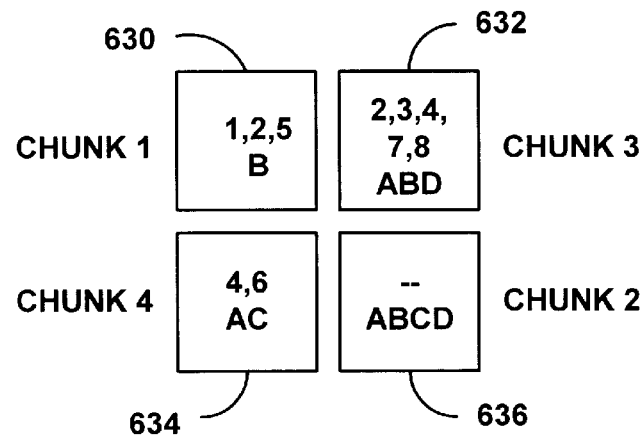
FIGS. 19A–B are diagrams illustrating aspects chunking in an embodiment.
Figure 19B:
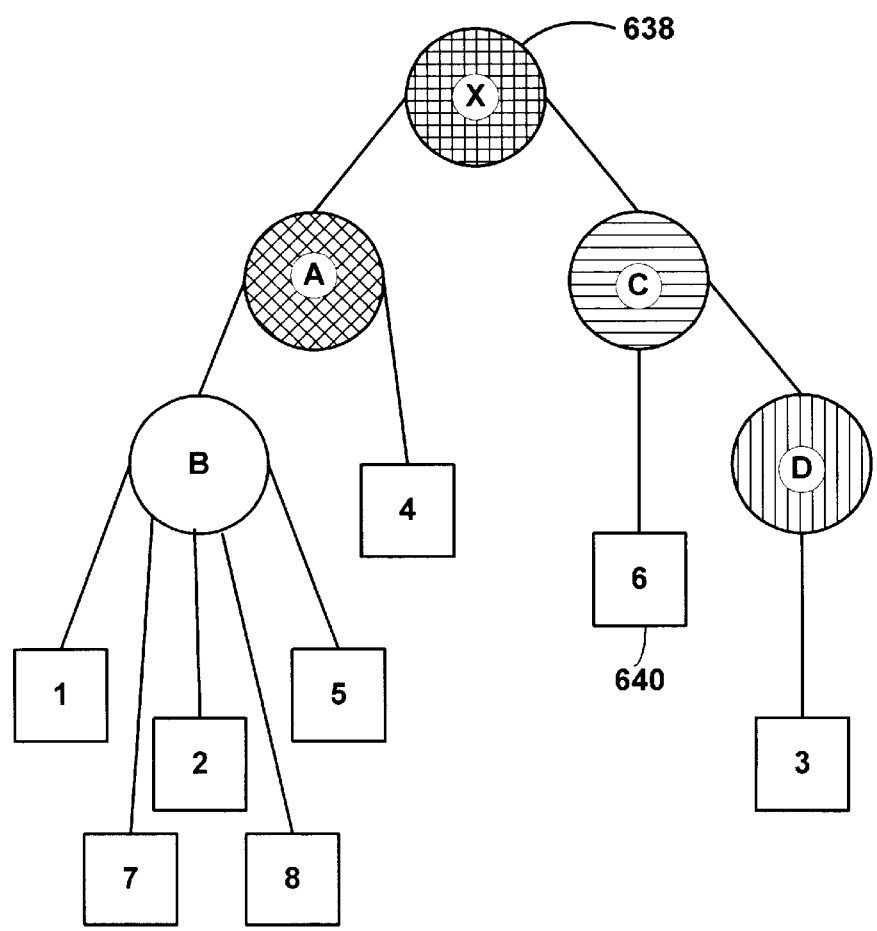

As an example of how chunking works, consider the eight objects and their associated geometries shown in FIG. 18A. For simplicity the eight objects 612–619 are defined by a single attribute 620 (e.g. color) which can have one of four values A–D. The eight objects are then overlapped in a graphics scene as is shown in FIG. 18B. Ignoring individual gsprites and their creation, but concentrating instead on four isolated chunks for the purposes of illustration, the four isolated chunks 621–624 are shown in FIG. 18B. The four isolated chunks 621–624 (FIG. 18B) are touched by geometries 1–8, and attributes A–D as is illustrated in FIG. 19A. Chunk 1 630 (FIG. 19A) is touched by geometries 1, 2, and 5 and attribute B, chunk 2 639 is touched by no geometries and attributes A–D, chunk 3 632 is touched by geometries 2, 4, 7, and 8, and attributes A, B, D, and chunk 4 634 is touched by geometries 4 and 6 and attributes A, C. An example of a partial scene graph built by image preprocessing (using the chunks shown in FIGS. 18B and 19A) is shown in FIG. 19B. The attributes (e.g. color, etc. shown by A–D, X) of each chunk are shown as circles 638, and the geometry (e.g. of the various shapes, shown by 1–8) is shown as squares 640. The letter X denotes the default value for an attribute. The intermediate nodes contain attribute operations to apply to the primitive geometry. The leaf nodes in the scene graph contain primitive geometry which are to be applied to the chunks, and may also contain bounding volumes around the geometry the chunks describe (leaf nodes with bounding volumes will be described below).

One approach for a chunking scheme is to iterate over every chunk and send the full geometry each time. Another more optimal approach is to send only geometry that is visible in the current chunk (note that the optimal case also skips geometry that is obscured or otherwise invisible). The actual method used in our system to chunk a gsprite in 32×32 pixel block falls between these two extremes and is called Bucket-Chunking. However, other schemes which fall at or between the two extremes may also be used to create chunks for a chunking scheme.

The Bucket Chunking scheme consists of two passes. The first pass traverses the scene graph while maintaining the current transform to view space with the goal of building up a descriptive command stream for each chunk in the view space. The view space is broken up into N×M chunk buckets, which in the end will each contain a list of the geometries that fall across the corresponding chunk. When a geometry-primitive node is encountered, the current transform is applied to the bounding volume to yield a 2-D "footprint" on the view space. For each chunk touched by the footprint, the geometry (and accumulated attribute state) is added to the corresponding bucket. At the completion of this first pass, each bucket will contain the necessary data to render the corresponding chunk. Note that this chunking scheme is sensitive to the quality of the calculated footprint—a loose bound on the object will yield a larger footprint, and hence will hit chunks not touched by the enclosed geometry. A tight bound on the object will yield a smaller footprint, and will hit most chunks touched by the enclosed geometry.

As an example of the first pass, consider a sub-set of four chunks which contain overlapping objects described by geometries 1–8, and attributes A–D, X shown in FIG. 19A. One approach for traversing the scene graph in pass one is to maintain the current state for each chunk, and then skip the geometry that does not fall inside a given chunk. This ensures that the attribute context for every geometry in every chunk is up to date. Using this approach on the scene graph in FIG. 19B gives the following command streams in the chunk buckets after pass one:

Chunk 1 Bucket: X, A, B, 1, 2, 5, A, X, C, D, C, X
Chunk 2 Bucket: X, A, B, A, X, C, D, C, X
Chunk 3 Bucket: X, A, B, 2, 7, 8, A, 4, X, D, 3, C, X
Chunk 4 Bucket: X, A, B, A, 4, X, C, 6, D, C, X Another approach is to retain the current attribute state, and send the state prior to sending each accepted geometry. This results in the following command streams in the chunk buckets:

Chunk 1 Bucket: B, 1, B, 2, B, 5
Chunk 2 Bucket: <empty>
Chunk 3 Bucket: B, 2, B, 7, B, 8, A, 4, D, 3
Chunk 4 Bucket: A, 4, C, 6

The second approach is an improvement over the first approach. Note that the attribute B is specified a second and third unnecessary time before geometries 2 and 5. This behavior is also manifested in chunk 3 for B for geometries 7 and 8. In reality, the situation is worse than portrayed here, because a dump of the current attribute state means that each and every attribute will be re-specified for each geometry. In other words, even if the texture transformation matrix is invariant for the whole scene graph, it will still be sent prior to each and every geometry in every chunk.

Therefore, this particular approach addresses attribute maintenance for overriding attributes and for composing attributes instead. Diffuse color is an overriding attribute. As is defined by the image pre-processor (e.g. image preprocessing software e.g. running on the image preprocessor 24, etc.) which produces the scene graph, attributes applied to red(blue(cube)) will result in a red cube. This is in contrast to other image pre-processor graphics interfaces that bind the closest attribute to the object. Binding the closest attribute to the object for red(blue(cube)) would result in a blue cube.

Using the outermost attribute as an overriding attribute greatly simplifies attribute maintenance for attributes. During scene graph traversal, once you hit an attribute node, you can ignore all nodes of that attribute type below it in the scene graph, since the top most attribute overrides them all.

A local transformation is a composing attribute. Thus, the current value is defined by the previous value and the new value. The composing attribute requires some sort of stack as the scene graph is traversed to store previous values.

The Bucket Chunking scheme uses the following structures:

The attribute node, which contains the current value.
The traversal context. This is a structure that contains, for every overriding attribute, a pointer to the current attribute value.
A grid of buckets, each of which contains a command-stream buffer and a bucket context structure of the same type as the global traversal context.
A list of default attribute values, each of which can be referred to by the traversal context.

For initialization, the context is placed in the default state, so that all attributes refer to the default context. Default values are loaded lazily, rather than dumped en masse prior to sending the rendering commands for each chunk.

```
Initialize Attribute Maintenance:
for each attribute: attr
    for each bucket: bucket
        bucket.context(attr) ⇐ nil // Clear context for each bucket
    end
    context[attr] ⇐ default[attr] // Initialize to default values
end
```

The following dictates how to process a given attribute node:

```
Process Attribute:
if context[attr] ≠ default[attr]
        ProcessGeom() // Attr already set, ignore subsequent value.
else
        context[attr] ⇐ SetAttr (attr,value) // Set to new value.
        ProcessGeom()
        context[attr] ⇐ SetAttr (attr,default[attr])
endif
```

The process for handling geometry nodes synchronizes the current traversal state with the attribute states of each bucket:

```
Process Geometry:
geomcommand ⇐ ConvertGeometry
(geom) // Convert to Command Stream.
for each touched bucket: bucket
        for each attribute: attr
                if (bucket.context(attr) ≠ context(attr)
                        bucket.context(attr) ⇐ context(attr)
                        append (bucket, context(attr))
                endif
        end
        append (bucket, geomCommand)
end
```

Composing attributes work in a similar manner to the overriding ones, with the exception that a stack is maintained during traversal. This is accomplished by using the nodes for the storage of the stack values. This method requires the following structures:

The current attribute node, which contains the composition of the previous values with the new value.

The traversal context. This is a structure that contains, for every composing attribute, a pointer to the current attribute node.

A list of default attribute values, each of which can be referred to by the traversal context.

A grid of buckets, each of which contains a command-stream buffer and a bucket context structure of the same type as the global traversal context.

The initialization for composing attributes looks the same as for overriding attributes:

```
Initialize Attribute Maintenance:
for each attribute: attr
        for each bucket: bucket
                bucket.context(attr) ⇐ nil // Clear
                context for each bucket
        end
        context[attr] ⇐ default[attr] // Initialize to default values
end
```

Processing a composing attribute node involves the composition of the new value with all values prior to the current node in the traversal. Note that in order to implement a stack of values, the prior value must be saved and restored.

```
Process Attribute:
node.ComposedValue ⇐ Compose (context[attr], node.Value)
SavePtr ⇐ context[attr] // Save previous composed value.
context[attr] ⇐ node
ProcessGeom()
context[attr] ⇐ SavePtr // Restore the previous composed value.
```

The geometry-handler is identical to the overriding attribute case:

```
Process Geometry:
geomCommand ⇐ ConvertGeometry
(geom) // Convert to Command Stream.
for each touched bucket: bucket
        for each attribute: attr
                if (bucket.context(attr) ≠ context(attr)
                        bucket.context(attr) ⇐ context(attr)
                        append (bucket, context(attr))
                endif
        end
        append (bucket, geomCommand)
end
```

The second pass of the Bucket Chunking scheme iterates over the grid of buckets and spits out the corresponding command stream. For every non-empty bucket, the corresponding chunk is rendered from the information stored in that bucket. Note that there may be empty buckets in the scene, which means that not every chunk in the gsprite must be rendered. For most active gsprites, which will consist of an opaque object on a transparent background, a good number of chunks should be empty.

The approach to maintaining attribute state described above is particularly well suited for rendering geometry in a chunked fashion. Chunking causes sets of geometry to be rendered in a different order than was originally specified. For instance, in rendering a chunk, the rendering system skips geometric sets that do not intersect with the chunk. Therefore, at the lower level of chunked geometric rendering, at most two levels of state should be maintained: 1) a global state in a format compatible with the tiler or alternative rendering hardware to allow rendering of the geometry; and 2) small state overlays within a set of geometry that apply only to that set of geometry. With this approach, each set of geometry can be rendered independently of any other, and rendering a set of geometry can be considered side-effect free.

An alternative approach to chunking uses hierarchical bounding volumes in the scene graph. If a footprint for a hierarchical bounding volume falls entirely within a chunk, then there is no need to descend any deeper into the scene graph from that point; all geometry under that node can be placed in the chunk bucket. Another variation on this bounding volume approach is to stop descent when the footprint falls over no more than N chunks, where N is some arbitrary number of minimum chunks. This approach effectively loosens the bounding volumes in exchange for more abbreviated first pass times.

A number of other chunking schemes can also be used instead of Bucket Chunking. For example, an accelerated front end loading scheme and/or an image space recursive scheme could also be used as a chunking scheme. These two alternative chunking schemes are described below.

In another embodiment for chunking using accelerated front end loading, overhead associated with breaking a gsprite into chunks can be eliminated if it is exactly known which chunks fall into which part of the scene graph. A set of active bounding boxes and primitives that are relevant to the chunk are maintained, and only this set is sent for testing.

There are three structures used in the display scheme as well as a bitmap used to construct these structures. The three structures are an active set, insert vector, and a delete vector. Every bounding box and geometry primitive has a unique index in the hierarchical bounding volume (HBV) tree, and the chunks being rendered are ordered in the tree. Although this scheme is actually independent of chunk ordering, a scan is done from left-to-right, top-to-bottom (LRTB). Since the choices made interact with ordering of the gsprite chunks, space filling curves other than LRTB can also be used.

The active set is a set of bounding boxes and primitives to send the current chunk. This set contains every bounding box touching a chunk and every primitive touching the current chunk not enclosed by a bounding box in the set. The data structure used for this set allows fast insertion, deletion, as well as fast enumeration. Given the fact that there will be only so many top level bounding boxes of interest to a gsprite, the data structure is implemented as a simple bitmask. The incidence bitmap is a single 32×32 table of bits that corresponds to a gsprite size of 1024×1024 pixels.

The insert vector and delete vector are vectors each containing a list of bounding boxes and primitives to be inserted or deleted from the active set. Each of these vectors is indexed by the chunk ordinal. The incidence bitmap is a N×M bitmap that represents a gsprite, each pixel of the incidence bitmap represents one chunk of the gsprite. If max(N, M) is greater than 32, then the bitmap must be broken up into 32×32 pixel chunks.

To construct the insert and delete vectors, the top of the HBV tree is then traversed. For each object encountered, an incidence bitmap is constructed. The incidence bitmap is then scanned to determine where it should be included in the insert and delete vectors. Once a bounding box lies totally inside one chunk, its contents do not have to be opened or its contents tested for incidence. Since a bounding box may straddle a chunk boundary (or a chunk corner), bounding boxes are no longer opened when they are smaller then 2×2 pixels on the incidence map.

To compute the incidence map for a single bounding box or primitive, the view is set so that each pixel corresponds to a gsprite chunk. The bounding box is then rendered, and the incidence mask is retrieved through the feedback channel as well as the level-of-detail which describes how many pixels are covered by the bounding box.

The incidence bitmap is then scanned to determine what entries belong in the insert and delete vectors. One method is to scan the incidence bitmap in chunk order and insert or delete whenever an edge transition occurs. This is not a very practical method if the gap between insert and delete is small. Another method is to insert on the first pixel touched and delete on the last pixel touched. A third method is to look at a sliding window and delete if the primitive falls out of the sliding window. Pseudocode for constructing the insert and delete vectors is shown below.

```
Push(TOPBOX, &BoxStack)
DO
    pop(Bbox, &BoxStack)
    // pop a bounding box off the box stack
    renderBbox(Bbox, &IncidenceMap, &pixelCoverage)
    // render the bounding box using the incidence map and pixel coverage map
    IF pixelCoverage > 4 and not primitive THEN
        push(children_of_Bbox, &Boxstack)
    ELSE
        scanIncidenceMap(IncidenceMap, &InsertVector, &DeleteVector)
        // add entries to the insert and delete vectors
    FI
    IF empty(BoxStack) THEN BREAK FI
OD
```

To display a gsprite, the display scheme steps through the gsprite chunks in order. At each transition the insert and delete vectors are used to determine which bounding boxes and primitives are to be updated in the active set. The active set is then sent down to the hardware in the manner of the hierarchical occlusion scheme. The pseudocode for the display scheme is shown below.

```
Initialize ActiveSet to EMPTY
DO {i = each chunk }
    insertListIntoSet(InsertVec[i], ActiveSet)
    deleteListFromSet(DeleteVec[i], ActiveSet)
    occlusionTestRender(ActiveSet)
OD
```

In yet another embodiment for chunking using image space recursion, the chunking scheme used is based on the observation that off-chunk culling can avoid a lot of redundant tests by carefully choosing a traversal order, and culling geometry progressively during traversal. For example, projected sub-geometry culled away for being entirely to the right of a chunk C should not be considered by chunks to the left of C. This is an image-space recursive subdivision scheme which makes improvements on the recursive HSR (Height-Space Recursive) scheme know in the art.

A chunk is progressively subdivided into N×M chunk subregions. At each step, sub-geometry not overlapping the subregion is culled away. If the region is in a single chunk, Z-buffered rendering with occlusion tests is invoked. Otherwise, if the region is not a single chunk, divide the region along X or Y (whichever is larger) into two regions and recursively process them. Pseudocode to accomplish this chunking scheme is shown below.

```
Render(geoset,reg) =
    let geoset' = subset(geoset, reg) in
        if single_chunk(reg)
            then Z-buffer_render(geoset', reg)
        else
            let reg1, reg2, = split(reg) in
                render(geoset', reg1)
                render(geoset', reg2)
```

Since each subregion has only one edge that its parent did not have, the subset function should only test against one edge instead of four. If the entire gsprite region is culled before invoking the scheme recursively, this property can be utilized. The rendering scheme shown above can be improved by: (a) replacing the abstract region type by four integers specifying minimum and maximum chunk coordinates; (b) making the region split operation explicit; and (c) doing the geometry subsetting just before making the recursive calls. The improved rendering scheme is shown below.

```
render = (geoset, xmin, xmax, ymin, ymax) =
    if xmin == xmax && ymin == ymax
        then Z-buffer_render(geoset, xmin, ymin)
    else if xmax - xmin > ymax-ymin
        then
            let xmid = xmin + floor((xmax-xmin)/2),
            gs1, gs2 = xsplit(geoset, xmid) in
            render(gs1, xmin, xmid, ymin, ymax);
            render(gs2, xmid+1, xmax, ymin, ymax)
    else
        let ymid = ymin + floor ((ymax-ymin)/2),
        gs1, gs2 = ysplit(geoset,ymid) in
        render(gs1, xmin, xmax, ymin, ymid);
        render(gs2, xmin, xmax, ymid+1, ymax);
```

To partition objects for chunking, the representation of the geometry (geoset) shown above is important. The geoset is represented by a collection of triples of the form <geometry, transform, bzim>, where bzim is a gsprite coordinate 3-D bounding region. The partitioning functions are implemented by testing each bzim against the new edge. If fully inside one or the other, the triple is placed in geometry set 1 (gs1) or geometry set 2 (gs2) accordingly. If overlapping, decompose the geometry into new triples, composing transforms, and applying the region edge test recursively, until the geometry or bzim falls within a defined stopping criteria, at which point the triple is placed into both gs1 and gs2.

Pseudocode to accomplish this partitioning geometry is shown below.

```
xsplit(empty, xmid, gs1, gs2) = gs1, gs2
xsplit(insert(<g, xf, bzim>, rest), xmid, gs1, gs2) =
    if xmax(bzim) < (xmid + 1) * CHUNK_WIDTH
        then xsplit(rest, xmid, insert (<g, xf, bzim>, gs1), gs2)
    else if xmin(bzim) >= (xmid + 1)* CHUNK_WIDTH
        then xsplit(rest, xmid, gs1, insert(<g, xf, bzim>, gs2))
    else if stop_splitting(<g, xf, bzim>)
        then xsplit(rest, xmid, insert(<g, xf, bzim>, gs1),
            insert(<g, xf, bzim, gs2))
    else
        let gs1', gs2' = xsplit(decompose(<g, xf, bzim>),
        xmid, gs1, gs2) in
            xsplit(rest, xmid, gs1', gs2')
```

The geosets are sorted by minz(bizm) at each stage to avoid redundant sorting in Z-buffer_render.

As has been shown above, a number of different schemes can be used for the chunking process. In one preferred embodiment, the DSP is programmed to perform the chunking scheme. The chunking scheme can also be performed by the host processor. Any of the chunking schemes described above could also be implemented in software, or a combination of hardware and software.

Image Compression

As was described above, the chunk size and sequential rendering is very valuable for image compression techniques since an entire 32×32 pixel chunk is completely rendered before the next chunk is computed, and thus can be compressed immediately. The tiler supports a lossy and lossless form of compression to compress chunks. Both the lossy and lossless form of compression compress chunks in independent blocks of 8×8 pixels, so each compressed 32×32 pixel chunk would consist of 16 such compressed blocks.

Figure 20:
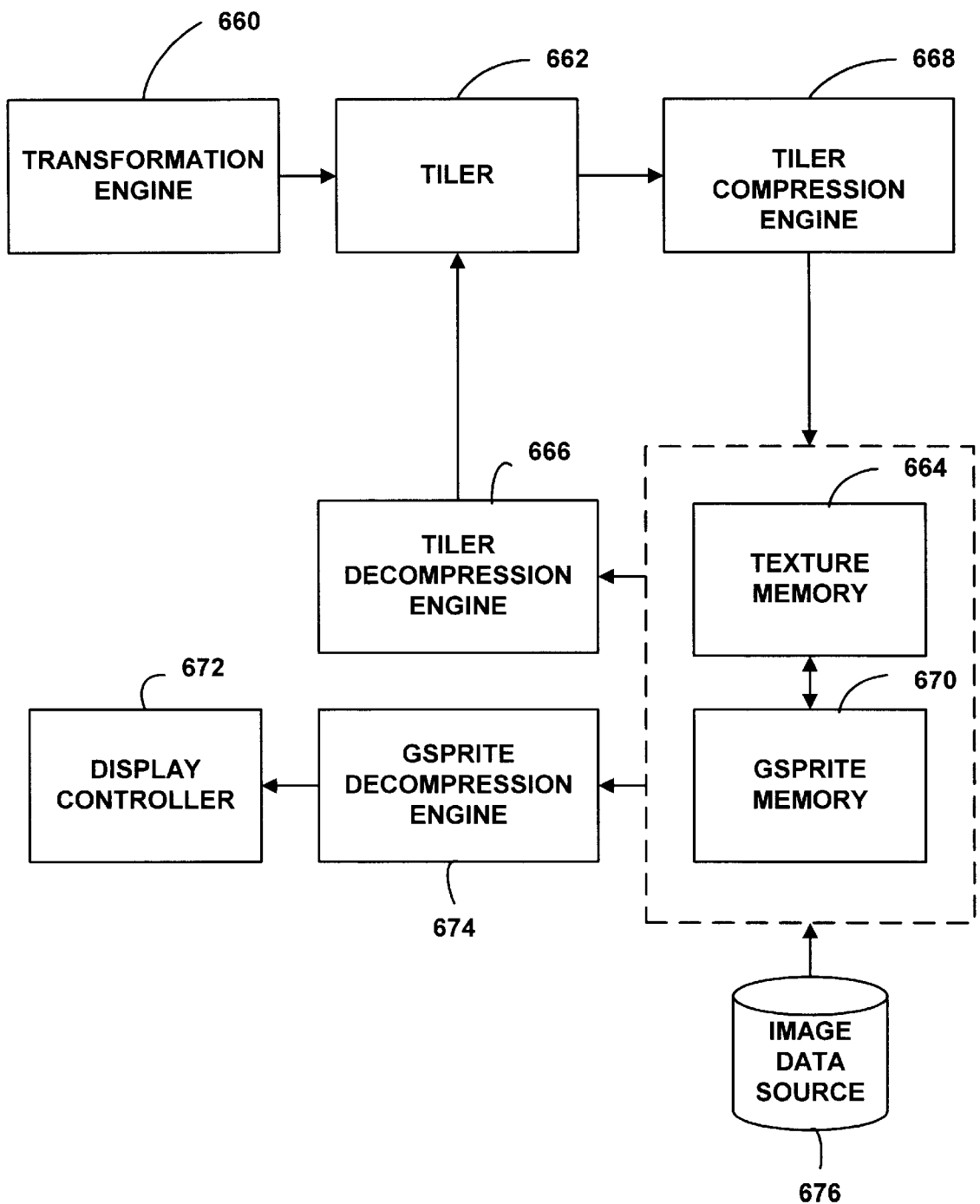
FIG. 20 is a block diagram illustrating image compression in an embodiment.

Compression of images allows much smaller memory size requirements and vastly reduced memory bandwidth requirements. The design uses a combination of caching, pre-fetch strategies, as well as chunking to reduce the latencies and overhead due to compression and block access. Since the entire image is computed in a 32×32 pixel buffer, gsprite image compression is achieved with minimal overhead. The overall conceptual design of the compression architecture is shown in FIG. 20.

The transformation engine 660 (FIG. 20) calculates model and viewing transformations, clipping, lighting, etc. and passes this information to the tiler 662. As the tiler processes transformation information, it reads texture data from texture memory 664. The texture data is stored in a compressed format, so as the texture blocks are needed, they are decompressed by the tiler decompression engine 666 and cached in an on-chip texture cache on the tiler. As the tiler resolves pixel data it transfers the resolved data to the tiler compression engine 668 which compresses the resolved data and stores the compressed data in gsprite memory 670. When the gsprite engine 672 needs the compressed gsprite data, it uses the gsprite decompression engine 674 to decompress the gsprite data from gsprite memory 664 and cache the data on an on-chip gsprite cache. In the actual hardware, the texture memory 664 and gsprite memory 670 are identical (i.e. the compressed data is stored in one memory shared by the various engines). Common shared memory is not required as long as the compression and decompression methods used are compatible. The gsprite data can also be taken from a data base or some other image source 676 and saved in the texture memory 664 and the gsprite memory 670.

One implementation of the invention supports both lossy and lossless compression and decompression of pixel blocks.

The lossy form of image compression has two stages: a lossy first stage, and a lossless second stage. The lossy form of compression begins with an optional color space conversion from red, green, blue (R, G, B) intensity values to luminance (Y) and chrominance (U and V, also referred to as Cr and Cb) values. The lossy stage includes a direct cosine transform (DCT) and a quantization that reduces the accuracy of certain frequency components.

The second stage is a lossless form of compression comprising Huffman coding and run length encoding (RLE). Alternative coding methods such as arithmetic coding can be used in place of Huffman coding.

Decompression for the lossy method includes a decoding stage, a dequantization of the compressed data, an inverse DCT, and an optional color space conversion from YUV to RGB.

The lossless form of compression includes an optional lossless color space conversion from RGB to YUV, a prediction stage, and a lossless encoding stage. This encoding stage can be identical to the entropy coding stage in the lossy form of compression. Decompression for this lossless method comprises a decoding stage, an inverse prediction step on each color component, and an optional color space conversion from YUV to RGB.

Lossy Compression/Decompression

One specific implementation of the lossy compression method in the compression engine 414 (FIGS. 9A–C) of the tiler occurs in four or five steps:

1. Convert the RGB data input to a YUV-like luminance-chrominance system (optional).
2. Perform a forward, two-dimensional discrete cosine transform (DCT) individually on each color component.
3. Order the two-dimensional DCT coefficients in approximately a monotonically increasing frequency order.
4. Quantize the DCT coefficients: Divide by either a uniform divisor or a frequency-dependent divisor.
5. Encode the resulting coefficients using Huffman encoding with fixed code tables.

Lossy decompression occurs in four or five steps:

1. Decode the compressed data input using Huffman decoding with fixed code tables.
2. Dequantize the compressed data: Multiply by the uniform multiplier or the frequency-dependent multiplier used in the quantization step of compression.
3. Reorder the linear array of data into the proper two-dimensional order for DCT coefficients.
4. Perform an inverse, two-dimensional DCT individually on each color component.
5. Convert the colors in the YUV-like luminance-chrominance system to RGB colors, if the compression process included the corresponding optional step.

Color Space Conversion

The color space conversion transforms the RGB colors to a brightness-color system with brightness coordinate Y and color coordinates U and V. This luminance-chrominance system is not a standard color space. Using this system improves the degree of compression because the color coordinates require only a small fraction of the bits needed to compress the brightness. The lossless, reversible conversion applies to each pixel independently and does not change the value of alpha.

RGB to YUV (for compression)

The conversion from integer RGB values to integer YUV values uses this transformation:

Y=(4R+4G+4B)/3−512

U=R−G

V=(4B−2R−2G)/3

YUV to RGB (for decompression)

The conversion from integer YUV values to integer RGB values uses this transformation:

R=(((Y+512)−V)/2+U+1)/2

G=(((Y+512)−V)/2−U+1)/2

B=((Y+512)/2+V+1)/2

Discrete Cosine Transform

Images and textures are pixels that contain the amplitudes for three colors and the amplitude for opacity. The pixel positions correspond to a spatial location in an image or texture map. An image or texture in this form is in the spatial domain. For images or textures, the discrete cosine transform (DCT) calculates coefficients that multiply the basis functions of the DCT. Applying the DCT to an image or texture yields a set of coefficients that equivalently represent the image or texture. An image or texture in this form is in the frequency domain.

The DCT maps the amplitude of the colors and opacity of an 8 by 8 pixel block between the spatial domain and the frequency domain. In the frequency domain, adjacent coefficients are less correlated, and the compression process can treat each coefficient independently without reducing the compression efficiency.

The forward DCT maps the spatial domain to the frequency domain, and conversely, the inverse DCT maps the frequency domain to the spatial domain. One suitable approach for the forward and inverse DCT is the approach described in FIGS. A.1.1 and A.1.2 in *Discrete Cosine Transform*. Rao, K. R., and P. Yip. San Diego: Academic Press, Inc., 1990.

The two-dimensional DCT produces a two-dimensional array of coefficients for the frequency domain representation of each color component. Zigzag ordering rearranges the coefficients so that low DCT frequencies tend to occur at low positions of a linear array. In this order, the probability of a coefficient being zero is approximately a monotonically increasing function of the position in the linear array (as given by the linear index). This ordering simplifies perceptual quantization and LOD filtering and also significantly improves the performance of the run-length encoding (RLE).

Quantization

Quantization reduces the number of different values that the zigzag-ordered DCT coefficients can have by dividing the coefficients by an integer. Depending on the value of the compression type parameter, quantization can be either uniform or perceptual. Neither case modifies the DC frequency coefficient (index=0), but instead passes it along unaltered.

The quantization process begins with the specification of the quantization factor for an image or portion of an image. In this implementation, a quantization factor is specified for a 32×32 pixel chunk. A quantization index (QIndex) specifies a corresponding quantization factor (QFactor) to use for the chunk. The following table shows the relationship between QIndex and Qfactor.

| Quantization Factor | |
|---|---|
| QIndex | QFactor |
| 0 | 2 |
| 1 | 3 |
| 2 | 4 |
| 3 | 6 |
| 4 | 8 |
| 5 | 12 |
| 6 | 16 |
| 7 | 24 |
| 8 | 32 |
| 9 | 48 |
| 10 | 64 |
| 11 | 96 |
| 12 | 128 |
| 13 | 192 |
| 14 | 256 |
| 15 | 4096 |

Each color plane has a different value for the chunk QIndex. A QIndex of 15 selects a QFactor of 4096, which produces zeros during quantization and inverse quantization. The quantization process divides each coefficient in a block by a QFactor and rounds it back to an integer. The inverse quantization process multiplies each coefficient by a QFactor. Quantization and inverse quantization do not change the DC frequency component.

Block Quantization Factor

The QIndex, and thus the QFactor, can vary from block to block (8×8 pixels). The QIndex for a block results from incrementing the QIndex for the chunk with a value embedded in the block compression type:

Block QIndex=Chunk QIndex+(Block Compression Type−3)

This increments the chunk QIndex by one, two, three, or four. Because the largest possible QIndex value is 15, any incremented value greater than 15 is set to 15.

The QIndex, and thus the QFactor, can also vary from coefficient to coefficient (from array index to array index) if the quantization type is perceptual.

For uniform quantization, the coefficient QIndex is equal to the block QIndex, so the corresponding QFactor either multiplies (inverse quantization) or divides (quantization) each coefficient in the block.

For perceptual quantization, the coefficient QIndex depends on the value (0 . . . 63) of the index in the linear array. The following table gives the resulting coefficient QIndex as a function of the array index value.

| Coefficient QIndex | Array Index |
|---|---|
| Block QIndex | index < 12 |
| Block QIndex + 1 | 12 ≤ index < 28 |
| Block QIndex + 2 | 28 ≤ index < 52 |
| Block QIndex + 3 | 52 ≤ index |

Entropy Coding

Huffman/RLE coding processes the linear array of quantized DCT coefficients by:

1. Independently encoding non-zero coefficients with the fewest possible bits (because the DCT coefficients are uncorrelated).
2. Optimally encoding continuous "runs" of coefficients with zero values—especially at the end of the linear array (because of the zigzag ordering).

One suitable approach for the Huffinan/RLE coding process is the Huffman/RLE coding process used for the AC coefficients in the well known JPEG still image compression standard.

To enable random access of blocks, this particular approach does not encode the DC frequency coefficient (index=0), but instead passes it on unaltered.

The algorithm computes a series of variable-length code words, each of which describes:

1. The length, from zero to 15, of a run of zeros that precedes the next non-zero coefficient.
2. The number of additional bits required to specify the sign and mantissa of the next non-zero coefficient.

The sign and mantissa of the non-zero coefficient follows the code word. One reserved code word signifies that the remaining coefficients in a block are all zeros.

Encoding

The encoding of all blocks uses the typical Huffman tables for AC coefficients from Annex K, section K.3.2 of ISO International Standard 10918. This includes Table K.5 for the luminance (Y) AC coefficients and Table K.6 for the chrominance (U and V) AC coefficients.

Decoding

The decoding of all blocks uses the same fixed tables as the encoding process. Therefore, it is never necessary to store or to convey the Huffman tables with the data.

Lossless Compression\Decompression

In the compression engine 414 in the tiler, lossless compression occurs in two or three steps:

1. Convert incoming RGB data to a YUV-like luminance-chrominance system (optional).
2. Perform a differential prediction calculation on each color component. Encode the resulting coefficients using Huffman encoding with fixed code tables.

Lossless decompression in the decompression engines 404, 450 in the tiler and gsprite engine occurs in two or three steps:

1. Decode the incoming compressed data using Huffman decoding with fixed code tables.
2. Perform an inverse, differential prediction (reconstruction) on each color component.
3. Convert the colors in the YUV-like luminance-chrominance system to RGB colors if the compression process included this corresponding optional step.

Color Space Conversion

The color space conversion reversibly transforms the RGB colors to a brightness-color system with brightness coordinate Y and color coordinates U and V. This is a unique color space that improves the degree of compression even more than the YUV system above because the numbers entering the Huffman/RLE encoder are smaller, and hence more compressible. The color space conversion applies to each pixel independently and does not change the value of alpha.

RGB to YUV (for compression)

The conversion from integer RGB values to integer YUV values uses this transformation:

Y=G
U=R−G
V=B−G

YUV to RGB (for decompression)

The conversion from integer YUV values to integer RGB values uses this transformation:

R=Y+U
G=Y
B=Y+V

Alpha information is not altered during the color space transform.

The color space transform can be bypassed. The decompressor is notified in cases where the color transform is bypassed by a flag in a gsprite control data structure.

The prediction stage occurs after the color space transform. Prediction is a losslessly invertible step that reduces the entropy of most source images, particularly images with lots of blank space and horizontal and vertical lines.

In the prediction stage of compression and the inverse prediction stage of decompression:

1. p(x, y) are the pixel values input to the compressor and output from the decompression engine; and
2. d(x, y) are the difference values input to the coder in the next stage of the compression engine and output from the inverse of the coder in the decompression engine.

Prediction is computed as follows:

$$d(x, y) = p(x, y) \quad \text{for } x = 0, y = 0$$
$$d(x, y) = p(x, y) - p(x, y - 1) \quad \text{for } x = 0, y > 0$$
$$d(x, y) = p(x, y) - p(x - 1, y) \quad \text{for } x > 0$$

Inverse prediction in the decompression engine is computed as follows:

$$p(x, y) = d(x, y) \quad \text{for } x = 0, y = 0$$
$$p(x, y) = p(x, y - 1) + d(x, y) \quad \text{for } x = 0, y > 0$$
$$p(x, y) = p(x - 1, y) + d(x, y) \quad \text{for } x > 0$$

The Huffman/RLE coding and decoding is the same as for the lossy form of decompression/decompression in this implementation.

The compression methods described above compress images in independent blocks of 8×8 pixels. Therefore, in the chunking architecture described above, each compressed 32×32 pixel chunk consists of 16 such blocks. To facilitate compression of a 32×32 pixel chunk, the anti-aliasing engine 412 resolves pixel data into 8×8 pixel blocks. The 8×8 pixel blocks are buffered such that a first buffer is filled while a second buffer is compressed.

Controls and Parameters

As introduced above, the tiler (FIGS. 9A–C) renders gsprites one chunk at a time. These chunks are comprised of pixel blocks (in this case, 16 8×8 pixel blocks). For texture mapping, shadowing, and some multi-pass rendering operations, the tiler fetches gsprite or texture blocks from memory. To compose a frame, the gsprite engine (FIGS. 12A–B) fetches gsprite blocks, transforms pixels to screen space, and composites pixels in a compositing buffer.

There are a number of control parameters that govern processing of gsprites, chunks, and blocks. A gsprite display list stores a list of gsprites comprising a display image. This display list includes pointers to gsprites, and more specifically, gsprite header blocks. As described further below, the gsprite header block stores a number of attributes of a gsprite including gsprite width, height, and an affine transform defined in terms of a screen space parallelogram. The gsprite header block also includes a list of its member chunks. In one implementation, this list is in the form of pointers or handles to chunk control blocks.

Chunk control blocks include per chunk and per block parameters. The per chunk parameters include a YUV color converter bypass, default Q factors, a perceptual quantization flag, pixel format, and whether the pixel data resides in memory managed in Memory Allocation Units (MAU) in linear memory. An MAU is a piece of shared memory used to allocate chunk memory. MAU managed memory includes a list of MAUs (124 bytes for example), each MAU having a pointer to the next MAU. In one specific implementation for example, the chunk control blocks are stored in sequential MAUs for each gsprite.

The per block parameters include compression type, number of MAUs the block spans, and a block pointer pointing to the first byte of pixel data for the block. The specific block format is an 8×8×4 array of pixels that encode 32 bit pixels (8bits for RGB and Alpha).

The steps for retrieving a pixel given (X,Y) coordinates in a gsprite using the above control parameters include:

1) Divide Y and X by 32 to derive the chunk row and column, respectively.
2) Form the chunk number by: (chunk row)*(width of sprite in chunks)+chunk column.
3) Form the Chunk Control Block offset by: (chunk number)*(size of chunk header block))
4) Form the Block offset within the Chunk Control Block by: (Y<4:3>*4+X<4:3>)*3.
5) Send the Block pointer to the Decompressed cache logic, receive a Block.
6) Form the pixel offset within the Block by (Y<2:0>*8)+ X<2:0>

Here, a chunk offset is used to select a chunk. A block offset is then used to select a block pointer. The block pointer selects a block containing the pixel, and the pixel offset selects the pixel.

To access the block for a given pixel among compressed blocks of pixel data, the cache controls on the tiler and gsprite engine perform the following steps:

1) Form the MAU address by looking up the Block pointer value in the Chunk Control Block, and dividing by the size of the MAU.
2) Look up the number of MAUs allocated in the Chunk Control Block for this block.
3) Look up the next Block pointer address in the Chunk Control Block.
4) Form the length of the compressed block by: MAUs allocated*MAU size+2's complement of ((Block pointer) mod MAU size)+(next Block pointer) mod (MAU size)
5) Send the block address and the length of the compressed block to the Compressed Cache logic.

The compressed cache will read the first MAU, and if the length of the transfer has not been satisfied, then the pointer contained in the MAU will be used to access the start of the next MAU. This process continues, until the transfer length has been met.

To support MIP map texture operations, the tiler supports another level of indexing. One method for indexing a MIP map level includes the following steps:

1) For a given sprite, form a table of mip chunk level offsets by:
 mipChunkOffset[0]=0 \\ Offset for level of detail 0
 For each level of mip map:
  mipChunkOffset[level+1]=width of sprite/(2^level) *height of sprite/(2^level)+mipChunkOffset[level]
2) Use the LOD parameter to get the mip chunk offset. At this point, the mip chunk offset, width of sprite/(2^level), and height of sprite/(2^level) can be used to find any desired chunk within the chosen level of detail for the current gsprite.

Gsprites

Above, we introduced the concept of a gsprite. To recap briefly, one or more objects in the view volume can be assigned to a gsprite. Gsprites can be rendered independently, which enables them to be rendered at different resolutions and updated at varying rates. To reduce rendering overhead, the system can approximate motion of an object by performing an affine transformation on the gsprite instead or re-rendering the object. To display the gsprites comprising a scene, the system composites the gsprites representing objects in the scene. We will explain these and other features in more detail below.

As described above, the system begins by assigning geometry to a gsprite. A gsprite is a two-dimensional region measured in the coordinates of the physical output device. In the implementation detailed below, the gsprite shape is a rectangle, but it can have other shapes as well. Gsprites can be affinely transformed by the gsprite engine (i.e. it can be scaled, translated, rotated, reflected, and/or sheared—any transformation possible with a 2×2 matrix plus translation). One application of the 2-D transform is to simulate 3-D movement. Gsprites can be instanced, such that the same gsprite image can appear multiple times on the screen with different transformations. The instancing can apply to rectangular subsets of a gsprite image as well as the entire image. It can also apply on a color component basis, e.g. alpha might come from one gsprite while the color comes from another.

In general, the image preprocessor assigns one object to a gsprite, but more than one object can also be assigned to a gsprite. The image preprocessor combines interpenetrating or self-occluding objects in a single gsprite. It also aggregates objects based on memory and processing constraints. For instance, the image processor may not be able to composite several independent but overlapping gsprites in the time required by the refresh rate of the output device. In this case, the system can aggregate these overlapping objects into a single gsprite.

After assigning objects to gsprites, the image processor renders the gsprites for the frame. Rendering objects independently enables the system to reduce rendering overhead because it does not have to re-render each object in a scene in every frame. We will elaborate further on this feature below.

To display objects in a scene, the image processor composites gsprites including the objects in the scene. Compositing refers to the process of combining color data from gsprite layers. To support translucency, the image processor also takes into account the alpha values of transformed gsprite pixels as it composites them for display.

Figure 21A:
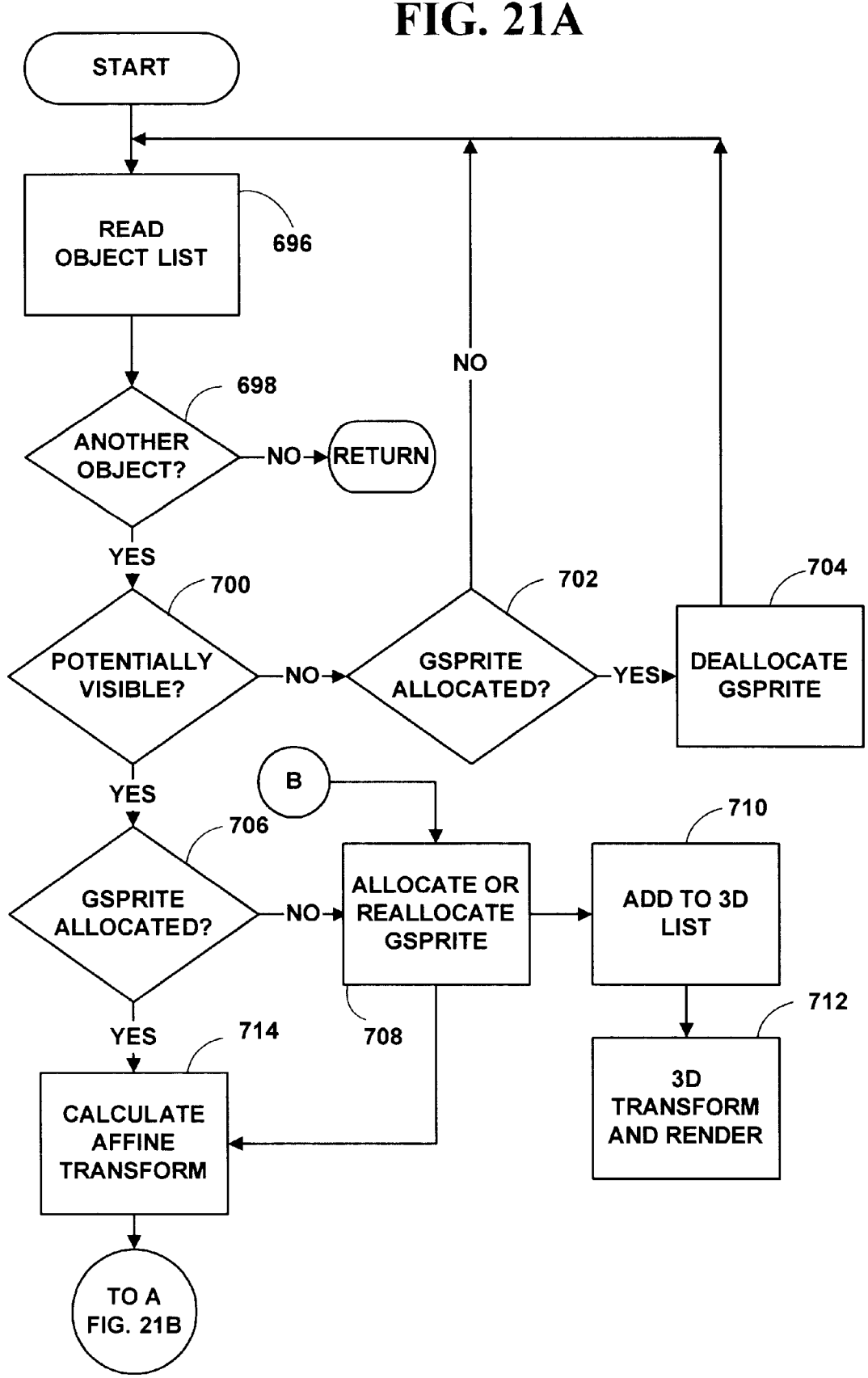
FIGS. 21A–B are flow diagrams illustrating the processing of gsprites in an embodiment.
Figure 21B:
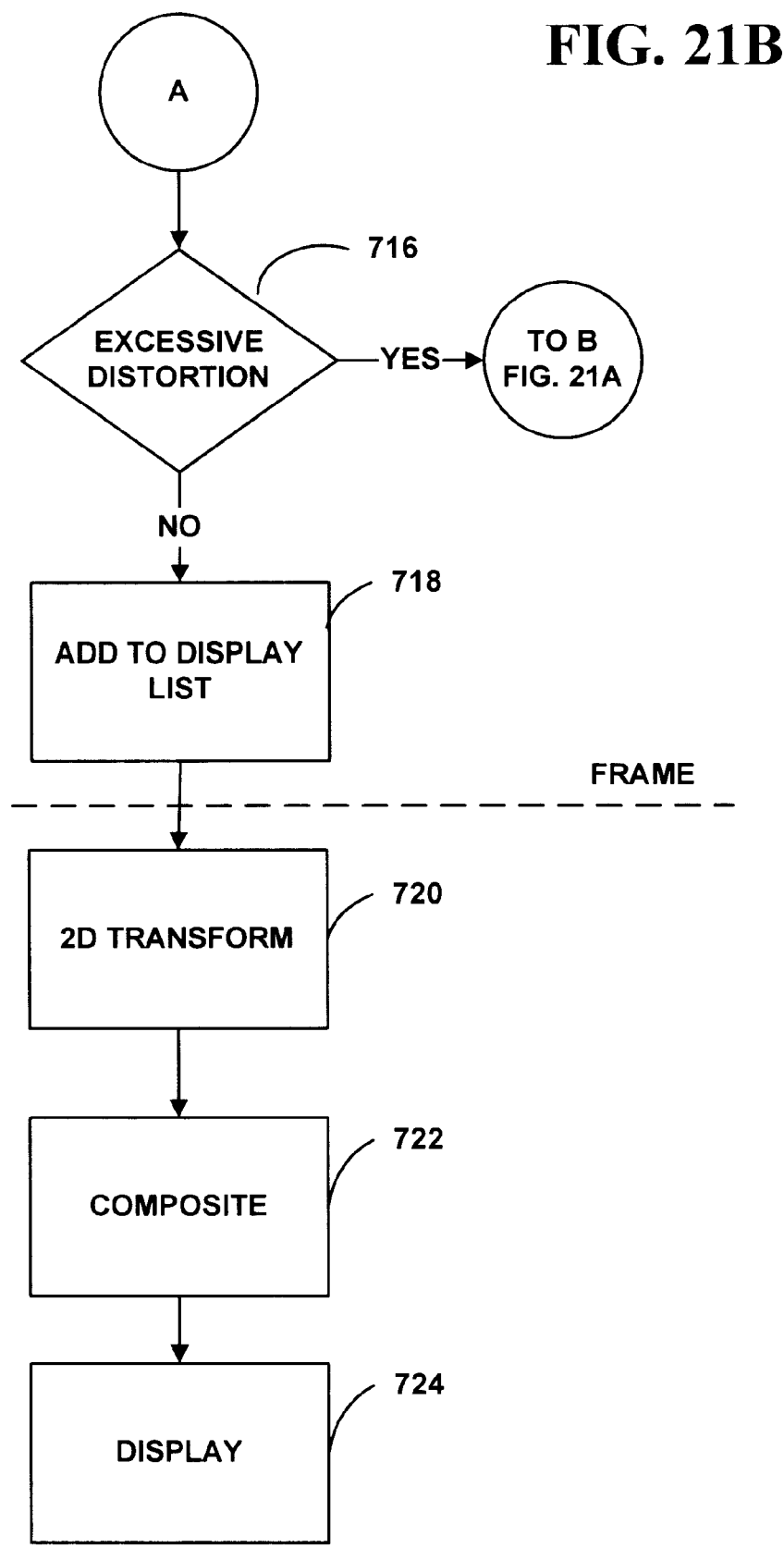

FIGS. 21A and 21B are flow diagrams illustrating how gsprites are processed in an embodiment. In the illustrated embodiment, the processing of gsprites spans two frame periods. Objects in a scene are allocated to gsprites and rendered in the first frame period, gsprites in the scene are then transformed and composited in a next frame period.

First, the image preprocessor determines potentially visible objects. In FIG. 21A, we illustrate this process as a series of steps. For a frame, the image processor determines potentially visible objects by traversing a list of objects (696, 698) and determining which objects are potentially visible in a scene, i.e. within a view space.

The image preprocessor then allocates, reallocates, or deallocates gsprites. Allocating a gsprite generally refers to creating a data structure to represent the gsprite in the system. If an object is not potentially visible (700), and the system has not allocated a gsprite for it (702), no additional processing is necessary. If an object is not potentially visible (702), and the system has already allocated a gsprite for it (702), then the image preprocessor deallocates the gsprite for that object (704).

The image preprocessor allocates a new gsprite data structure for potentially visible objects for which the system has not allocated a gsprite (706, 708). In this case, the image preprocessor creates a gsprite data structure and queues image data corresponding to the object for rendering (710). This "queuing" for rendering is represented as adding to a list of objects for 3-D rendering (710). The image preprocessor also calculates an affine transform for the gsprite (714). The affine transform serves two purposes in this embodiment. First, it can be used to approximate motion of the object that it corresponds to in the scene. Second, it can be used to transform a gsprite from gsprite space to the output device coordinates. Gsprite space refers to a coordinate system used in subdividing the object into chunks. The coordinate system used to subdivide the object into chunks can be optimized so that chunk regions most efficiently cover the object transformed to 2-D space.

If an object is potentially visible (700), and the system has allocated a gsprite for it (706), then the illustrated image preprocessor computes an affine transformation (714). As we will explain in further detail below, the affine transformation can be used to approximate the motion of the object. The image preprocessor evaluates the accuracy of this approximation, and if it produces too much distortion (716), the image preprocessor re-allocates a gsprite for the object (708). In this case, the image preprocessor then queues the geometry to be rendered into the gsprite for rendering (i.e. places in the 3-D list) (710), and also adds the gsprite to the display list (718).

If, however, the affine transformation can be used to accurately approximate the object's motion (716 distortion is within a preset tolerance), then there is no need to re-render the object, and the image preprocessor places the gsprite associated with the object in the display list (718).

In the next frame period, the image processor generates the display image. The frame period is illustrated by the dashed line separating steps (718) and (720). The image processor traverses the display list, and transforms the gsprites in the list to the physical output device coordinates (720). The transform to the output coordinates generally includes scanning pixel data from a warped, rotated or scaled gsprite to the pixel locations of output device. The image processor then composites this transformed or "scanned" gsprite data (722). Finally, the image processor converts the pixel data to analog values and displays the image (724).

FIGS. 5A and 5B are flow diagrams illustrating the process of rendering geometry in a chunking architecture. It is important to note that the gsprite concepts described above are not limited to a chunking architecture. FIG. 5A and the accompanying text above provide more description regarding how the image preprocessor determines gsprite configuration from the geometry in a scene. See steps (240–244) and accompanying text. Specifically, objects can be aggregated and rendered into a single gsprite or a small number of gsprites if necessary, due to processing limitations of the image processor. For example, if the tiler, gsprite engine, and compositing buffer cannot process the current assignment of objects to gsprites for a frame at the required frame refresh rate, then data can be passed back to the DSP or host processor to aggregate objects and render multiple objects in a gsprite.

FIG. 6 provides additional information regarding the processing of gsprites in one embodiment. As shown in FIG. 6 and described above, the image preprocessor also determines the depth order of gsprites (280).

When the image preprocessor allocates a gsprite, it creates a data structure to represent the gsprite. The gsprite data structure includes a header for storing various attributes of the gsprite and for keeping track of where related image data is stored in memory. The data structure includes fields to store the size of the gsprite, to represent the edge equations for the edges of the gsprite, to maintain 2-D transform data, and other image attributes.

After determining the gsprite configuration for the view space, the image preprocessor determines which gsprites to render. Instead of rendering all of the objects in a scene, the system can re-use gsprites rendered from another frame. The change in position of an object from frame to frame can be approximated by performing an affine transformation on a rendered gsprite. As shown in FIG. 6, the image preprocessor loops on gsprites (282–286) and computes gsprite transforms (284). In the following section, we elaborate further on gsprite updating and warping of gsprites.

The image processing system can approximate motion of a 3-D object by performing an affine transformation on a rendered, 2-D gsprite representing the object. We refer to the process of performing an affine transformation on a rendered image as "warping," and a gsprite resulting from this process as a "warped gsprite." In one implementation, the process of simulating 3-D rendering of an object includes the following steps: 1) calculating an affine transformation matrix to approximate the geometric motion of characteristic points; 2) measuring the accuracy of the approximation in step 1; and 3) if the accuracy is sufficient, then performing an affine transformation on the gsprite at time $t_0$ to approximate its position at a later time t.

Figure 22:
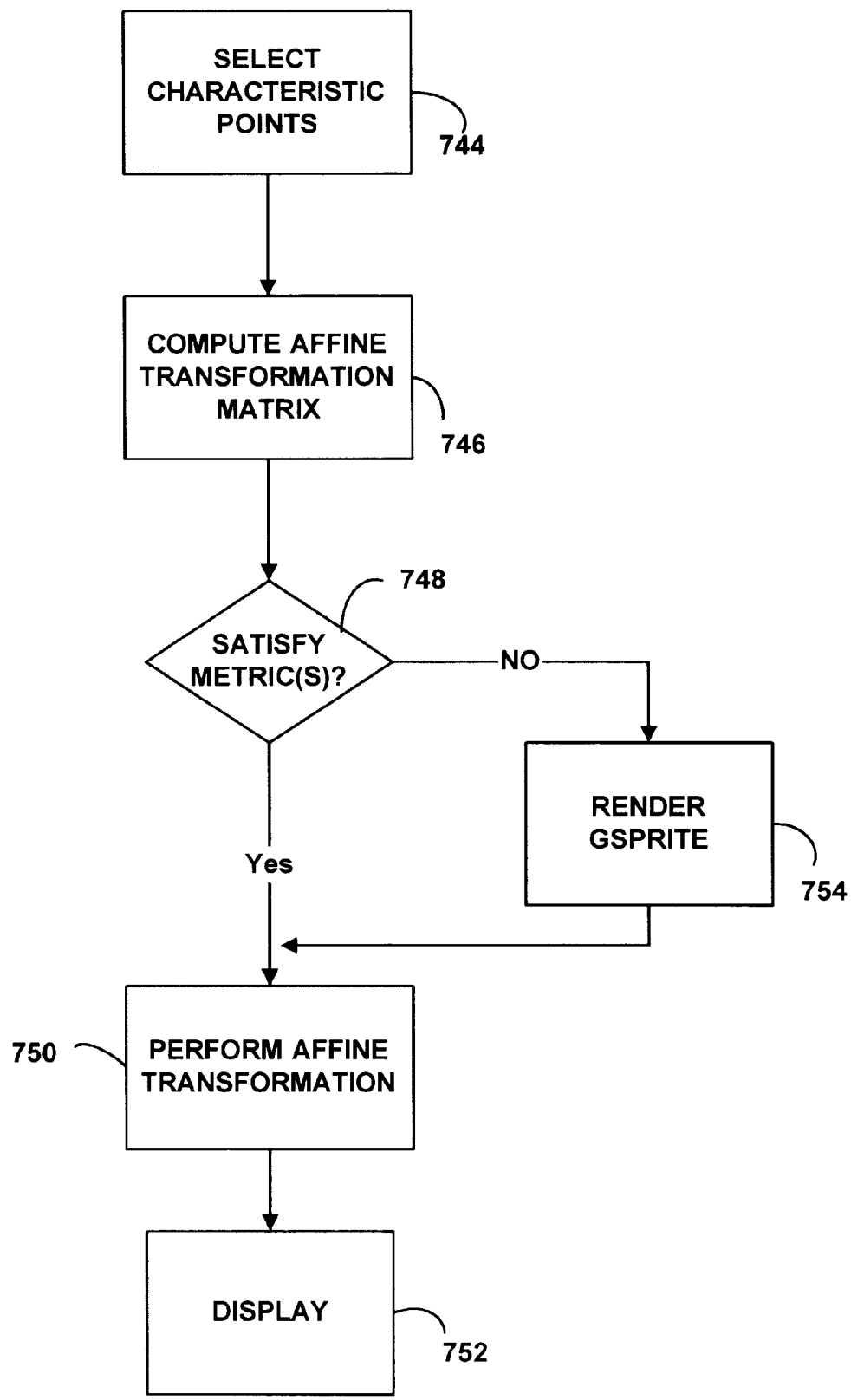
FIG. 22 is a flow diagram illustrating one aspect of a method for performing gsprite transforms in an embodiment.

FIG. 22 is a flow diagram illustrating the process of performing an affine transform to simulate 3-D motion. To be complete, FIG. 22 shows "select characteristic points" as the first step (744). As will become apparent from the discussion below, characteristic points are typically not selected during image processing, but rather are specified by the author of the geometric model.

The affine transformation used to simulate the motion of an object is computed using characteristic points. Characteristic points are points selected for an object to represent its position or other important image characteristics as they change over time. Since we will refer to characteristic points in world coordinates of a 3-D model and the screen coordinates of the model transformed to screen space, it is helpful to clarify terms that we will use to describe these points. We will refer to characteristic points in screen space as "viewing characteristic points," and we will refer to characteristic points in world coordinates as "modeling characteristic points."

By selecting a representative set of characteristic points rather than considering the entire set of object points, we simplify the calculation of the affine transformation significantly. The number of characteristic points needed to obtain an accurate approximation of an object's 3-D motion varies depending on the model. If the object is a rigid body, characteristic points can be selected from a bounding box enclosing the entire object. If the points defining the bounding box are transformed with the same transformation, then the bounding box points follow the transform of the object geometry.

For objects with more complex motion, more characteristic points may be required to obtain an accurate approximation. For example, an object can be sub-divided into a number of rigid bodies, each with a bounding box approximating its position. If the object is comprised of a hierarchy of rigid bodies with individual moving transformations, then the characteristic points can be derived from the union of the moving sub-object bounding box vertices.

As another alternative, the author of the model can specify characteristic points for the model. This enables the author of the model to specifically identify characteristic points used to approximate the object's 3-D motion. As described further below, the accuracy of the affine transform can be verified according to any of a number of metrics. By enabling the author to specify the characteristic points, the author can specify points most relevant to the metric or metrics used to evaluate the accuracy of the affine transform.

Given a set of characteristic points, an affine transformation can be computed to approximate the change in position of a gsprite from time $t_0$ time t. This step is illustrated as step (746) in FIG. 22.

The affine transformation is computed from the viewing characteristic points at time $t_0$ and t. Depending on how the characteristic points are selected, the modeling characteristic points represent points on an object or on its bounding box. The position of these modeling characteristic points changes with time according to the modeling transform. To find the viewing characteristic points, the modeling characteristic points are multiplied by the viewing transform. The following discussion will help clarify the process of computing the affine transformation matrix used to transform a 2-D gsprite.

The format of the affine transformation matrix is as follows:

$$S = \begin{bmatrix} a & b & p_x \\ c & d & p_y \end{bmatrix}$$

One metric to check the accuracy of the approximation is the position metric. The position metric refers to the difference in position between the characteristic points at time t and the position of the characteristic points at to multiplied by the affine transformation matrix. The general formula for the position metric is as follows:

$$\sum_i \|\bar{x}^i(t) - S(t)\bar{x}^i(t_0)\|^2$$

In the case of the position metric, the position of the characteristic points in screen space is most relevant because the difference in position on the screen indicates how accurate the transformed gsprite approximates the motion of its corresponding 3-D model. For other metrics, however, the accuracy of the approximation can be computed in terms of the modeling characteristic points. For the example of the position metric, we consider the screen space points directly. Let $$\bar{x}^i(t) = V(t)T(t)x^i(t)$$

be the screen space points, where) V(t) is the viewing transform and T(t) is the modeling transform. To compute the affine transformation matrix, a standard least-squares technique can be used. Solving the linear system:

$$[\bar{x}^i(t_o)]S(t) = \bar{x}^i(t)$$

the standard least-squares solution techniques produce a result that minimizes the position metric.

For the case when there are three characteristic points, the affine transformation matrix can be solved directly. For example, if three points on the axes of a bounding box are used, the result is a closed form expression for the time-dependent affine transformation matrix as shown below:

$$\begin{bmatrix} x^0 & y^0 & 1 \\ x^1 & y^1 & 1 \\ x^2 & y^2 & 1 \end{bmatrix}_{t_0} \begin{bmatrix} a & c \\ b & d \\ p_x & p_y \end{bmatrix}_t = \begin{bmatrix} x^0 & y^0 \\ x^1 & y^1 \\ x^2 & y^2 \end{bmatrix}_t$$

$$S(t) = [X(t_0) \ 1]^{-1} X(t)$$

$$[X(t_0)1]^{-1} = \frac{1}{D} \begin{bmatrix} y^1 - y^2 & y^2 - y^0 & y^0 - y^1 \\ x^2 - x^1 & x^0 - x^2 & x^1 - x^0 \\ x^1 y^2 - x^2 y^1 & x^2 y^0 - x^0 y^2 & x^0 y^1 - x^1 y^0 \end{bmatrix}$$

where $D = x^1 y^2 - x^2 y^1 + x^2 y^0 - x^0 y^0 = x^0 y^1 + x^1 y^0$

In the general case, a least squares technique such as normal equations or singular value decomposition can be used to solve for the affine transformation matrix. The generalized problem is illustrated below:

$$\begin{bmatrix} x_0 & y_0 \\ x_1 & y_1 \\ x_2 & y_2 \\ \vdots & \vdots \end{bmatrix} \begin{bmatrix} a & c \\ b & d \\ t_x & t_y \end{bmatrix} = \begin{bmatrix} x_0 & y_0 \\ x_1 & y_1 \\ x_2 & y_2 \\ \vdots & \vdots \end{bmatrix}$$

To solve for the affine transformation matrix, the pseudo-inverse of an N by 3 matrix has to be computed. For an arbitrary number of characteristic points, we use a least squares technique to solve for the pseudoinverse. In one embodiment, the normal equations method is used.

Let $\tilde{X}$ be the transposed matrix of characteristic points at time $t_0$, and let X be the transposed matrix of characteristic points at time t.

$$[\tilde{X}1]S = X$$

$$\begin{bmatrix} \tilde{x}^0 & \tilde{y}^0 & \vdots & 1 \\ \tilde{x}^1 & \tilde{y}^1 & \vdots & 1 \\ \vdots & \vdots & \vdots & \vdots \\ \tilde{x}^{n-1} & \tilde{y}^{n-1} & \vdots & 1 \end{bmatrix} \begin{bmatrix} a & c \\ b & d \\ p_x & p_y \end{bmatrix} = \begin{bmatrix} x^0 & y^0 \\ x^1 & y^1 \\ \vdots & \vdots \\ x^{n-1} & y^{n-1} \end{bmatrix}$$

To solve with the method of normal equations, both sides of the equation are multiplied by the transpose of the fitting matrix, and then the resulting square matrix is inverted. The typical weakness of normal equations is that the resulting matrix is singular, or prone to instability due to round-off error. The matrix will be singular if the characteristic points are degenerate. In the particular form of the matrix, round-off error can be controlled by normalizing the terms.

$$[\tilde{x}1]^T[\tilde{x}1]S=[\tilde{x}1 9\ ^Tx.$$

$$\begin{bmatrix} \sum_i \tilde{x}^i\tilde{x}^i & \sum_i \tilde{x}^i\tilde{y}^i & \sum_i \tilde{x}^i \\ \sum_i \tilde{x}^i\tilde{y}^i & \sum_i \tilde{y}^i\tilde{y}^i & \sum_i \tilde{y}^i \\ \sum_i \tilde{x}^i & \sum_i \tilde{y}^i & 1 \end{bmatrix} \begin{bmatrix} a & c \\ b & d \\ p_x & p_y \end{bmatrix} = \begin{bmatrix} \sum_i \tilde{x}^i x^i & \sum_i \tilde{x}^i y^i \\ \sum_i \tilde{y}^i x^i & \sum_i \tilde{y}^i y^i \\ \sum_i x^i & \sum_i y^i \end{bmatrix}$$

There are just five terms in the resulting matrix. The 3×3 matrix is then inverted to obtain the affine transform. Alternately, since the sum of the x coordinates term and the sum of they coordinates term correspond to the centroid of the characteristic points, these terms can be eliminated by a change of coordinate system to translate the centroid to 0,0. The resulting matrix is 2×2 and easily inverted.

After calculating the affine transformation matrix, the accuracy of the approximation is checked using one or more metrics. Decision step (748) of FIG. 18 illustrates the step of checking one or more metrics and shows generally how the logic branches based on the metric(s). As described above, the position metric is one example of how the accuracy of the affine transformation can be checked. To measure whether the affine transformation satisfies the position metric, the viewing characteristic points at time to transformed using the computed affine transformation are compared to the viewing characteristic points at time, t.

Another approach is to use the internal rotation of the 3-D model as a metric. In this case, the modeling characteristic points at time $t_0$ transformed using the computed affine transformation are compared with the modeling characteristic points at time t.

Yet another approach is to use a lighting metric. Like the metric for internal rotation, the modeling characteristic points are used to check the accuracy of the approximation.

In addition to the metrics described above, there are a variety of other alternatives. To compute these metrics, relevant characteristic data can be maintained along with the characteristic points. A single metric, or a combination of metrics can be used depending on the desired accuracy.

If the characteristic points representing the transformed gsprite are sufficiently accurate, then the transformed gsprite can be used in place of a re-rendered gsprite. To compute the 2-D transform, the gsprite for time to is multiplied by the affine transformation matrix (750). In contrast to rendering the gsprite, this computation consumes significantly less processing time. Simulating 3-D motion with a 2-D transform, therefore, can significantly reduce the amount of processing required to render an image.

Based on the accuracy of the approximation, the system can reduce rendering overhead as needed to stay within its rendering capacity for a frame of image data. To illustrate the concept generally, FIG. 22 shows that a gsprite is re-rendered if the 2-D transform is not sufficiently accurate (754). However, as will be described in further detail below, it is not necessarily preferred to accept or reject a gsprite based on a metric. Rather, it is often useful to determine how accurate the approximation will be for a number of gsprites in a scene and then re-render as many gsprites as possible. We describe a process for "priority queuing" of gsprites below.

In the embodiment described above and illustrated in FIG. 22, an affine transform is applied to a gsprite, even if re-rendered. This is not necessary in all implementations of this concept. However, in this case the affine transform can be used to transform gsprite data where the image preprocessor has transformed the data as an optimization in chunking.

Figure 23:
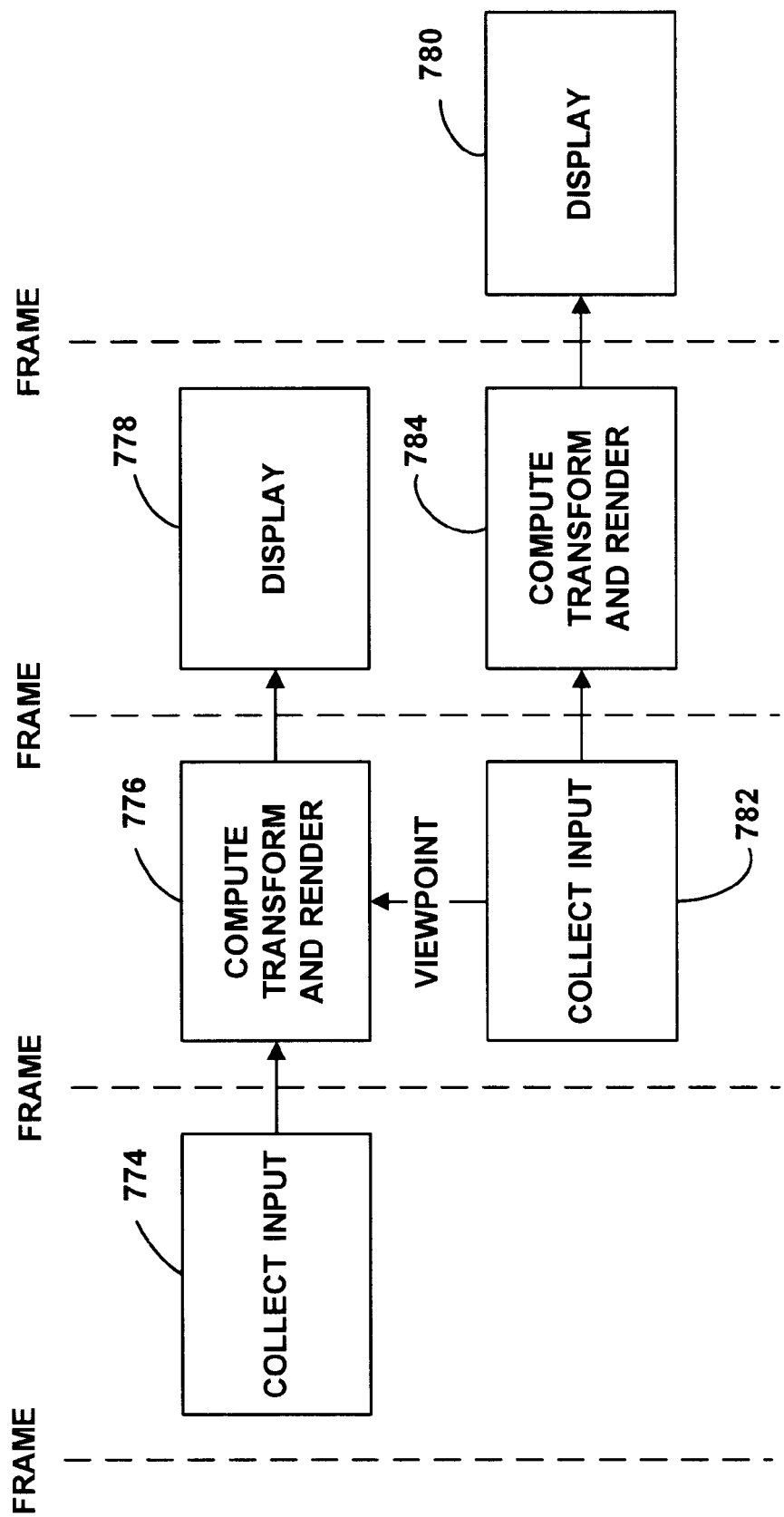
FIG. 23 is a diagram illustrating how gsprite transforms can reduce transport delay in an embodiment.

In addition to reducing rendering overhead, warping of gsprites can reduce transport delay. In applications where the viewpoint perspective changes rapidly, it is difficult to display the rapidly changing perspective because of transport delay. Transport delay refers to the delay incurred between receiving input, which causes a change in viewpoint, and the ultimate display of the appropriate image for that new viewpoint. FIG. 23 illustrates an example of how transport delay can be reduced. The sections along the horizontal axis represent time increments corresponding to frame delay.

In this example, there is a delay of three frame periods between sampling input and displaying output on a display device. First, the input is sampled in a first frame 774. Next, the system computes the affine transforms and renders objects in the gsprites 776. Finally, the rendered image data for the frame is composited and scanned out to the display device 778. While the time required to perform each of these steps is not necessarily an entire frame delay as measured by a frame period, we use the increment of a frame period to illustrate the concept. As illustrated, there are three frame periods of delay between the input and the display of the corresponding image data.

To reduce transport delay, viewpoint data from a subsequent image can be applied at the rendering phase of the current image 782. This is illustrated by the arrow from the input phase for a subsequent image 782 to the gsprite transform and rendering phase 776 of the current image. Processing steps (782, 784, 780) for the next frame of image data are shown adjacent to steps (776, 778) as shown in FIG. 23. As illustrated, processing occurs in a pipeline fashion. Inputs are sampled for a subsequent frame while gsprite transforms are computed and rendering is performed for the current frame.

The modeling transform for the current image can be used in conjunction with the viewing transform for the subsequent image to compute a gsprite transform, which is typically in the form of an affine transformation matrix. A rendered gsprite can then be warped to simulate its position relative to the viewpoint of the subsequent image. This approach decreases the effect of transport delay on the user because it enables the system to more quickly adjust for rapid changes in the viewpoint perspective.

In addition to reducing transport delay in this context, the use of subsequent image data can be used to reduce transport delay in other contexts as well.

As outlined above, there are a number of advantages to rendering gsprites independently. Gsprites can have different update rates, and therefore, the number of gsprites that are updated in a particular frame varies. Some gsprites may need to be updated every frame while other gsprites can be updated less frequently. If a number of gsprites have to be updated in a particular frame, the rendering overhead can increase dramatically and overload the system. To address this problem, the system performs priority queuing, which enables it to distribute rendering among a number of frames and process gsprites more efficiently.

Without priority queuing, the number of gsprites that are scheduled for rendering in a particular frame can vary. For example, some gsprites can have predefined update rates. The update rate for a gsprite can vary depending on whether it is in the foreground or background of a scene. With the support for affine warps described above, the system can avoid re-rendering a gsprite by simulating a change in position with an affine transformation. In the case of affine warps, the need to re-render a gsprite can vary depending on how the scene is changing.

To implement priority queuing, the system prioritizes rendering based on the amount of distortion that would result by re-using a rendered gsprite. The distortion is computed based on one or more error thresholds. To quantify distortion of a gsprite, the system measures how close, or conversely, how far a gsprite is to its error threshold. The error threshold can vary for each gsprite and can be based on one or more factors. A distortion ordered list of gsprites is maintained to represent the relative quality of the gsprites before re-rendering. Then, as many of the gsprites are re-rendered in a frame as possible in view of the system resources. Gsprites are re-rendered starting with the most distorted gsprite and continuing in descending order to lesser distorted gsprites. Processing in this manner eliminates the possibility of a frame overload from gsprite rendering, instead providing an efficient mechanism for balancing scene complexity and motion against gsprite accuracy.

In addition to the features described above, rendering to gsprites enables the system to vary the resolution of objects in a scene. This enables the system to allocate processing and memory resources to gsprites based on their importance in a scene.

The cost of a gsprite can be measured in terms of the memory it occupies and the processing required to render it. Both of these costs are strongly dependent upon the number of pixels in the gsprite image. If gsprite images are stored and rendered at a fixed resolution, the screen resolution, the cost incurred by a gsprite is determined by its screen extent.

It is important to allocate processing and memory resources based on the type and location of an object rather than merely the size it occupies on the screen. Active objects in the foreground of a scene are typically more important to the scene than the background. However, if the gsprite is allocated resources based on size, then the processing and memory cost for the background is much larger due to its greater screen extent.

The system can decouple the screen resolution from the resolution of the gsprite so that the cost of a gsprite may be set independently of its final screen coverage. The system achieves this by choosing the appropriate resolution of the gsprite and then scaling the gsprite to an appropriate size.

The magnification or scaling factor can be derived from the screen extent of the image and the gsprite resolution. Typically, a graphics application supplies the screen extent. The graphics application can also specify the resolution. Alternatively, the image preprocessor can determine gsprite resolution based on the resources available and the relative importance of the gsprite in the scene.

In operation, the image processor renders the gsprite to a smaller area in output device coordinates than it actually occupies in the view space. The size of the area to which the gsprite is rendered is derived from the resolution and the screen extent. The rendered gsprite can then be scaled to its actual size, as defined by its screen extent. Since the gsprite has a smaller area, it consumes less memory and less processing resources for rendering. Moreover, in the illustrated embodiment gsprites of varying resolutions may still be processed in a common graphics pipeline.

One way to support this approach is to store the magnification or scaling factor in the gsprite data structure. The scaling factor can then be used to scale the gsprite before it is composited with other gsprites to generate the display image. The image preprocessor can perform the scaling of the gsprite. More specifically, in the implementation described above the DSP scales the gsprite.

Just as a gsprite can be scaled to reduce resolution, it can also be rendered to one size and then scaled to a smaller display area. This technique can be applied to objects in a scene that are fading in size. Instead of rerendering the object for every frame, the system can scale the gsprite representing the object. This approach can be implemented by storing the scaling factor in the gsprite data structure as well.

Above we have described gsprite processing through an image processing system, and we have also described how a gsprite transform can be computed and applied in an image processing system. We now describe in more detail how to transform, composite and display pixel data.

In this embodiment, the DSP 176 sets up the gsprite data structures and stores them in shared memory 216 on the image processing board 174. The DSP 176 reads and writes to the sprite engine registers through the tiler via a memory mapped interface. The registers in the sprite engine include a pointer to the current display list. More detail regarding the gsprite engine 436 is provided above with reference to FIG. 12.

Figure 24:
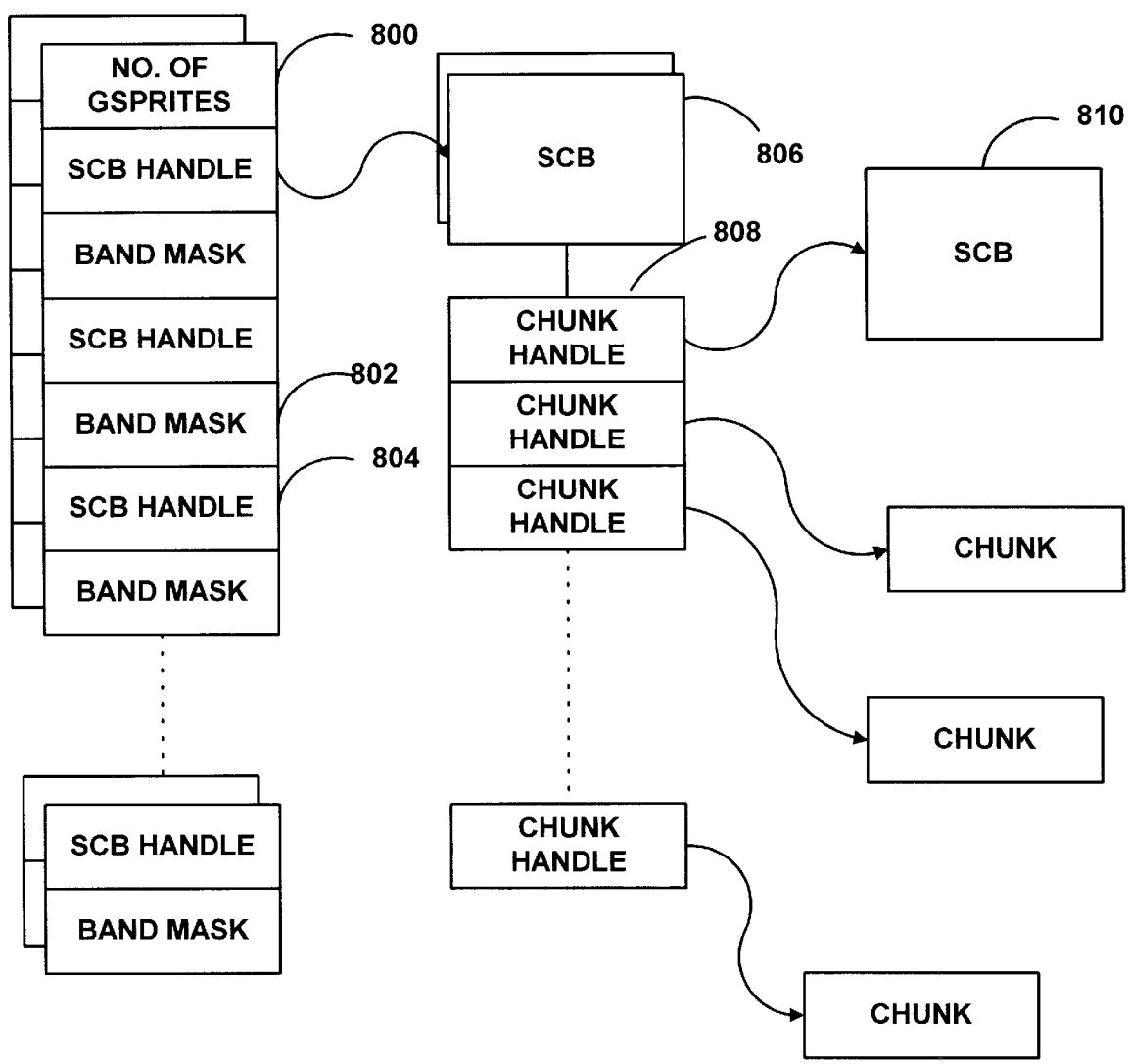
FIG. 24 is a block diagram of gsprite data structures in an embodiment.

The primary input to the gsprite engine 204 is the gsprite display list. FIG. 24 illustrates an example of the display list 800 and gsprite data structures. In this implementation, the display list 800 comprises an array of gsprite control block addresses called SCB (sprite control block) handles 804, each of which is followed by a band mask 802. The first word in the list 800 includes the number of gsprites in the list. A set bit in the band mask indicates that the gsprite is present in the band. While we provide a specific example here, the display list can be implemented in other ways. For example, the list can be comprised of separate lists for each band, where each band list enumerates gsprites that impinge upon that band. As noted above, the gsprites in the display list are sorted in depth order, and in this case, they are sorted in front to back order.

The gsprite control block (SCB) 806 includes information to scan the gsprite to output device coordinates. Rectangular gsprites map to a parallelogram in screen space under an affine transformation.

The edge equations of the gsprite have the form: $A_0x+B_0y+C_0=F_0$; $A_1x+B_1y+C_1=F_1$; $-A_0x-B_0y+C_2=F_2$; $-A_1x-B_1y+C_3=F_3$. The right hand side of these equations equals zero at the respective edges. The DSP 176 determines the value of the coefficients from the affine transformation for the gsprite. After the affine transformation, the shape of the gsprite is a parallelogram, and thus, only two sets of A and B coefficients need to be stored. The C terms are not needed at all, since the gsprite engine just needs the F values at a start point, and also needs a description of how the F values change with steps in screen space X and Y, which is given by the A and B coefficients. To support the mapping of stored gsprite data to output device coordinates, the sign of the coefficient is set such that when the coordinates of a point inside the parallelogram are evaluated in the edge equation, the result is a positive number.

Specifically, the SCB includes $A_0$, $B_0$; $A_1$, $B_1$; $F_0$, $F_1$, $F_2$, $F_3$; the left most point xs, ys; the rightmost point xf, yf, the slope of left most point to the top of the gsprite, and the slope of the left most point to the bottom; and the width and height of the parallelogram.

The start point for the scan is the leftmost point of the parallelogram, and the scan moves left-to-right column-by-column in screen space. In order to clip the gsprite to each 32-scanline screen band the SCB also includes the dx/dy slopes from the start (leftmost) point to the top and bottom points of the gsprite, so that the leftmost point on a particular screen band can be determined.

The edge equations of the parallelogram have been normalized on the DSP 176 such that F=0 at one edge of the parallelogram and F=the gsprite width or height at the opposite edge. Thus the F values for edges 0 and 1 of the parallelogram can be used directly to look up a particular gsprite image sample S, T at a particular screen location X, Y. Since the mapping from a screen X, Y to a gsprite S, T will rarely land directly on a gsprite image sample, the gsprite engine interpolates the nearest 4 (or 16) gsprite image samples to find the output sample.

The SCB 806 includes the size of the original gsprite (horizontal and vertical stride), and the size and location of the subgsprite to scan (width, height, start S and T). It can also include flags describing how the image chunks were compressed and what pixel format is used in the chunks.

In this chunking architecture, the gsprite is divided into 32×32 pixel chunks. It is not necessary to divide gsprites into chunks for rendering. However, a chunking architecture has a number of advantages as set forth above. To support the chunking architecture, the SCB includes a two-dimensional array of pointers (chunk handles), which represent the address in shared memory for the first word of the compressed chunk. Chunk memory is managed in 512 bit blocks. Each pointer or chunk handle has 18 bits, allowing a total of 16 MB of addressable memory. Since the amount of memory required to compress each chunk is variable, each 512 bit block contains an 18 bit pointer to the next block. Blocks that are no longer required are added to a linked list of free blocks so that they can be used for other chunks.

When objects allocated to a gsprite are divided into chunks, the gsprite data structure is updated to include a reference to the chunks that include image data for the gsprite.

Gsprite data can be instanced from another gsprite. In the example shown in FIG. 20, one gsprite instances image data from another. Here, the first chunk handle (808) for the SCB points to the SCB 810 of another gsprite. In an alternative implementation, chunk handles only point to locations in memory where chunks are stored.

Figure 25:
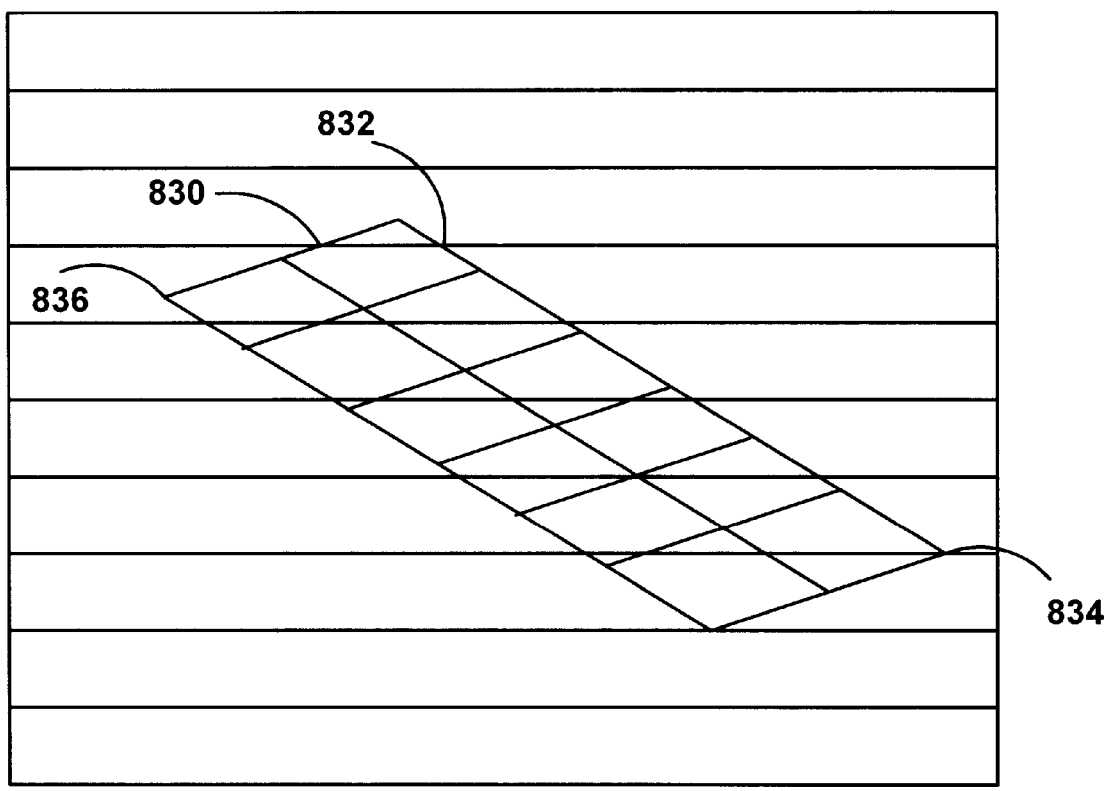
FIG. 25 is a diagram illustrating an example of a gsprite mapped to output device coordinates in an embodiment.

FIG. 25 is an example illustrating how a six chunk by two chunk gsprite might map onto horizontal bands on the display. FIG. 25 shows the start 836 and end 834 points used in scanning image data from gsprite space to physical output device space. We explain how gsprite image data is mapped to the output device space in more detail below.

After rendering and calculating affine transforms for gsprites in a frame, the image processor then performs display generation. As shown in FIG. 21B, the image processor transforms gsprites to physical output coordinates and composites the gsprites. After compositing pixel data, the image processor transfers it to the display.

In this embodiment, the gsprite engine reads in the display list and maps the gsprite image to output device coordinates. As the gsprite engine transforms the gsprite data, it sends pixel data to a compositing buffer for display. The compositing buffer is preferably double buffered so that composited pixel data can be transferred from one buffer while pixel data is being composited in the other buffer.

More specifically, the gsprite engine reads gsprite AYUV format image data out of shared memory, decompresses, transforms, and filters it, converts it to ARGB format, and sends it to compositing buffer at video rates (e.g. 75 Hz). The compositing buffer composites the decompressed ARGB pixels into a 1344×32 frame buffers for display.

Figure 26:
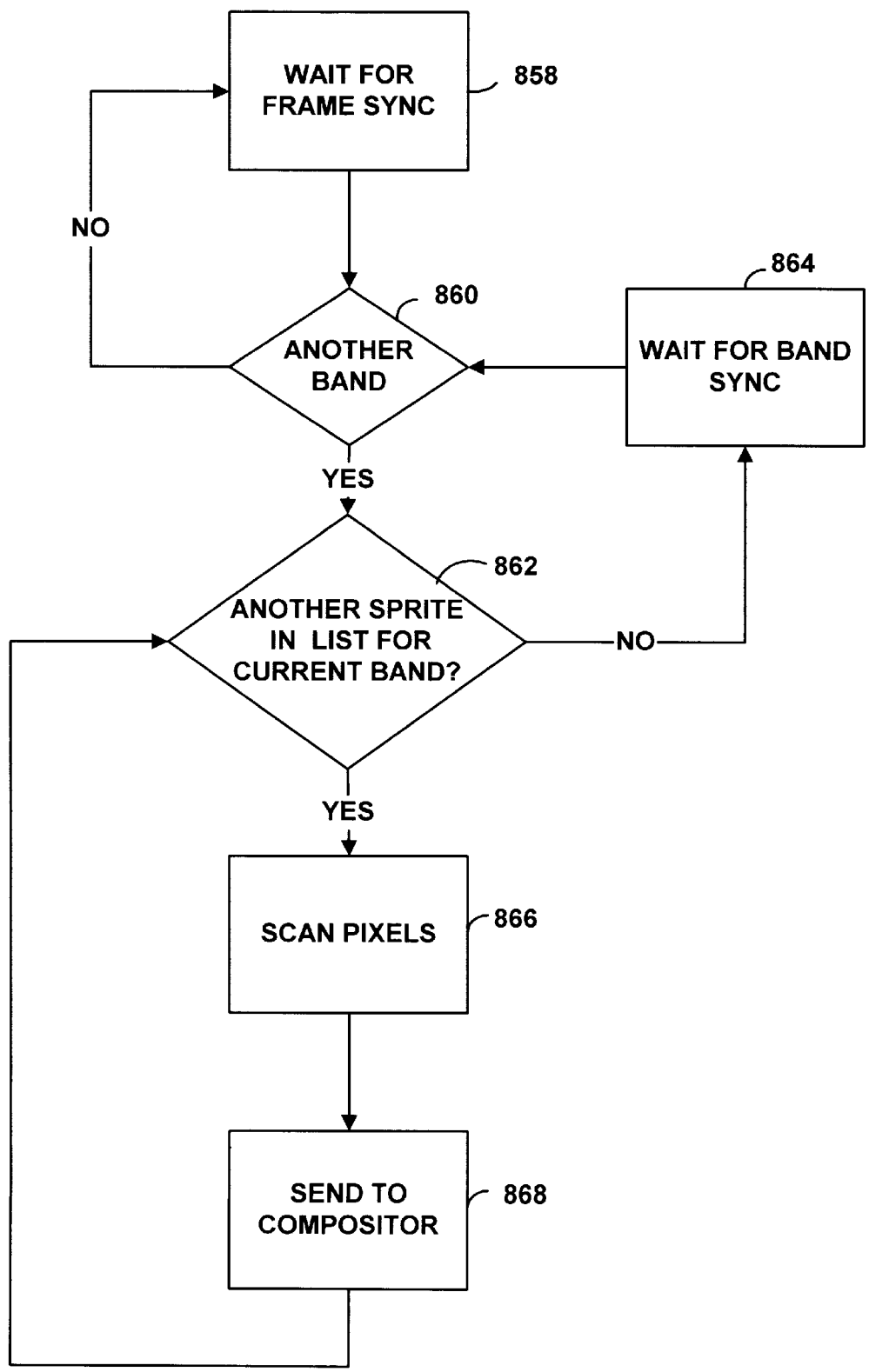
FIG. 26 is a flow diagram illustrating one aspect of display generation in an embodiment.

FIG. 26 is a flow diagram illustrating how the gsprite engine processes image data. Upon receipt of a frame sync signal (858), the gsprite engine loops through each band (860) for a frame and scans each gsprite in a band (862).

After scanning the gsprites for a band, it then moves to the next band (860). The gsprite engine repeats the scanning process for each of the bands in the view space.

Since, in a real time application, the gsprite engine must complete the scan within a time dictated by the frame rate, it is possible that the gsprite engine will not be able to process every gsprite in every band. To help prevent this case, the gsprite engine reports back to the host each frame the free processing time for each band. Using this information, the image preprocessor can aggregate objects as necessary to prevent overloading of any particular band.

In scanning the pixels from gsprite space, the gsprite engine converts the pixel data to the output device coordinates (866). Any of a number of conventional scanning techniques can be used to scan the gsprite to output device coordinates. Either backward or forward mapping can be used. The gsprite engine uses a backward mapping approach in this embodiment.

Using the edge equation data in the SCB, the gsprite engine determines the location for starting the scan on each band by clipping the gsprite to the band. For example, FIG. 25 shows how the edges of the gsprite cross into the third band (830, 832). The intersection points are the start and stop points for the scan of the gsprite in this particular band. One approach to scanning is to scan in a zigzag pattern from the starting point. The starting point in a band can be found by taking the nearest pixel in output device coordinates to the intersection point. Once the starting point is computed, the gsprite engine steps up in increments until it steps outside the gsprite or out of the band. It then steps to the right one column and steps down until it either steps outside the gsprite or out of the band. At each step, it interpolates from pixel data in gsprite space to find a pixel value for a pixel location. As it computes this pixel value at each location, it sends the pixel data to the compositing buffers for compositing.

Figure 27:
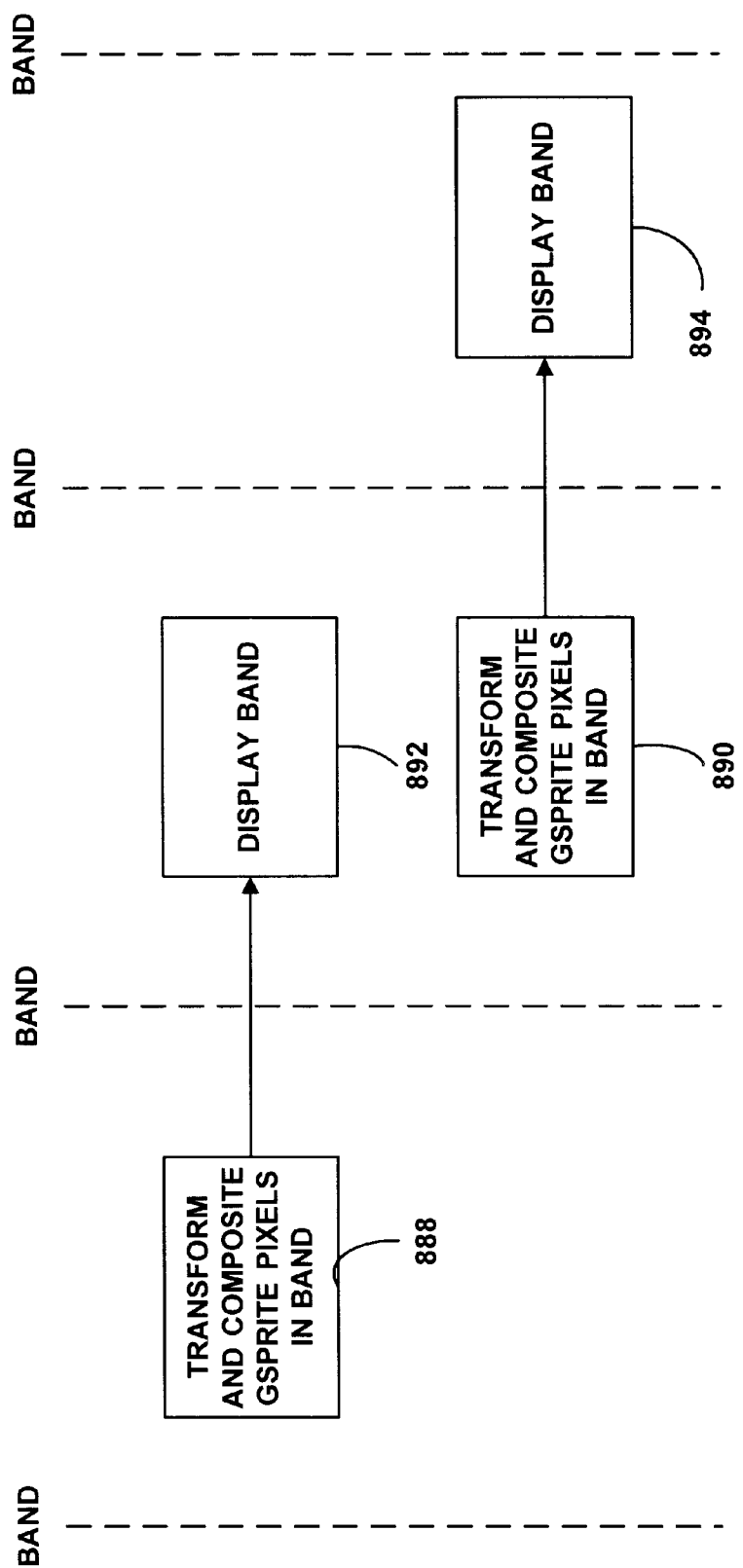
FIG. 27 is a flow diagram illustrating display generation of FIG. 26 in terms of band periods.

FIG. 27 is a block diagram illustrating how the gsprite engine and compositing buffers process bands of image data. In this diagram, the term "band" refers to the amount of time (band period) allotted to process a band of pixel data. This time can be derived, in part, from the frame rate and the number of bands in the display device. As shown in FIG. 27, the gsprite engine 204 fills the compositing buffers 210 for a band 888, and this composited image data is then scanned out to the display 892. Using double buffering, these steps can be overlapped for succeeding bands. While the gsprite engine 204 fills a compositing buffer for one band 890, the compositing buffer transfers composited image data for another band to the DAC 212, 892. In the next band period, the band that was just composited is then displayed 894. This process repeats for bands in the display. Because of this double-buffering, the process of transforming and compositing of pixels can occur simultaneously with the process of displaying a band.

Gsprites may be composited in real time to generate the image which is displayed on the output device. The gsprite pixel data generated from the gsprite addressing and imaging processing engine is passed to a compositing buffer. The compositing buffer has two 32 scanline buffers, one used for compositing into and one used for generating the video data for display. The two buffers ping-pong back and forth so that as one scanline region is being displayed, the next is being composited.

The gsprite engine passes the primary color data and alpha data to the compositing buffer for each pixel to be composited. A 32 scanline alpha buffer is associated with the scanline buffer that is being used for compositing. Since the gsprites are processed in front to back order, the alpha buffer can be used to accumulate opacity for each pixel, allowing proper anti-aliasing and transparency.

The scanline color buffer is initialized to 0.0 (all bits reset), while the alpha buffer is initialized to 1.0 (all bits set). For each pixel, the color that is loaded into the scanline buffer is calculating color(new)=color(dst)+color(src)*alpha (src)*alpha(dst). The alpha value that is stored in the alpha buffer is calculated by alpha(new)=alpha(dst)*(1 minus alpha (src)). Preferably, the color look up table (LUT) is 256×10 bits: the extra bits (10 vs. 8) can be used to provided more accurate gamma correction.

Tiling

As outlined above, the image processor (FIG. 1) performs scan-conversion, hidden surface removal, antialiasing, translucency computation, texturing, and shading. In this section we describe scan conversion, hidden surface removal, antialiasing and translucency computation in detail.

Figure 4B:
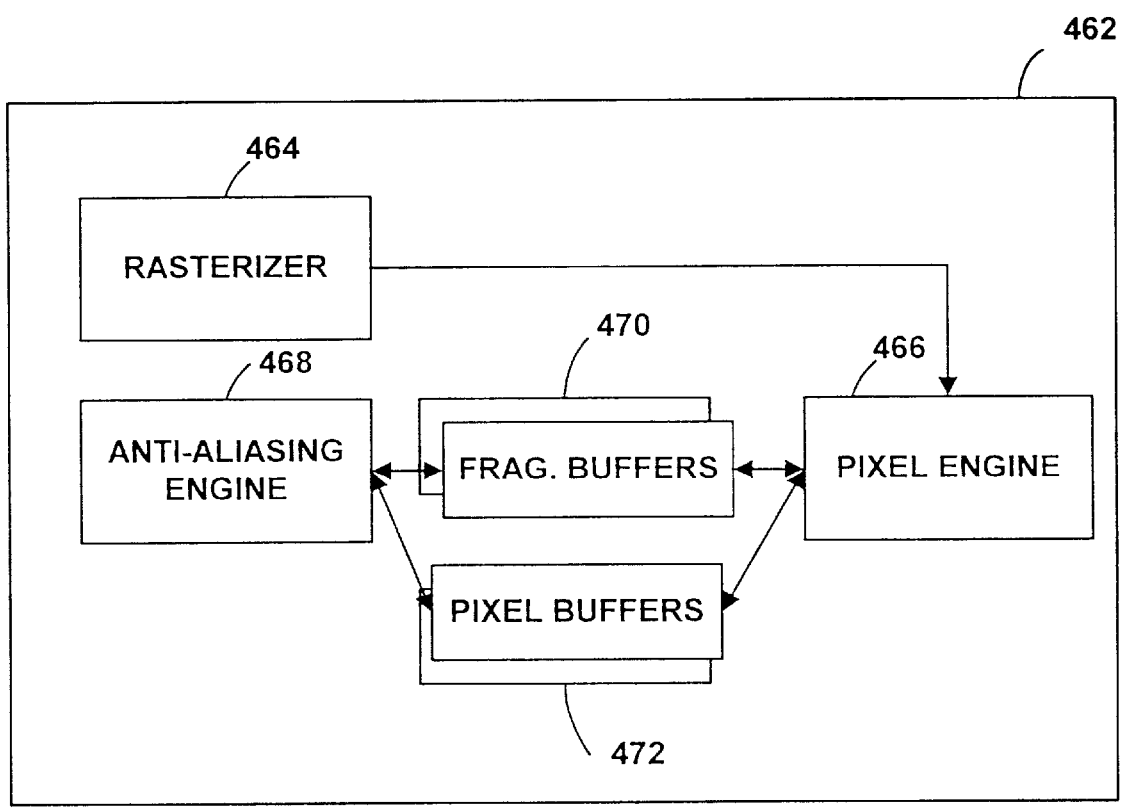
FIG. 4B is a block diagram illustrating portions of an image processor for rendering geometric primitives in an embodiment.

FIG. 4B is a block diagram illustrating portions of the image processor 462 for producing rendered image data from geometric primitives. The image processor includes a rasterizer 464, a pixel engine 466, an anti-aliasing engine 468, and a rasterization buffer, which includes pixel buffers 470, and a fragment buffer 472 in this embodiment. The "rasterizer" refers to the part of the image processor that determines pixel values from the geometric primitives, i.e. polygons. The rasterizer 464 reads primitive data and produces pixel data associated with a pixel location. This pixel data includes color, alpha, and depth (distance from the viewpoint). When a pixel is not entirely covered by a polygon, the rasterizer generates pixel fragment data.

As it scan converts a polygon, the rasterizer passes pixel data to the pixel engine for processing. The pixel engine 468 reads the pixel data from the rasterizer and determines which pixel data to store in the pixel and fragment buffers. The pixel buffers 472 are two-dimensional arrays, where the elements in the arrays correspond to pixel locations and include memory for storing color, alpha and depth data. The fragment buffer 470 stores fragment data to represent partial coverage of a pixel.

The pixel engine 466 performs hidden surface removal using depth values generated by the rasterizer and also maintains pixel fragments and translucent pixels for anti-aliasing and translucency processing. For a given pixel location, the pixel engine retains the nearest fully covered opaque pixel, if any. In this context, "fully covered" means that the pixel is entirely covered by a polygon that is being scan converted in the rasterizer. The pixel engine also retains pixels with translucency (alpha less than 1) and pixel fragments in front of the nearest opaque pixel. The pixel engine stores the nearest opaque pixel for a pixel location in the pixel buffer, and stores in the fragment buffer any fragments or translucent pixels at this pixel location that are in front of the nearest opaque pixel.

After the pixel engine generates pixel data, the anti-aliasing engine 468 resolves the pixel data in the pixel and fragment buffers. The design of the image processor illustrated in FIG. 4B supports double buffering of pixel data and single buffering of fragment data. The pixel engine generates pixel data in one of the pixel buffers, and adds fragment information into the fragment buffer while the anti-aliasing engine resolves the pixel data from the other pixel buffer and fragment data from the fragment buffer. As each fragment is resolved, the fragment entry is added to the fragment free list for use by new pixel data.

Having provided an overview of the process of generating and resolving pixel data, we now describe an embodiment in more detail. Below we describe an embodiment with reference to the tiler, shown generally in FIG. 4 and illustrated in more detail in FIGS. 9A–9C. We provide more detail regarding the tiler, including the components pertaining to scan conversion and antialiasing, as well as the components referring to textures. We will describe components used in multi-pass rendering, shading, and textures now, and will elaborate on these concepts later in our description.

The components of FIG. 4B can implemented on the tiler. The tiler reads primitive data and rendering instructions from the shared memory system 216 (FIG. 4A), produces rendered image data, and stores compressed image data in shared memory. As described above, the basic 3-D graphics primitives in the system are triangles. Triangle rendering provides numerous simplifications in hardware used for graphics generation since the triangle is always planar and convex. However, alternatively n-sided polygons can also be used.

Above we explained the components of the tiler 200. Here we describe the data flow through the tiler in more detail.

Since the tiler receives inputs from the DSP, we begin with a recap of functions of the DSP 176 (FIG. 4). As described above, the DSP 176 can perform front end geometry and lighting calculations required for 3-D graphics. The DSP 176 calculates model and viewing transformations, clipping, lighting, etc. Rendering commands are stored in main memory buffers and DMAed (Direct Memory Accessed) to the image processing board over a PCI bus. The rendering commands are then buffered in the shared memory 216 (FIG. 4A) until needed by the DSP. The rendering commands are read by the tiler 200 (FIG. 4A) when it is ready to perform image processing operations.

Figure 28A:
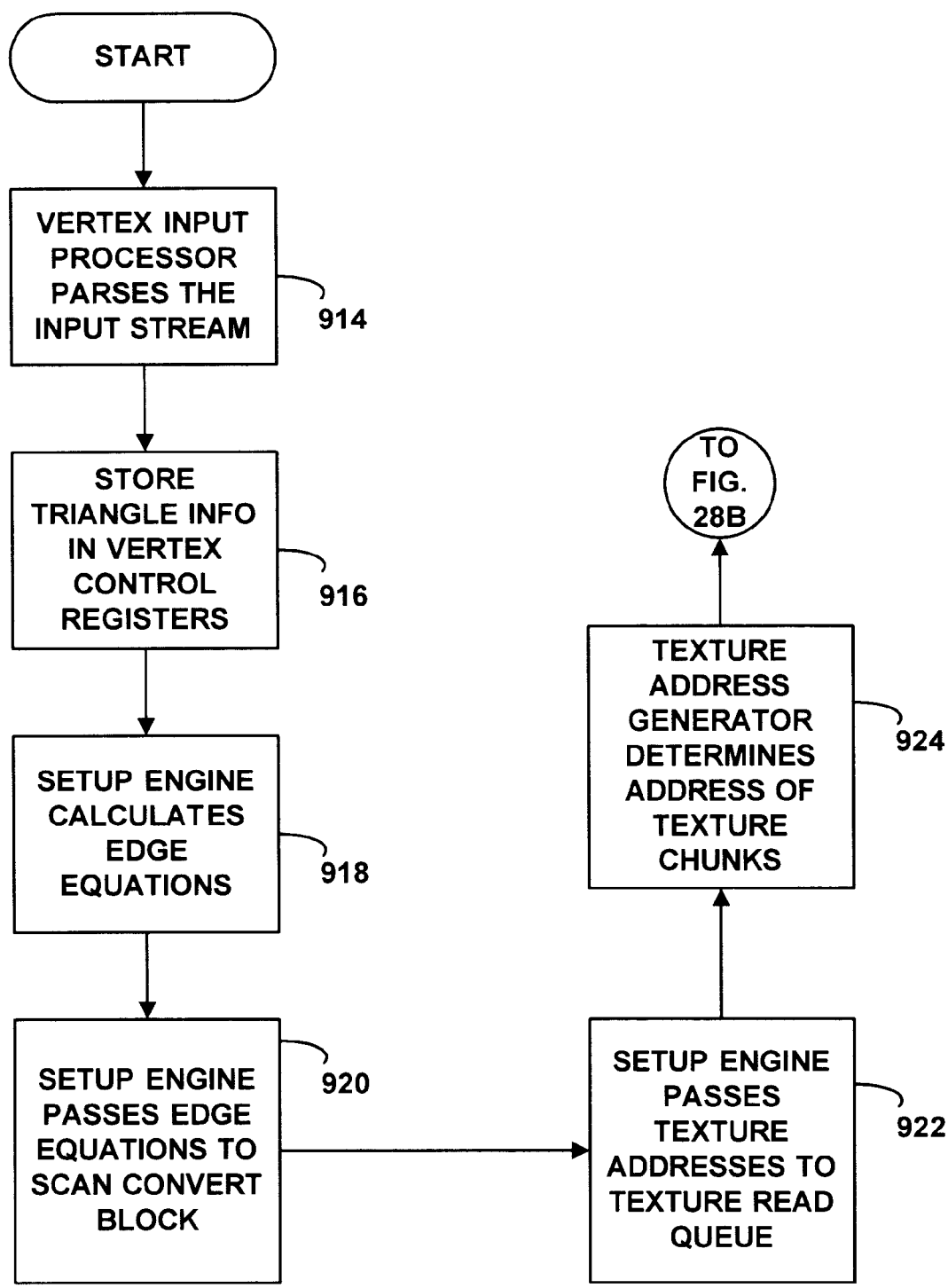
FIGS. 28A–F are a flow diagrams illustrating aspects of pixel and fragment generation in three alternative embodiments.
Figure 28B:
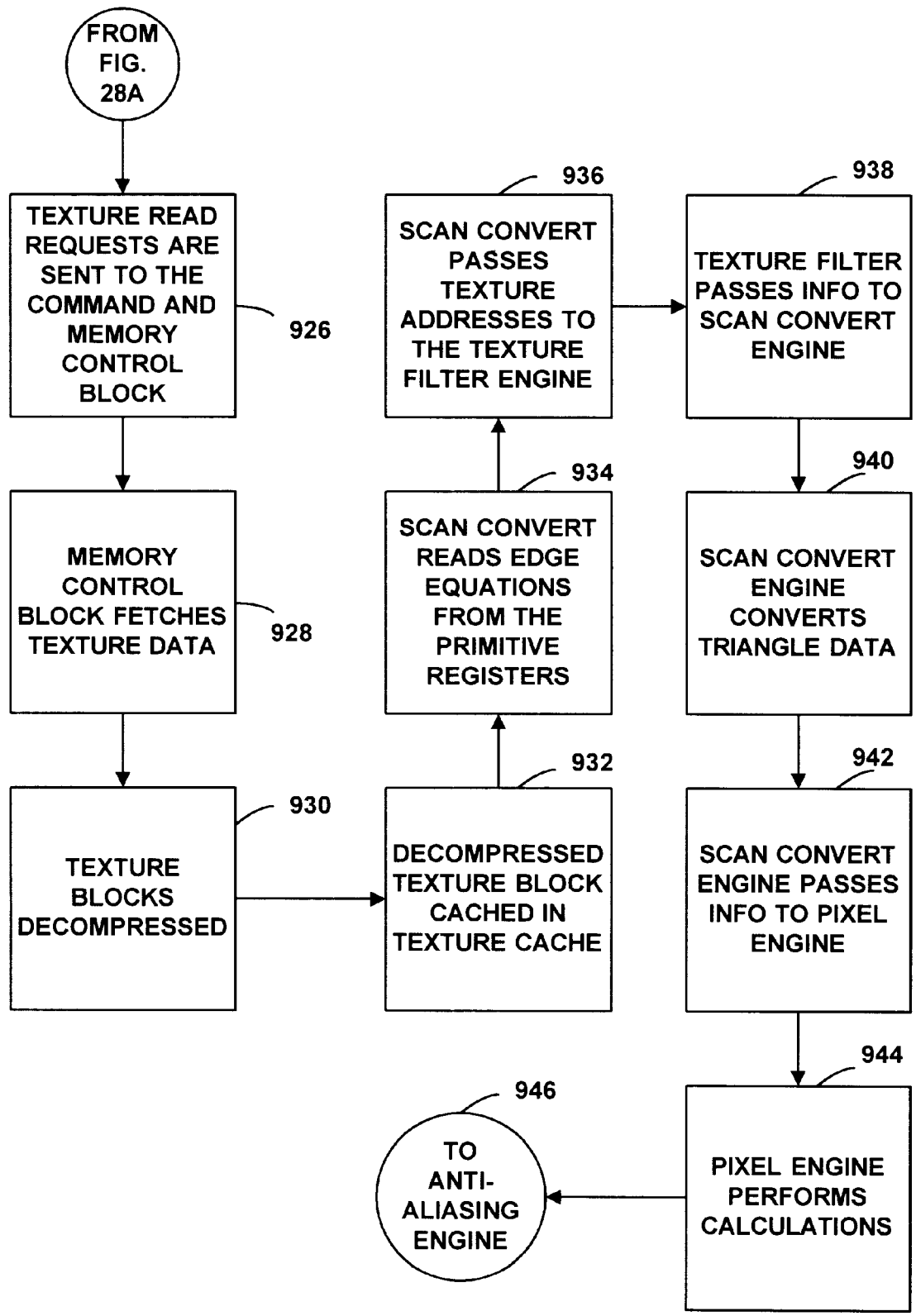

As is shown in the flowchart in FIGS. 28A and 28B, the setup block processes primitive rendering instructions read from the shared memory. The vertex input processor parses the input stream (914) (FIG. 28A), and stores the information necessary for primitive triangle processing in the vertex control registers (916).

The two vertex control registers store six vertices, three for each triangle in each register. The two vertex control registers allow for double buffering of triangle information to assure that the setup engine always has triangle information to process.

The setup engine then calculates the linear equations (918) which determine the edge, color, and texture coordinate interpolation across the surface of the triangle. These linear equations are used to determine which texture blocks will be required to render the triangle. The edge equations are also passed to the scan convert block (920) and are stored in the primitive registers within the scan convert block until required by the scan convert engine. The primitive registers are capable of storing multiple sets of edge equations.

The setup engine also passes texture addresses to the texture read queue (922), which buffers requests for texture chunks. The texture address generator then determines the address in memory of the requested texture chunks (924) and sends the texture read requests to the command and memory control block (926) (FIG. 28B), which will fetch the texture data (928) used by the scan convert block.

Texture data is stored in the shared memory (216) (FIG. 4A) in a compressed image format which may be the same format as the image data. The compression format is performed on individual 8×8 pixel blocks. The 8×8 blocks are grouped together in 32×32 blocks for memory management purposes to reduce memory management overhead.

As texture blocks are needed, they are fetched into the tiler, decompressed by the decompression engine (930), and cached in an on-chip texture cache (932). A total of 32 8×8 pixel blocks can be cached, although each block stores only one color component. The texture data is cached in an R G B and Alpha format.

The scan convert engine then reads the edge equations from the primitive registers (934) to scan convert the triangle edge information. The scan convert engine includes interpolators for walking the edges of the triangles, interpolating colors, depths, translucency, etc.

The scan convert engine passes texture addresses to the texture filter engine (936). The texture filter engine calculates texture data for the polygons that are being rendered. The texture filter engine computes a filter kernel based on the Z-slope and orientation of the triangle, and on the s and t coordinates. The texture cache attached to the texture filter engine store texture data for sixteen 8×8 pixel blocks. The texture cache is also in communication with the decompression engine which will decompress texture data (which is stored in a compressed format) for use by the texture filter engine.

When the texture filtering is completed, the texture filter engine passes the information back to the scan convert engine (938), so it can be used by the scan convert engine for further processing. Along with texture processing, the scan convert engine scan converts the triangle edge data (940) and the individual pixel addresses along with color and depth information are passed to the pixel engine for processing (942).

Figure 28C:
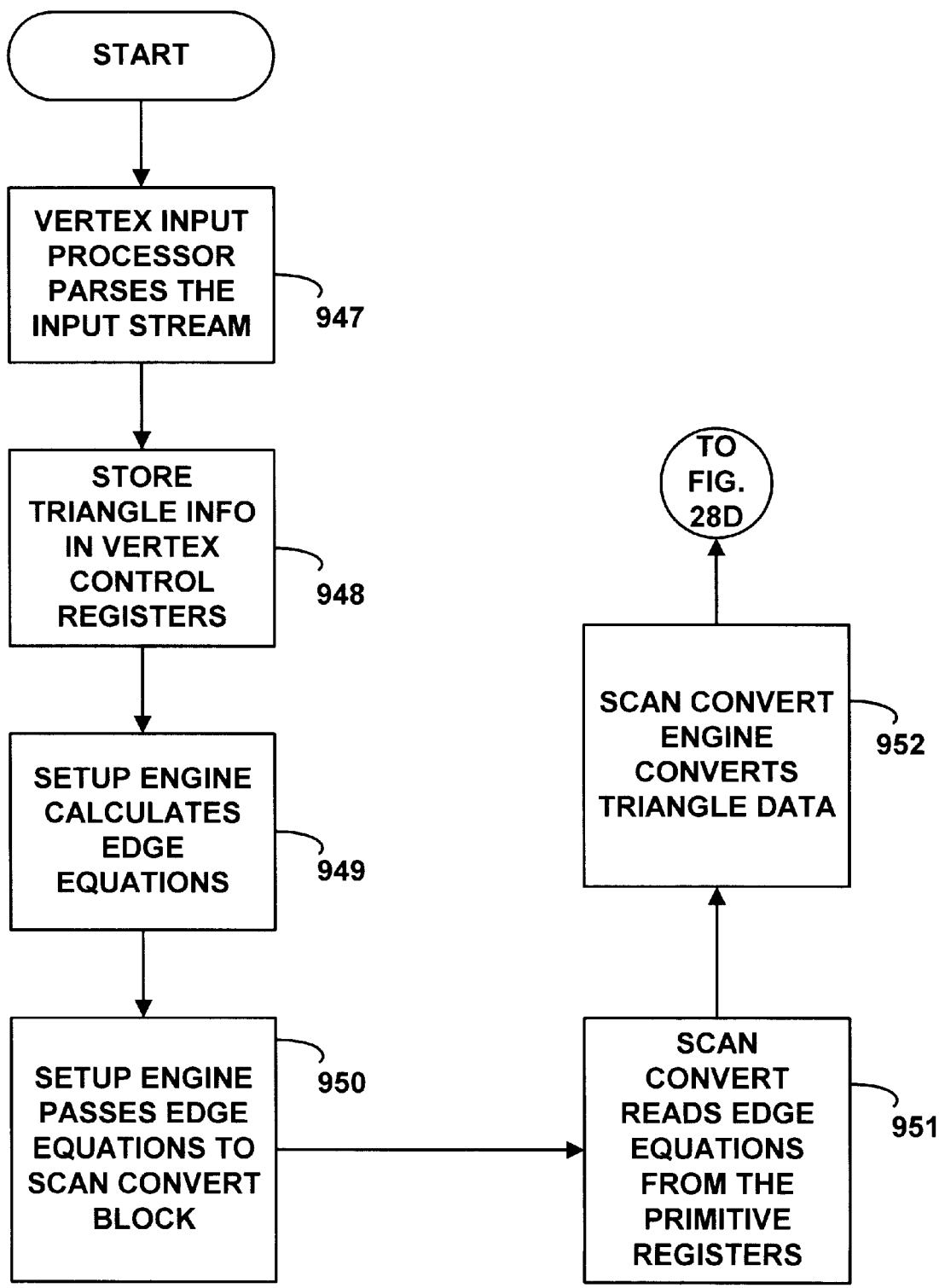
Figure 28D:
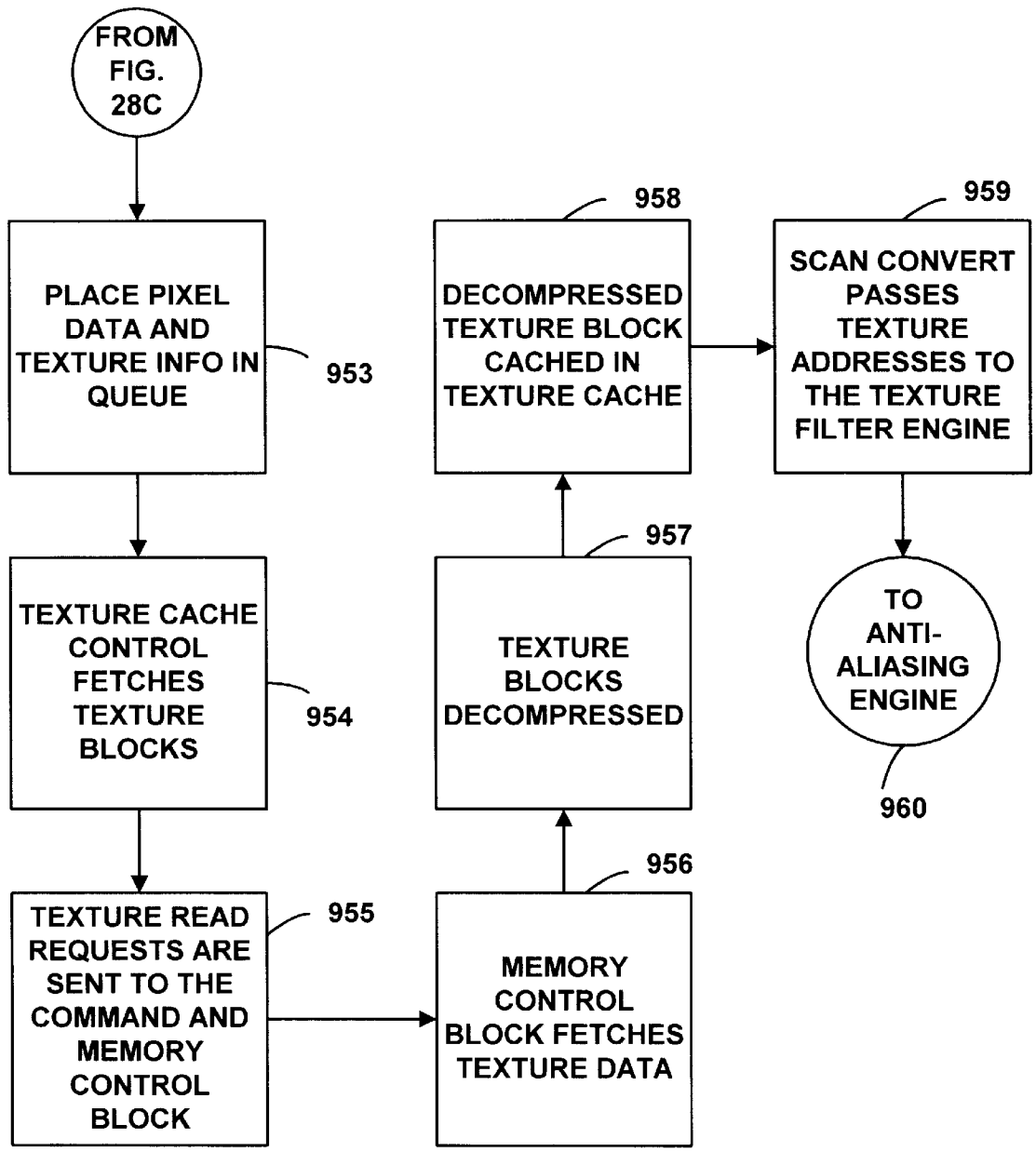
Figure 28E:
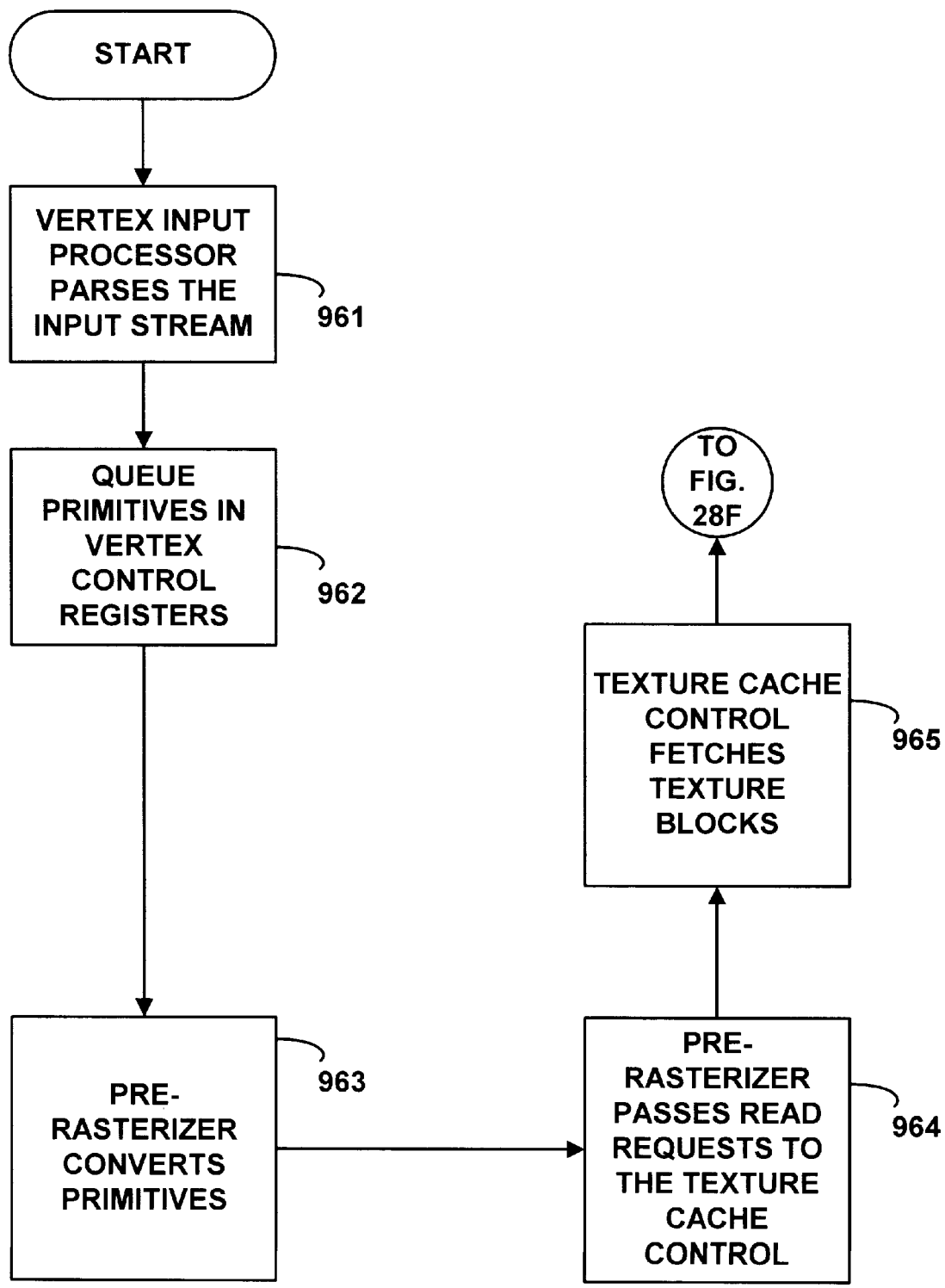
Figure 28F:
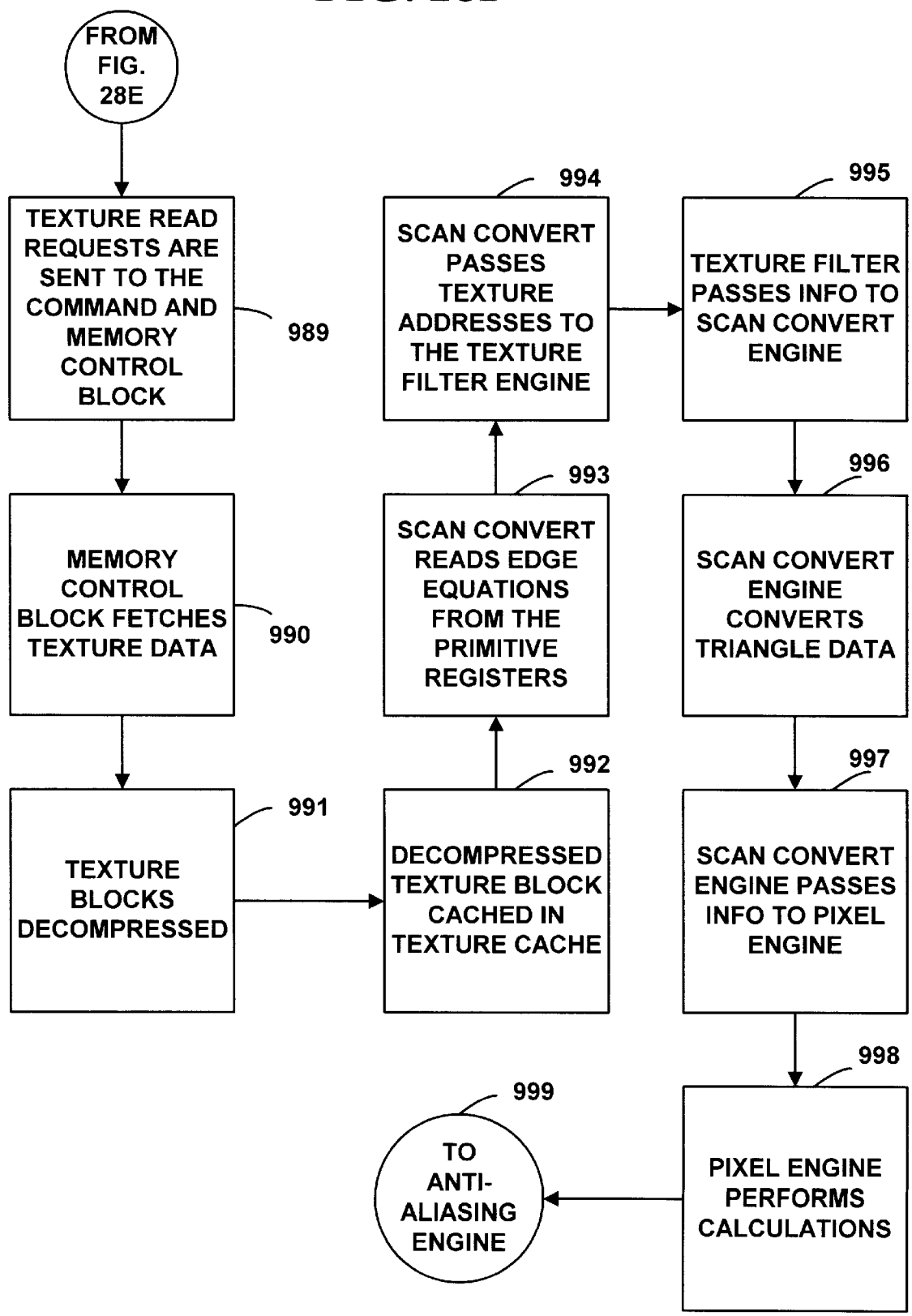

The method illustrated in FIGS. 28A and 28B varies for the alternative methods described in connection with FIGS. 10 and 11. FIGS. 28C and 28D illustrate a method for accessing image data corresponding to FIG. 10 and 9B. Similarly, FIGS. 28E and 28F illustrate a method for accessing image data corresponding to FIG. 11 and 9C.

Referring first to FIGS. 28C and 28D, this implementation of the method begins in the set-up block 381 in FIG. 9B. The vertex input processor 384 processes the input data stream (947). Next, the vertex control registers 386 buffer triangle data from the input data stream (948). The set-up engine 388 then calculates the edge equations (949) and passes them to the scan convert block 395 (950).

The scan convert block 395 reads edge equations stored in the primitive registers (951) and scan converts triangle data (952). The scan convert engine 398 then writes pixel data including the pixel address, color and alpha data, and coverage data to an entry in the texture reference data queue 399 (953) (FIG. 28D). In the case of texture mapping operations, this entry also includes texture reference data, namely, the coordinates of the texture centerpoint. The entry may also include texture filter data such as level detail or anisotropic filter control data.

From the texture reference data, the texture cache control 391 determines which texture blocks to fetch and causes the appropriate texture block or blocks to be fetched from memory (954).

The texture address cache control 391 sends texture read requests to the command and memory control block 380 (955). The texture read queue 393 buffers read requests for texture blocks to the shared memory system. The memory control 380 fetches the texture data from shared memory, and if it is compressed, places the compressed block or blocks in the compressed cache 416 (956). The decompression engine 404 decompresses compressed image data and places it in the texture cache 402 (957, 958). As described above in connection with FIG. 10, the replacement of blocks in the texture cache proceeds according to a cache replacement algorithm.

To carry out texture mapping or other pixel operations requiring image data in the texture cache, the texture filter engine 401 reads texture addresses from the texture reference data queue 399 (959). The texture filter engine 401 accesses the image data in the texture cache 402, computes the contribution from texture, and combines this contribution with the color and possibly alpha data from the texture reference data queue 399.

The texture filter engine 401 passes pixel data to the pixel engine 406, which then performs hidden surface removal and controls storage of the pixel data to a rasterization buffer.

FIGS. 28E and 28F illustrate a method for accessing image data blocks from memory corresponding to the approach in FIG. 11. In this alternative implementation, the method begins by queuing primitives in the set-up block 383. The vertex input processor 384 parses the input data stream and queues triangle data in the vertex control registers 387 (961, 962). When image data blocks need to be accessed from memory, as in the case of a texture mapping operation, the pre-rasterizer 389 scan converts primitives queued in the vertex control registers 386 to generate read requests for texture data blocks in shared memory (963).

As the pre-rasterizer scans a primitive queued in the set-up block, it passes texture read requests to the texture cache control 391 (964). The texture cache control 391 determines the appropriate texture blocks (965) and transfers read requests to the command and memory control block 380 (989) (FIG. 28F) via the texture read queue 393. The memory control block fetches the requested texture data, and if it is compressed, stores it in the compressed cache 416 (990). The decompression engine decompresses texture blocks in the compressed cache 416 and writes the decompressed image data to the texture cache 402 (991, 992). The texture cache control manages the flow of texture blocks from the compressed cache 416, through the decompression engine 404, and into the texture cache 402.

The scan convert block 397 reads the geometric primitives queued in the set-up block. The scan convert block 397 performs pixel generation operations as soon as requested texture data is available in the texture cache 402. In the process of performing these pixel operations, the scan convert engine 398 reads edge equations from the primitive registers (993) and passes texture addresses to the texture filter engine 403 (994). The texture filter engine accesses the appropriate image data stored in the texture cache 402 and then returns filtered data to the scan convert block 397 (995). The scan convert block 397 converts the triangle data and computes output pixel data from converted triangle data and the filtered data (996). It then passes this output pixel data to the pixel engine 406.

The pixel engine 406 performs pixel level calculations including hidden surface removal and blending operations. To perform hidden surface removal, the pixel engine 406 compares depth values for incoming pixels (filly covered pixels or pixel fragments) with pixels at corresponding locations in the pixel or fragment buffers. For shadowing operations, the pixel engine provides a Z-value to the texture filter engine 400 where it is compared with Z-values in a shadow Z map (stored in the texture cache). After performing the pixel level calculations, the pixel engine stores the appropriate data in the pixel or fragment buffers.

The tiler implements a high quality anti-aliasing algorithm for dealing with non-opaque pixels. The pixel buffer stores the pixel data for the front-most non-transparent pixel for pixel locations in a chunk. The fragment buffer stores pixel fragments for translucent pixels and for partially covered pixels closer to the viewpoint than the pixels in the pixel buffer for corresponding pixel locations. More than one fragment for a pixel location can be stored using a fragment list structure. In a process referred to as resolving, the anti-aliasing engine processes the fragment lists to compute color and alpha values for pixel locations.

To reduce the number of fragments that are generated, the pixel engine implements a method for merging pixel fragments which compares the fragment that is being generated with fragment(s) currently stored in the fragment buffer. If the new and previous fragment's attributes (color and depth) are similar to within a preset tolerance, the fragments are combined on the fly and no additional fragment is generated.

If a combined fragment is found to be fully covered (with a full coverage mask and opaque alpha), then the fragment is written into the color buffer and that fragment location is freed up to use for subsequent polygons within the current chunk.

Once all the polygons for the chunk are rendered, the pixel buffers are swapped. While the anti-aliasing engine resolves the pixel data in the fragment buffer and one of the pixel buffers, the pixel engine writes pixel data for the next chunk in the other pixel buffer and the remaining free locations in the fragment buffer. In general, pixel resolution comprises computing a single color (and possibly alpha) value for a pixel location based on the pixel data in the pixel and fragment buffers corresponding to the location. We provide additional detail addressing these issues below.

In the implementations of the tiler shown in FIGS. 9A–C the pixel engine and anti-aliasing engine have access to a single fragment buffer and a pair of pixel buffers. The two 32×32 pixel buffers are provided for double buffering between the pixel engine and the anti-aliasing engine. The pixel buffer entry includes the following data:

| R | G | B | α | Z | P |
|---|---|---|---|---|---| where R, G, B are the red, green, and blue color components respectively, α is the alpha component which represents the translucency of the pixel, and Z is the Z component which represents the depth of the pixel from the eye point. The x,y address is fixed and implicit in 20 the pixel buffer addressing. Eight bits are used per color component (i.e. Red, Green, and Blue), eight bits are used for the α component, and twenty-six bits are used to store the Z-value, stencil value, and a priority value. Out of this 26 bits, up to 24 can be used as Z values, up to 3 can be used as stencil planes and up to three can be used as priority values. As described above with reference to FIG. 9, the buffer also includes a 9 bit fragment buffer pointer.

The priority value is fixed per primitive and is used to help resolve objects which are coplanar, such as roads on top of terrain, by using priority relationships which are used by the tiling engine to margin the incoming pixel Z-value, as compared to the stored Z-value, during the Z compare operation.

The fragment buffer is used to store information about pixel fragments for polygons whose edges cross a given pixel or for polygons with translucency. Each entry in the fragment buffer provides color, α, Z and coverage data associated with the surface.

Multiple fragment buffer entries can be associated with a single pixel (via a linked list mechanism) for cases in which multiple polygons have partial coverage for the same pixel location. The fragment buffer is dual ported so that it can be operated on by the anti-aliasing engine and the pixel engine in parallel. In one possible implementation the fragment buffer is a one-dimensional array of fragment records and includes a total of 512 fragment record entries. The memory management of the fragment buffer is performed using a linked list structure. Each fragment buffer entry includes the following data:

| R | G | B | α | Z | M | P | S |
|---|---|---|---|---|---|---|---| where R, G, B are the red, green, and blue color components respectively, α is the alpha value which represents the translucency of the pixel, and Z is the Z-value which represents the depth of the pixel from the eye point, M is a 4×4 pixel coverage bitmask for each pixel which is partially covered, P is a pointer to the next fragment buffer entry, and S is used to represent a fragment stencil. Eight bits are used per color component (i.e. Red, Green, and Blue), eight bits are used for the α component, twenty-six bits are used to store the Z-value plus stencil and priority, and nine bits are used for the fragment pointer P.

The pixel coverage mask is computed by determining a coverage mask value for each edge and bitwise ANDing them together. The computation of the coverage mask is a two step process. The first step is to determine how many of the subpixel bits in the coverage mask are to be turned on, and the second step is to determine which specific bits are to be enabled.

The first step uses the area of the pixel which is covered by the edge to determine how many of the coverage mask bits are to be switched on. This area is computed by a table lookup indexed by the edge slope and distance from the pixel center. The second step uses the edge slope to determine the order in which the sample bits are to be switched on. The set of bit orders is stored in a pre-computed tabled called the 'Coverage Order' table. Each coverage order table entry consists of a specific ordering of the sample bits which is correct for a range of slope values. The edge slope is tested against the set of slope ranges, and the requirements are significantly reduced because much of the data generated during the rasterizing process does not have to be retained after the image processor has resolved the pixels in a chunk. The image processor only needs to retain the resolved color portion after resolving a chunk.

Another advantage to rendering chunks is that the pixel and fragment memory can be implemented to reduce the overhead of memory accesses. Typical graphics systems use external memories to implement color, depth and fragment buffers. It is very difficult to organize this external memory to satisfy the rigorous bandwidth requirements of real time image processing. The pixel and fragment memory needed to support rendering of a chunk, such as a 32×32 pixel region, does not have to be located in external memory. Instead, it can be implemented on the same hardware that performs rasterizing and antialiasing functions. For example, in the implementation described above, the fragment and pixel buffers can be implemented on a single chip.

The use of on-chip memories simplifies the bandwidth problems associated with external memory. On-chip memories enable efficient use of multiple memory banks. For example, one bank can be used for the pixel buffer, and another bank can be used for fragment records.

Another advantage of on-chip memory is that it is less expensive and easier to implement multi-port memories.

The performance of the pixel and fragment buffers can be enhanced through the use of multi-port memories, which allow simultaneous reads and/or writes to achieve one clock per pixel processing rate. Since the fragment buffer is much smaller when chunks are rendered separately, it can be implemented on chip. Both the smaller size of the memory and its presence on-chip make it feasible and cost effective to use multi-port memory. External multi-port memories on the other hand, are expensive due to the higher per bit cost and connections between chips.

Another important advantage related to chunking is that pixels for one portion of a frame can be generated while pixels for another portion are resolved. Thus, instead of generating pixels for an entire frame and then resolving those pixels, our approach can overlap the processes of generating and resolving pixels, reducing system transport delay.

In one embodiment of our system, the image processor resolves fragments in a post processing step. While the pixel engine generates pixel data for part of an image, the anti-aliasing engine resolves fragments for another part of an image. As noted above, the pixel index associated with the range containing this slope value is used as the index into the coverage order table.

A method for computing the coverage mask is described in Schilling, A. "*A New Simple and Efficient Anti-Aliasing with Subpixel Masks*", Computer Graphics, Vol. 25, No. 4, July 1991, pp. 133–141.

After the image processor generates fragment data for a pixel location, it then sorts and resolves this fragment data to compute color at that location. As described above, the image processor generates and maintain fragments for partially covered pixels. A pixel is partially covered by a polygon if one or more of the polygon's edges cross the pixel, or if the polygon has translucency. Maintaining fragment data to perform both antialiasing and translucency computations can require a significant amount of memory. As the number of rendered polygons increases, the amount of memory to store pixel data and fragments also increases.

In addition to the increased memory requirements, the amount of processing required to resolve fragments can be significant as well. In a Z-buffer approach, fragment data is depth sorted. In general, the primitive data is not sorted in depth order as it arrives for rendering. Since primitive data arrives in arbitrary depth order, the image processor has to sort the fragment data after generating it. The sorted data is then processed to determine the color and possibly the alpha at a pixel location. At each pixel location, several fragments can contribute to the color. If alpha is also computed the number of fragments and the complexity of processing increases as well.

For the reasons highlighted above, the memory and processing requirements to support advanced antialiasing and translucency can be substantial. There is a conflict between supporting sophisticated antialiasing and translucency computations, on one hand, and reducing memory requirements on the other. To reduce the cost of the system, the use of memory should be minimized, yet advanced antialiasing and translucency features usually require more memory. It is even more difficult to support these advanced features in a real time system while still minimizing memory requirements.

In one embodiment, our system renders primitives one chunk at a time, which reduces memory and allows for fragment resolution in a post processing step. While pixel data is generated for one chunk, pixel data of another chunk can be resolved. A number of benefits impacting fragment sorting and pixel resolution follow from the chunking concept. Memory data is double buffered: the pixel engine can access one buffer while the anti-aliasing engine accesses the other. After the pixel engine has generated pixels for a chunk, the tiler performs a buffer swap. The pixel engine then generates pixels for the next chunk, and the anti-aliasing engine resolves the pixels for the previous chunk.

Although it could also be double buffered, in the preferred embodiment, the fragment buffer is dual ported so that the pixel engine and anti-aliasing engine can access it simultaneously. The pixel engine can then write fragment data to the fragment buffer through one port while the anti-aliasing engine accesses fragment data through another port.

In this embodiment, the double buffered and dual-ported memory systems enable the image processor to overlap pixel data generation and pixel resolution. There are a number of alternative ways to implement a double buffering scheme as well.

The image processor sorts the fragment data in depth order before completing the resolve process. In general, the image processor can sort pixel data as it generates pixels, and after it has generated pixels for a portion of an image to be rendered. For instance, the pixel engine can perform an insertion sort as it writes fragment data to the fragment buffer. In addition, the pixel engine can sort fragment data after it has completed generating pixel data for all or part of an image. The pixel engine can also sort fragments in cases where it rejects incoming pixel data. Since the pixel engine does not have to write to the fragment buffer when the incoming pixel data is rejected, it can then perform a sort of fragments before the next incoming pixel arrives. We refer to this latter approach as "background sorting" of fragments.

An insertion sort refers to depth sorting an incoming fragment with other fragments in the fragment buffer. In a real time system, an insertion sort may not be preferred because it can potentially slow down the process of generating pixel data. Searching the fragment buffer to find the proper insertion point for an incoming fragment can cause undesirable overhead. Additionally, in hardware implementations, it requires additional hardware and complicates the design of the pixel engine.

As an alternative to an insertion sort, fragments can be sorted after the image processor has completed pixel generation for a portion of an image. Some systems render an entire frame of image data at once. In such systems, sorting fragments for every pixel location in the view space can require substantial processing time and add undesirable delay, especially for a real time system. The amount of time required to perform the sorting can vary depending on the number of fragments per pixel, and depending on the degree to which insertion sorting is already performed. The sorting operation, therefore, can hold up other pixel operations from occurring, thereby decreasing performance.

By rendering a portion of the view space at a time, the fragment sorting for one part of an image can occur while a next portion is being rasterized. In essence, the anti-aliasing engine can perform fragment sorting in a post-processing step. In one embodiment, the anti-aliasing engine sorts fragments for one chunk as fragments for the next chunk are being generated.

Even in cases where pixel generation and resolution are overlapped in this manner, it still may be advantageous to perform some sorting of fragments for part of an image as the pixel engine generates pixels for that part of the image. Background sorting of pixel fragments reduces the overhead of sorting fragments after the pixel engine completes generating pixels for a set of primitives.

In one embodiment, background sorting is performed concurrently with pixel operations being performed on the pixels to reduce, and in some cases eliminate the latency required for sorting of fragments. The design takes advantage of the fact that many of the pixels are not partially covered, and therefore do not make use of the fragment buffer. The background sorting uses this spare bandwidth to perform a sort of a set of fragments in the fragment buffer.

Figure 29:
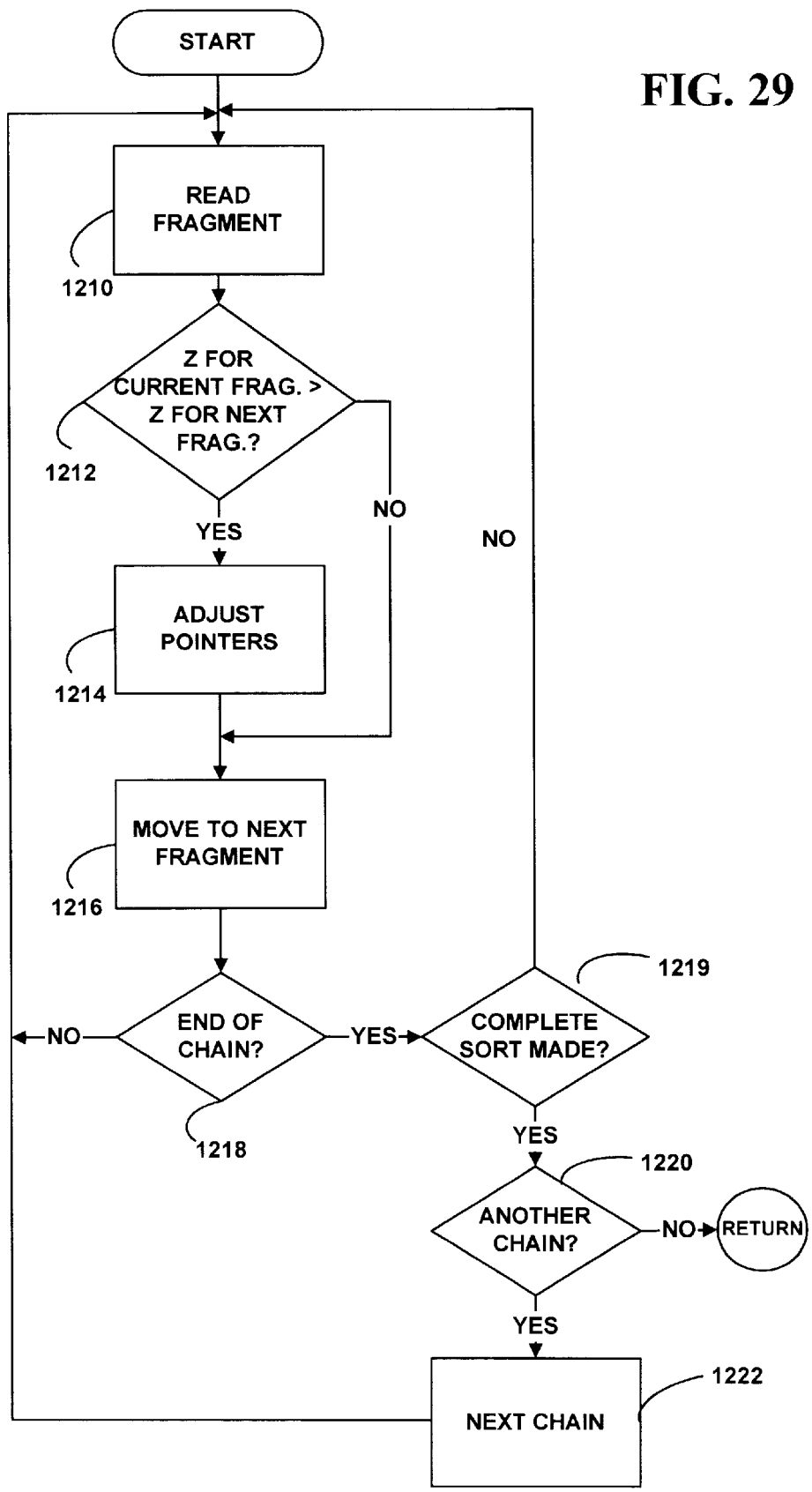
FIG. 29 is a flow diagram illustrating background sorting of fragments in an embodiment.

One way to implement background sorting is to perform a bubble sort. The pixel engine performs a bubble sort of the fragments, by walking each chain of fragments (1210) and comparing the Z-values between two adjacent fragments. FIG. 29 is a flow diagram illustrating this approach.

If the current fragment has a larger Z (is further away) than the next fragment it points to in the fragment chain (1212), the two are swapped in order by readjusting their pointers (1214) accordingly. If the Z-values are already in sorted order, the sort logic continues marching down the chain comparing the previous next fragment with the new next fragment (1216). The sort logic continues walking the chain (1218) until it reaches the end of the current chain. If the sort logic has completely sorted the chain (1219), then the logic moves to the next chain. If not, the logic makes another pass through the chain. The sort logic continues passing through the chain until all of the fragments are in order for the current chain. The sort logic then moves to a next chain, if another exists and needs sorting (1220, 1222).

If a new fragment should come in that has the same address as one of the ones currently being sorted, the pipeline is stalled until the two fragments have been written. This is a rare case, and therefore is unlikely to hinder performance in a system employing background sorting.

An optimization can be employed whereby an extra n×1 bit RAM is used, where n is the total number of fragments allowed per chunked region. Whenever a new fragment is added to a fragment chain, the extra bit is set for the index to the first (foremost) fragment in the chain. This bit indicates a potentially unsorted fragment. When the fragment sort hardware gets ready to move to a new fragment chain, it clears the bit for that chain and proceeds to sort it. If in the meantime, a new fragment comes in that chain, then there is a chance that the fragment is unsorted again. Since the new fragment resets the new fragment bit, it means the sort operation will have to be performed again on the fragment chain.

However, using this bit to tag the fragment chain that has received a new fragment eliminates the problem inherent in sorting a buffer that is being changed without the knowledge of the sort logic. The extra bit also prevents the background sort from spending time attempting to sort buffers that have already been sorted, are not the first in a chain, or which have not been allocated yet.

If there are less total fragments available than pixels, it maybe less costly in gates to use an individual RAM since there are fewer bits, and the sort is done based on the total number of fragments, not the total number of pixels.

A hardware implementation of the sort logic includes comparators for comparing Z information, data routing multiplexers for routing the pointers (used for swapping pointers in the sort process), a 1 bit×n RAM, and the logic for setting/clearing the bit in the RAM based on the offset. It also includes a state machine that controls the compare, routing, and fragment visited, as well as the sort process. This state machine is responsible for shutting down the incoming pipeline if the new fragment needs the same fragment as is currently being sorted. The fragment buffer and fragment index RAM should be multi-ported so the sort logic can read or write independent of pixel generation operations performed in the pixel engine.

Alternatively, the fragment buffer is double buffered. This implementation can be extended to alternative approaches using fewer ports on the RAM. This approach may require greater control for identifying when an incoming pixel is not a fragment so the same ports can be shared between incoming pixels and the sort logic.

After sorting, the image processor resolves the fragments for a pixel location to determine the color for that pixel location. If alpha is not considered, the image processor computes color accumulation based on the color and coverage data for fragments in a depth sorted list for a pixel location. If alpha is considered in addition to coverage data, the image processor computes color accumulation based on color, coverage, and alpha of the fragments in a depth sorted list for a pixel location.

In general, the image processor can resolve fragments for pixel locations corresponding to the entire view space or for only part of the view space at a time. In the embodiment described above, the image processor resolves pixel locations in a portion of the view space called a chunk. Fragment resolution occurs after fragments have been generated and sorted.

Fragment resolution is the process during which all of the fragments for a pixel are combined to compute a single color and alpha value. This single color and alpha are written into the color buffer (and then compressed and stored to a gsprite).

Computing the resolved color includes accumulating a correctly scaled color contribution from each layer while computing and maintaining coverage information with which to scale subsequent layers. This accumulation can be performed in front-to-back, or in back-to-front depth order. In a front-to-back approach, as opposed to back-to-front, spatial coverage data can be used to determine coverage for succeeding layers. Unlike coverage, alpha data applies equally to the entire pixel area.

For front to back, the equations for computing color and alpha for sorted fragment records are:

Alpha initialized to maximum value (inverse alpha). Color initialized to 0.

Anew=Aold−(Aold*Ain);

Cnew=Cold+(Cin*(Aold*Ain));

For back to front, the equations for computing color and alpha for sorted fragment records are:

Alpha and Color initialized to 0.

Anew=Ain+((1−Ain)*Aold);

Cnew=(Cin*Ain)+((1−Ain)*Cold);

For a hardware implementation, front to back is preferable because the resolve process is less hardware intensive.

A pseudocode example of accumulating fragments with depth, color, and coverage only (no alpha), is set-forth below:

```
NUM_CVG_BITS is the number of bits in the coverage mask
MAX_ALPHA is the maximum alpha value
for (each fragmented pixel location) {
    ColorAccum = 0;
    CoverageAccum = 0;
    while (fragment list is not empty) {
        scan fragment list and extract closest fragment (coverage, color);
        ColorScale = CountSetBits(coverage &
```

-continued

```
~(CoverageAccum))/NUM_CVG_BITS;
        ColorAccum += ColorScale * color;
        CoverageAccum |= coverage
    }
    ColorAccum is pixel color
}
```

Accumulating fragments with depth, color, coverage, and alpha requires that an alpha value be computed and maintained for each subsample. This is due to the combination of coverage masks and alpha values for each fragment. It is generally the case that the accumulated alpha at any layer during accumulation is a function of all of the alpha values of previous layers. With coverage masks, each subsample can potentially have a different set of 'previous' alpha values, since a layer for which the coverage bit is clear does not contribute to that subsample.

One approach to resolving fragments with both alpha and coverage is to compute color for each subpixel in a layer separately, and then add the contribution from each subpixel location to determine the total color contribution. The alpha scale for each subpixel is determined from the alpha at that layer in addition to the alpha accumulated from other layers. This alpha scale is then multiplied by the color for the subpixel to determine the color contribution of the subpixel. The color for a layer is then determined by summing the color contributions from the subpixels.

One example of accumulating color and alpha for subpixels separately is:

```
for (each fragmented pixel location) {
    ColorAccum = 0;
    AlphaAccum[NUM_CVG_BITS] = { MAX_ALPHA,
MAX_ALPHA, . . . , MAX_ALPHA };
        while (fragment list is not empty) {
            scan fragment list and extract closest fragment (coverage,
            color, alpha);
            for (i=0; i<NUM_CVG_BITS; i++) {
                // if this bit is set in coverage mask
                if (coverage >> I) & 0x1 {
                    // compute alpha scale value - contribution for
                    this color
                    AlphaScale = (alpha * AlphaAccum[i]);
                    // add color scaled by alpha
                    ColorAccum += (color* AlphaScale)*
                    (1/NUM_CVG_BITS));
                    // compute accumulated alpha for the subsample
                    // AlphaAccum = AlphaAccum*
                    (MAX_ALPHA-alpha) =
                    // AlphaAccum - AlphaAccum*alpha
                    AlphaAccum[i] -= AlphaScale;
                }
            }
        }
    ColorAccum is pixel color
}
```

An example using 4 sub-pixel locations will help illustrate fragment resolution. In this example, we consider three fragments each having a coverage mask, alpha and color value. The initial state is illustrated in table below. In this example, we accumulate color and alpha using a front to back approach. The initial alpha is set to 1, meaning full transparency. The data for each layer is as follows: fragment 0, alpha=0.5, coverage mask (cm)=0011, and color=$C_0$; fragment 1, alpha=0.3, cm=1000, color=$C_1$; fragment 2, alpha=0.8, cm=0101, color=$C_2$. The data for each fragment is provided in tables below.-

With the alpha values initialized to one, the alpha coverage array is shown below.

| 1 | 1 |
|---|---|
| 1 | 1 |

To compute color, the color values for each subpixel location are multiplied by the new alpha and the alpha from the coverage array. The result for the subpixel locations is then divided by four (one divided by the number of subpixel locations). Finally, the contribution from all of the subpixel locations is summed to find the accumulated color.

| coverage mask | color | alpha for new frag. | alpha from coverage array alpha | subpixel contribution |
|---|---|---|---|---|
| 1 | $C_0$ | 0.5 | 1 | 1/4 |
| 1 | $C_0$ | 0.5 | 1 | 1/4 |
| 0 | $C_0$ | 0.5 | 1 | 1/4 |
| 0 | $C_0$ | 0.5 | 1 | 1/4 |

Using the formula, Alpha'=Alpha*(Max_alpha−new_alpha), the image processor computes the new alpha separately for each pixel location and stores it in the alpha coverage array in the table below.

| 0.5 | 0.5 |
|---|---|
| 1 | 1 |

The contribution of fragment 1 is set forth in the table below.

| coverage mask | color | alpha for new frag. | alpha from coverage array alpha | subpixel contribution |
|---|---|---|---|---|
| 0 | $C_1$ | 0.3 | 0.5 | 1/4 |
| 0 | $C_1$ | 0.3 | 0.5 | 1/4 |
| 0 | $C_1$ | 0.3 | 1 | 1/4 |
| 1 | $C_1$ | 0.3 | 1 | 1/4 |

The new alpha coverage array is as follows:

| 0.5 | 0.5 |
|---|---|
| 0.7 | 1 |

The contribution of fragment 2 is set forth in the table below.

| coverage mask | color | alpha for new frag. | alpha from coverage array alpha | subpixel contribution |
|---|---|---|---|---|
| 1 | $C_2$ | 0.8 | 0.5 | 1/4 |
| 0 | $C_2$ | 0.8 | 0.5 | 1/4 |
| 1 | $C_2$ | 0.8 | 1 | 1/4 |
| 0 | $C_2$ | 0.8 | 0.7 | 1/4 |

The alpha coverage array for the fragments after fragment 2 is as follows:

| 0.5 | 0.1 |
|---|---|
| 0.7 | 0.2 |

This method requires 2*NUM_CVG_BITS multiplies (2*16=48 in the 4×4 case) per fragment for the computation of alpha and the color contribution. Note that the (1/NUM_CVG_BITS) scaling can be done with a shift if the number of bits in the coverage mask is a 2**n size (which is typically the case).

Figure 30:
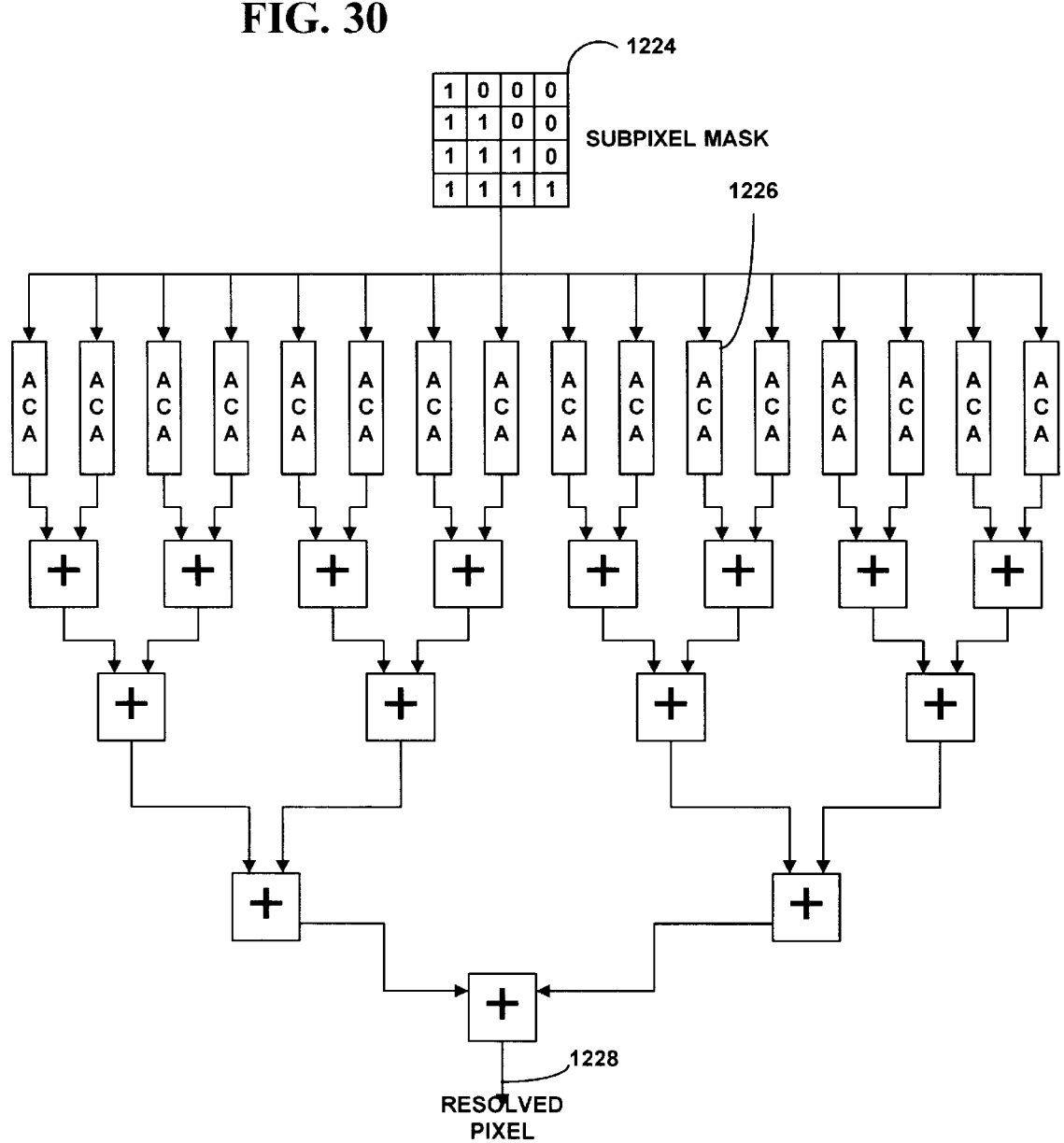
FIG. 30 is a block diagram illustrating a pixel resolution system in an embodiment.

FIG. 30 is a schematic diagram illustrating a hardware implementation of the approach described above for a pixel divided in 4×4 subpixel regions (1224). The resolve hardware includes a set of 16 identical processing and storage units called alpha and color accumulators (ACA) (1226), each ACA dedicated to one subpixel region of the pixel. During processing of the fragment list for each pixel location, the coverage masks of each fragment are used as a processing mask for the resolve hardware. The ACA performs a multiply for the alpha scale, color accumulation, and alpha accumulation. The (1/NUM_CVG_BITS) scaling is performed with a shift as set forth above. Once all fragments have been processed for a given pixel location, the output section combines the color and alpha values for all of the 16 subpixels in a hierarchical fashion (1228). The processors in the output combine the two incoming values and divide by 2. With hardware pipelining, the pixel resolve process uses only a single hardware clock per fragment entry.

An alternative technique reduces hardware requirements by treating subpixels having the same accumulated alpha similarly at each layer. This technique is based on the observation that the state in which subsamples have unique accumulated alpha values occurs gradually. Initially, all of the subsample alphas are set to zero (transparent). The first fragment accumulation can add at most one unique alpha value, resulting in one group of subsamples retaining the initial alpha value and the other group having the same new alpha value. The second fragment accumulation can result in no more than four unique alpha values. Overall, the number of unique subsample alpha values possible after 'n' fragment accumulations is 2n (or, more accurately, MIN(2n, NUM_CVG_BITS)).

This alternate technique uses this characteristic to reduce the number of accumulations required by only performing the color scale and accumulation for each unique alpha value within the subsamples rather than for every subsample. With this technique, at most one accumulate needs to occur for the first fragment, two for the second fragment, four for the third fragment, and so on, up to the number of subsamples in the pixel (e.g., with a 4×4 subsample array the worst case is 16 accumulations per fragment).

The foundation of the technique is to maintain the set of unique alpha values and their associated coverage masks during fragment accumulation, the intent of which is to perform a minimum number of color accumulations.

The alpha and coverage masks are stored in NUM_CVG_BITS element arrays of which some subset of these entries is actually valid (or 'in-use') at any time. The 'in-use' entries are those which hold the current set of unique alpha values. The in-use entries are identified by a NUM_CVG_BITS bit mask where a set bit indicates that the array element at that bit index is in-use. A convention is used in which the first set bit in the coverage mask of a {unique alpha, coverage mask} pair defines which array element that pair is stored in. Consider the following example of how the array is initialized and updated with the accumulation of three fragments (using 4 subsamples):

```
Initial state (X implies a 'don't care' value):
    0b0001      // in-use mask
    { 1., 0b1111 } // alpha, coverage pairs
    { X, 0bXXXX }
    { X, 0bXXXX }
    { X, 0bXXXX }
Accumulate fragment { .5 /* alpha */, 0b0011 /* coverage mask */}
    0b0101      // in-use mask
    { .5, 0b0011 } // alpha, coverage pairs
    { X, 0bXXXX }
    { 1., 0b1100 }
    { X, 0bXXXX }
Accumulate fragment { .3, 0b1000 }
    0b1101      // in-use mask
    { .5, 0b0011 } // alpha, coverage pairs
    { X, 0bXXXX }
    { 1., 0b0100 }
    { .7, 0b1000 }
Accumulate fragment { .8, 0b0101 }
    0b1111      // in-use mask
    { .1, 0b0001 } // alpha, coverage pairs
    { .5, 0b0010 }
    { .2, 0b0100 }
    { .7, 0b1000 }
```

The initial alpha coverage array is set forth below:

| x | 1 |
|---|---|
| x | x |

The in use mask is 0001, which specifies the location where the array mask is stored. The corresponding array mask is as follows:

| xxxx | 1111 |
|---|---|
| xxxx | xxxx |

After fragment 0, the alpha coverage mask appears as follows.

| x | 0.5 |
|---|-----|
| x | 1   |

The in use mask is 0101, and the array mask is as follows:

| xxxx | 0011 |
|------|------|
| xxxx | 1100 |

For elements in the in use mask that are set, the array mask is ANDed with the coverage mask for the new fragment to determine whether there is a change in alpha value. If there is a new alpha, the new value for the array mask is computed by: array mask AND NOT coverage mask. If there is a new value for the array mask, it is stored in the appropriate location.

After fragment 1, the alpha coverage mask appears as follows.

| x   | 0.5 |
|-----|-----|
| 0.7 | 1   |

The in-use mask is 1101, and the array mask is as follows:

| xxxx | 0011 |
|------|------|
| 1000 | 0100 |

After fragment 2, the alpha coverage mask appears as follows.

| 0.5 | 0.1 |
|-----|-----|
| 0.7 | 0.2 |

The in-use mask is 1111, and the array mask is as follows:

| 0010 | 0001 |
|------|------|
| 1000 | 0100 |

The number of unique alpha values at any time is equal to the number of set bits in the in-use mask. The complete solution includes two steps. The first step is performing the necessary color accumulations, where one accumulation is required per 'in-use' entry in the coverage/alpha array. The second step is to update the coverage/alpha array with the new fragment's values.

A complete implementation of this technique (for 4×4 subsamples) is as follows. for (each fragmented pixel location) {

```
// initial state (per pixel)
InUseMask = 0x0001;
CoverageArrayMask[16] = { 0xffff, 0, . . . , 0 };
CoverageArrayAlpha[16] = { MAX_ALPHA,
MAX_ALPHA, . . . , MAX_ALPHA };
ColorAccum = 0;
while (fragment list is not empty) {
    scan fragment list and extract closest fragment (coverage,
    color, alpha);
    // accumulate this fragment's color into ColorAccum for
    each in-use element
    InUseMaskScratch = InUseMask;
    while (InUseMaskScratch != 0x0000) {
        // find first set bit in scratch in-use mask
        Index = FindFirstSetBit(InUseMaskScratch);
        // clear this bit in scratch mask
        InUseMaskScratch &= ~(0x1 << Index);
        // read old (or current) alpha for this entry - this is used
        // in updating the non-covered area (which may be
        newly 'in-use')
        AlphaOld = CoverageArrayAlpha[Index];
        // alpha scale factor - used for scaling color
        for accumulation and
        // to compute alpha for subsequent layers
        AlphaScale = AlphaOld * alpha;
        // compute alpha for next layer - use this for
        updating alpha array
        // AlphaNext = AlphaOld*(MAX_ALPHA-alpha) =
AlphaOld-AlphaOld*alpha
        AlphaNext = AlphaOld - AlphaScale;
        // compute mask for overlapped coverage - this is
        the portion of this
        // array entry which is covered by the new fragment, so
        accumulate the
        // color and update the array with new alpha value
        AccumCvgMask = coverage &
        CoverageArrayMask[Index];
        if (AccumCvgMask != 0x0000) {
            // accumulate the color
            nCoverageBits = CountSetBits(AccumCvgMask);
            ColorAccum += color*(AlphaScale *
nCoverageBits/NUM_CVG_BITS));
            // update alpha for covered portion (this may
            result in a 'new'
            // in-use element or just overwrite the old one)
            Index2 = FindFirstSetBit(AccumCvgMask);
            InUseMask |= (0x1 << Index2);
            CoverageArrayMask[Index2] = AccumCvgMask;
            CoverageArrayAlpha[Index2] = AlphaNext;
        }
        // compute the mask for the non-covered area - this is
        the portion
        // of this array entry which is unobscured by the
        new fragment, so
        // just update the coverage (the alpha stays the same)
        UpdateCvgMask = ~coverage &
        CoverageArrayMask[Index];
        if (UpdateCvgMask!= 0x0000) {
            Index2 = FindFirstSetBit(UpdateCvgMask);
            InUseMask |= (0x1 << Index2);
            // update for the non-covered area - this
            may result in a 'new'
            // in-use element or just overwrite the
```

-continued

```
old one (thus copy the
            // alpha value in case it is new . . . )
            CoverageArrayMask[Index2] = UpdateCvgMask;
            CoverageArrayAlpha[Index2] = AlphaOld;
        }
     }
  }
  ColorAccum is pixel color
}
```

The core arithmetic operation is the color accumulation, which requires a total of three multiplies per unique alpha value:

ColorAccum+=color*(alpha*AlphaOld*(nCoverageBits/ NUM_CVG_BITS));

Note that the third multiply may be somewhat simplified by the number of subsamples. For 16 subsamples, the third multiply involves 0.4 fixed point value, thus this multiplier can be a 8×4 (where the other multipliers are likely to be 8×8). Also note that, for 2**n sized coverage masks, the division shown above is merely a shift.

This technique requires a worst case total of:

$$\sum_{n=1}^{NumFrags} MIN(2^n, 16)$$

accumulations. The typical case can be much less than this because the worst case occurs only when a new fragment's coverage has both set and unset values in each 'in-use' array element.

One useful optimization is to track coverage mask locations which have fully opaque alpha value. This is useful in the case in which fragments are being generated due to partial geometric coverage and not due to non-opaque transparency values. These fragments will normally have a fully opaque transparency value. Implementing this optimization is done by maintaining an additional mask value, the OpaqueAlphaMask. The OpaqueAlphaMask is set by O-Ring in coverage masks of fragments for which the alpha is fully opaque (this is done after accumulating the fragment's contribution). This mask is then used to disregard bits in the masks of subsequent fragments, since there can be no further color contribution to the corresponding sub-samples.

Another possible optimization is to consolidate locations with identical alpha values, but this is significantly more expensive to implement, and the occurrence of identical alpha values which are not either 0 or MAX_ALPHA is not likely.

The example and pseudocode given above use a front-to-back depth sorting. It is equally possible to perform the same computations in a back-to-front depth sorting. Also, the computations given above use color components which have not been pre-multiplied by the alpha component. The same technique applies to pre-multiplied color components, with slightly different arithmetic computations (and identical control flow).

Multi-Pass Rendering

The image processor supports sophisticated multi-pass shading and lighting functions, including for example, reflection maps and multi-light source shadows. In one embodiment, the image processor supports two forms of multi-pass rendering. The first form of multi-pass rendering includes rendering geometry to generate a rendered image, storing the rendered image, and then using the rendered image in a subsequent rendering pass to render the same geometry or different geometry in the same scene. In one embodiment, these functions are carried out using the tiler and the shared memory. The tiler renders geometry to a gsprite, transfers the gsprite to shared memory, and then retrieves the gsprite from shared memory for use in a subsequent rendering pass.

The second form of multi-pass rendering includes rasterizing the same geometry in multiple passes, and performing pixel compositing operations into a rasterization buffer. In one embodiment, the tiler supports compositing functions into a rasterization buffer. The pixel engine within the tiler supports blending of pixel fragments generated during more than one rendering pass on the same geometry in a scene. The first and second form of multi-pass rendering can be used separately or combined to support advanced lighting and shading operations.

Shadows can be created using a version of the multi-pass rendering approaches outlined above. In one embodiment, shadows are created using multiple rendering passes. First, the tiler renders the scene from the perspective of a light source to generate a shadow depth map, which is then stored in gsprite memory. In a second pass, the geometry is rasterized from the perspective of the viewpoint, and each pixel is transformed back into light source coordinates. The depth of the pixels relative to the light source are compared against depth values accessed from the depth map to determine whether and to what extent the pixel is in shadow. To support this functionality, the image processor supports the following rendering modes:

Render Normal: This is the default rendering mode used for all non-shadowed geometry.

Render for Z-Map: Render to create a depth map for a light source point of view to be used as a texture in shadow luminance rendering.

Render for Shadow Luminance: Render using the shadow depth map.

Because of its support for multi-pass rendering operations as outlined above, the image processor can support a wide variety of lighting and shading operations to create many different effects. These effects include combinations of shadows, possibly from multiple light sources, reflections, and texture mapping of various lighting parameters, etc. General lighting functions are computed using a series of passes. During each pass, the tiler makes a single texture map access for each pixel rasterized. The results of each rendering pass can be combined in the rasterization buffer.

The ability to render geometry to a gsprite enables the tiler to overcome the limitations of existing systems which cannot store intermediate results. This is a major advantage because it enables the system to support a broader range of lighting and shading operations. Another advantage is that a gsprite can be mapped to other geometry in the scene or used in rendering other scenes for subsequent image frames.

An example will illustrate the concept. Consider the lighting model representing a diffuse material illuminated by two shadowing light sources, given by $D \ N \cdot L_1 s_1 + D \ N \cdot L_2 S_2$ where D is the texture-mapped diffuse color, $N \cdot L_i$ is the dot product of the polygon normal with the light direction ($L_1$ for light 1, or $L_2$ for light 2), and $s_i$ is the shadow modulation factor for light I (i.e. i=1 or 2) computed using light depth maps. Computing the shadow modulation factor with graphics hardware can be accomplished using the three pass shadowing technique introduced above. This shadowing technique requires a table lookup very similar to standard texture mapping, but accesses depths from the point of view of the light rather than colors. The depths are compared with a depth in light space interpolated over the polygon to determine whether a given point is illuminated or in shadow.

This lighting expression may be decomposed into 4 passes:

| pass | interpolated color | texture color |
|------|--------------------|---------------|
| 1 | N•L$_1$ | D |
| 2 | 1 | S$_1$ |
| 3 | N•L$_2$ | D |
| 4 | 1 | S$_2$ | where the result of each pass must be added or multiplied with previously computed terms in the lighting expression to yield the final result. The problem is that the result of pass 3 can not be blended with the result from passes 1 and 2: it must first be multiplied by the result of pass 4 before being added to the result of pass 2.

The above problem is solved in one embodiment by using gsprites to store intermediate results. For the above example of the diffuse material illuminated by two shadowing light sources, the tiler makes the four passes shown in the following table:

| pass | interpolated color | texture color | blend function | after-pass action |
|------|--------------------|---------------|----------------|-------------------|
| 1 | N•L$_1$ | D | load | none |
| 2 | 1 | S$_1$ | * | store to gsprite S |
| 3 | N•L$_2$ | D | load | none |
| 4 | 1 | S$_2$ | * | add in S |

In pass 1, the polygon is rendered interpolating N·L$_1$ and using D as the texture map. In pass 2, the product of pass 1 is multiplied (*) by s$_1$, the shadow modulation factor for light 1, and stored to gsprite S. In pass 3, the polygon is rendered interpolating N·L$_2$ and using D as the texture map. In pass 4, the product of pass 3 is multiplied by s$_2$, the shadow modulation factor for light 2. The expression D N·L$_2$s$_2$ is in the accumulator, and the expression D N·L$_1$ s$_1$ is stored in gsprite S.

The addition of the current buffer contents and the gsprite S after pass 4 is performed in a fifth pass. A texture-mapped square covering the entire image is rendered, texture-mapped by gsprite S. The blend function is set to add, effectively adding the two images. Thus, the decomposition of lighting expressions with one accumulator is solved by using one accumulator along with gsprites.

The structure and operation of the tiler as well as its interaction with shared memory are described in detail above.

Another aspect of multi-pass rendering introduced above is the capability to perform pixel compositing operations in the rasterization buffer. Above, we described aspects of the tiler relating to pixel generating and resolving in detail (See FIGS. 9A–C. for example). The tiler supports high quality antialiasing by generating fragment lists, and then resolving depth sorted fragment lists to compute final pixel values. One significant advantage of the tiler is its capability to combine fragments generated during rendering passes into the pixel and fragment buffers.

The process of blending fragments proceeds generally as follows. In a first pass, geometry in a scene is rendered to create fragments, which are stored in the fragment buffer. In a subsequent pass, the same geometry is rendered, and the fragments are blended with those in the fragment buffer.

Figure 31:
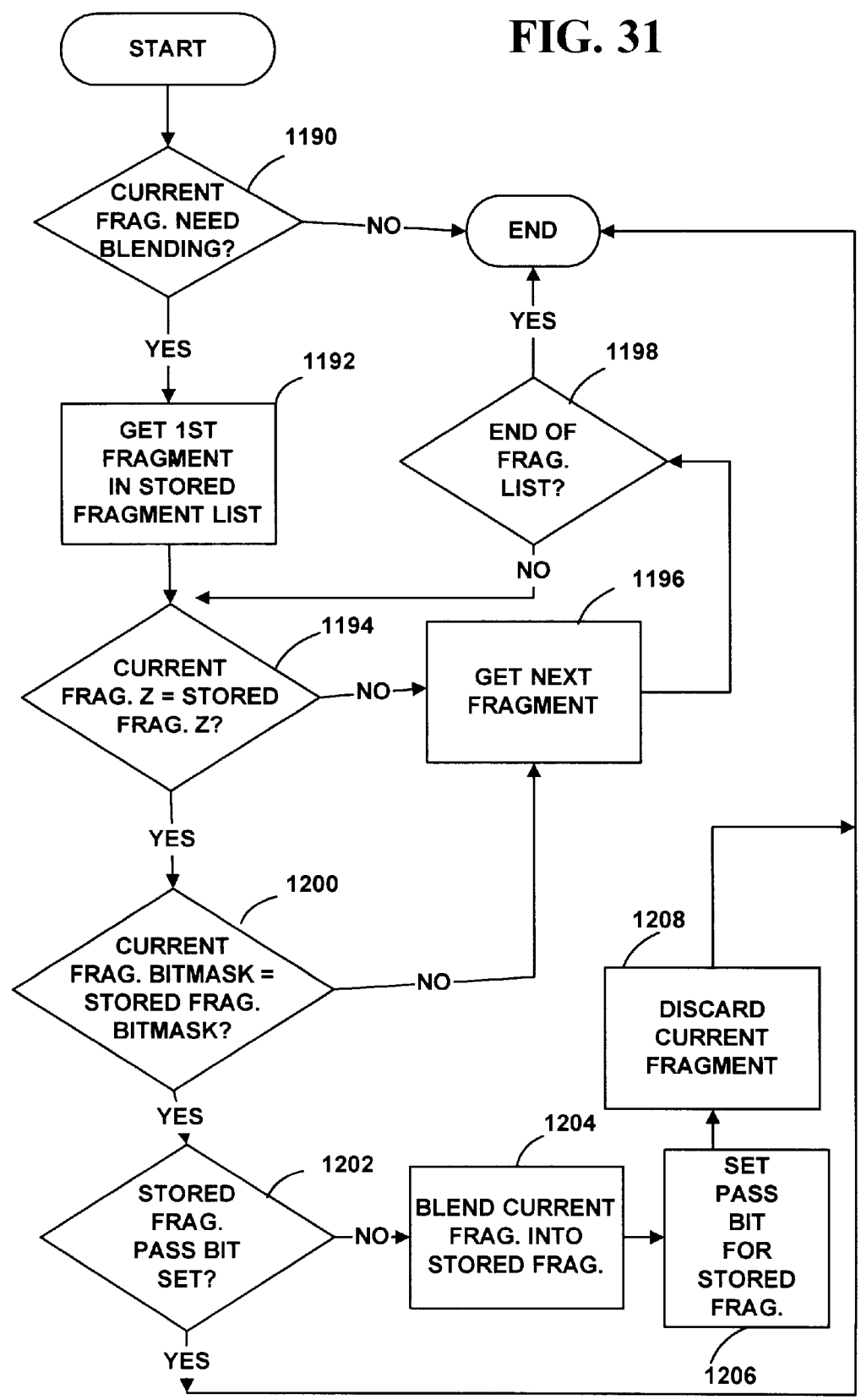
FIG. 31 is a flow diagram illustrating fragment blending in one embodiment of the invention.

FIG. 31 is a flow diagram illustrating fragment blending in one embodiment of the invention. When a fragment is generated which needs to be blended (1190), the pixel engine in the tiler attempts to blend the current fragment to a previously created fragment that represents a matching piece of geometry inside the pixel. At the specified pixel location, the pixel engine searches a stored fragment list from the beginning (1192) to find a fragment with the same Z-value as the current fragment (1194). If the stored fragment does not have the same Z-value as the current fragment, the next fragment in the stored fragment list is obtained (1 196). If all fragments in the stored fragment list are exhausted (1198) without finding a fragment with a Z-value equal to the current fragment, then the blend process ends for the current fragment, and it is discarded.

In practice, a fragment should only be discarded in the case where the pixel engine previously merged the fragment that current fragment would otherwise be blended with. In this special case, the pixel engine has already blended to the merged fragment and has set a flag to prevent the pixel engine from merging to this merged fragment more than once. The current fragment is then discarded. We describe how to prevent more than one blend to a merged fragment below.

If more than one fragment exists with the same Z-value, the pixel engine attempts to find a stored fragment with similar coverage mask. The coverage mask of the incoming pixel data does not need to match the stored coverage mask exactly, but it preferably should be a subset of the stored coverage mask. For example, an AND operation of the two coverage masks should return the current coverage mask in order for the two fragments to be considered a match. If the result of the AND operation does not produce the current coverage mask, the current coverage mask does not "match" this particular stored coverage mask.

If the Z-value of the current fragment is equal to the stored fragment Z, and the coverage mask of the current fragment matches the stored fragment coverage mask (1200), the pixel engine checks a data bit called the "pass bit" in the stored fragment. In general, the pass bit is used to prevent blending in special cases even if the pixel engine identifies a matching fragment. The pass bit is described further below. If the coverage mask of the current fragment does not match, the next fragment in the fragment list is obtained (1196), and processing continues.

The pass bit addresses a complication caused by fragment merging. As described above, fragment merging is a technique to reduce the memory required for fragment storage. When a fragment arrives with a depth value and color value close to a fragment already inserted into the fragment list for a pixel, the fragment is merged into the existing fragment rather than allocated and inserted. The complication is that the merged fragment no longer corresponds to either of the merged fragments for blending purposes. As an example, consider two fragments, A and B, having the same depth value, that are merged in the first pass to create fragment C. In the second pass, the same geometry is rendered with the blending function set to add the colors. The fragments A and B are again generated, but without special testing, are blended twice with the merged fragment C. This causes an incorrectly large contribution to the color at fragment C.

To address this complication, the tiler blends to each fragment only once per pass, ignoring additional blending from other fragments which were merged in the initial pass. This is a reasonable approximation since the colors and opacities should have been very close in order for the fragments to have been merged. An additional bit field is added to each fragment to guarantee a single blending operation per fragment per pass, called the pass bit. The blending operation is performed only if the pass bit is not set (1200). In one implementation of this feature in the tiler, a stencil plane bit is used as the pass bit to block a blend operation on a merged fragment.

Referring again to FIG. 31, if the pass bit is not set in the matching fragment in the fragment buffer (1202), then the blending operation is performed using the generalized blending described previously, but only to the color and opacity of the matched fragment (1204). The pass bit is then set for the new merged fragment (1206) so that subsequent fragments that were merged initially are no longer blended. After blending, the current fragment is then discarded (1208), and no memory is allocated to store the current fragment.

Blending into the rasterization buffer includes 1) texture or shadow modulation to produce a composed pixel value; and 2) blending the composed pixel value with the existing contents of the rasterization buffer. In the tiler, the composed pixel value can either be a fully covered, opaque pixel (pixel record), a partially covered pixel (fragment record). Partially covered pixels include pixel data generated when a primitive partially covers a pixel location, or pixel data generated when a translucent pixel partially or fully covers a pixel location. The tiler supports blending of pixel records in the pixel buffer and fragment records in the fragment buffer. In a blend operation, the composed pixel value is blended with the existing contents of the pixel or fragment buffer.

In the implementations of the tiler shown in FIG. 9, the texture filter engine determines a filtered texture value for textures, or a filtered shadow depth map value for shadows. It composes this filter result with a pixel value from the rendered scene by modulating the color and/or alpha values of the pixel value. It then passes the composed pixel value to the pixel engine. For example, in the implementation of the tiler shown in FIG. 9B, the texture filter engine 401 takes an entry from the texture reference data queue 399 and composes the entry with a filtered texel value. The pixel engine 406 then combines the composed value with a corresponding entry in the pixel or fragment buffer 408, 410.

The following table lists the notational definitions used to describe blending operations in the tiler.

| Notation | Object | Description |
| --- | --- | --- |
| C | Color | Each of R, G, and B |
| A | Alpha | Opacity |
| c | Color factor | Multiplier of a color (one each for R, G, and B) |
| a | Alpha factor | Multiplier of an alpha |
| f (subscript) | Fragment | Quantity interpolated for fragment |
| t (subscript) | Texel | Filtered quantity from texture map or shadow depth map |
| c (subscript) | Composed | Fragment quantity multiplied by texel |
| b (subscript) | Buffer | Existing quantity in color or fragment buffer |

Texture or shadow modulation applies to both colors and opacity:

$C_c = C_t C_f$ $A_c = A_t A_f$

Several blending modes can combine the composed and existing buffer values. The new buffer value (designated with a prime) is:

$C_b' = c_b C_b + c_c C_c$ $A_b' = a_b A_b + a_c A_c$

The blending mode determines a set of factors ($c_b$, $c_c$, $a_b$, $a_c$). The c values contain three components—one for each color (R, G, and B).

The following table gives the values of the color factors in each color blending mode.

| Color Blending Mode | Color Factor |
| --- | --- |
| C_Constant | (constant1, constant2, constant3) |
| C_Alpha_Composed | $(A_c, A_c, A_c)$ |
| C_Alpha_Buffer | $(A_b, A_b, A_b)$ |
| C_1-Alpha_Composed | $(1 - A_c, 1 - A_c, 1 - A_c)$ |
| C_1-Alpha_Buffer | $(1 - A_b, 1 - A_b, 1 - A_b)$ |
| C_Color_Composed | $C_c = (R_c, G_c, B_c)$ |
| C_Color_Buffer | $C_b = (R_b, G_b, B_b)$ |

The following table gives the values of the alpha factor in each alpha blending mode.

| Alpha Blending Mode | Alpha Factor |
| --- | --- |
| A_Constant | constant |
| A_Alpha_Composed | $A_c$ |
| A_Alpha_Buffer | $A_b$ |
| A_1-Alpha_Composed | $1 - A_c$ |
| A_1-Alpha_Buffer | $1 - A_b$ |

A wide range of color and alpha combinations are possible by manipulating two factors:

1) The color blending and alpha blending modes; and
2) The constants C_Constant and A_Constant, which when set to either zero or one effect simple accumulation of passes.

In sum, the tiler supports a generalized blending function by combining multi-pass rendering with fragment list processing. While we have described a specific approach to blending fragments, this approach can be modified and used in different architectures without departing from the scope of the invention. The specific hardware used to implement fragment processing can vary. For example, the pixel engine and fragment buffers can be implemented using a variety of different hardware components. At a higher level, it is not necessary that the fragment processing hardware be implemented in a chunking architecture. Other architectures, such as architectures employing parallel processing engines, can be used in the alternative.

When rendering objects with different lighting models, some of which require decomposition to gsprites, it is sometimes necessary to render some of the geometry in black in order to perform antialiasing. This occurs because gsprites do not retain depth or fragment list information from the rendering, only a single color and opacity. If an object T requires multiple passes and is contained in a background scene requiring only a single pass (e.g. a spaceship occluded by a group of trees), then the background must be rendered in black for some of the passes required for T. The rendering is needed in order to properly occlude hidden parts of T so that the resulting image can be combined with previous results using purely 2-D operations.

In one embodiment, this "extraneous" rendering is eliminated with the addition of a color-clear operation. The color-clear operation clears color values for pixels in the pixel buffer to zero (black) while retaining the Z-values, and clears the color values for the corresponding fragments in the fragment buffer to zero (black) while retaining the Z-values, coverage masks, and opacity of the fragments.

Consider as an example, a scene containing an object T requiring four passes (e.g. a texture mapped object, a spaceship T, illuminated by two shadowing light sources) among a set of objects requiring a single pass (e.g. a forest of trees, some of which occlude the object). An approach including rendering some geometry to black occurs as follows:

1. Render the background and T fully illuminated by light 1.
2. Render T for light 1 shadow modulation and blend in using multiply blend mode.
3. Save the resulting image.
4. Render the background in black and T fully illuminated by light 2.
5. Render T for light 2 shadow modulation and blend in using multiply blend mode.
6. Add in the image saved from step 3.

The background is rendered to black in step 4 because proper antialiased hidden surface elimination in case T is occluded by the background. Since the background contribution was already added in step 1, the background contribution is drawn in black in step 4 to avoid increasing its contribution when the two images are added. In this example, the amount of duplicated work (i.e. the work of drawing the background again but in black) is a small fraction of the total work. However, if T requires many passes and the background geometry is complex with respect to T's geometry, the duplicated work becomes significant.

In one embodiment, the duplicated work is eliminated. A color-clear operation is added which clears the color values in every pixel fragment to zero without changing the fragments' Z-values, coverage masks, or opacity. Rendering is performed on all the geometry so that antialiased hidden surface removal is performed once. The color-clear passes do not insert any more fragments; they simple blend colors into existing fragments. The color-clear operation allows the state to be reset in order to begin accumulating another term in the lighting expression. This avoids computing duplicate renderings of geometry with the color set to black.

With the color-clear capability, the example graphics scene would be rendered with these steps:

1. Render the background and T fully illuminated by light 1.
2. Render T for light 1 shadow modulation and blend in using multiply blending mode.
*3. Save the resulting image and invoke color-clear.
*4. Render T fully illuminated by light 2.
5. Render T for light 2 shadow modulation and blend in using multiply blend mode.
6. Add in the image save from step 3.

Note the difference in steps 3 and 4 in the new scheme from the prior example without color clear. As a result of the color clear operation, a significant improvement in processing is achieved by eliminating duplicated work for processing the background colors of complex graphics image.

To further optimize processing, an additional bit of memory at each pixel can be used to indicate whether any fragments in that pixel have been blended to. This makes both the color-clear and fragment resolution operations easier since only pixels that have been modified need to be cleared (e.g. by the color-clear operation) or computed (e.g. for fragment resolution). During fragment resolution, pixels that have not been blended to immediately output zero for their colors and opacities into the destination gsprite. This bit saves a significant amount of work if many pixels have not been blended to, regardless of how many fragments these untouched pixels contain.

In another embodiment of the invention, a color-opacity-clear operation is used instead of a color-clear operation. If objects have a static transparency, that is the transparency is not changing across illuminating passes, the color-clear operation leaves the fragment transparencies alone. If the geometry does not have static transparency across illumination passes, then a color-opacity operation is used instead. The color-opacity operation clears the modeling opacities in each fragment to one so that the multi-pass decomposition can happen on the opacities as well as the colors. That is, the color-opacity operation will clear the color values in every pixel fragment (by setting them to zero), while clearing the opacities in each fragment (by setting them to one). The opacities cleared are the modeling opacities rather than "transparency" due to partial coverage of the fragment. The blending modes described above allow the fragment opacity to be blended to as well as the fragment color. The color-opacity clear operation also significantly improves processing by eliminating duplicated work for processing the background opacity of a complex graphics image.

In the tiler shown in FIGS. 9A–9C, the pixel engine 406 performs the color and opacity clear operations. To perform the color clear, the pixel buffer sets the color values in the pixel buffer and corresponding fragment list in the fragment buffer to zero. Similarly, to perform an opacity clear, the pixel buffer sets the alpha values in the pixel buffer and corresponding fragment list to zero.

We have described various aspects of an graphics processing system, its architecture, and associated methods with references to several embodiments. While we have described several embodiments in detail, we do not intend to limit our invention to these specific embodiments. For example, multi-pass rendering techniques described above can be implemented in different graphics architectures. The specific components of the tiler (FIGS. 9A–C) can be modified without departing from the scope of the invention. Variation of our systems and methods can be implemented in hardware or software or a combination of both.

Figure 32:
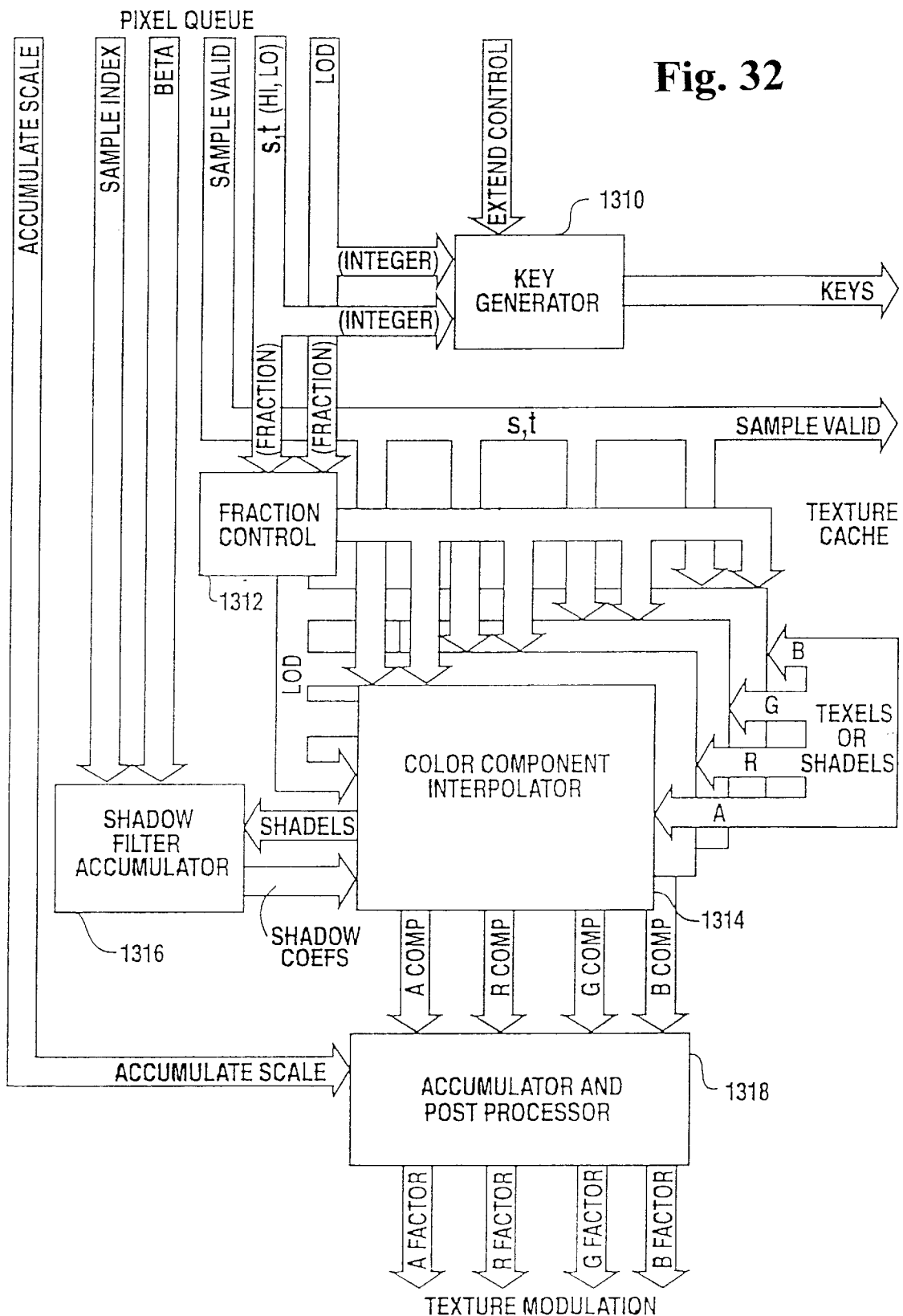
FIG. 32 is a block diagram illustrating an implementation of a texture and shadow filter.

FIG. 32 is a block diagram illustrating one implementation of the texture filter engine (401, FIG. 9B). The texture filter engine reads instances of texture reference data from a pixel queue (texture reference data queue 399 in FIG. 9B) and computes alpha and color values (alpha, and RGB color factors) or shadow coefficients for these instances. This implementation supports both texture and shadow filtering. For texture mapping operations, the texture filter engine computes texture colors and alpha, and filters the texture colors to compute alpha and color factors. For shadowing operations, the texture filter engine performs depth compares and filters the resulting values to compute shadow attenuation coefficients (s).

The pixel queue receives texture reference data from a rasterizer (such as the scan convert block 395 in FIG. 9B) and acts as a FIFO buffer to the texture filter engine 401. The "sample valid" data specifies which samples in a set of texture or shadow map elements fetched from the texture cache are valid for the current filtering operation.

For a texture mapping operation, the texture reference data includes the coordinates of a pixel location mapped into the texture, (s,t). To support tri-linear MIP-mapping, the inputs include the (s,t) coordinates for the two closest MIP map levels (hi, lo) and the level of detail (LOD). The "accumulate scale" data is used to control weighting factors applied to the output of the color component interpolators. The "extend control" data are data bits that control texture extend modes. The texture extend modes instruct the texture filter engine to perform either a clamp, wrap, or reflect operation when a texture request is outside the texture map area.

For shadowing operations, the inputs include a sample index, (s,t) coordinates of a pixel location mapped into the shadow map, and a beta, which represents the depth of the geometric primitive from the light source for a given pixel location. The sample index relates to the specific manner in which the shadow filter operates on shadow map elements or "samples." In this specific implementation, the texture filter engine operates on 8 samples per clock cycle. In the case of shadow filtering, these samples correspond to a 4×2 grid. For example, the shadow filter operates on a total of 2 sets of samples for 4×4 mode (4×2+4×2=4×4) and 8 sets for the 8×8 mode. In the case of 4×4 mode, the shadow filter applies a 3×3 filter four times, one each to the upper left, upper right, lower left, and lower right 3×3 blocks in the 4×4 overall footprint. In the first clock cycle, it processes the upper 4×2 grid and in the second clock it processes the lower 4×2 grid in the 4×4 block. The sample index is an index used to identify the set of 8 samples currently being processed. The sample index steps through 2 clock cycles for the 4×4 case and 8 clock cycles for the 8×8 case and identifies which 4×2 subset is currently being processed.

As shown in FIG. 32, the texture filter engine includes a key generator 1310, fraction control 1312, color component interpolator 1314, shadow filter accumulator 1316, and accumulator and post-processor 1318.

In a texture mapping operation, the key generator 1310 reads the (s,t) coordinates and LOD and generates the cache keys to fetch corresponding texture data from the texture cache. The texture cache returns alpha and the RGB components in response to the texture requests. The fraction control 1312 receives the (s,t) coordinates as input and controls the operation of bi-linear and/or tri-linear interpolators in the color component interpolator 1314. The color component interpolator 1314 interpolates the texel samples to compute interpolated alpha and RGB components. The accumulator and post-post processor 1318 then scales the alpha and RGB components, accumulates the scaled components, and outputs alpha and color factors corresponding to a pixel location currently being processed. These alpha and color factors are color and alpha values input to the pixel engine, as input to the texture modulation process.

In anisotropic texture mapping, the color component interpolators 1314 walk along the line of anisotropy and perform tri-linear interpolation at each step. The accumulator 1318 acts as a one dimensional filter, scaling the alpha and color components and then accumulating the scaled components. In one specific embodiment, the accumulator 1318 scales the alpha and color components using trapezoidal or triangle filtering based on the ratio of anisotropy. In either case, the accumulator scales components at the far edges of the resampling filter to approximate a roll-off at the filter edges. To achieve trapezoidal filtering, the scale factor corresponds to a linear roll-off at the filter edges and is a constant at steps between the filter edges.

In one specific implementation, the scale factors for steps along the line of anisotropy are computed as follows. For an anisotropy ratio from 1 to 1 up to 2 to 1, the accumulator applies a weighting factor of 0.5 at each step of the anisotropic walker. For an anisotropy ratio of 2 to 1 and greater: the accumulator weights components by 1./anisotropy for steps n<(anisotropy-1)/2; and weights components by 0.5 (anisotropy-2n)/anisotropy for n greater than or equal to (anisotropy-1)/2. The anisotropy ratio in this specific example is the ratio of the long to the short side of the best fit rectangle for an inverse Jacobian matrix. The inverse Jacobian matrix is a matrix of partial derivatives of the geometric transform from view space coordinates to texture coordinates (i.e., from (x,y) to (s,t) coordinates). The line of anisotropy is a line through the (s,t) coordinates in the direction of the longer column vector of the inverse Jacobian matrix.

For shadowing operations, the key generator 1310 reads the (s,t) coordinates of the pixel location mapped into the shadow map and generates cache keys. The texture cache returns shadow map elements (shadels) to the shadow filter accumulator 1316. The shadow filter receives the shadow index and beta as input, and compares the depth of the current instance of pixel data in light space with the depth values in the filter footprint to generate a shadow mask. The shadow filter accumulator sums elements in the shadow mask and divides the sum by the number of samples. In this implementation, the texture filter engine achieves the smooth roll off at the edges of the filter footprint by applying a trapezoidal filter to the result of the depth compare step. To implement the trapezoidal filter, the shadow accumulation filter computes four preliminary shadow coefficients by applying a 3×3, or 7×7 box filter four times to a 4×4 or 8×8 filter footprint, respectively and passes the four preliminary coefficients to one of the color interpolators 1314. This color interpolator 1314 performs bilinear interpolation on the preliminary coefficients to compute a final shadow coefficient.

Figure 33:
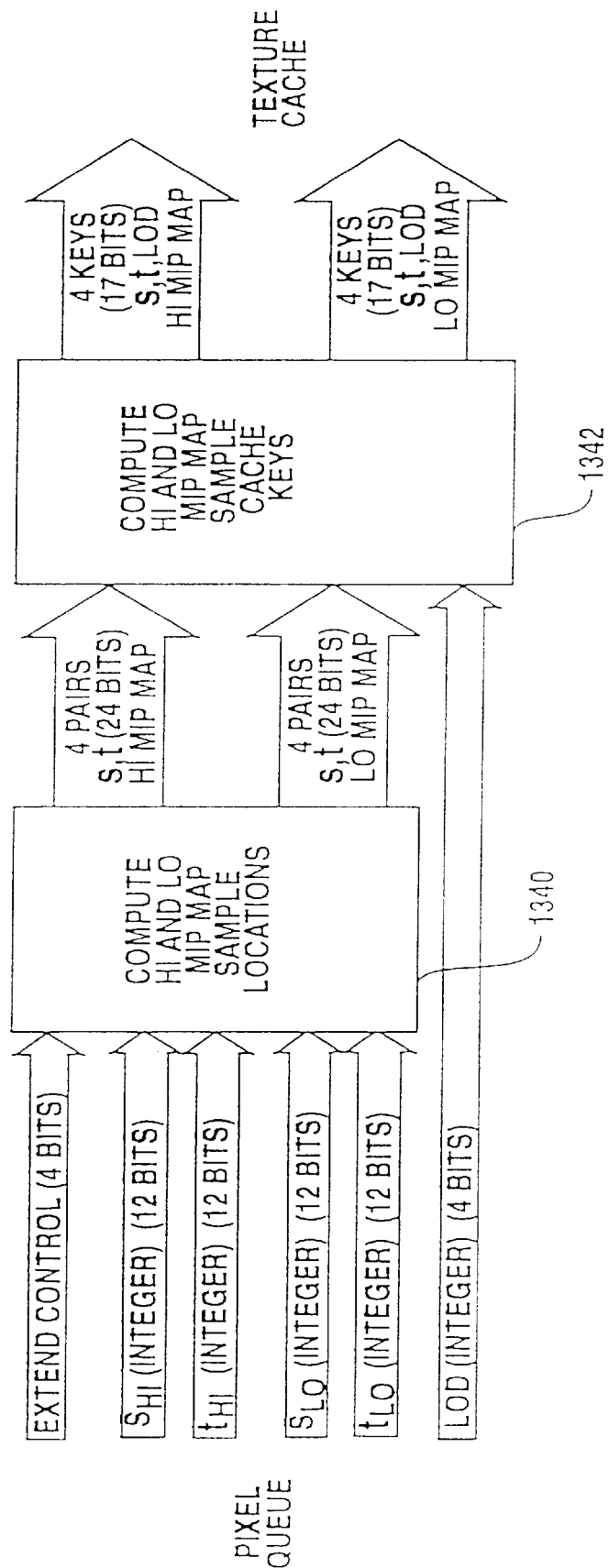
FIG. 33 is a block diagram illustrating an implementation of the key generator in FIG. 32.

As introduced above, the key generator 1310 reads (s,t) coordinates from the pixel queue and generates cache keys to fetch texture data from the texture cache. FIG. 33 is a block diagram illustrating the key generator in more detail. Based on the (s,t) coordinates in the hi and lo MIP maps (the two closest MIP maps), the key generator computes the texture sample locations in the hi and lo MIP maps (1340). The key generator then computes the cache keys from these samples (1342). The key generator transfers the cache keys, (s,t) coordinates and LOD for the hi and lo MIP map levels to the texture cache, which returns the requested texture samples. Of course, if only one texture map level of detail is used, the key generator only generates keys for one texture map.

The fraction control 1312 in FIG. 32 controls the interpolation between samples in a texture or shadow map, and between MIP map levels for tri-linear interpolation. To support bi-linear interpolation, the fraction control controls weighting between samples in a texture or shadow map. To support tri-linear interpolation, the fraction control instructs the interpolators to interpolate between the four nearest samples to a point mapped into the two closest MIP map levels (bi-linear interpolation) and then instructs a linear interpolator to blend the result from the two MIP map levels. The fraction control receives the LOD and (s,t) coordinates for the hi and lo MIP map levels as input and controls interpolation between samples at each MIP level and between MIP map levels.

Figure 34:
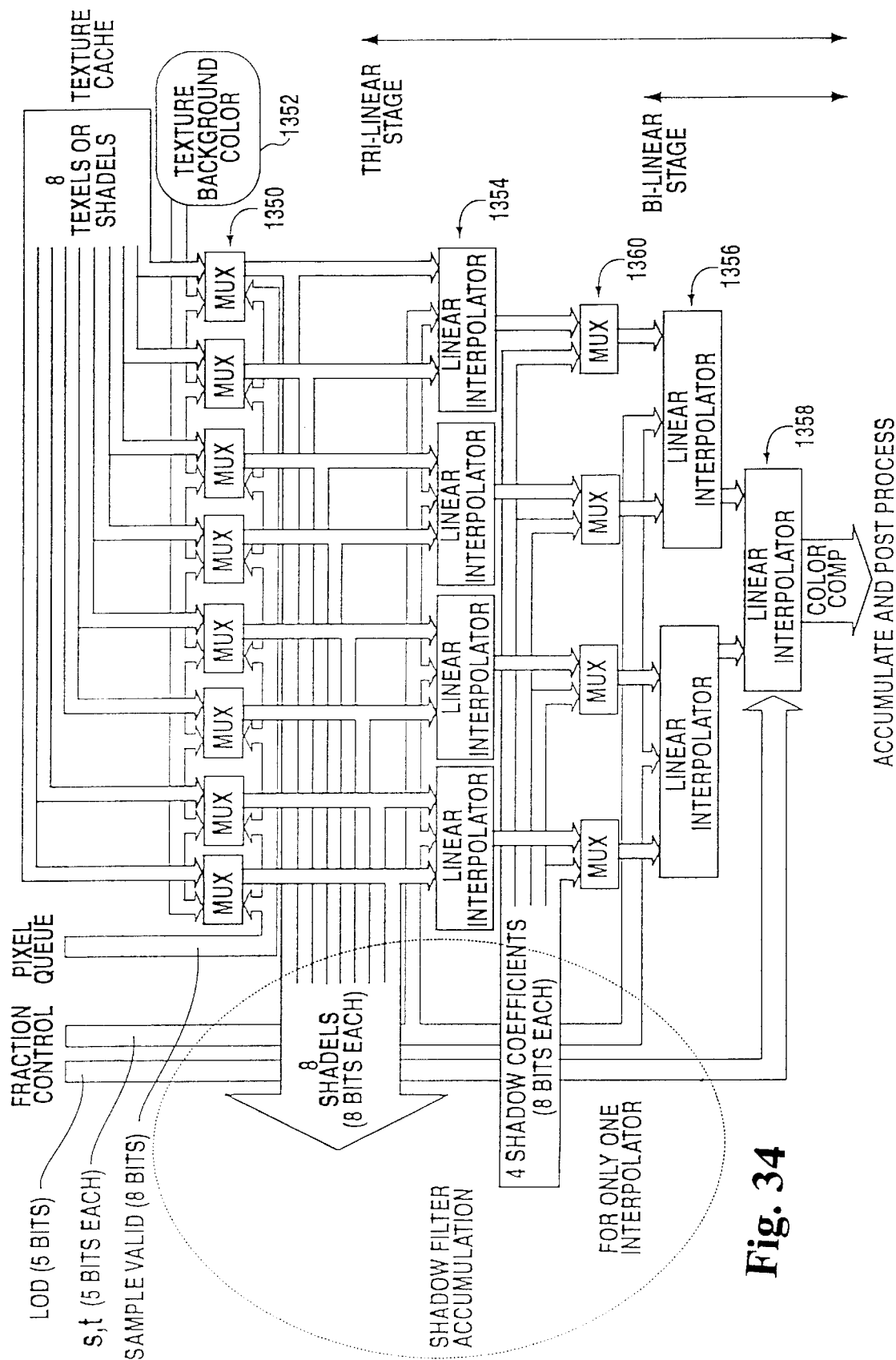
FIG. 34 is a block diagram illustrating an implementation of the color interpolators in FIG. 32.

The color component interpolator 1314 includes interpolators for alpha and RGB color components. FIG. 34 is a block diagram illustrating one of the four interpolators in more detail. This interpolator handles color component interpolation for one component and performs bi-linear interpolation on shadow coefficients. The other color component interpolators handle only a color component.

The color component interpolator receives texels or shadow map elements from the texture cache and applies them to a bank of multiplexers 1350. When input to the bank of multiplexers 1350, the sample valid data specifies which of the samples are valid, i.e. those that should be used for the current texture or shadowing operation. Based on the sample valid control signals, the multiplexers select either the incoming sample or a texture background color 1352. For shadowing operations, the color component interpolator 1314 passes shadow elements to the shadow filter accumulator 1316. The three color channels are used to form a single 34 bit wide shadow map element, and the alpha channel is ignored in shadowing operations. For texture mapping operations, the color component interpolator transfers texture samples to the stages of linear interpolators 1354, 1356 and 1358.

In tri-linear interpolation, the color component interpolator uses three stages of linear interpolators, two to interpolate between samples at each MIP map level (1354 and 1356), and another to blend the result from each MIP level (1358). The color component interpolator performs bi-linear interpolation to combine shadow coefficients computed from 4 filter footprints. As shown in FIG. 34, it uses the last two stages (1356 and 1358) to perform this bi-linear interpolation. A second bank of multiplexers 1360 selects between four shadow coefficients and the output of the first stage of linear interpolators 1354. In both texture mapping and shadowing operations, the color component interpolator transfers the output of the interpolator stages to the accumulator and post-processor 1318.

Figure 35:
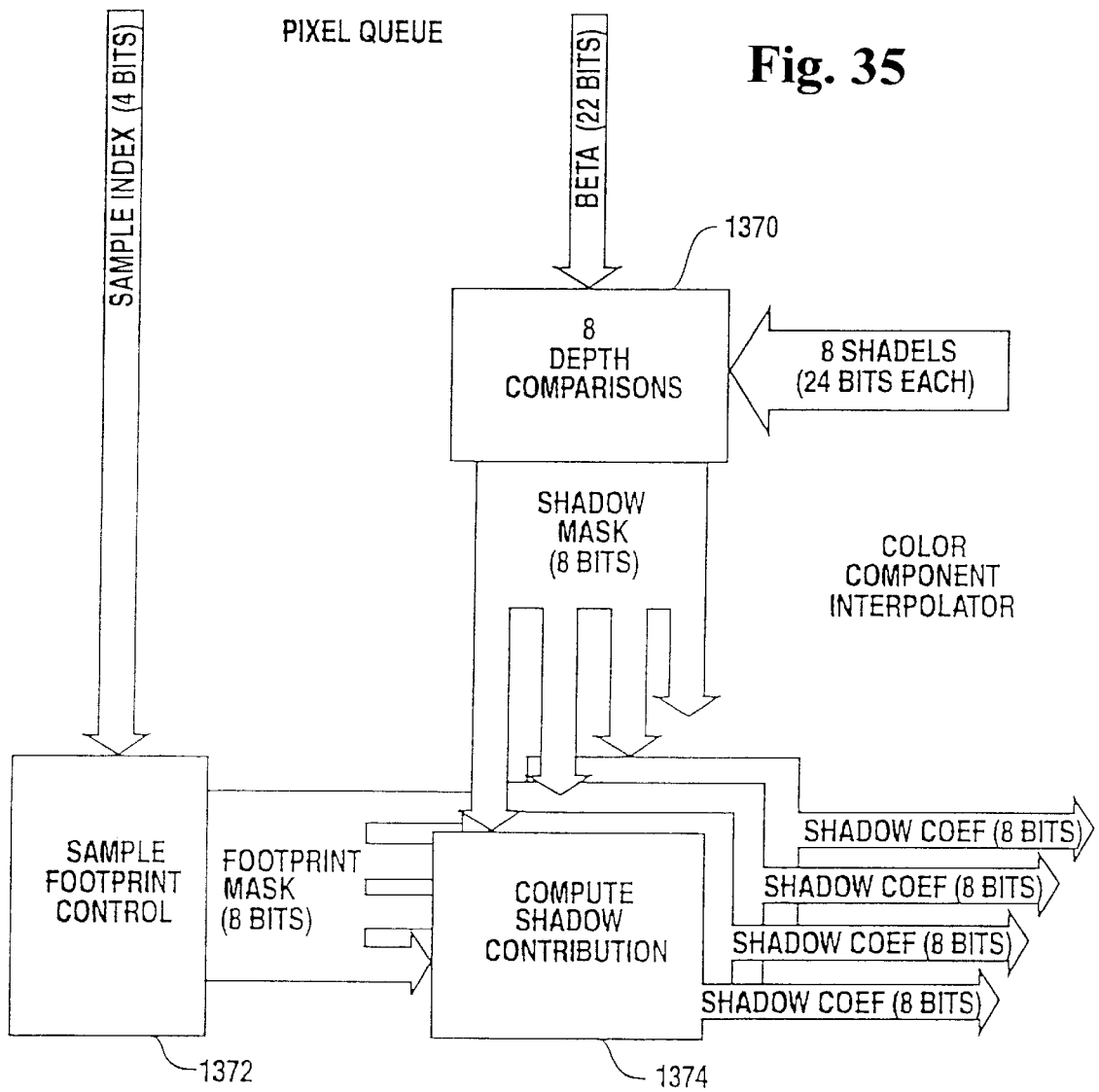
FIG. 35 is a block diagram illustrating an implementation of the shadow filter accumulator in FIG. 32.

The shadow filter accumulator 1316 receives a sample index and light depth value (beta) from the pixel queue, compares the light depth value with shadow map elements returned from the texture cache to generate shadow masks, and filters the shadow masks to compute preliminary shadow coefficients. FIG. 35 is a block diagram illustrating the shadow filter accumulator in more detail. Depth comparators in the shadow filter accumulator compare the depth of the shadow elements in the filter footprint and generate a shadow mask. In this particular case, the shadow mask is 8 bits with boolean values corresponding to a 4×2 section of the filter footprint.

The footprint control 1372 selects the current 4×2 section of the overall footprint based on the sample index value from the pixel queue. The footprint control transfers a footprint mask to each of four shadow contribution blocks based on the clock cycle and the filtering mode (2×2, 4×4 or 8×8). The footprint mask indicates which of the 8 shadow mask elements are valid at the current clock cycle for each of four box filters, in the 4×4 and 8×8 modes. In the two by two mode, the shadow filter accumulator outputs four booleans indicating whether each of the four nearest samples are in shadow or not.

As noted above, the shadow filter accumulator applies four box filters (3×3 or 7×7, e.g.) to the samples in the filter footprint. Each of the shadow contribution blocks combine the footprint mask and the shadow mask to determine which elements of the shadow mask are valid for the current clock cycle and then sum the valid elements. After accumulating the valid elements in the shadow mask for the entire filter footprint, the shadow contribution blocks divide the sum by the number of samples to compute preliminary shadow coefficients, which are transferred to a bi-linear interpolation stage in the color interpolator. The color interpolator then interpolates between the four preliminary shadow coefficients to compute a final shadow coefficient.

Figure 36:
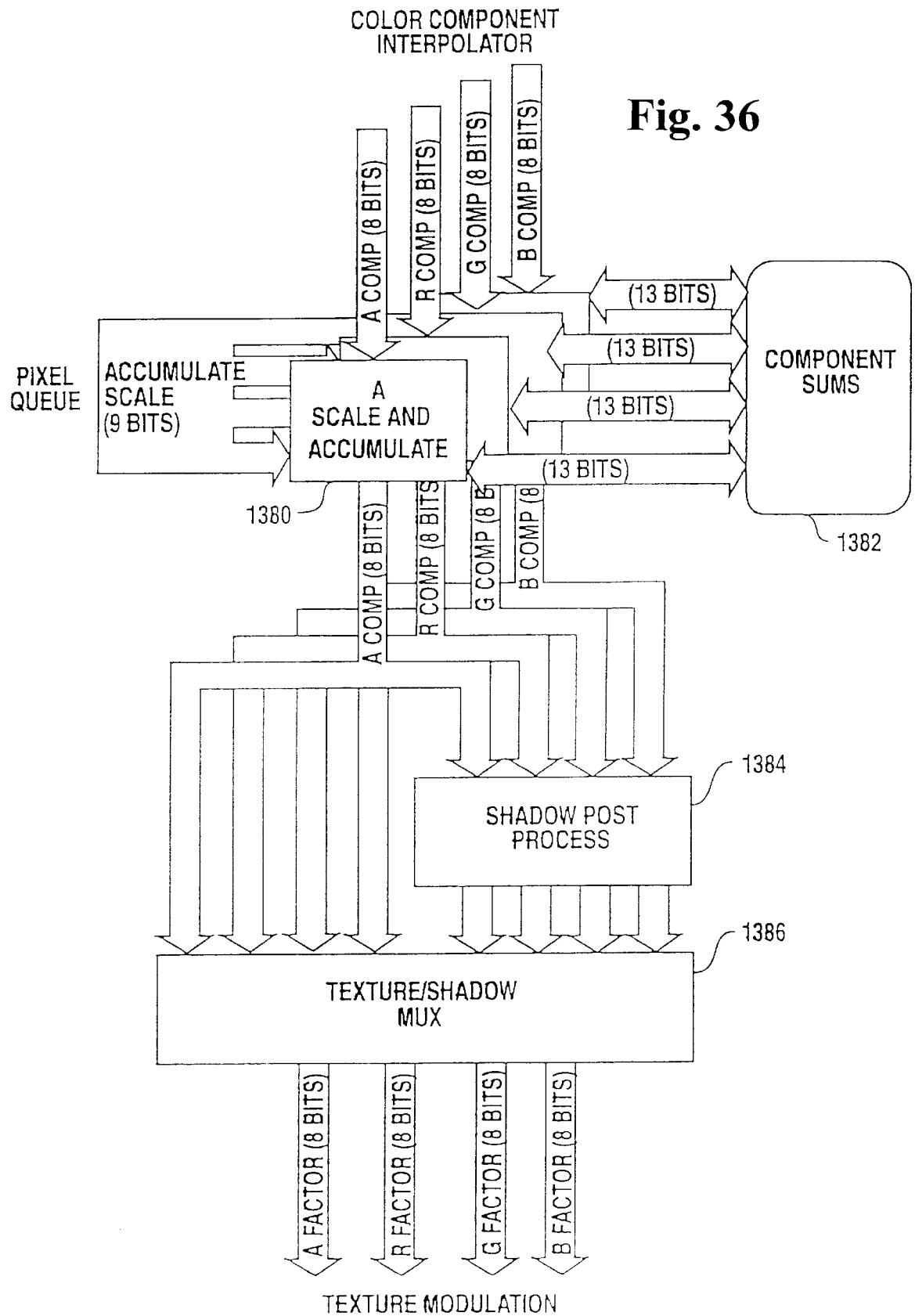
FIG. 36 is a block diagram illustrating an implementation of the accumulator and post processor in FIG. 32.

The accumulator and post-processor 1318 receives alpha and color components from the color component interpolator 1314 and computes color and alpha factors for each instance of texture reference data. For shadowing operations, the texture filter engine uses one channel (alpha or RGB) to compute a shadow attenuation coefficient. The shadow filtering logic can also be implemented separately. FIG. 36 is a block diagram illustrating the accumulator and post-processor in more detail. As shown, each color component (alpha and RGB) has a scale and accumulator. The scale and accumulator 1380 for each component receives the accumulation scale and a color component as input, and in response, scales the color component and adds it to an accumulated component value in the component sum block 1382. For example, in anisotropic filtering, the scale and accumulate blocks 1380 weight the output of the reconstruction filter (tri-linear interpolator), as the texture filter engine walks along the line of anisotropy. After the last step, the scale and accumulators for alpha and RGB components output the final color component factors.

For shadowing operations, the scale and accumulate block bypasses the multiply operation but adds an ambient offset. The ambient offset ensures that even objects totally in shadow will still be visible. For example, a shadow coefficient of 1 means totally illuminated, a shadow coefficient of 0 means totally in shadow. If colors were multiplied by a coefficient of zero, the object would not be visible at that pixel location. Thus, an offset is added and the shadow coefficients are clamped to 1 such that the offset shadow coefficients range from the offset value to 1.

The shadow post processor 1384 does the replication of the scalar shadow attenuation 's' to all 3 color channels and (conditionally) to the alpha channel. There is also a conditional complimenting (s=1−s) of the shadow attenuation for to compute a shadow image. A shadow image is an array of shadow coefficients or an array of the compliments of shadow coefficients which may be used to shadow a gsprite.

Finally, the multiplexer stage 1386 selects either the shadow coefficients, for a shadowing operations, or RGB and alpha components for texture mapping operations. In sum, the texture filter engine 401 performs both shadowing and texturing operations. It passes the result of texture mapping operations to a texture modulation stage. Texture modulation typically includes multiplying the RGB color values from the texture filter by an interpolated color or color values computed in the scan convert block. In addition for graphical objects with translucency, texture modulation can also include multiplying the alpha value from the texture filter by an interpolated alpha value from the scan convert block. Depending on the implementation, texture modulation can be implemented in the texture filter engine (element 401 in FIG. 9B) or the pixel engine (element 406 in FIG. 9B).

It may also be implemented in the scan convert block (element 394 in FIG. 9A or element 397 in FIG. 9C). In one implementation, the texture filter engine 401 combines an interpolated value with the filtered value to compute a composed value. The pixel engine 406 then determines whether to store or combine a composed value with a corresponding RGB component or alpha component stored in the pixel or fragment buffers for a corresponding pixel location.

In the case of shadowing operations, the shadow coefficients can be applied to the RGB and alpha values at corresponding pixel locations in the pixel or fragment buffers, or to interpolated RGB or alpha values generated during the current pass and buffered in a queue. For example, if an object does not have a texture associated with it, the texture modulator in the texture filter engine 401 can multiply interpolated and un-resolved RGB and alpha values representing the lit image and stored in the texture reference data queue 391 (FIG. 9B) by the shadow attenuation coefficients from the accumulator and post processor.

We have described various aspects of an graphics processing system, its architecture, and associated methods with references to several embodiments. While we have described several embodiments in detail, we do not intend to limit our invention to these specific embodiments. For example, multi-pass rendering techniques described above can be implemented in different graphics architectures. The specific components of the tiler (FIGS. 9A–C) can be modified without departing from the scope of the invention. Variation of our systems and methods can be implemented in hardware or software or a combination of both.

In view of the many possible embodiments to which the principles of our invention may be put, we emphasize that the detailed embodiments described above are illustrative only and should not be taken as limiting the scope of our invention. Rather, we claim as our invention all such embodiments as may come within the scope and spirit of the following claims and equivalents to these claims.

We claim:

1. In a graphics processing system, a method for rendering geometric primitives in a view volume to compute a display image for a view space at a computational rate greater than 10 Hz, the method comprising:

rendering a first set of geometric primitives in a first pass including rasterizing the first set of geometric primitives to generate pixel data, storing the pixel data in a rasterization buffer, including sub-pixel anti-aliasing data, resolving the pixel data, including the sub-pixel anti-aliasing data, in the rasterization buffer to compute anti-aliased pixel data, and transferring the anti-aliased pixel data to a memory device, wherein the first set of geometric primitives represents a first object, the first object is rendered to a first anti-aliased image layer such that the first anti-aliased image layer is independently accessible as a texture map for use in texture mapping operations in other rendering passes within a computational period of the display image, the first object is rendered to sub-divided 2D regions of the view space, and each of the anti-aliased images corresponding to the 2D regions are independently accessible for texture mapping operations;

performing a subsequent rendering pass including rasterizing the first set of geometric primitives using the anti-aliased pixel data as a texture to produce rendered image data;

generating the display image from the rendered image data at the computational rate; and repeating the above steps to produce subsequent display images at the computational rate.

2. The method of claim 1 wherein the first rasterizing step includes:

rasterizing the first set of geometric primitives to generate a first set of pixel data and storing the first set of pixel data in the rasterization buffer;

rasterizing the first set of geometric primitives to generate a second set of pixel data; and blending the first and second sets of pixel data, including blending sub-pixel anti-aliasing data for corresponding pixel locations in the first and second sets of pixel data before the pixel data is resolved into a single instance of color values per pixel.

3. The method of claim 2 wherein the first and second sets of pixel data include fragment records having color and depth data;

and the blending of the first and second sets of pixel data includes blending the fragment records for corresponding pixel locations.

4. The method of claim 3 wherein the step of storing the first set of pixel data in the rasterization buffer includes storing fragment records in fragment lists, the fragment lists corresponding to pixel locations; and the step of blending the fragment records includes:

for a fragment record in the second set of pixel data corresponding to a first pixel location, searching a fragment list corresponding to the first pixel location for a stored fragment record having the same depth value as the fragment record; and blending the fragment record with a stored fragment record having the same depth value.

5. The method of claim 1 wherein the computational rate is at least about equal to the frame refresh rate of a physical output device.

6. The method of claim 1 wherein the computational rate is greater than or equal to 50 Hz.

7. The method of claim 1 further including:

rendering a second set of geometric primitives representing a second object in the scene to a second anti-aliased image layer, such that the first and second anti-aliased image layers are independently accessible as texture maps for use in texture mapping operations in other rendering passes within a computational period of the display image.

8. In an image processing system, a method for rendering geometric primitives in a view volume to compute an image for a view space at a computational rate, the method comprising:

in a first rendering pass, rasterizing geometric primitives to generate pixel data including fragment records having color and depth data and corresponding to pixel locations in the image;

storing the pixel data from the first rendering pass including the fragment records in a rasterization buffer;

in a second rendering pass, generating pixel data including fragment records corresponding to the pixel locations in the image; and blending the color data of the fragment records from the first rendering pass stored in the rasterization buffer with the color data of the fragment records generated in the second rendering pass, including searching fragments records corresponding to a location of an incoming fragment generated in the second pass to find a fragment record from the first rendering pass that is likely to originate from the same geometric primitive as the incoming fragment;

storing blended fragment records in the rasterization buffer; and resolving the blended fragment records in the rasterization buffer to produce resolved image data, wherein the first and second rendering passes comprise rasterizing a subset of the geometric primitives in the view volume corresponding to an object, and rasterizing portions of the object to sub-regions of the view space corresponding to each of the portions of the object, such that the rasterization buffer is used to render each of the portions, one portion of the object at a time.

9. The method of claim 8 wherein fragment records include alpha data and the blending step includes blending the color and alpha data of the fragment records from the first rendering pass stored in the rasterization buffer with the color and alpha data of the fragment records generated in the second rendering pass.

10. The method of claim 8 wherein the blending step includes:

for an incoming fragment record generated in the second pass for a pixel location, searching fragment records stored in the rasterization buffer corresponding to the pixel location to find a stored fragment record with the same depth value as the incoming fragment; and blending the incoming fragment record with a stored fragment having the same depth value as the incoming fragment.

11. The method of claim 9 wherein the fragment records have coverage masks, and including the step of:

finding a fragment record having a matching coverage mask; and blending the incoming fragment record with the stored fragment having the matching coverage mask.

12. The method of claim 11 further including checking whether the stored fragment having the matching coverage mask has been merged in a previous rendering pass; and if so, not performing the blending step.

13. The method of claim 8 further including:

storing the resolved image data in memory;

in a third rendering pass, rasterizing geometric primitives to generate pixel data including fragment records for the pixel locations;

and storing the pixel data from the third rendering pass including the fragment records in the rasterization buffer;

retrieving the resolved image data from memory and combining the resolved image data with pixel data from the third rendering pass stored in the rasterization buffer.

14. A system for rendering geometric primitives in a view volume to compute a display image for a view space at a computational rate, the system comprising:

a rasterization buffer;

a rasterizer operable to read geometric primitive data, operable to read rendering control commands, and operable to generate sets of pixel data in multiple rendering passes for a corresponding set of the geometric primitive data in response to a multi-pass rendering control command, wherein each of the sets of pixel data correspond to a 2D image region of a view space, the rasterizer is operable to generate the sets of pixel data in series for one region at a time, the 2D regions correspond to sub-regions of a 2D projection of an object, and the sets of geometric primitives comprise portions of the object;

a pixel engine in communication with the rasterizer to receive the sets of pixel data for the multiple rendering passes, operable to control transfer of at least a first set of selected fragment records to the rasterization buffer, and operable to blend selected fragment records from one or more subsequent rendering passes with corresponding selected fragment records from one or more previous rendering passes stored in the rasterization buffer, the rasterization buffer operable to store blended fragment records after the one or more subsequent rendering passes; and a pixel post processor in communication with the rasterization buffer operable to resolve blended fragment records and compute anti-aliased sets of a pixel data for each of the image regions and operable to store the anti-aliased set of pixel data for each image region in a memory device such that each image region is independently accessible to the rasterizer and the rasterizer is operable to independently retrieve each of the anti-aliased sets of pixel data for use as texture samples.

15. The system of claim 14 wherein the rasterization buffer includes a fragment buffer to store the blended fragment records and a pixel buffer to store pixel records; and wherein the pixel engine is in communication with the rasterizer to control transfer of the pixel records to the rasterization buffer.

16. The system of claim 15 wherein the fragment buffer is dual ported, and further including an antialiasing engine in communication with the fragment buffer to resolve the blended fragment records stored in the fragment buffer for a first pixel region, while the pixel engine transfers selected fragment records to the fragment buffer for a second pixel region.

17. The system of claim 15 wherein the fragment buffer is double buffered, and further including an antialiasing engine in communication with the fragment buffer to resolve blended fragment records stored in the fragment buffer for a first pixel region, while the pixel engine transfers selected fragment records to the fragment buffer for a second pixel region.

18. The system of claim 14 further including a texture cache, wherein the rasterizer is in communication with the texture cache to read texture data and to generate a set of pixel data of the sets of pixel data using the texture data.

19. A system for rendering geometric primitives in a view volume to compute a display image for a view space at a computational rate, the system comprising:

gsprite memory;

a texture cache;

a rasterization buffer;

a rasterizer operable to read geometric primitive data, operable to read rendering control commands, and to generate pixel data for a corresponding set of the geometric primitive data in response to a rendering control command, the rasterizer including an interpolator for generating interpolated color values interpolated from the geometric primitive data for pixel locations in the image and a texture modulator for multiplying the interpolated color values by texture or shadow modulation factors derived from texture samples in the texture cache;

a pixel engine in communication with the rasterizer to receive the pixel data, and to control transfer of selected pixel data to the rasterization buffer, including adding texture modulated pixels from the texture modulator with pixel data from a previous rendering pass in the rasterization buffer to composite pixel data from different rendering passes, and an antialiasing engine in communication with the rasterization buffer to resolve the selected pixel data, including composited pixel data, stored in the rasterization buffer and in communication with the gsprite memory to store resolved pixel data;

the rasterizer being in communication with the gsprite memory to read the resolved pixel data and to control transfers of the resolved pixel data to the texture cache;

the rasterizer being in communication with the texture cache to texture map the resolved pixel data in the texture cache to geometric primitives in the view volume, and to add the texture modulated, resolved pixels to pixel data from the rasterization buffer.

* * * * *

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Title page:
The following should appear in the References Cited section, under Other Publications:
-- Chapter 7: Blending, Antialiasing, and Fog, "Open GL Programming Guide," by Neider, Davis & Woo, pp. 196-199.

"The Accumulation Buffer: Hardware Support for High-Quality Rendering," by P. Haeberli and K. Akeley, *Computer Graphics*, Vol. 24, No. 4, August 1990, pp. 309-318.

"The A-Buffer, an Antialiased Hidden Surface Method," by Loren Carpenter, *Computer Graphics*, Vol. 18, No. 3, July 1984, pp. 103-108.

"A New Simple and Efficient Antialiasing with Subpizel Masks," by Andreas Schilling, *Computer Graphics*, Vol. 25, No. 4, July 1991, pp. 133-141.

"Exact: Algorithm and Hardware Architecture for an Improved A-Buffer," by A. Schilling and W. Straβer, *Computer Graphics Proceedings, Annual Conference Series*, 1993, pp. 85-91.

Regan, Matthew and Ronald Pose, "Priority Rendering with a Virtual Reality Address Recalculation Pipeline," *ACM Siggraph, '94, Computer Graphics Proceedings, Annual Conference Series*, pp. 155-162, 1994.

Regan, Matthew and Ronald Pose, "Low Latency Virtual Reality Display System," *Technical Report No. 92/166, Monash University, Victoria, Australia*, pp. 1-13, Sept. 1992.

Regan, Matthew and Ronald Pose, "A Interactive Graphics Display Architecture," *IEEE Virtual Reality, 1993 International Symposium*, pp. 293-299, 1993.

Torborg, Jay et al., "Talisman: Commodity Realtime 3D Graphics for the PC," *ACM Siggraph, Conference Proceedings*, pp. 353-363, August 4-9, 1993.

Deering, Michael et al., "Leo: A System for Cost Effective 3D Shaded Graphics," *ACM Siggraph, Conference Proceedings*, pp. 101-108, August 1-6, 1993.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Akerly, Kurt, "Reality Engine Graphics," *ACM Siggraph, Conference Proceedings*, pp. 109-116, August 1-6, 1993.

Mcmillan, Leonard et al., "Plenoptic Modeling: An Image-Based Rendering System," *ACM Siggraph, Conference Proceedings*, pp. 39-46, August 6-11, 1995.

Tan, Wee-Chiew et al., "Low-Power polygon Renderer for Computer Graphics," *Application Specific Array Processors, 1993 International Conference*, pp. 200-213, 1993.

Bae, Seong-Ok et al., "Patch Rendering: A New Parallel Hardware Architecture for Fast Polygon Rendering," *Circuits and Systems, 1991 IEEE International Symposium*, pp. 3070-3073, 1991.

Slater, Mel, "An Algorithm to Support 3D Interaction on Relatively Low Performance Graphics Systems," *Comput. & Graphics*, Vol. 16, No. 3, pp. 311-315. 1992.

Slater, Mel, "Segments on Bit-mapped Graphics Displays," *Software—Practice and Experience*, Vol. 16(II), pp. 965-980, Nov. 1986.

Chrysanthou, Y. and Slater, M., "Computing Dynamic Changes to BSP Trees," *Computer Graphics Forum*, Vol. II, No. 3, Conference Issue, pp. C-321 to C-342, Sept. 71—, 1992.

Slater, Mel et al., "Liberation from Rectangle: A Tiling Method for Dynamic Modification of Objects on Raster Displays," *Eurographics "88, conference date*, Sept. 12-16, 1988, pp. 381-392, 1998.

Slater, Mel et al., "Liberation from Flatland: 3D Interaction Based on the Desktop Bat," *Eurographics '91*, pp. 209-221, 1991.

Deering, "Explorations of Display Interfaces for Virtual Reality," *IEEE Virtual Reality, 1993 International Symposium*, pp. 141-147, 1993.

Reichlen, "Sparcchair: A One Hundred Milllion Pixel Display," *IEEE Virtual Reality, 1993 International Symposium*, pp. 300-307, May 28, 1993.

UNITED STATES PATENT AND TRADEMARK OFFICE
CERTIFICATE OF CORRECTION

PATENT NO.    : 5,977,977
DATED         : November 2, 1999
INVENTOR(S)   : Kajiya et al.

It is certified that error appears in the above-identified patent and that said Letters Patent is hereby corrected as shown below:

Foley, James D. et al., "Computer Graphics: Principles and Practices," *Addison-Wesley Publishing Co., 2nd ed.*, pp. 806-813, 855-921, 1990.

Collaborative work, "Pixel-Planes," *Pixel Planes Home Page, url-http://www.cs.unc.edu/~pxpl/, University of North Carolina*, pp.1-25, update, 9/26/95.

Oak Technology WARP5 Press Releases, "Oak Technology Sets New Standard for 3D Realism with Breakthrough WARP5 Chip Architecture," Atlanta, GA, June 19, 1997.

Bergman et al., "Image Rendering by Adaptive Refinement," *ACM Siggraph '86*, Vol. 20, No. 4, pp. 29-37, Aug. 18-22, 1986.

Chen, Chein-Liang et al., "A Raster Engine for Computer Graphics and Image Composing," *Abstract, APCCAS '94, IEEE*, pp. 103-108, Dec. 5-8, 1994.

Yoo, Terry S. et al., "Direct Visualization of Volume Data," *IEEE Computer Graphics and Applications Magazine*, Vol. 12, No. 4, pp. 63-71, July, 1992.

Bove, Jr., V. Michael et al., "Real-Time Decoding and Display of Structured Video," *IEEE Multimedia, 1994, International Conference*, pp. 456-462, 1994.

Heb, Andreas et al., "Three Dimensional Reconstruction of Brains from 2-Deoxyglycose Serial Section Autoradiographs," *Image Processing, 1994 International Conference*, Vol. 3, pp. 290-294, 1994.

Hu, Lincoln, "computer Graphics in Visual Effects," *COMPCON Spring '92, IEEE computer Society International Conference*, pp. 472-474, 1992.

Runyon, Kenneth R., "Advanced Graphics Processor," *Digital Avionics Systems, 1993 Conference*, pp. 394-399, 1993.

Crawfis, Roger A. et al., "A Scientific Visualization Synthesizer," *Visualization, 1991 conference*, pp. 262-267, 1991.

Haeberli, Paul et al., "The Accumulation Buffer: Hardware Support for High-Quality Rendering," *ACM Computer Graphics*, Vol. 24, No. 4, pp. 309-318, August, 1990.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Bae et al., "ESEU: A Hardware Architecture for Fast Image Generation," *Circuits and Systems, 1990 IEEE International Symposium*, pp. 73-76.

Column 1,
Line 37, "rendered 25 to " should read -- rendered to --.

Column 3,
Line 9, "add" should read -- and --.

Column 6,
Line 24, "SA and SB" should read -- 5A and 5B --.
Line 54, "aspects chunking" should read -- aspects of chunking --.

Column 12,
Line 13, "on board" should read --on a board --.
Line 33, "our the image" shoud read -- the image --.

Column 15,
Line 17, "is determine" should read -- is to determine --.

Column 16,
Line 50, "case the" should read -- case, the --.
Line 57, "build" should read -- builds --.

Column 18,
Line 32, "procession" should read -- processing --.
Line 17, "(MU)" should read -- (MMU) --.

Column 26,
Line 50, "fill" should read -- full --.

Column 29,
Line 21, "2X2" should read -- 2 by 2 --.

Column 31,
Line 59, "ISA" should rad -- 15A --.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Column 32,
Line 43, "characters arms" should read -- character's arms --.
Line 52, "actually is composed" should read -- actually composed --.
Line 53, "example "coffee cup"" should read -- example, the "coffee cup" -- and "be look at" should read -- be looked at --.
Line 55, "this" should read -- these --.

Column 33,
Line 40, "to of be" should read -- to be --.

Column 34,
Line 13, "flowchart" should read -- flowcharts --.

Column 35,
Line 46, "also achieved" should read -- also be achieved --.

Column 36,
Line 40, "(kb)" should read -- (kb)) --.
Line 41, "z-buffer" should read -- Z-buffer --.

Column 39,
Line 6, "if (bucket.context(attr)≠context(attr)" should read
-- if (bucket.context(attr)≠context(attr)) --.
Line 64, "if (bucket. context(attr)≠context(attr)" should read
-- if (bucket.context(attr)≠context(attr)) --.

Column 41,
Line 24, "comer" should read -- corner --.

Column 42,
Line 18, "know" should read -- known --.

Column 43,
Line 17, "bzim," should read -- bzim>, --.

Column 48,
Line 29, "decompression/decompression" should read -- compression/decompression --.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Column 49,
Line 15, "block))" should read -- block) --.

Column 53,
Line 34, "to" should read $t_o$ --.
Line 60, "$[x^i(t_0)S(t)=x^i(t)$" should read -- $[x^i(t_0)1]S(t)=x^i(t)$ --.

Column 54,
Line 20, "$D=x^1y^2-x^2y^1+x^2y^0-x^0y^0=x^0y^1+x^1y^0$" should read
--

Signed and Sealed this

Twenty-seventh Day of November, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Title page,
The following should appear in the References Cited section, under
OTHER PUBLICATIONS:
-- Chapter 7: Blending, Antialiasing, and Fog, "Open GL Programming Guide," by Neider, Davis & Woo, pp. 196-199.

"The Accumulation Buffer: Hardware Support for High-Quality Rendering," by P. Haeberli and K. Akeley, *Computer Graphics*, Vol. 24, No. 4, August 1990, pp. 309-318.

"The A-Buffer, an Antialiased Hidden Surface Method," by Loren Carpenter, *Computer Graphics*, Vol. 18, No. 3, July 1984, pp. 103-108.

"A New Simple and Efficient Antialiasing with Subpizel Masks," by Andreas Schilling, *Computer Graphics*, Vol. 25, No. 4, July 1991, pp. 133-141.

"Exact: Algorithm and Hardware Architecture for an Improved A-Buffer," by A. Schilling and W. Straßer, *Computer Graphics Proceedings, Annual Conference Series*, 1993, pp. 85-91.

Regan, Matthew and Ronald Pose, "Priority Rendering with a Virtual Reality Address Recalculation Pipeline," ACM *Siggraph, '94, Computer Graphics Proceedings, Annual Conference Series, pp.* 155-162, 1994.

Regan, Matthew and Ronald Pose, "Low Latency Virtual Reality Display System," *Technical Report No. 92/166, Monash University, Victoria, Australia,* pp. 1-13, Sept. 1992.

Regan, Matthew and Ronald Pose, "A Interactive Graphics Display Architecture," *IEEE Virtual Reality, 1993 International Symposium,* pp. 293-299, 1993.

Torborg, Jay et al., "Talisman: Commodity Realtime 3D Graphics for the PC," *ACM Siggraph, Conference Proceedings, pp.* 353-363, August 4-9, 1993.

Deering, Michael et al., "Leo: A System for Cost Effective 31) Shaded Graphics," *ACM Siggraph, Conference Proceedings, pp. 101-108,* August 1-6, 1993.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Akerly, Kurt, "Reality Engine Graphics," ACM *Siggraph, Conference Proceedings, pp.* 109-116, August 1-6, 1993.

Mcmillan, Leonard et al., "Plenoptic Modeling: An Image-Based Rendering System," *ACM Siggraph, Conference Proceedings, pp. 39-46,* August 6-11, 1995.

Tan, Wee-Chiew et al., "Low-Power polygon Renderer for Computer Graphics," *Application Specific Array Processors, 1993 International Conference, pp.* 200-213, 1993.

Bae, Seong-Ok et al., "Patch Rendering: A New Parallel Hardware Architecture for Fast Polygon Rendering," *Circuits and Systems, 1991 IEEE International Symposium*, pp. 3070-3073, 1991.

Slater, Mel, "An Algorithm to Support 3D Interaction on Relatively Low Performance Graphics Systems," *Comput. & Graphics,* Vol. 16, No. 3, pp. 311-315. 1992.

Slater, Mel, "Segments on Bit-mapped Graphics Displays," *Software—Practice and Experience*, Vol. 16(II), pp. 965-980, Nov. 1986.

Chrysanthou, Y. and Slater, M., "Computing Dynamic Changes to BSP Trees," *Computer Graphics Forum, Vol. II, No.* 3, Conference Issue, pp. C-321 to C-342, Sept. 71-, 1992.

Slater, Mel et al., "Liberation from Rectangle: A Tiling Method for Dynamic Modification of Objects on Raster Displays," *Eurographics "88, conference date,* Sept. 12-16, 1988, pp. 381-392, 1998.

Slater, Mel et al., "Liberation from Flatland: 3D Interaction Based on the Desktop Bat," *Eurographics `91, pp.* 209-221, 1991.

Deering, "Explorations of Display Interfaces for Virtual Reality," *IEEE Virtual Reality, 1993 International Symposium*, pp. 141-147, 1993.

Reichlen, "Sparcchair: A One Hundred Million Pixel Display," *IEEE Virtual Reality, 1993 International Symposium*, pp. 300-307, May 28, 1993.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Foley, James D. et al., "Computer Graphics: Principles and Practices," *Addison-Wesley Publishing Co.*, 2nd ed., pp. 806-813, 855-921, 1990.

Collaborative work, "Pixel-Planes," *Pixel Planes Home Page, url-http://www.cs.unc.edu/~pxpl, University of North Carolina*, pp. 1-25, update, 9/26/95.

Oak Technology WARP5 Press Releases, "Oak Technology Sets New Standard for 3D Realism with Breakthrough WARP5 Chip Architecture," Atlanta, GA, June 19, 1997.

Bergman et al., "Image Rendering by Adaptive Refinement," *ACM Siggraph '86*, Vol. 20, No. 4, pp. 29-37, Aug. 18-22, 1986.

Chen, Chein-Liang et al., "A Raster Engine for Computer Graphics and Image Composing," *Abstract, APCCAS '94, IEEE, pp.* 103-108, Dec. 5-8, 1994.

Yoo, Terry S. et al., "Direct Visualization of Volume Data," *IEEE Computer Graphics and Applications Magazine, Vol.* 12, No. 4, pp. 63-71, July, 1992.

Bove, Jr., V. Michael et al., "Real-Time Decoding and Display of Structured Video," *IEEE Multimedia, 1994, International Conference, pp.* 456-462, 1994.

Heb, Andreas et al., Three Dimensional Reconstruction of Brains from 2-Deoxyglycose Serial Section Autoradiographs," *Image Processing, 1994 International Conference, Vol.* 3, pp. 290-294, 1994.

Hu, Lincoln, "computer Graphics in Visual Effects," COMPCON *Spring '92, IEEE computer Society International Conference, pp.* 472-474,.1992.

Runyon, Kenneth R., "Advanced Graphics Processor," *Digital Avionics Systems, 1993 Conference, pp.* 394-399, 1993.

Crawfis, Roger A. et al., "A Scientific Visualization Synthesizer," *Visualization, 1991 conference, pp.* 262-267, 1991.

Haeberli, Paul et al., "The Accumulation Buffer: Hardware Support for High-Quality Rendering," *ACM Computer Graphics, Vol.* 24, No. 4, pp. 309-318, August, 1990.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Bae et al., "ESEU: A Hardware Architecture for Fast Image Generation," *Circuits and Systems, 1990IEEE International Symposium, pp. 73-76.*

Column 1,
Line 37, "rendered 25 to " should read -- rendered to --:

Column 3,
Line 9, "add" should read -- and --.

Column 6,
Lind 24, "SA and SB" should read -- 5A and 5B --.
Line 54, "aspects chunking" should read -- aspects of chunking --.

Column 12,
Line 13, "on board" should read --on a board --.
Line 33, "our the image" shoud read -- the image --.

Column 15,
Line 17, "is determine" should read -- is to determine --.

Column 16,
Line 50, "case the" should read -- case, the --.
Line 57, "build" should read - builds --.

Column 18,
Line 32, "procession" should read -- processing --.
Line 17, "(MU)" should read -- (MMU) --.

Column 26,
Line 50, "fill" should read -- full --.

Column 29,
Line 21, "2X2" should read -- 2 by 2 --.

Column 31,
Line 59, "ISA" should rid -- 15A --.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Column 32,
Line 43, "characters arms" should read -- character's arms --.
Line 52, "actually is composed" should read -- actually composed --.
Line 53, "example "coffee cup"" should read -- example, the "coffee cup" -- and "be look at" should read -- be looked at --.
Line 55, "this" should read -- these --.

Column 33,
Line 40, "to of be" should read -- to be --.

Column 34.
Line 13, "flowchart" should read -- flowcharts --.

Column 35,
Line 46, "also achieved" should read -- also be achieved --.

Column 36,
Line 40, "(kb)" should read -- (kb)) --.
Line 41, "z-buffer" should read -- Z-buffer --.

Column 39,
Line 6, "if (bucket.context(attr)≠context(attr)" should read -- if (bucket.context(attr) ≠context(attr)) --.
Line 64, "if (bucket. context(attr) ≠context(attr)" should read -- if (bucket.context(attr) ≠context(attr)) --.

Column 41,
Line 24, "comer" should read -- corner --.

Column 42,
Line 18, "know" should read -- known --.

Column 43,
Line 17, "bzim," should read -- bzim>, --.

Column 48,
Line 29, "decompression/decompression" should read -- compression/decompression --.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Column 49,
Line 15, "block))" should read -- block) --.

Column 53,
Line 34, "to" should read -- $t^o$ --.
Line 60, "$[x^j(t_o)S(t)=x^j(t)$" should read -- $[x^j(t_o)1]S(t) \, x^j(t)$ --.

Column 54,
Line 20, "D=$x^1y^2-x^2y^1+x^2y^0-x^0y^0=x^0y^1+x^1y^0$" should read -- D=$x^1y^2-x^2y^1+x^2y^0-x^0y^2+x^0y^1+x^1y^0$ --.

Column 55,
Line 1 (page 80, line 12 of the application), "$[\tilde{X}1]^T[\tilde{X}1]S=[\tilde{X}19^T X$" should read
-- $[\tilde{X} \; 1]^T [\tilde{X} \; 1] S = [\tilde{X} \; 1]^T X$ --.

Line 21, "branches based" should read --branches are based--.
Line 25, "to" should read -- $t_o$ --.

Column 58,
Line 14, "sprite" should read -- gsprite --.
Line 55, "yf," should read --yf; --.

Column 61,
Line 11, "provided" should read --provide--.

Column 62,
Line 9, "can implemented" should read --can be implemented--.

Column 64,
Line 55, "filly" should read --fully--.

Column 65,
Line 45, "in 20 the" should read --in the--.

Column 66,
Line 38, "tabled" should read --table--.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

<u>Column 66, line 42 through column 68, line 2,</u>
Should read:

-- against the set of slope ranges, and the index associated with the range containing this slope value is used as the index into the coverage order table.

A method for computing the coverage mask is described in Schilling, A. "A New Simple and Efficient Anti-Aliasing with Subpixel Masks," *Computer Graphics*, Vol. 25, No. 4, July 1991, pp. 133-141.

After the image processor generates fragment data for a pixel location, it then sorts and resolves this fragment data to compute color at that location. As described above, the image processor generates and maintain fragments for partially covered pixels. A pixel is partially covered by a polygon if one or more of the polygon's edges cross the pixel, or if the polygon has translucency. Maintaining fragment data to perform both antialiasing and translucency computations can require a significant amount of memory. As the number of rendered polygons increases, the amount of memory to store pixel data and fragments also increases.

In addition to the increased memory requirements, the amount of processing required to resolve fragments can be significant as well. In a Z-buffer approach, fragment data is depth sorted. In general, the primitive data is not sorted in depth order as it arrives for rendering. Since primitive data arrives in arbitrary depth order, the image processor has to sort the fragment data after generating it. The sorted data is then processed to determine the color and possibly the alpha at a pixel location. At each pixel location, several fragments can contribute to the color. If alpha is also computed the number of fragments and the complexity of processing increases as well.

For the reasons highlighted above, the memory and processing requirements to support advanced antialiasing and translucency can be substantial. There is a conflict between supporting sophisticated antialiasing and translucency computations, on one hand, and reducing memory requirements on the other. To reduce the cost of the system, the use of memory should be minimized, yet advanced antialiasing and translucency features usually require more memory. It is even more difficult to support these advanced features in a real time system while still minimizing memory requirements.

In one embodiment, our system renders primitives one chunk at a time, which reduces memory and allows for fragment resolution in a post processing step. While pixel data is generated for one chunk, pixel data of another chunk can be resolved. A number of benefits impacting fragment sorting and pixel resolution follow from the chunking concept. Memory requirements are significantly reduced because much of the data generated during the rasterizing process does not have to be retained after the image processor has resolved the pixels in a chunk. The image processor only needs to retain the resolved color portion after resolving a chunk.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Another advantage to rendering chunks is that the pixel and fragment memory can be implemented to reduce the overhead of memory accesses. Typical graphics systems use external memories to implement color, depth and fragment buffers. It is very difficult to organize this external memory to satisfy the rigorous bandwidth requirements of real time image processing. The pixel and fragment memory needed to support rendering of a chunk, such as a 32 x 32 pixel region, does not have to be located in external memory. Instead, it can be implemented on the same hardware that performs rasterizing and antialiasing functions. For example, in the implementation described above, the fragment and pixel buffers can be implemented on a single chip.

The use of on-chip memories simplifies the bandwidth problems associated with external memory. On-chip memories enable efficient use of multiple memory banks. For example, one bank can be used for the pixel buffer, and another bank can be used for fragment records.

Another advantage of on-chip memory is that it is less expensive and easier to implement multi-port memories. The performance of the pixel and fragment buffers can be enhanced through the use of multi-port memories, which allow simultaneous reads and/ or writes to achieve one clock per pixel processing rate. Since the fragment buffer is much smaller when chunks are rendered separately, it can be implemented on chip. Both the smaller size of the memory and its presence on-chip make it feasible and cost effective to use multi-port memory. External multi-port memories on the other hand, are expensive due to the higher per bit cost and connections between chips.

Another important advantage related to chunking is that pixels for one portion of a frame can be generated while pixels for another portion are resolved. Thus, instead of generating pixels for an entire frame and then resolving those pixels, our approach can overlap the processes of generating and resolving pixels, reducing system transport delay.

In one embodiment of our system, the image processor resolves fragments in a post processing step. While the pixel engine generates pixel data for part of an image, the anti-aliasing engine resolves fragments for another part of an image. As noted above, the pixel data is double buffered: the pixel engine can --.

Column 75,
Line 2, "follows." should read --follows:--.
Line 28, "follows." should read --follows:--.
Line 48, "follows." should read --follows:--.

Column 76,
Line 47, "BITS));" should read --BITS);--.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

Page 9 of 9

It is certified that error appears in the above-identified patent and that said Letters Patent is hereby corrected as shown below:

Column 78,
Line 58, "N·L$_2$S$_2$" should read -- N·L$_2$s$_2$ --.

Column 90,
Line 53, "Claim 9" should read -- Claim 10 --.

This certificate supercedes Certificate of Correction issued on November 27, 2001.

Signed and Sealed this

Twenty-fifth Day of December, 2001

*Attest:*

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.     : 5,977,977
DATED          : November 2, 1999
INVENTOR(S)    : Kajiya et al.

It is certified that error appears in the above-identified patent and that said Letters Patent is hereby corrected as shown below:

Title page:
The following should appear in the References Cited section, under OTHER PUBLICATIONS:

-- Chapter 7: Blending, Antialiasing, and Fog, "Open GL Programming Guide," by Neider, Davis & Woo, pp. 196-199.

"The Accumulation Buffer: Hardware Support for High-Quality Rendering," by P. Haeberli and K. Akeley, *Computer Graphics*, Vol. 24, No. 4, August 1990, pp. 309-318.

"The A-Buffer, an Antialiased Hidden Surface Method," by Loren Carpenter, *Computer Graphics*, Vol. 18, No. 3, July 1984, pp. 103-108.

"A New Simple and Efficient Antialiasing with Subpizel Masks," by Andreas Schilling, *Computer Graphics*, Vol. 25, No. 4, July 1991, pp. 133-141.

"Exact: Algorithm and Hardware Architecture for an Improved A-Buffer," by A. Schilling and W. Straßer, *Computer Graphics Proceedings, Annual Conference Series*, 1993, pp. 85-91.

Regan, Matthew and Ronald Pose, "Priority Rendering with a Virtual Reality Address Recalculation Pipeline," *ACM Siggraph, '94, Computer Graphics Proceedings, Annual Conference Series*, pp. 155-162, 1994.

Regan, Matthew and Ronald Pose, "Low Latency Virtual Reality Display System," *Technical Report No. 92/166, Monash University, Victoria, Australia*, pp. 1-13, Sept. 1992.

Regan, Matthew and Ronald Pose, "A Interactive Graphics Display Architecture," *IEEE Virtual Reality, 1993 International Symposium*, pp. 293-299, 1993.

Torborg, Jay et al., "Talisman: Commodity Realtime 3D Graphics for the PC," *ACM Siggraph, Conference Proceedings*, pp. 353-363, August 4-9, 1993.

Deering, Michael et al., "Leo: A System for Cost Effective 3D Shaded Graphics," *ACM Siggraph, Conference Proceedings*, pp. 101-108, August 1-6, 1993.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Akerly, Kurt, "Reality Engine Graphics," ACM *Siggraph, Conference Proceedings*, pp. 109-116, August 1-6, 1993.

Mcmillan, Leonard et al., "Plenoptic Modeling: An Image-Based Rendering System," *ACM Siggraph, Conference Proceedings*, pp. 39-46, August 6-11, 1995.

Tan, Wee-Chiew et al., "Low-Power polygon Renderer for Computer Graphics," *Application Specific Array Processors, 1993 International Conference*, pp. 200-213, 1993.

Bae, Seong-Ok et al., "Patch Rendering: A New Parallel Hardware Architecture for Fast Polygon Rendering," *Circuits and Systems, 1991 IEEE International Symposium*, pp. 3070-3073, 1991.

Slater, Mel, "An Algorithm to Support 3D Interaction on Relatively Low Performance Graphics Systems," *Comput. & Graphics*, Vol. 16, No. 3, pp. 311-315. 1992.

Slater, Mel, "Segments on Bit-mapped Graphics Displays," *Software—Practice and Experience*, Vol. 16(II), pp. 965-980, Nov. 1986.

Chrysanthou, Y. and Slater, M., "Computing Dynamic Changes to BSP Trees," *Computer Graphics Forum, Vol. II, No. 3*, Conference Issue, pp. C-321 to C-342, Sept. 7-11, 1992.

Slater, Mel et al., "Liberation from Rectangle: A Tiling Method for Dynamic Modification of Objects on Raster Displays," *Eurographics "88, conference date*, Sept. 12-16, 1988, pp. 381-392, 1988.

Slater, Mel et al., "Liberation from Flatland: 3D Interaction Based on the Desktop Bat," *Eurographics '91*, pp. 209-221, 1991.

Deering, "Explorations of Display Interfaces for Virtual Reality," *IEEE Virtual Reality, 1993 International Symposium*, pp. 141-147, 1993.

Reichlen, "Sparcchair: A One Hundred Million Pixel Display," *IEEE Virtual Reality, 1993 International Symposium*, pp. 300-307, May 28, 1993.

UNITED STATES PATENT AND TRADEMARK OFFICE
CERTIFICATE OF CORRECTION

PATENT NO.   : 5,977,977
DATED        : November 2, 1999
INVENTOR(S)  : Kajiya et al.

It is certified that error appears in the above-identified patent and that said Letters Patent is hereby corrected as shown below:

Foley, James D. et al., "Computer Graphics: Principles and Practices," *Addison-Wesley Publishing Co.*, 2$^{nd}$ ed., pp. 806-813, 855-921, 1990.

Collaborative work, "Pixel-Planes," *Pixel Planes Home Page*, url-http://www.cs.unc.edu/~pxpl, *University of North Carolina*, pp.1-25, update, 9/26/95.

Oak Technology WARP5 Press Releases, "Oak Technology Sets New Standard for 3D Realism with Breakthrough WARP5 Chip Architecture," Atlanta, GA, June 19, 1997.

Bergman et al., "Image Rendering by Adaptive Refinement," *ACM Siggraph '86*, Vol. 20, No. 4, pp. 29-37, Aug. 18-22, 1986.

Chen, Chein-Liang et al., "A Raster Engine for Computer Graphics and Image Composing," *Abstract, APCCAS '94, IEEE, pp.* 103-108, Dec. 5-8, 1994.

Yoo, Terry S. et al., "Direct Visualization of Volume Data," *IEEE Computer Graphics and Applications Magazine, Vol.* 12, No. 4, pp. 63-71, July, 1992.

Bove, Jr., V. Michael et al., "Real-Time Decoding and Display of Structured Video," *IEEE Multimedia, 1994, International Conference*, pp. 456-462, 1994.

Heb, Andreas et al., "Three Dimensional Reconstruction of Brains from 2-Deoxyglycose Serial Section Autoradiographs," *Image Processing, 1994 International Conference*, Vol. 3, pp. 290-294, 1994.

Hu, Lincoln, "computer Graphics in Visual Effects," COMPCON *Spring '92, IEEE computer Society International Conference, pp.* 472-474, 1992.

Runyon, Kenneth R., "Advanced Graphics Processor," *Digital Avionics Systems, 1993 Conference*, pp. 394-399, 1993.

Crawfis, Roger A. et al., "A Scientific Visualization Synthesizer," *Visualization, 1991 conference*, pp. 262-267, 1991.

Haeberli, Paul et al., "The Accumulation Buffer: Hardware Support for High-Quality Rendering," *ACM Computer Graphics, Vol.* 24, No. 4, pp. 309-318, August, 1990.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Bae et al., "ESEU: A Hardware Architecture for Fast Image Generation," *Circuits and Systems, 1990IEEE International Symposium, pp. 73-76.*

Column 1,
Line 37, "rendered 25 to" should read -- rendered to --.

Column 3,
Line 9, "add" should read -- and --.

Column 6,
Line 24, "SA and SB" should read -- 5A and 5B --.
Line 54, "aspects chunking" should read -- aspects of chunking --.

Column 12,
Line 13, "on board" should read -- on a board --.
Line 33, "our the image" should read -- the image --.

Column 15,
Line 17, "is determine" should read -- is to determine --.

Column 16,
Line 50, "case the" should read -- case, the --.
Line 57, "build" should read -- builds --.

Column 18,
Line 32, "procession" should read -- processing --.
Line 17, "(MU)" should read -- (MMU) --.

Column 26,
Line 50, "fill" should read -- full --.

Column 29,
Line 21, "2X2" should read -- 2 by 2 --.

Column 31,
Line 59, "ISA" should read -- 15A --.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Column 32,
Line 43, "characters arms" should read -- character's arms --.
Line 52, "actually is composed" should read -- actually composed --.
Line 53, "example "coffee cup"" should read -- example, the "coffee cup" -- and "be look at" should read -- be looked at --.
Line 55, "this" should read -- these --.

Column 33,
Line 40, "to of be" should read -- to be --.

Column 34,
Line 13, "flowchart" should read -- flowcharts --.

Column 35,
Line 46, "also achieved" should read -- also be achieved --.

Column 36,
Line 40, "(kb)" should read -- (kb)) --.
Line 41, "z-buffer" should read -- Z-buffer --.

Column 39,
Line 6, "if (bucket.context(attr)≠context(attr)" should read
-- if (bucket.context(attr)≠context(attr)) --.
Line 64, "if (bucket. context(attr) ≠context(attr)" should read
-- if (bucket.context(attr)≠context(attr)) --.

Column 41,
Line 24, "comer" should read -- corner --.

Column 42,
Line 18, "know" should read -- known --.

Column 43,
Line 17, "bzim," should read -- bzim>, --.

Column 48,
Line 29, "decompression/decompression" should read -- compression/decompression --.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Column 49,
Line 15, "block))" should read -- block) --.

Column 53,
Line 34, "to" should read -- $t_o$ --.
Line 60, "$[x^i(t_o)S(t)=x^i(t)$" should read -- $[-x^{-i}(t_o)1]S(t) = x^{-i}(t)$ --.

Column 54,
Line 20, "$D=x^1y^2-x^2y^1+x^2y^0-x^0y^0=x^0y^1+x^1y^0$" should read -- $D=x^1y^2-x^2y^1+x^2y^0-x^0y^2+x^0y^1+x^1y^0$ --.

Column 55,
Line 1 (page 80, line 12 of the application), "$[\tilde{X}1]^T[\tilde{X}1]S = [\tilde{X}19^T X$" should read -- $[\tilde{X}\ 1]^T [\tilde{X}\ 1] S = [\tilde{X}\ 1]^T X$ --.

Line 21, "branches based" should read -- branches are based --.
Line 25, "to" should read -- $t_o$ --.

Column 58,
Line 14, "sprite" should read -- gsprite --.
Line 55, "yf," should read -- yf; --.

Column 61,
Line 11, "provided" should read -- provide --.

Column 62,
Line 9, "can implemented" should read -- can be implemented --.

Column 64,
Line 55, "filly" should read -- fully --.

Column 65,
Line 45, "in 20 the" should read -- in the --.

Column 66,
Line 38, "tabled" should read -- table --.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

<u>Column 66, line 42 through column 68, line 2,</u>
Should read:

-- against the set of slope ranges, and the index associated with the range containing this slope value is used as the index into the coverage order table.

A method for computing the coverage mask is described in Schilling, A. "A New Simple and Efficient Anti-Aliasing with Subpixel Masks," *Computer Graphics*, Vol. 25, No. 4, July 1991, pp. 133-141.

After the image processor generates fragment data for a pixel location, it then sorts and resolves this fragment data to compute color at that location. As described above, the image processor generates and maintain fragments for partially covered pixels. A pixel is partially covered by a polygon if one or more of the polygon's edges cross the pixel, or if the polygon has translucency. Maintaining fragment data to perform both antialiasing and translucency computations can require a significant amount of memory. As the number of rendered polygons increases, the amount of memory to store pixel data and figments also increases.

In addition to the increased memory requirements, the amount of processing required to resolve fragments can be significant as well. In a Z-buffer approach, fragment data is depth sorted. In general, the primitive data is not sorted in depth order as it arrives for rendering. Since primitive data arrives in arbitrary depth order, the image processor has to sort the fragment data after generating it. The sorted data is then processed to determine the color and possibly the alpha at a pixel location. At each pixel location, several fragments can contribute to the color. 1f alpha is also computed the number of fragments and the complexity of processing increases as well.

For the reasons highlighted above, the memory and processing requirements to support advanced antialiasing and translucency can be substantial. There is a conflict between supporting sophisticated antialiasing and translucency computations, on one hand, and reducing memory requirements on the other. To reduce the cost of the system, the use of memory should be minimized, yet advanced antialiasing and translucency features usually require more memory. It is even more difficult to support these advanced features in a real time system while still minimizing memory requirements.

In one embodiment, our system renders primitives one chunk at a time, which reduces memory and allows for fragment resolution in a post processing step. While pixel data is generated for one chunk, pixel data of another chunk can be resolved. A number of benefits impacting fragment sorting and pixel resolution follow from the chunking concept. Memory requirements are significantly reduced because much of the data generated during the rasterizing process does not have to be retained after the image processor has resolved the pixels in a chunk. The image processor only needs to retain the resolved color portion after resolving a chunk.

UNITED STATES PATENT AND TRADEMARK OFFICE
CERTIFICATE OF CORRECTION

PATENT NO. : 5,977,977
DATED : November 2, 1999
INVENTOR(S) : Kajiya et al.

It is certified that error appears in the above-identified patent and that said Letters Patent is hereby corrected as shown below:

Another advantage to rendering chunks is that the pixel and fragment memory can be implemented to reduce the overhead of memory accesses. Typical graphics systems use external memories to implement color, depth and fragment buffers. It is very difficult to organize this external memory to satisfy the rigorous bandwidth requirements of real time image processing. The pixel and fragment memory needed to support rendering of a chunk, such as a 32 x 32 pixel region, does not have to be located in external memory. Instead, it can be implemented on the same hardware that performs rasterizing and antialiasing functions. For example, in the implementation described above, the fragment and pixel buffers can be implemented on a single chip.

The use of on-chip memories simplifies the bandwidth problems associated with external memory. On-chip memories enable efficient use of multiple memory banks. For example, one bank can be used for the pixel buffer, and another bank can be used for fragment records.

Another advantage of on-chip memory is that it is less expensive and easier to implement multi-port memories. The performance of the pixel and fragment buffers can be enhanced through the use of multi-port memories, which allow simultaneous reads and/or writes to achieve one clock per pixel processing rate. Since the fragment buffer is much smaller when chunks are rendered separately, it can be implemented on chip. Both the smaller size of the memory and its presence on-chip make it feasible and cost effective to use multi-port memory. External multi-port memories on the other hand, are expensive due to the higher per bit cost and connections between chips.

Another important advantage related to chunking is that pixels for one portion of a frame can be generated while pixels for another portion are resolved. Thus, instead of generating pixels for an entire frame and then resolving those pixels, our approach can overlap the processes of generating and resolving pixels, reducing system transport delay.

In one embodiment of our system, the image processor resolves fragments in a post processing step. While the pixel engine generates pixel data for part of an image, the anti-aliasing engine resolves fragments for another part of an image. As noted above, the pixel data is double buffered: the pixel engine can --.

Column 75,
Line 2, "follows." should read -- follows: --.
Line 28, "follows." should read -- follows: --.
Line 48, "follows." should read -- follows: --.

Column 76,
Line 47, "BITS));" should read -- BITS); --.

UNITED STATES PATENT AND TRADEMARK OFFICE
CERTIFICATE OF CORRECTION

PATENT NO.   : 5,977,977
DATED        : November 2, 1999
INVENTOR(S)  : Kajiya et al.

It is certified that error appears in the above-identified patent and that said Letters Patent is hereby corrected as shown below:

Column 78,
Line 58, "$N \cdot L_2 S_2$" should read -- $N \cdot L_2 S_2$ --.

Column 90,
Line 53, "Claim 9" should read -- Claim 10 --.

This certificate supersedes Certificate of Correction issued on December 25, 2001.

Signed and Sealed this

Nineteenth Day of November, 2002

Attest:

Attesting Officer

JAMES E. ROGAN
Director of the United States Patent and Trademark Office